United States Patent
Okada et al.

(10) Patent No.: US 9,205,326 B2
(45) Date of Patent: Dec. 8, 2015

(54) PORTABLE VIDEO GAME SYSTEM

(71) Applicant: Nintendo Co., Ltd., Kyoto (JP)

(72) Inventors: Satoru Okada, Kyoto (JP); Kazuo Yoneyama, Kyoto (JP); Masahiko Ota, Kyoto (JP); Ryuji Umezu, Kyoto (JP); Takanobu Nakashima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/281,516

(22) Filed: May 19, 2014

(65) Prior Publication Data

US 2014/0295965 A1 Oct. 2, 2014

Related U.S. Application Data

(60) Division of application No. 12/230,253, filed on Aug. 26, 2008, now Pat. No. 8,821,287, which is a division of application No. 09/722,410, filed on Nov. 28, 2000, now Pat. No. 7,445,551, which is a continuation-in-part of application No. 09/627,440, filed on Jul. 28, 2000, now abandoned.

(30) Foreign Application Priority Data

| May 24, 2000 | (JP) | ................................ 2000-153706 |
| May 24, 2000 | (JP) | ................................ 2000-153707 |
| May 24, 2000 | (JP) | ................................ 2000-153708 |

(51) Int. Cl.
*A63F 9/24* (2006.01)
*A63F 13/00* (2014.01)
(Continued)

(52) U.S. Cl.
CPC .................. *A63F 13/00* (2013.01); *A63F 13/08* (2013.01); *A63F 13/10* (2013.01); *A63F 2300/204* (2013.01); *A63F 2300/206* (2013.01)

(58) Field of Classification Search
CPC .................................................... G07F 17/3202
USPC ............................................................ 463/42
See application file for complete search history.

(56) References Cited

U.S. PATENT DOCUMENTS

| 3,818,483 A | 6/1974 | Yamauchi et al. |
| 4,119,955 A | 10/1978 | Nichols, III |

(Continued)

FOREIGN PATENT DOCUMENTS

| EP | 0 960 637 | 12/1999 |
| JP | 63-242293 | 9/1988 |

(Continued)

OTHER PUBLICATIONS

Computer Closet Collection, NEC Turbo Express, printed from wysiwyg://22/http://www.geocities.com/~compcloset/NECTurboExpress.htm on Sep. 28, 2000 (2 pages), copyright 1997-1999, last modified Jun. 24, 1999.

(Continued)

*Primary Examiner* — Reginald Renwick
(74) *Attorney, Agent, or Firm* — Nixon & Vanderhye, P.C.

(57) ABSTRACT

An example display system for playing a video game includes a hand-holdable housing; a liquid crystal display; one or more input devices; a first boot ROM storing code that is executed if a video game program for the video game has a first specification; and a second boot ROM storing code that is executed if a video game program for the video game has a second specification.

13 Claims, 144 Drawing Sheets

(51) Int. Cl.
*A63F 13/90* (2014.01)
*A63F 13/40* (2014.01)

(56) References Cited

U.S. PATENT DOCUMENTS

| | | |
|---|---|---|
| 4,162,792 A | 7/1979 | Chang et al. |
| 4,204,728 A | 5/1980 | Goshima et al. |
| 4,249,735 A | 2/1981 | Bromley |
| 4,255,786 A | 3/1981 | Holley et al. |
| 4,324,401 A | 4/1982 | Stubben et al. |
| 4,324,402 A | 4/1982 | Klose |
| 4,327,915 A | 5/1982 | Bromley |
| 4,344,622 A | 8/1982 | Nissim |
| 4,359,222 A | 11/1982 | Smith, III et al. |
| 4,395,760 A | 7/1983 | Soski et al. |
| 4,398,086 A | 8/1983 | Smith, III |
| 4,438,926 A | 3/1984 | Yokoi et al. |
| 4,481,529 A | 11/1984 | Kerling |
| 4,516,777 A | 5/1985 | Nikora |
| 4,542,903 A | 9/1985 | Yokoi et al. |
| 4,628,304 A | 12/1986 | Bottiau |
| 4,639,225 A | 1/1987 | Washizuka |
| 4,683,466 A | 7/1987 | Holley et al. |
| 4,703,318 A | 10/1987 | Haggerty |
| 4,754,270 A | 6/1988 | Murauchi |
| 4,835,681 A | 5/1989 | Culley |
| 4,865,321 A | 9/1989 | Nakagawa et al. |
| 4,890,222 A | 12/1989 | Kirk |
| 4,907,225 A | 3/1990 | Gulick et al. |
| 4,922,420 A | 5/1990 | Nakagawa et al. |
| 4,924,413 A | 5/1990 | Suwannukul |
| 4,931,860 A | 6/1990 | Narumiya |
| 4,979,738 A | 12/1990 | Frederiksen |
| 4,981,296 A | 1/1991 | Shiraishi et al. |
| 4,984,193 A | 1/1991 | Nakagawa |
| 5,023,603 A | 6/1991 | Wakimoto et al. |
| 5,026,058 A | 6/1991 | Bromley |
| D318,884 S | 8/1991 | Kojo |
| 5,095,798 A | 3/1992 | Okada et al. |
| 5,109,504 A | 4/1992 | Littleton |
| 5,125,671 A | 6/1992 | Ueda et al. |
| 5,134,391 A | 7/1992 | Okada |
| 5,155,380 A | 10/1992 | Hwang et al. |
| 5,161,803 A | 11/1992 | Ohara |
| 5,184,830 A | 2/1993 | Okada et al. |
| 5,207,426 A | 5/1993 | Inoue et al. |
| 5,238,250 A | 8/1993 | Leung et al. |
| 5,245,327 A | 9/1993 | Pleva et al. |
| 5,265,888 A | 11/1993 | Yamamoto et al. |
| 5,291,189 A | 3/1994 | Otake et al. |
| 5,300,944 A | 4/1994 | Shapiro et al. |
| 5,308,086 A | 5/1994 | Ueda et al. |
| 5,327,158 A | 7/1994 | Takahashi et al. |
| 5,337,069 A | 8/1994 | Otake et al. |
| 5,371,512 A | 12/1994 | Otake et al. |
| 5,395,112 A | 3/1995 | Darling |
| 5,400,052 A | 3/1995 | Otake et al. |
| 5,400,053 A | 3/1995 | Johary et al. |
| 5,412,800 A | 5/1995 | Bril et al. |
| 5,442,375 A | 8/1995 | Wojaczynski et al. |
| 5,453,763 A | 9/1995 | Nakagawa et al. |
| 5,483,257 A | 1/1996 | Otake et al. |
| 5,495,266 A | 2/1996 | Otake et al. |
| 5,509,663 A | 4/1996 | Otake et al. |
| 5,543,925 A | 8/1996 | Timmermans |
| 5,552,799 A | 9/1996 | Hashiguchi |
| 5,556,108 A | 9/1996 | Nagano et al. |
| 5,559,954 A | 9/1996 | Sakoda et al. |
| 5,560,614 A | 10/1996 | Ueda et al. |
| 5,587,723 A | 12/1996 | Otake et al. |
| 5,592,651 A | 1/1997 | Rackman |
| 5,603,064 A | 2/1997 | Bennett |
| 5,608,424 A | 3/1997 | Takahashi et al. |
| 5,617,546 A | 4/1997 | Shih et al. |
| RE35,520 E | 5/1997 | Darling et al. |
| 5,659,673 A | 8/1997 | Nonoshita |
| 5,703,616 A | 12/1997 | Kawasugi |
| 5,708,457 A | 1/1998 | Otake et al. |
| 5,759,104 A | 6/1998 | Shirae et al. |
| 5,768,608 A | 6/1998 | Nakamura |
| 5,770,533 A | 6/1998 | Franchi |
| 5,784,047 A | 7/1998 | Cahill, III et al. |
| 5,785,598 A | 7/1998 | Hsu |
| 5,790,096 A | 8/1998 | Hill, Jr. |
| 5,793,351 A | 8/1998 | Leach |
| 5,808,591 A | 9/1998 | Mantani |
| 5,838,296 A | 11/1998 | Butler et al. |
| 5,844,532 A | 12/1998 | Silverbrook et al. |
| 5,854,620 A | 12/1998 | Mills et al. |
| 5,892,939 A | 4/1999 | Call et al. |
| 5,896,140 A | 4/1999 | O'Sullivan |
| 5,903,270 A | 5/1999 | Gentry et al. |
| 5,937,199 A | 8/1999 | Temple |
| 5,940,068 A | 8/1999 | Hasegawa et al. |
| 5,954,808 A | 9/1999 | Paul |
| 5,959,596 A | 9/1999 | McCarten et al. |
| 5,969,707 A | 10/1999 | Hsu |
| 6,010,405 A | 1/2000 | Morawiec |
| 6,020,751 A | 2/2000 | Rampone et al. |
| 6,042,478 A | 3/2000 | Ng |
| 6,047,373 A | 4/2000 | Hall et al. |
| 6,052,794 A | 4/2000 | Polzin et al. |
| 6,115,054 A | 9/2000 | Giles |
| 6,132,315 A | 10/2000 | Miyamoto et al. |
| 6,146,277 A | 11/2000 | Ikeda |
| 6,153,843 A | 11/2000 | Date et al. |
| 6,200,216 B1 | 3/2001 | Peppel |
| 6,209,043 B1 | 3/2001 | Sanemitsu |
| 6,295,646 B1 | 9/2001 | Goldschmidt Iki et al. |
| 6,311,246 B1 | 10/2001 | Wegner et al. |
| 6,315,669 B1 | 11/2001 | Okada et al. |
| 6,322,447 B1 | 11/2001 | Okada et al. |
| 6,334,815 B2 | 1/2002 | Miyamoto et al. |
| 6,480,929 B1 | 11/2002 | Gauthier et al. |
| 6,508,712 B1 | 1/2003 | Miyagawa |
| 7,445,551 B1 | 11/2008 | Okada et al. |
| 2001/0047452 A1 | 11/2001 | Okada et al. |
| 2009/0069083 A1 | 3/2009 | Okada et al. |

FOREIGN PATENT DOCUMENTS

| | | |
|---|---|---|
| JP | 4-49989 | 2/1992 |
| JP | 4-140791 | 5/1992 |
| JP | 4-140792 | 5/1992 |
| JP | 5-204820 | 8/1993 |
| JP | 6-42263 | 6/1994 |
| JP | 7-204349 | 8/1995 |
| JP | 8-180149 | 7/1996 |
| JP | 10-137447 | 5/1998 |
| JP | 10-222621 | 8/1998 |
| JP | 10-328408 | 12/1998 |
| JP | 11-207034 | 8/1999 |
| JP | 11-333144 | 12/1999 |
| WO | WO 89/10171 | 11/1989 |

OTHER PUBLICATIONS

NEC Turbo Express, printed date unknown from http://www.edu.uni-klu.ac.at/~kseiner/express/html on Sep. 28, 2000 (2 pages), document date unknown.

Turbo Express FAQ, printed from http://www.gameconsoles.com/turboexp_faq.htm on Sep. 28, 2000 (18 pages), last revision of document: May 25, 1995.

Computer Closet Collection, Sega Game Gear, printed from wysiwyg://28/http://www.geocities.com/~compcloset/SegaGameGear.htm on Sep. 28, 2000 (2 pages), copyright 1997-1999, last modified Jun. 22, 1999.

The Real Game Gear FAQ, Version GG.04, Dec. 1999, printed from http://www.classicgaming.com/museum/realggfaq.txt on Sep. 28, 2000 (32 pages).

Computer Closet Collection, Atari Lynx, printed from wysiwyg://12/http://www.geocities.com/~compcloset/AtariLynx.htm on Sep. 28, 2000 (2 pages), copyright 1997-1999, last modified Jun. 22, 1999.

(56) References Cited

OTHER PUBLICATIONS

[FAQ] Atari Lynx Frequently-Asked Questions, printed from http://www.landfield.com/faqs/games/video-games/atari/lynx on Sep. 28, 2000 (16 pages), last revision of document: May 1, 2000.
Computer Closet Collection, Nintendo Game Boy/Game Boy Light, printed from wysiwyg://40/http://www.geocities.com/~compcloset/NintendoGameBoy.htm on Sep. 28, 2000 (5 pages), copyright 1997-1999, last modified Jun. 22, 1999.
Computer Closet Collection, Milton-Bradley Microvision, printed from wysiwyg://52/http://www.geocities.com/~compcloset/MiltonBradley-Microvision.htm on Sep. 28, 2000 (2 pages), copyright 1997-1999, last modified Jun. 22, 1999.
Microvision FAQ Version 0.08, copyright 1994, 1995, printed from http://www.gameconsoles.com/microvision_faq.htm on Sep. 28, 2000 (13 pages).
Computer Closet Collection, Sega Nomad, printed from wysiwyg://34/http://www.geocities.com/~compcloset/SegaNomad.htm on Sep. 28, 2000 (2 pages), copyright 1997-1999, last modified Jun. 22, 1999.
Sega Nomad Press Announcement of Aug. 22, 1995, printed from http://gamezero.com/team-0/whats_new/past/nomad.html on Sep. 28, 2000 (2 pages).
Computer Closet Collection, Tiger Game.com, printed from wysiwyg://46/http://www.geocities.com/~compcloset/TigerGameCom.htm on Sep. 28, 2000 (1 page), copyright 1997-1999, last modified Jun. 22, 1999.
Tiger Game.Com, "Low Cost, Big Games", printed from http://gamecenter.com/Consoles/Features/Pocket/ss02.html on Sep. 28, 2000 (2 pages), document date unknown.
"CardBus—The 32-bit PC Card Option"; The Worldwide Organization for Modular Peripherals; pp. 1-3; PCMCIA 1995.
U.S. Appl. No. 09/627,440.
British Toys & Hobbies, "Milton Bradley—a very individual range," vol. 29, No. 1, Jan. 1980, (3 pages).
Playthings, American Toy Fair Special Highlights Edition, "Tomy augments toys with none additions for kids aged three and up," (3 pages), no date.
Playthings, Directory Issue, Market Reference Information for Buyers & Manufacturers of Toys, Hobbies & Crafts (2 pages), May 31, 1980.
'83 New Brandai Fair, "Animest," (2 pages).
Playthings, 1983 American Toy Fair Special Highlights Edition, "Thumb Power puts imprint on its new handheld games," (3 pages), Feb. 1983.
Playthings, Unveiling the 1983 Toy Lines Electronic Circuit: Expanded Section, "Nintendo Goes Beyond Hand-Held Electronic Games," (3 pages), no date.
Playthings, Special Highlights Edition, Extra: Licensing Scope; Visitor's Guide to New York, vol. 82, No. 2, Feb. 1984 (4 pages).
TH&C (Toys Hobbies & Crafts), Special Toy Fair Issue, "Electronic Toys in '79: Buyers Brace for More Shortages," (3 pages), no date.
Microvision—encyclopedia article about Microvision printed from http://encyclopedia.thefreeddictionary.com/Microvision, May 31, 2004.
Computer Closet Collection, Milton Bradley Microsivion, printed from http://www.computercloset.org/MiltonBradleyMicrovision.htm, (2 pages), May 31, 2004.
Digital Equipment Corporation printed from http://db.gamefaqs.com/portable/microvision/file/microvision.txt (11 pages), May 31, 2004.
Milton Bradley Microvision (U.S.) (1979, LCD, 9 Volt (1 or 2), Model# 4952) printed from http://users2.ev1.net/~rik1138/MB/uVUS.htm.
Nintendo of America, Inc. Gameboy Programming Manual Version 1.0, 1999 (300+ pages).

Fig. 14

| NO | CGB | AGB ROM | AGB RAM | Remarks |
|---|---|---|---|---|
| 1 | VDD(5V) | VDD(3.3V) | VDD(3.3V) | Switch Voltage By Detection Switch |
| 2 | PHI | PHI | PHI | |
| 3 | /WR | /WR | /WR | |
| 4 | /RD | /RD | /RD | |
| 5 | /CS | /CS | /CS | Select ROM Chip |
| 6 | A0 | A0/D0 | A0 | Address/Data Shared Terminal |
| 7 | A1 | A1/D1 | A1 | Same As Above |
| 8 | A2 | A2/D2 | A2 | Same As Above |
| 9 | A3 | A3/D3 | A3 | Same As Above |
| 10 | A4 | A4/D4 | A4 | Same As Above |
| 11 | A5 | A5/D5 | A5 | Same As Above |
| 12 | A6 | A6/D6 | A6 | Same As Above |
| 13 | A7 | A7/D7 | A7 | Same As Above |
| 14 | A8 | A8/D8 | A8 | Same As Above |
| 15 | A9 | A9/D9 | A9 | Same As Above |
| 16 | A10 | A10/D10 | A10 | Same As Above |
| 17 | A11 | A11/D11 | A11 | Same As Above |
| 18 | A12 | A12/D12 | A12 | Same As Above |
| 19 | A13 | A13/D13 | A13 | Same As Above |
| 20 | A14 | A14/D14 | A14 | Same As Above |
| 21 | A15 | A15/D15 | A15 | Same As Above |
| 22 | D0 | A16 | D0 | |
| 23 | D1 | A17 | D1 | |
| 24 | D2 | A18 | D2 | |
| 25 | D3 | A19 | D3 | |
| 26 | D4 | A20 | D4 | |
| 27 | D5 | A21 | D5 | |
| 28 | D6 | A22 | D6 | |
| 29 | D7 | A23 | D7 | |
| 30 | /RES | /CS2 | /CS2 | Action Each Different In AGB and CGB Modes |
| 31 | Not Allowed to Use (VIN) | IREQ/DREQ | IREQ/DREQ | In CGB Mode, Ignore VIN Input |
| 32 | GND | GND | GND | |

Fig. 30A

| BG Mode | Character Format BG Screen | | | Number of Characters Specifiable | Number of Colors/Palettes | Features | | | | | |
|---|---|---|---|---|---|---|---|---|---|---|---|
| | Rotation/ scaling | No. of Screens | Size | | | *1 | *2 | *3 | *4 | *5 | *6 |
| 0 | No | 4 | 256 x 256 to 512 x 512 | 1024 | 16/16 256/1 | O | O | O | O | O | O |
| 1 | No | 2 | 256 x 256 to 512 x 512 | 1024 | 16/16 256/1 | O | O | O | O | O | O |
| 1 | Yes | 1 | 128 x 128 to 1024 x 1024 | 256 | 256/1 | O | X | O | O | O | O |
| 2 | Yes | 2 | 128 x 128 to 1024 x 1024 | 256 | 256/1 | O | X | O | O | O | O |

*1 HV Scroll (individual screens)
*2 HV Flip (individual characters)
*3 Mosaic (16 levels)

*4 Semi-transparent (16 levels)
*5 Fade-in/Fade-out
*6 Screen priority specification (2 bits)

Fig. 30B

| BG Mode | Bitmap Format BG Screen | | | Frame Memory | No. of Colors | Features | | | | | |
|---|---|---|---|---|---|---|---|---|---|---|---|
| | Rotation/ Scaling | No. of Screens | Size | | | *1 | *2 | *3 | *4 | *5 | *6 |
| 3 | Yes | 1 | 240 x 160 | 1 | 32,768 | O | X | O | O | O | O |
| 4 | Yes | 1 | 240 x 160 | 2 | 256 | O | X | O | O | O | O |
| 5 | Yes | 1 | 160 x 128 | 2 | 32,768 | O | X | O | O | O | O |

*1 HV Scroll (individual screens)
*2 HV Flip (individual characters)
*3 Mosaic (16 levels)

*4 Semi-transparent (16 levels)
*5 Fade-in/Fade-out
*6 Screen priority specification (2 bits)

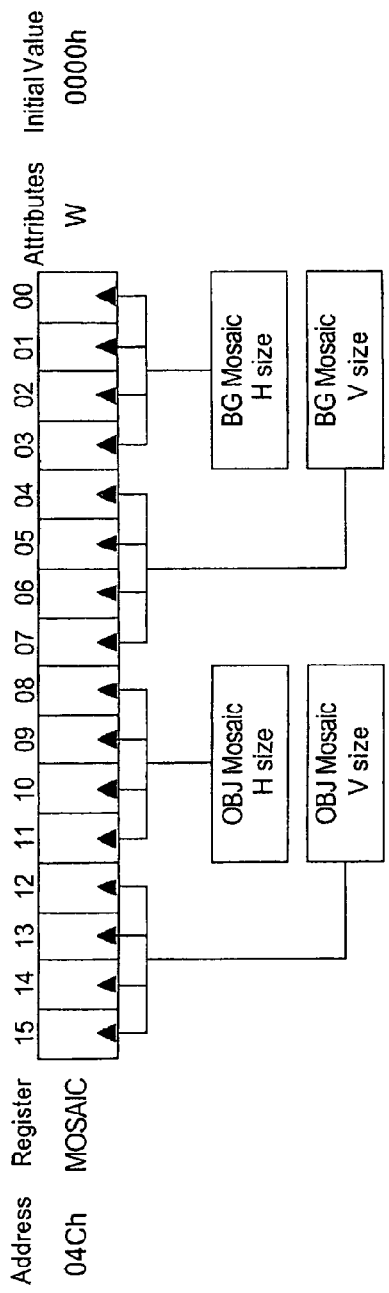

Text BG screen data format

Rotation/scaling BG screen data format

| Address | Register | Bits 15-00 | Attributes | Initial Value |
|---|---|---|---|---|
| 028h | BG2X_L | X-coordinate of reference starting point (rotation/scaling results) | W | 0000h |
| 038h | BG3X_L | | | |

Fig. 43A

| Address | Register | Bits 15-00 | Attributes | Initial Value |
|---|---|---|---|---|
| 02Ah | BG2X_H | X-coordinate of reference starting point (rotation/scaling results) [bits 15-12 unused] | W | 0000h |
| 03Ah | BG3X_H | | | |

Fig. 43B

| Address | Register | Bits 15-00 | Attributes | Initial Value |
|---|---|---|---|---|
| 02Ch | BG2Y_L | Y-coordinate of reference starting point (rotation/scaling results) | W | 0000h |
| 03Ch | BG3Y_L | | | |

Fig. 43C

| Address | Register | Bits 15-00 | Attributes | Initial Value |
|---|---|---|---|---|
| 02Eh | BG2Y_H | Y-coordinate of reference starting point (rotation/scaling results) [bits 15-12 unused] | W | 0000h |
| 03Eh | BG3Y_H | | | |

Fig. 43D

| Address | Register | Bits 15-00 | Attributes | Initial Value |
|---|---|---|---|---|
| 020h | BG2PA | dx: distance of movement in x direction along same line | W | 0100h |
| 030h | BG3PA | | | |

Fig. 44A

| Address | Register | Bits 15-00 | Attributes | Initial Value |
|---|---|---|---|---|
| 022h | BG2PB | dmx: distance of movement in x direction along next line | W | 0000h |
| 032h | BG3PB | | | |

Fig. 44B

| Address | Register | Bits 15-00 | Attributes | Initial Value |
|---|---|---|---|---|
| 024h | BG2PC | dy: distance of movement in y direction along same line | W | 0000h |
| 034h | BG3PC | | | |

Fig. 44C

| Address | Register | Bits 15-00 | Attributes | Initial Value |
|---|---|---|---|---|
| 026h | BG2PD | dmy: distance of movement in y direction along next line | W | 0100h |
| 036h | BG3PD | | | |

Fig. 44D

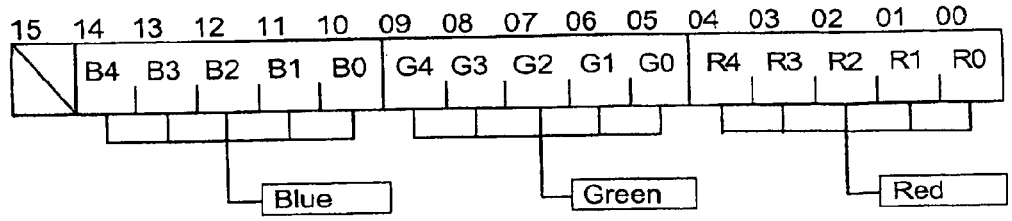
Fig. 48A
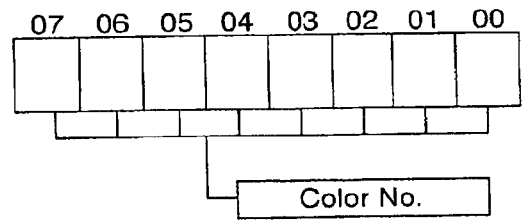
Fig. 48B
| | 0 | 1 | 2 | 3 | 4 | ... | 236 | 237 | 238 | 239 |
|---|---|---|---|---|---|---|---|---|---|---|
| 0 | 0h | 2h | 4h | 6h | 8h | ... | 1D8h | 1Dah | 1DCh | 1DEh |
| 1 | 1E0h | 1E2h | 1E4h | 1E6h | 1E8h | ... | 3B8h | 3Bah | 3BCh | 3BEh |
| 2 | 3C0h | 3C2h | 3C4h | 3C6h | 3C8h | ... | 598h | 59Ah | 59Ch | 59Eh |
| 3 | 5A0h | 5A2h | 5A4h | 5A6h | 5A8h | ... | 778h | 77Ah | 77Ch | 7Eh |
| 4 | 780h | 782h | 784h | 786h | 788h | ... | 958h | 95Ah | 95Ch | 95Eh |
| ⋮ | ⋮ | ⋮ | ⋮ | ⋮ | ⋮ | ⋮ | ⋮ | ⋮ | ⋮ | ⋮ |
| 156 | 12480h | 12482h | 12484h | 12486h | 12488h | ... | 12658h | 1265Ah | 1265Ch | 1265Eh |
| 157 | 12660h | 12662h | 12664h | 12666h | 12668h | ... | 12838h | 1283Ah | 1283Ch | 1283Eh |
| 158 | 12840h | 12842h | 12844h | 12846h | 12848h | ... | 12A18h | 12A1Ah | 12A1Ch | 12A1Eh |
| 159 | 12A20h | 12A22h | 12A24h | 12A26h | 12A28h | ... | 12BF8h | 12BFAh | 12BFCh | 12BFEh |
VRAM address (+06000000h)
Fig. 49

Frame 0

|   | 0 | 1 | 2 | 3 | 4 | ... | 236 | 237 | 238 | 239 |
|---|---|---|---|---|---|-----|-----|-----|-----|-----|
| 0 | 0h | 1h | 2h | 3h | 4h | ... | ECh | EDh | EEh | EFh |
| 1 | F0h | F1h | F2h | F3h | F4h | ... | 1DCh | 1DDh | 1DEh | 1DFh |
| 2 | 1E0h | 1E1h | 1E2h | 1E3h | 1E4h | ... | 2CCh | 2CDh | 2CEh | 2CFh |
| 3 | 2D0h | 2D1h | 2D2h | 2D3h | 2D4h | ... | 3BCh | 3BDh | 3BEh | 3BFh |
| 4 | 3C0h | 3C1h | 3C2h | 3C3h | 3C4h | ... | 4ACh | 4ADh | 4AEh | 4AFh |
| ⋮ | ⋮ | ⋮ | ⋮ | ⋮ | ⋮ | ⋮ | ⋮ | ⋮ | ⋮ | ⋮ |
| 156 | 9240h | 9241h | 9242h | 9243h | 9244h | ... | 932Ch | 932Dh | 932Eh | 932Fh |
| 157 | 9330h | 9331h | 9332h | 9333h | 9334h | ... | 941Ch | 941Dh | 941Eh | 941Fh |
| 158 | 9420h | 9421h | 9422h | 9423h | 9424h | ... | 950Ch | 950Dh | 950Eh | 950Fh |
| 159 | 9510h | 9511h | 9512h | 9513h | 9514h | ... | 95FCh | 95FDh | 95FEh | 95FFh |

VRAM address (+06000000h)

*Fig. 50A*

Frame 1

|   | 0 | 1 | 2 | 3 | 4 | ... | 236 | 237 | 238 | 239 |
|---|---|---|---|---|---|-----|-----|-----|-----|-----|
| 0 | A000h | A001h | A002h | A003h | A004h | ... | A0ECh | A0EDh | A0EEh | A0EFh |
| 1 | A0F0h | A0F1h | A0F2h | A0F3h | A0F4h | ... | A1DCh | A1DDh | A1DEh | A1DFh |
| 2 | A1E0h | A1E1h | A1E2h | A1E3h | A1E4h | ... | A2CCh | A2CDh | A2CEh | A2CFh |
| 3 | A2D0h | A2D1h | A2D2h | A2D3h | A2D4h | ... | A3BCh | A3BDh | A3BEh | A3BFh |
| 4 | A3C0h | A3C1h | A3C2h | A3C3h | A3C4h | ... | A4ACh | A4ADh | A4AEh | A4AFh |
| ⋮ | ⋮ | ⋮ | ⋮ | ⋮ | ⋮ | ⋮ | ⋮ | ⋮ | ⋮ | ⋮ |
| 156 | 13240h | 13241h | 13242h | 13243h | 13244h | ... | 1332Ch | 1332Dh | 1332Eh | 1332Fh |
| 157 | 13330h | 13331h | 13332h | 13333h | 13334h | ... | 1341Ch | 1341Dh | 1341Eh | 1341Fh |
| 158 | 13420h | 13421h | 13422h | 13423h | 13424h | ... | 1350Ch | 1350Dh | 1350Eh | 1350Fh |
| 159 | 13510h | 13511h | 13512h | 13513h | 13514h | ... | 135FCh | 135FDh | 135FEh | 135FFh |

VRAM address (+06000000h)

Frame 0

|   | 0 | 1 | 2 | 3 | 4 | ... | 156 | 157 | 158 | 159 |
|---|---|---|---|---|---|---|---|---|---|---|
| 0 | 0h | 2h | 4h | 6h | 8h | ... | 138h | 13Ah | 13Ch | 13Eh |
| 1 | 140h | 142h | 144h | 146h | 148h | ... | 298h | 29Ah | 29Ch | 29Eh |
| 2 | 2A0h | 2A2h | 2A4h | 2A6h | 2A8h | ... | 3B8h | 3BAh | 3BCh | 3BEh |
| 3 | 3C0h | 3C2h | 3C4h | 3C6h | 3C8h | ... | 4F8h | 4FAh | 4FCh | 4FEh |
| 4 | 500h | 502h | 504h | 506h | 508h | ... | 638h | 63Ah | 63Ch | 63Eh |
| ⋮ | ⋮ | ⋮ | ⋮ | ⋮ | ⋮ | ⋮ | ⋮ | ⋮ | ⋮ | ⋮ |
| 124 | 9B00h | 9B02h | 9B04h | 9B06h | 9B08h | ... | 9C38h | 9C3Ah | 9C3Ch | 9C3Eh |
| 125 | 9C40h | 9C42h | 9C44h | 9C46h | 9C48h | ... | 9D78h | 9D7Ah | 9D7Ch | 9D7Eh |
| 126 | 9D80h | 9D82h | 9D84h | 9D86h | 9D88h | ... | 9EB8h | 9EBAh | 9EBCh | 9EBEh |
| 127 | 9EC0h | 9EC2h | 9EC4h | 9EC6h | 9EC8h | ... | 9FF8h | 9FFAh | 9FFCh | 9FFEh |

VRAM Address (+06000000h)

Fig. 51B

Frame 1

|   | 0 | 1 | 2 | 3 | 4 | ... | 156 | 157 | 158 | 159 |
|---|---|---|---|---|---|---|---|---|---|---|
| 0 | A000h | A002h | A004h | A006h | A008h | ... | A138h | A13Ah | A13Ch | A13Eh |
| 1 | A140h | A142h | A144h | A146h | A148h | ... | A298h | A29Ah | A29Ch | A29Eh |
| 2 | A2A0h | A2A2h | A2A4h | A2A6h | A2A8h | ... | A3B8h | A3BAh | A3BCh | A3BEh |
| 3 | A3C0h | A3C2h | A3C4h | A3C6h | A3C8h | ... | A4F8h | A4FAh | A4FCh | A4FEh |
| 4 | A500h | A502h | A504h | A506h | A508h | ... | A638h | A63Ah | A63Ch | A63Eh |
| ⋮ | ⋮ | ⋮ | ⋮ | ⋮ | ⋮ | ⋮ | ⋮ | ⋮ | ⋮ | ⋮ |
| 124 | 13B00h | 13B02h | 13B04h | 13B06h | 13B08h | ... | 13C38h | 13C3Ah | 13C3Ch | 13C3Eh |
| 125 | 13C40h | 13C42h | 13C44h | 13C46h | 13C48h | ... | 13D78h | 13D7Ah | 13D7Ch | 13D7Eh |
| 126 | 13D80h | 13D82h | 13D84h | 13D86h | 13D88h | ... | 13EB8h | 13EBAh | 13EBCh | 13EBEh |
| 127 | 13EC0h | 13EC2h | 13EC4h | 13EC6h | 13EC8h | ... | 13FF8h | 13FFAh | 13FFCh | 13FFEh |

VRAM address (+06000000h)

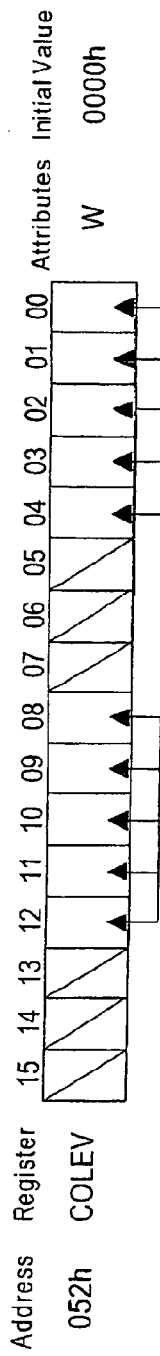
Fig. 68A
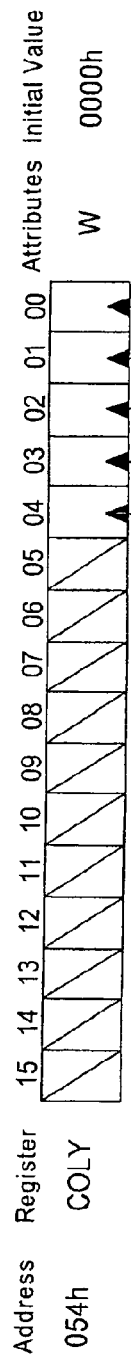
Fig. 68B
Fig. 69

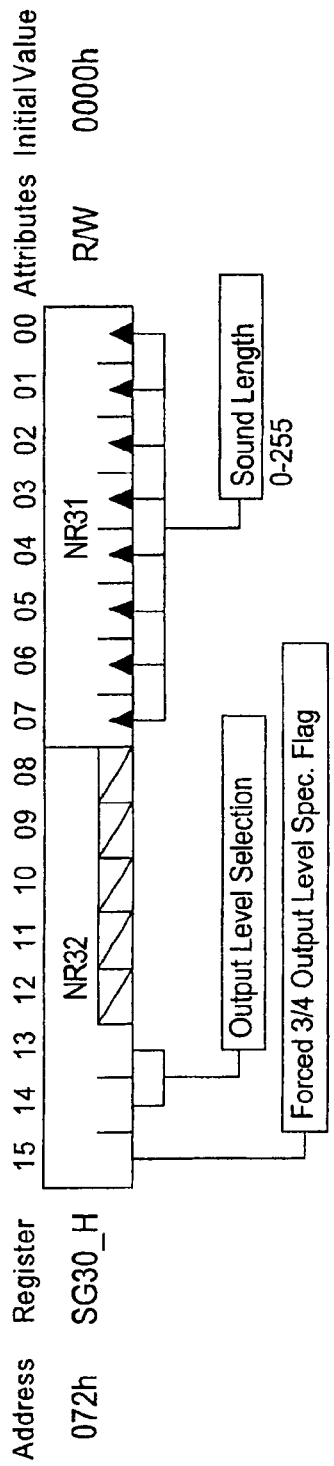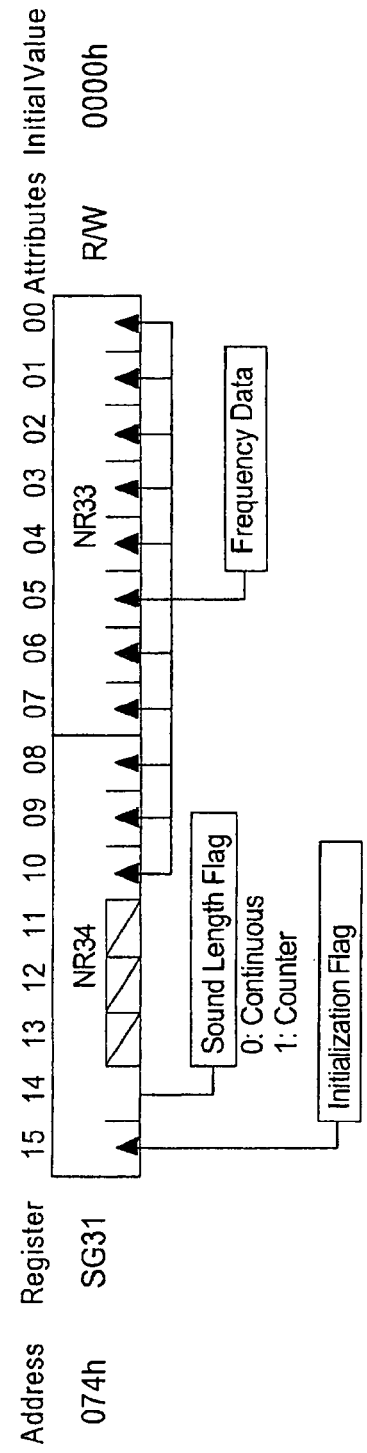

| Address | Register | 15 14 13 | 12 11 10 09 08 | 07 06 05 04 | 03 02 01 00 | Attributes | Initial Value |
|---|---|---|---|---|---|---|---|
| 090h | SGWR0_L | Step 2 | Step 3 | Step 0 | Step 1 | R/W | - |

*Fig. 76A*

| Address | Register | 15 14 13 | 12 11 10 09 08 | 07 06 05 04 | 03 02 01 00 | Attributes | Initial Value |
|---|---|---|---|---|---|---|---|
| 092h | SGWR0_H | Step 6 | Step 7 | Step 4 | Step 5 | R/W | - |

*Fig. 76B*

| Address | Register | 15 14 13 | 12 11 10 09 08 | 07 06 05 04 | 03 02 01 00 | Attributes | Initial Value |
|---|---|---|---|---|---|---|---|
| 094h | SGWR1_L | Step 10 | Step 11 | Step 8 | Step 9 | R/W | - |

*Fig. 76C*

| Address | Register | 15 14 13 | 12 11 10 09 08 | 07 06 05 04 | 03 02 01 00 | Attributes | Initial Value |
|---|---|---|---|---|---|---|---|
| 096h | SGWR1_H | Step 14 | Step 15 | Step 12 | Step 13 | R/W | - |

*Fig. 76D*

| Address | Register | 15 14 13 | 12 11 10 09 | 08 07 06 05 | 04 03 02 | 01 00 | Attributes | Initial Value |
|---|---|---|---|---|---|---|---|---|
| 098h | SGWR2_L | Step 18 | Step 19 | Step 16 | Step 17 | | R/W | - |

Fig. 76E

| Address | Register | 15 14 13 | 12 11 10 09 | 08 07 06 05 | 04 03 02 | 01 00 | Attributes | Initial Value |
|---|---|---|---|---|---|---|---|---|
| 09Ah | SGWR2_H | Step 22 | Step 23 | Step 20 | Step 21 | | R/W | - |

Fig. 76F

| Address | Register | 15 14 13 | 12 11 10 09 | 08 07 06 05 | 04 03 02 | 01 00 | Attributes | Initial Value |
|---|---|---|---|---|---|---|---|---|
| 09Ch | SGWR3_L | Step 26 | Step 27 | Step 24 | Step 25 | | R/W | - |

Fig. 76G

| Address | Register | 15 14 13 | 12 11 10 09 | 08 07 06 05 | 04 03 02 | 01 00 | Attributes | Initial Value |
|---|---|---|---|---|---|---|---|---|
| 09Eh | SGWR3_H | Step 30 | Step 31 | Step 28 | Step 29 | | R/W | - |

Fig. 76H

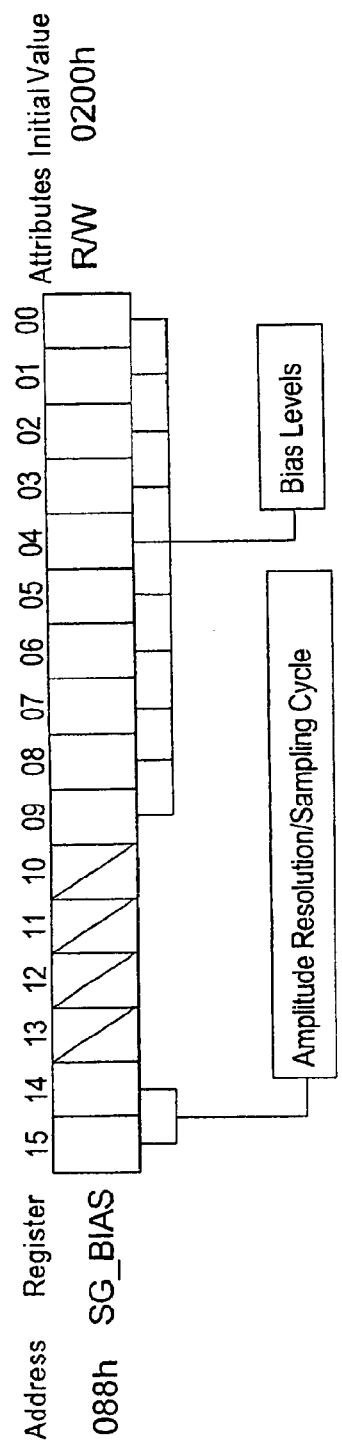
Fig. 79
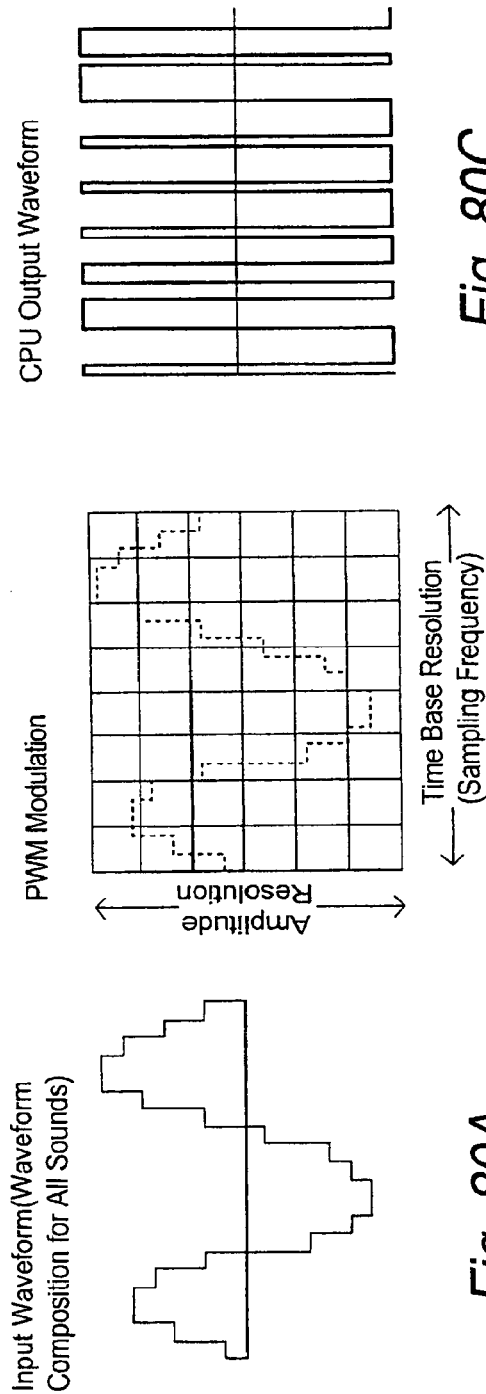
Fig. 80C
Fig. 80B
Fig. 80A

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0B0h | DM0SAD_L | | | | | | | | | | | | | | | | | W | 0000h |

*Fig. 82A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0B2h | DM0SAD_H | | | /// | /// | /// | | | | | | | | | | | | W | 0000h |

*Fig. 82B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0B4h | DM0DAD_L | | | | | | | | | | | | | | | | | W | 0000h |

*Fig. 83A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0B6h | DM0DAD_H | | /// | /// | /// | /// | | | | | | | | | | | | W | 0000h |

*Fig. 83B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0B8h | DM0CNT_L | /// | /// | | | | | | | | | | | | | | | W | 0000h |

*Fig. 84*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0BCh | DM1SAD_L | | | | | | | | | | | | | | | | | W | 0000h |
| 0C8h | DM2SAD_L | | | | | | | | | | | | | | | | | | |

*Fig. 86A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0BEh | DM1SAD_H | | ///| ///| | | | | | | | | | | | | | W | 0000h |
| 0CAh | DM2SAD_H | | | | | | | | | | | | | | | | | | |

*Fig. 86B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0C0h | DM1DAD_L | | | | | | | | | | | | | | | | | W | 0000h |
| 0CCh | DM2DAD_L | | | | | | | | | | | | | | | | | | |

*Fig. 87A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0C2h | DM1DAD_H | | ///| ///| | | | | | | | | | | | | | W | 0000h |
| 0CEh | DM2DAD_H | | | | | | | | | | | | | | | | | | |

*Fig. 87B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0C4h | DM1CNT_L | ///| | | | | | | | | | | | | | | | W | 0000h |
| 0D0h | DM2CNT_L | | | | | | | | | | | | | | | | | | |

*Fig. 88*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0D4h | DM3SAD_L | | | | | | | | | | | | | | | | | W | 0000h |

*Fig. 90A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0D6h | DM3SAD_H | ■ | ■ | ■ | ■ | | | | | | | | | | | | | W | 0000h |

*Fig. 90B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0D8h | DM3DAD_L | | | | | | | | | | | | | | | | | W | 0000h |

*Fig. 91A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0DAh | DM3DAD_H | ■ | ■ | ■ | ■ | | | | | | | | | | | | | W | 0000h |

*Fig. 91B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 0DCh | DM3CNT_L | | | | | | | | | | | | | | | | | W | 0000h |

*Fig. 92*

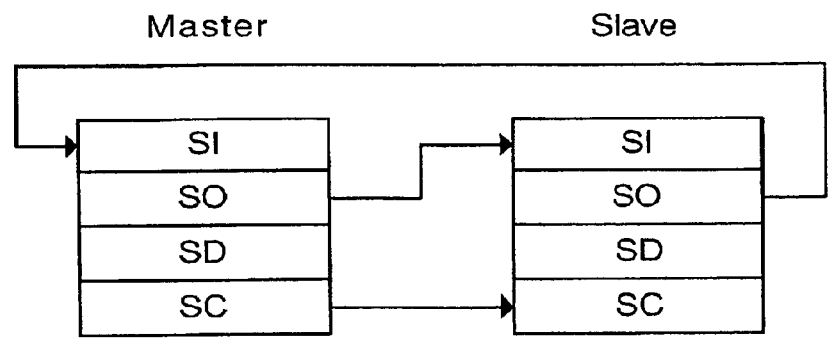
Fig. 94
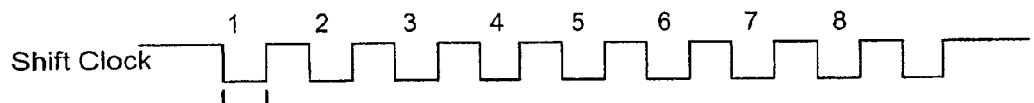
Fig. 95A
Fig. 95B
Fig. 95C

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 12Ah | SCCNT_H | | | | | | | | | | | | | | | | | R/W | 0000h |

*Fig. 103*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 120h | SCD0 | | | | | | | | Data 0 | | | | | | | | | R/W | 0000h |

*Fig. 104A*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 122h | SCD1 | | | | | | | | Data 1 | | | | | | | | | R/W | 0000h |

*Fig. 104B*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 124h | SCD2 | | | | | | | | Data 2 | | | | | | | | | R/W | 0000h |

*Fig. 104C*

| Address | Register | 15 | 14 | 13 | 12 | 11 | 10 | 09 | 08 | 07 | 06 | 05 | 04 | 03 | 02 | 01 | 00 | Attributes | Initial Value |
|---|---|---|---|---|---|---|---|---|---|---|---|---|---|---|---|---|---|---|---|
| 126h | SCD3 | | | | | | | | Data 3 | | | | | | | | | R/W | 0000h |

*Fig. 104D*

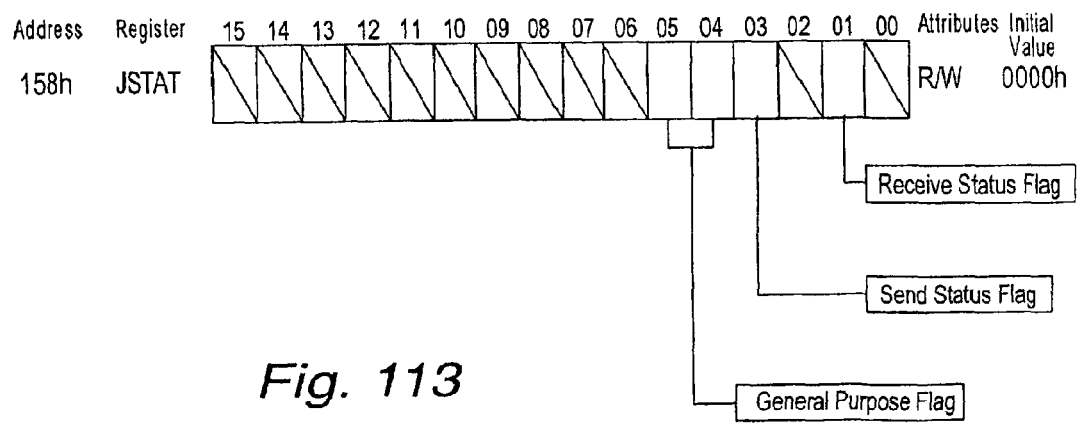

Device Reset

| Direction | Order | d7 | d6 | d5 | d4 | d3 | d2 | d1 | d0 | Remarks |
|---|---|---|---|---|---|---|---|---|---|---|
| Receive | 1 | 1 | 1 | 1 | 1 | 1 | 1 | 1 | 1 | Command 255(FFh) |
| Send | 1 | 0 | 0 | 0 | 0 | 0 | 0 | 0 | 0 | Type Number |
| | 2 | 0 | 0 | 0 | 0 | 0 | 1 | 0 | 0 | 0400h |
| | 3 | Lower 8 bits of Register JSTAT ||||||||  Communication Status |

*Fig. 114*

Type/Status Data Request

| Direction | Order | d7 | d6 | d5 | d4 | d3 | d2 | d1 | d0 | Remarks |
|---|---|---|---|---|---|---|---|---|---|---|
| Receive | 1 | 0 | 0 | 0 | 0 | 0 | 0 | 0 | 0 | Command 0(00h) |
| Send | 1 | 0 | 0 | 0 | 0 | 0 | 0 | 0 | 0 | Type Number |
| | 2 | 0 | 0 | 0 | 0 | 0 | 1 | 0 | 0 | 0400h |
| | 3 | Lower 8 bits of Register JSTAT |||||||| Communication Status |

*Fig. 115*

AGB Data Write

| Direction | Order | d7 | d6 | d5 | d4 | d3 | d2 | d1 | d0 | Remarks |
|---|---|---|---|---|---|---|---|---|---|---|
| Receive | 1 | 0 | 0 | 0 | 1 | 0 | 1 | 0 | 1 | Command 21(15h) |
| Receive | 2 | Lower 8 bits of receive data Register JOYRE_L ||||||||  Receive Data |
| | 3 | Upper 8 bits of receive data Register JOYRE_L |||||||| |
| | 4 | Lower 8 bits of receive data Register JOYRE_H |||||||| |
| | 5 | Upper 8 bits of receive data Register JOYRE_H |||||||| |
| Send | 6 | Lower 8 bits of Register JSTAT |||||||| Communication Status |

Fig. 116

AGB Data Read

| Direction | Order | d7 | d6 | d5 | d4 | d3 | d2 | d1 | d0 | Remarks |
|---|---|---|---|---|---|---|---|---|---|---|
| Receive | 1 | 0 | 0 | 0 | 1 | 0 | 1 | 0 | 0 | Command 20(14h) |
| Send | 2 | Lower 8 bits of send data Register JOYTR_L |||||||| Send Data |
| | 3 | Upper 8 bits of send data Register JOYTR_L |||||||| |
| | 4 | Lower 8 bits of send data Register JOYTR_H |||||||| |
| | 5 | Upper 8 bits of send data Register JOYTR_H |||||||| |
| | 6 | Lower 8 bits of Register JSTAT |||||||| Communication Status |

Fig. 117

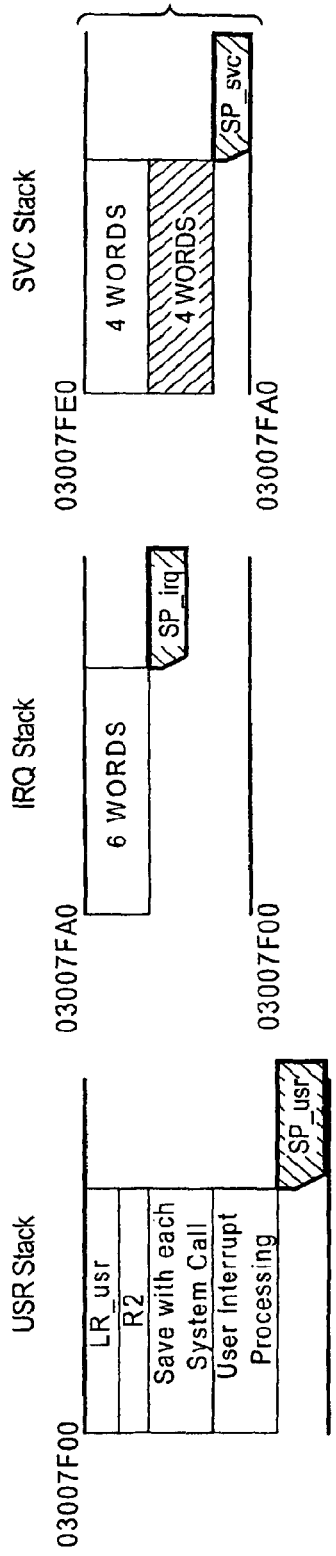
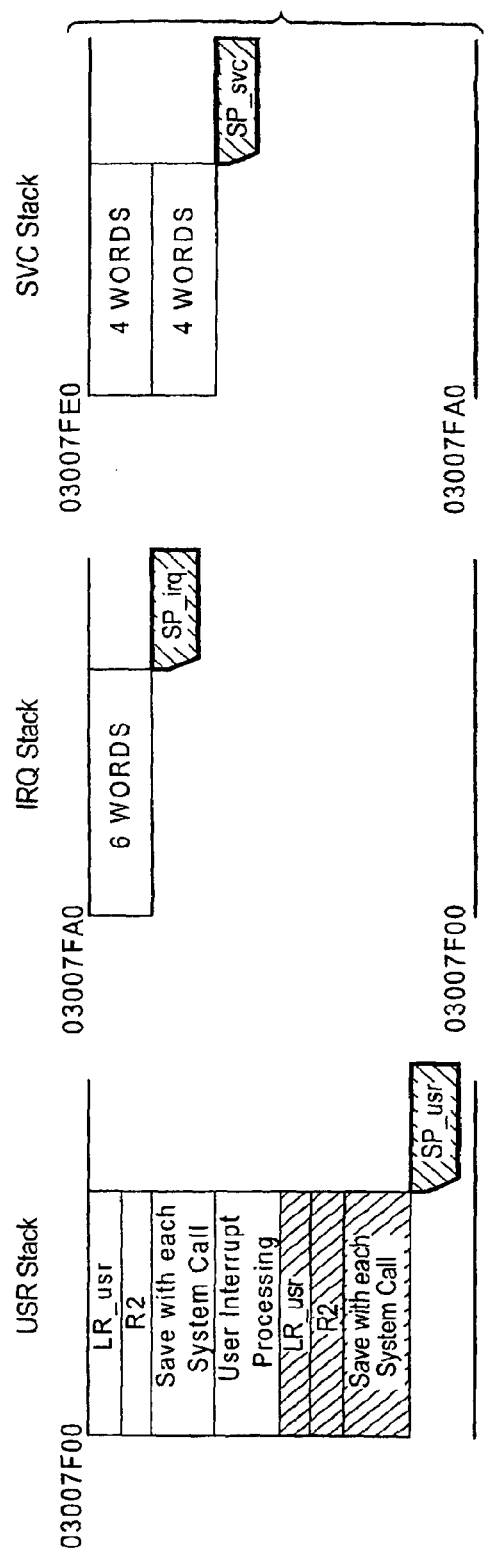
Fig. 128E
Fig. 128F

Fig. 131A

| Addr | | D15 | D14 | D13 | D12 | D11 | D10 | D09 | D08 | D07 | D06 | D05 | D04 | D03 | D02 | D01 | D00 | R/W | Initial Value | Figure in App |
|---|---|---|---|---|---|---|---|---|---|---|---|---|---|---|---|---|---|---|---|---|
| 00 | DISPCNT | Window Display Flag | | | OBJ | Display Flag | | | | Forced Blank | OBJ Map Format | OBJ Hoff | Frame Buffer No | CGB mode | V Counter Eval. | BG Mode | | | RW | 0080h | Fig. 29 |
| | | OBJ | Win1 | Win0 | | BG3 | BG2 | BG1 | BG0 | | | | | | | | | | | | |
| 04 | DSPSTAT | V Count Setting | | | | | | | | | | V counter Match Interrupt | HBlank Interrupt | VBlank Interrupt | V Counter Eval | HBlank Status | VBlank Status | RW | 0000h | Fig. 28 |
| 06 | VCOUNT | - | - | - | - | - | - | - | - | V Counter Value | | | | | | | | R | 0000h | Fig. 27 |
| 08 | BG0CNT | Size | - | - | - | Screen Base Block | | | | Color Mode | Mosaic | 0 | 0 | Character Base Block | | Priority | | RW | 0000h | Fig. 32A |
| 0A | BG1CNT | Size | - | - | - | Screen Base Block | | | | Color Mode | Mosaic | 0 | 0 | Character Base Block | | Priority | | RW | 0000h | Fig. 32A |
| 0C | BG2CNT | Size | - | Area Overflow | - | Screen Base Block | | | | Color Mode | Mosaic | 0 | 0 | Character Base Block | | Priority | | RW | 0000h | Fig. 32B |
| 0E | BG3CNT | Size | - | Area Overflow | - | Screen Base Block | | | | Color Mode | Mosaic | 0 | 0 | Character Base Block | | Priority | | RW | 0000h | Fig. 32B |
| 10 | BG0HOFS | - | - | - | - | - | - | - | - | Horizontal Offset | | | | | | | | W | 0000h | Fig. 45A |
| 12 | BG0VOFS | - | - | - | - | - | - | - | - | Vertical Offset | | | | | | | | W | 0000h | Fig. 45B |
| 14 | BG1HOFS | - | - | - | - | - | - | - | - | Horizontal Offset | | | | | | | | W | 0000h | Fig. 45A |
| 16 | BG1VOFS | - | - | - | - | - | - | - | - | Vertical Offset | | | | | | | | W | 0000h | Fig. 45B |
| 18 | BG2HOFS | - | - | - | - | - | - | - | - | Horizontal Offset | | | | | | | | W | 0000h | Fig. 45A |
| 1A | BG2VOFS | - | - | - | - | - | - | - | - | Vertical Offset | | | | | | | | W | 0000h | Fig. 45B |
| 1C | BG3HOFS | - | - | - | - | - | - | - | - | Horizontal Offset | | | | | | | | W | 0000h | Fig. 45A |
| 1E | BG3VOFS | - | - | - | - | - | - | - | - | Vertical Offset | | | | | | | | W | 0000h | Fig. 45B |
| 20 | BG2PA | dx: Distance moved Along same line in x direction | | | | | | | | | | | | | | | | W | 0100h | Fig. 44A |
| 22 | BG2PB | dmx: Distance moved Along next line in x direction | | | | | | | | | | | | | | | | W | 0000h | Fig. 44B |
| 24 | BG2PC | dy: Distance moved Along same line in y direction | | | | | | | | | | | | | | | | W | 0100h | Fig. 44C |
| 26 | BG2PD | dmy: Distance moved Along next line in y direction | | | | | | | | | | | | | | | | W | 0000h | Fig. 44D |

Fig. 131B

| Addr | Register | D15 | D14 | D13 | D12 | D11 | D10 | D09 | D08 | D07 | D06 | D05 | D04 | D03 | D02 | D01 | D00 | R/W | Initial Value | Fig. in App |
|---|---|---|---|---|---|---|---|---|---|---|---|---|---|---|---|---|---|---|---|---|
| 28 | BG2X_L | x-Coordinate of referenceStarting point (rotation/scaling results) |||||||||||||||| | 0000h | Fig. 43A |
| 2A | BG2X_H | · | · | · | · | x-Coordinate of referenceStarting point (rotation/scaling results) |||||||||||| W | 0000h | Fig. 43B |
| 2C | BG2Y_L | y-Coordinate of reference  Starting point (rotation/scaling results) |||||||||||||||| | 0000h | Fig. 43C |
| 2E | BG2Y_H | · | · | · | · | y-Coordinate of reference Starting point (rotation/scaling results) |||||||||||| W | 0000h | Fig. 43D |
| 30 | BG2PA | dx: Distance moved Along same line in x direction |||||||||||||||| W | 0100h | Fig. 44A |
| 32 | BG2PB | dmx: Distance moved Along next line in x direction |||||||||||||||| W | 0000h | Fig. 44B |
| 34 | BG2PC | dy: Distance moved Along same line in y direction |||||||||||||||| | 0000h | Fig. 44C |
| 36 | BG2PD | dmy: Distance moved Along next line in y direction |||||||||||||||| W | 0100h | Fig. 44D |
| 38 | BG3X_L | x-Coordinate of reference  Starting point (rotation/scaling results) |||||||||||||||| | 0000h | Fig. 43A |
| 3A | BG3X_H | · | · | · | · | x-Coordinate of reference Starting point (rotation/scaling results) |||||||||||| W | 0000h | Fig. 43B |
| 3C | BG3Y_L | y-Coordinate of reference Starting point (rotation/scaling results) |||||||||||||||| | 0000h | Fig. 43C |
| 3E | BG3Y_H | · | · | · | · | y-Coordinate of reference Starting point (rotation/scaling results) |||||||||||| W | 0000h | Fig. 43D |
| 40 | WIN0H | · | · | Window 0 upper-left x-Coordinate ||||||| Window 0 lower-right x-Coordinate ||||||| W | 0000h | |
| 42 | WIN1H | · | · | Window 1 upper-left x-Coordinate ||||||| Window 1 lower-right x-Coordinate ||||||| W | 0000h | |
| 44 | WIN0V | · | · | Window 0 upper-left y-Coordinate ||||||| Window 0 lower-right y-Coordinate ||||||| W | 0000h | |
| 46 | WIN1V | · | · | Window 1 upper-left y-Coordinate ||||||| Window 1 lower-right y-Coordinate ||||||| W | 0000h | |
| 48 | WININ | · | · | Control for Inside of Window 1 |||||||| Special Effects | OBJ | BG3 | BG2 | BG1 | BG0 | R/W | 0000h | Fig. 65 |
| 4A | WINOUT | · | · | OBJ Window Control |||||||| Special Effects | OBJ | BG3 | BG2 | BG1 | BG0 | R/W | 0000h | Fig. 66 |

Fig. 131C

| Addr | Register | D15 | D14 | D13 | D12 | D11 | D10 | D09 | D08 | D07 | D06 | D05 | D04 | D03 | D02 | D01 | D00 | R/W | Initial Value in App | Fig. |
|---|---|---|---|---|---|---|---|---|---|---|---|---|---|---|---|---|---|---|---|---|
| 4C | MOSAIC | Vertical Size | | | | Horizontal Size | | | | Vertical Size | | | | Horizontal Size | | | | W | 0000h | Fig. 35 |
| | | OBJ Mosaic | | | | | | | | BG Mosaic | | | | | | | | | | |
| 50 | BLDMOD | . | . | . | . | BD | OBJ | BG 3 | BG 2 | BG 1 | BG 0 | . | . | BD | OBJ | BG 3 | BG 2 | BG 1 | BG 0 | RW | 0000h | Fig. 67 |
| | | 2nd target pixel | | | | | | | | Type of Color Special Effect | | | | 1st target pixel | | | | | | |
| 52 | COLEV | | | | | Color Special Effect Coefficient EVB | | | | . | . | . | Color Special Effect Coefficient EVA | | | | | | 0000h | Fig. 68A |
| 54 | COLEY | | | | | | | | | . | . | . | Color Special Effect Coefficient EVY | | | | | W | 0000h | Fig. 68B |
| 60 | SG10_L | . | . | . | . | . | . | . | . | | | | NR1 0 | | | | | W/R | 0000h | Fig. 72A |
| 62 | SG10_H | | | | | NR12 | | | | | | | NR11 | | | | | W/R | 0000h | Fig. 72B |
| 64 | SG11 | | | | | NR14 | | | | | | | NR1 3 | | | | | W/R | 0000h | Fig. 72C |
| 68 | SG20 | | | | | NR22 | | | | | | | NR2 1 | | | | | W/R | 0000h | Fig. 74A |
| 6C | SG21 | | | | | NR24 | | | | | | | NR2 3 | | | | | W/R | 0000h | Fig. 74B |
| 70 | SG30_L | . | . | . | . | . | . | . | . | | | | NR3 0 | | | | | W/R | 0000h | Fig. 75A |
| 72 | SG30_H | | | | | NR32 | | | | | | | NR3 1 | | | | | W/R | 0000h | Fig. 75B |
| 74 | SG31 | | | | | NR34 | | | | | | | NR3 3 | | | | | W/R | 0000h | Fig. 75C |
| 78 | SG40 | | | | | NR42 | | | | | | | NR4 1 | | | | | W/R | 0000h | Fig. 77A* |
| 7C | SG41 | | | | | NR44 | | | | | | | NR4 3 | | | | | W/R | 0000h | Fig. 77B |
| 80 | SGCNT0_L | | | | | NR51 | | | | | | | NR5 0 | | | | | W/R | | Fig. 78A |
| 82 | SGCNT0_H | FIFO B reset | TIMER | R Output | L Output | Direct Sound B | | | | FIFO A reset | TIMER | R Output | L Output | Direct Sound A | DSB Output Ratio | DSA Output Ratio | Sound 1-4 Mix Ratio | W/R | 0000h | Fig. 78C |
| 84 | SGCNT1 | . | . | Amplitude Resolution/ Sampling Cycle | | . | . | . | . | . | . | . | . | . | . | NR5 2 | | W/R | 0000h | Fig. 78B |
| 88 | SGBIAS | | | | | | | | | | | Bias Level | | | | | | W/R | 0000h | Fig. 79 |

Fig. 131D

| Addr | Register | D15 | D14 | D13 | D12 | D11 | D10 | D09 | D08 | D07 | D06 | D05 | D04 | D03 | D02 | D01 | D00 | R/W | Initial-Value | Fig. in App. |
|---|---|---|---|---|---|---|---|---|---|---|---|---|---|---|---|---|---|---|---|---|
| 90 | SGWR0_L | | Step 2 | | | | Step 3 | | | | | Step 0 | | | | Step 1 | | W/R | - | Fig. 76A |
| 92 | SGWR0_H | | Step 6 | | | | Step 7 | | | | | Step 4 | | | | Step 5 | | W/R | - | Fig. 76B |
| 94 | SGWR1_L | | Step 10 | | | | Step 11 | | | | | Step 8 | | | | Step 9 | | W/R | - | Fig. 76C |
| 96 | SGWR1_H | | Step 14 | | | | Step 15 | | | | | Step 12 | | | | Step 13 | | W/R | - | Fig. 76D |
| 98 | SGWR2_L | | Step 18 | | | | Step 19 | | | | | Step 16 | | | | Step 17 | | W/R | - | Fig. 76E |
| 9A | SGWR2_H | | Step 22 | | | | Step 23 | | | | | Step 20 | | | | Step 21 | | W/R | - | Fig. 76F |
| 9C | SGWR3_L | | Step 26 | | | | Step 27 | | | | | Step 24 | | | | Step 25 | | W/R | - | Fig. 76G |
| 9E | SGWR3_H | | Step 30 | | | | Step 31 | | | | | Step 28 | | | | Step 29 | | W/R | - | Fig. 76H |
| A0 | SGFIFO_L | | | | Sound Data 1 | | | | | | | | Sound Data 0 | | | | | W | - | Fig. 71A |
| A2 | SGFIFO_H | | | | Sound Data 3 | | | | | | | | Sound Data 2 | | | | | W | - | Fig. 72A |
| A4 | SGFIFOB_L | | | | Sound Data 1 | | | | | | | | Sound Data 0 | | | | | W | - | Fig. 71A |
| A6 | SGFIFOB_H | | | | Sound Data 3 | | | | | | | | Sound Data 2 | | | | | W | - | Fig. 72A |
| B0 | DM0SAD_L | | | | | | | | | | | | | | | | | W | 0000h | Fig. 82A |
| B2 | DM0SAD_H | - | - | - | - | - | | | | | | | | | | | | W | 0000h | Fig. 82B |
| B4 | DM0DAD_L | | | | | | | | | | | | | | | | | W | 0000h | Fig. 83A |
| B6 | DM0DAD_H | - | - | - | - | - | | | | | | | | | | | | W | 0000h | Fig. 83B |
| B8 | DM0CNT_L | - | - | - | | | | | | | | | | | | | | W | | Fig. 84 |
| BA | DM0CNT_H | Enable | Interrupt | Startup Timing | - | - | Transfer Width | Continuous | Source Address Control | Destination Address Control | | | | - | - | - | - | W/R | 0000h | Fig. 85 |
| | | | | | | | DMA 0 Control | | | | | | | | | | | | | |

Fig. 131E

| Addr | Register | D15 | D14 | D13 | D12 | D11 | D10 | D09 | D08 | D07 | D06 | D05 | D04 | D03 | D02 | D01 | D00 | R/W | Initial Value | Fig. in App. |
|---|---|---|---|---|---|---|---|---|---|---|---|---|---|---|---|---|---|---|---|---|
| BC | DM1SAD_L | | | | | | | | DMA 1 Source Address | | | | | | | | W | 0000h | Fig. 86A |
| BE | DM1SAD_H | · | · | · | · | · | · | · | · | DMA 1 Source Address | | | | | | | | W | 0000h | Fig. 86B |
| C0 | DM1DAD_L | | | | | | | | DMA 1 Destination Address | | | | | | | | W | 0000h | Fig. 87A |
| C2 | DM1DAD_H | · | · | · | · | · | · | · | · | DMA 1 Destination Address | | | | | | | | W | 0000h | Fig. 87B |
| C4 | DM1CNT_L | · | · | · | · | · | · | Word Count | | | | | | | | | | W | | Fig. 88 |
| C6 | DM1CNT_H | Enable | Interrupt | Startup timing | | · | Transfer Width | Contin-uous | Source Address Control | | Destination Address Control | | · | · | · | · | · | W/R | 0000h | Fig. 89 |
| C8 | DM2SAD_L | | | | | | | | DMA 2 Source Address | | | | | | | | W | 0000h | Fig. 86A |
| CA | DM2SAD_H | · | · | · | · | · | · | · | · | DMA 2 Source Address | | | | | | | | W | 0000h | Fig. 86B |
| CC | DM2DAD_L | | | | | | | | DMA 2 Destination Address | | | | | | | | W | 0000h | Fig. 87A |
| CE | DM2DAD_H | · | · | · | · | · | · | · | · | DMA 2 Destination Address | | | | | | | | W | 0000h | Fig. 87B |
| D0 | DM2CNT_L | · | · | · | · | · | · | Word Count | | | | | | | | | | W | | Fig. 88 |
| D2 | DM2CNT_H | Enable | Interrupt | Startup timing | | · | Transfer Width | Contin-uous | Source Address Control | | Destination Address Control | | · | · | · | · | · | W/R | 0000h | Fig. 89 |
| D4 | DM3SAD_L | | | | | | | | DMA 3 Source Address | | | | | | | | W | 0000h | Fig. 90A |
| D6 | DM3SAD_H | · | · | · | · | · | · | · | · | DMA 3 Source Address | | | | | | | | W | 0000h | Fig. 90B |
| D8 | DM3DAD_L | | | | | | | | DMA 3 Destination Address | | | | | | | | W | 0000h | Fig. 91A |
| DA | DM3DAD_H | · | · | · | · | · | · | · | · | DMA 3 Destination Address | | | | | | | | W | 0000h | Fig. 91B |
| DC | DM3CNT_L | | | | | | | Word Count | | | | | | | | | | W | 0000h | Fig. 92 |
| DE | D3CNT_H | Enable | Interrupt | Startup timing | | DREQ | Transfer Width | Contin-uous | Source Address Control | | Destination Address Control | | · | · | · | · | · | W/R | 0000h | Fig. 93 |

| Addr | Register | D15 | D14 | D13 | D12 | D11 | D10 | D09 | D08 | D07 | D06 | D05 | D04 | D03 | D02 | D01 | D00 | R/W | Initial Value | Fig. in App. |
|---|---|---|---|---|---|---|---|---|---|---|---|---|---|---|---|---|---|---|---|---|
| 100 | TM0D | Timer 0 Setting ||||||||||||||||  W | 0000h | Fig. 81A |
| 102 | TM0CNT | Timer 0 Control |||||||| Operation | Interrupt | · | · | · | Count Up Timing | Prescalar || R/W | 0000h | Fig. 81B |
| 104 | TM1D | Timer 1 Setting ||||||||||||||||  W | 0000h | Fig. 81A |
| 106 | TM1CNT | Timer 1 Control |||||||| Operation | Interrupt | · | · | · | Count Up Timing | Prescalar || R/W | 0000h | Fig. 81B |
| 108 | TM2D | Timer 2 Setting ||||||||||||||||  W | 0000h | Fig. 81A |
| 10A | TM2CNT | Timer 2 Control |||||||| Operation | Interrupt | · | · | · | Count Up Timing | Prescalar || R/W | 0000h | Fig. 81B |
| 10C | TM3D | Timer 3 Setting ||||||||||||||||  W | 0000h | Fig. 81A |
| 10E | TM3CNT | Timer 3 Control |||||||| Operation | Interrupt | · | · | · | Count Up Timing | Prescalar || R/W | 0000h | Fig. 81B |

Fig. 131F

| Addr | Register | D15 | D14 | D13 | D12 | D11 | D10 | D09 | D08 | D07 | D06 | D05 | D04 | D03 | D02 | D01 | D00 | R/W | Initial Value | Fig. in App. |
|---|---|---|---|---|---|---|---|---|---|---|---|---|---|---|---|---|---|---|---|---|
| 120 | SCD0 | | | | | | | | | 32-Bit Normal SIO Communication Data and Multi-play Communication Data 0 | | | | | | | | R/W | 0000h | Fig. 97A |
| 122 | SCD1 | | | | | | | | | 32-Bit Normal SIO Communication Data and Multi-play Communication Data 1 | | | | | | | | R/W | 0000h | Fig. 97B |
| 124 | SCD2 | | | | | | | | | Multi-play Communication Data 2 | | | | | | | | R/W | 0000h | Fig. 104C |
| 126 | SCD3 | | | | | | | | | Multi-play Communication Data 3 | | | | | | | | R/W | 0000h | Fig. 104D |
| 128 | SCCNT_L | Port Control | | | | | | | | SIO Control | | | | | | | | | | |
| | Normal SIO Communication | . | Interrupt Enable | 0 | Transfer Bit Length | . | Send Enable Flag | Parity Enable Flag | FIFO Enable Flag | Start | . | . | . | Transfer Enable Flag Send | Transfer Enable Flag Receive | Shift Clock Freq. | Shift Clock | R/W | 0000h | Fig. 98 |
| | Multi-play Communication | . | Interrupt Enable | 1 | 0 | . | . | . | . | Start (master) Busy (slave) | Comm- unication Error Flag | Multi-play ID | | SD Terminal Monitor | SI Terminal Monitor | Baud Rate | | | | |
| | UART Communication | . | Interrupt Enable | 1 | 1 | Receive Enable Flag | Send Enable Flag | Parity Enable Flag | FIFO Enable Flag | Data Length | Error Flag | Receive Data Flag | Send Data Flag | Parity Control | CTS Flag | Baud Rate | | R/W | 0000h | Fig. 96 |
| 12A | SCCNT_H | | | | | | | | | | | | | | | | | | | |
| | Normal SIO Communication | . | . | . | . | . | . | . | . | 8Bit Normal SIO Communication Data | | | | | | | | | | |
| 130 | P1 | . | . | . | . | . | L | R | . | Down | Up | L | R | Start | Select | B | A | R/W | 0000h | Fig. 119 |
| 132 | P1CNT | Interrupt Condi- tions | Interrupt Enable | . | . | . | L | R | Interrupt Enable | Down | Up | L | R | Start | Select | B | A | R/W | 0000h | Fig. 120 |
| 134 | R | Communication Function Select | . | . | . | . | . | . | . | Input/Output Select SO SI SD SC | | | | Data Bit SO SI SD SC | | | | R/W | 0000h | Fig. 109 |

Fig. 131G

| Addr | Register | D15 | D14 | D13 | D12 | D11 | D10 | D09 | D08 | D07 | D06 | D05 | D04 | D03 | D02 | D01 | D00 | R/W | Initial Value | Fig. in App. |
|---|---|---|---|---|---|---|---|---|---|---|---|---|---|---|---|---|---|---|---|---|
| 140 | HS_CTRL | | | | | | | | | JOY Bus Communication Control | | | | | | | | R/W | 0000h | Fig. 110 |
| | | | | | | | | | | - | - | Interrupt | - | - | Send Complete | Receive Complete | Device reset signal receive | | | |
| 150 | JOYRE_L | | | | | | | JOY Bus Communication Receive Data 0 | | | | | | | | | | R/W | 0000h | Fig. 111A |
| 152 | JOYRE_H | | | | | | | JOY Bus Communication Receive Data 1 | | | | | | | | | | R/W | 0000h | Fig. 111B |
| 154 | JOYTR_L | | | | | | | JOY Bus Communication Send Data 0 | | | | | | | | | | R/W | 0000h | Fig. 112A |
| 156 | JOYTR_H | | | | | | | JOY Bus Communication Send Data 1 | | | | | | | | | | R/W | 0000h | Fig. 112B |
| 158 | JSTAT | | | | | | | JOY Bus Communication Receive Status | | | | | General Purpose Flag | Send Status Flag | - | Receive Status Flag | - | R/W | 0000h | Fig. 113 |
| 200 | IE | | | | | Game Pak | Key | DMA 3 | DMA 2 | DMA 1 | DMA 0 | Entire SIO | TMR3 | TMR2 | TMR1 | TMR0 | Interrupt Enable Flag V Counter Match | H Blank | V Blank | R/W | 0000h | Fig. 122 |
| 202 | IF | | | | | Game Pak | Key | DMA 3 | DMA 2 | DMA 1 | DMA 0 | Entire SIO | TMR3 | TMR2 | TMR1 | TMR0 | Interrupt Request Flag V Counter Match | H Blank | V Blank | R/W | 0000h | Fig. 123 |
| 204 | WSCNT | Game Pak Type | Pre-fetch | | | PHI Terminal Output Control | | Wait State 2 Wait Control | | Wait State 1 Wait Control | | Wait State 0 Wait Control | | SRAM Wait Control | | R/W | 0000h | Fig. 17 |
| 208 | IME | | | | | | | | | | | | | | | | Interrupt Master Flag | R/W | 0000h | Fig. 121 |
| 300 | PAUSE | Power Down | Mode | | | | | | | | | | | | | | - | - | 0000h | |

Fig. 131H

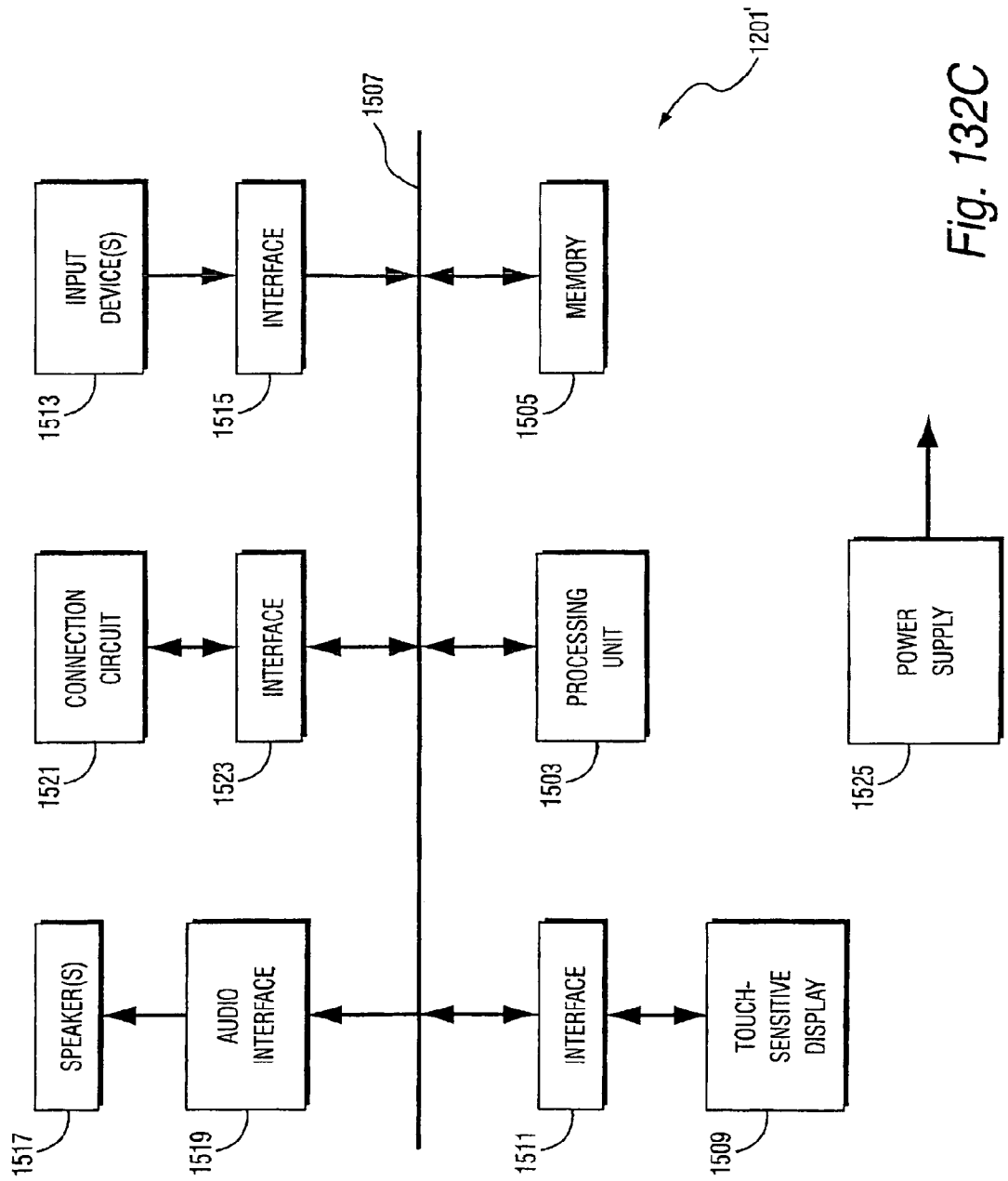

Read/write bit
A readable and writable bit.

Read-only bit
A bit that is readable but not writable.

Write-only bit
A bit that is not readable but is writable.

Fixed-value bit
Must be set to a specified fixed value.

Unrestricted bit
Can be set to either 0 or 1.

Not used

PORTABLE VIDEO GAME SYSTEM

CROSS-REFERENCE TO RELATED APPLICATION

This application is a divisional of U.S. patent application Ser. No. 12/230,253, filed Aug. 26, 2008, which is a divisional of U.S. patent application Ser. No. 09/722,410, filed Nov. 28, 2000, now U.S. Pat. No. 7,445,551, which is a continuation-in-part of U.S. patent application Ser. No. 09/627,440, filed Jul. 28, 2000, now abandoned. The entire contents of each of these applications are hereby incorporated herein in their entirety.

CROSS-REFERENCE TO RELATED APPLICATIONS

This application is a divisional of application Ser. No. 12/230,253, filed Aug. 26, 2008, which is a divisional of application Ser. No. 09/722,410, filed Nov. 28, 2000, now U.S. Pat. No. 7,445,551, which is a continuation-in-part of application Ser. No. 09/627,440, filed Jul. 28, 2000, now abandoned. The entire contents of each of these applications are incorporated herein in their entirety.

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND AND SUMMARY

The present invention generally relates to a portable or hand-held video game system and, more particularly, to a hand-held video game system compatible with various types of storage media.

Over the years, portable (or hand-held) game systems have been (and continue to be) very popular. Typically, these portable game systems include a hand-held game system housing a processing unit and associated hardware for running a game program, and include a display for displaying images of the game. The game program itself is typically contained in a game program memory such as, for example, a semiconductor memory (e.g., ROM, EPROM, etc.) that is part of a removable cartridge. By storing the game program in a removable cartridge, the user can conveniently and easily change the game being played by simply exchanging one cartridge with another, different cartridge containing a different game. Examples of portable game systems are the "Game Boy®" and "Game Boy® Color" products manufactured and sold by Nintendo Corporation, Ltd. Throughout this application, the "Game Boy" product is referred to as "DMG" and the "Color Game Boy" product is referred to as "CGB".

FIGS. 1A, 1B and 1C show the CGB. The CGB displays game characters in color on a color liquid crystal display (LCD) 116 when a color-ready game cartridge 112 is selectively inserted into a game cartridge slot 118 (see FIG. 1C). FIG. 2 shows the external appearance of game cartridge 112. Color LCD 116 displays characters using a plurality of different colors if color-ready game cartridge 112 is inserted into the CGB. The CGB may also be configured to receive monochrome game cartridges (not shown) usable with the DMG and to display monochrome characters on LCD 116.

With reference to FIG. 3, the CGB includes color LCD 116 as described above. Color LCD 116 is formed as a dot matrix display and is driven by LCD drivers 122 and 124 to display color images on its screen. LCD driver 122 selectively drives, for example, the rows of the dot matrix display and LCD driver 124 selectively drives, for example, the columns of the dot matrix display. LCD drivers 122, 124 are supplied with color image signals from a color display processing circuit 128 included in a central processing unit (CPU) 126. The graphics for CGB are created from blocks of pixels known as characters. Characters are typically 8 pixels wide and 8 pixels high (or 8 pixels wide and 16 pixels high). Characters can be used to represent both background and object data. Backgrounds are groups of characters laid out like tiles to create the environment or background of a game. Objects are groups of character data that are used to represent the main game character and other moving objects that overlay the background in a game. Objects are sometimes referred to as sprites.

CPU 126 further includes a CPU core 130 that is connected to an internal read only memory (ROM) 132 and an internal random access memory (RAM) 134. Internal RAM 134 is used as a work memory of CPU core 130. CPU 126 further includes a basic oscillator 136. Basic oscillator 136 is formed of, for example, a quartz oscillator, and supplies an oscillating signal to a programmable frequency divider 138. Programmable frequency divider 138 divides the oscillating signal from basic oscillator 136 in accordance with frequency division data from CPU core 130, and supplies a divided signal as a clock of CPU core 130.

A connector 140 is connected to CPU 126 by an appropriate bus. Game cartridge 112 is selectively attachable to connector 140. Game cartridge 112 is preferably in the form of a replaceable memory cartridge insertable into game cartridge slot 118 of the CGB. Game cartridge 112 may comprise a plastic housing that encases a printed circuit board. The printed circuit board has a connector defining a number of electrical contacts. When game cartridge 112 is inserted into game cartridge slot 118 of the CGB, the cartridge electrical contacts mate with corresponding "edge connector" electrical contacts within game system 110. This action electrically connects the printed circuit board contained within the plastic housing to the electronics within game system 110. In this example, the printed circuit board of game cartridge 112 at least includes a read-only memory (ROM) 142 and a read/write memory (e.g., SRAM) 146. ROM 142 stores instructions and other information pertaining to a particular video game. The ROM for one game cartridge 112 may, for example, contain instructions and other information for an adventure game while the ROM of another game cartridge 112 may contain instructions and other information for a car race game, an educational game, etc. To play a game, a user of game system 110 need only plug the appropriate game cartridge into game cartridge slot 118 of the CGB—thereby connecting the cartridge's ROM 142 (and any other circuitry it may contain) to the CGB. This enables the CGB circuitry to access information contained within ROM 142 (and read/write memory 146), which information controls the game system to play the appropriate video game by displaying images and reproducing sound as specified under control of the ROM game program information. Read/write memory 146 is used to store data such as game backup data.

CPU 126 is supplied with operation signals from operating keys 148a-148e. Operating key 148a is used, among other things, to move a game character displayed on color LCD 116 in four directions, that is, upward, downward, right and left. Operating key 148*b* is a select key that is used for, for example, game mode selection and the like. Operating key 148*c* is a start key that is used to start playing the game or to temporarily stop the progress of the game. Operating keys 148*d*, 148*e* are push-button switches. By pushing operating keys 148*d*, 148*e*, it is possible to cause various motions of the game characters displayed on color LCD 116, for example, a weapon use, a jump and the like. Operating keys 148*a*-148*e* are disposed in a forward surface of the CGB as shown in FIG. 1B. A key matrix (not shown) is provided for sending CPU 126 the operation signals from operating keys 148*a*-148*e* as controller data.

Batteries (not shown) (e.g., 2 AA batteries) provide power for game system 110. A power indicator LED 119 (see FIG. 1B) may dim as the batteries lose their charge, thereby providing a visual indication to the user that new batteries are needed.

In accordance with the game program, character data supplied from game cartridge 112 and the controller data from operating keys 148*a*-148*e*, CPU 126 executes data processing and writes display data into a display RAM 152, using an extended RAM 150 when necessary. The display RAM 152 has two banks, that is, a first bank and a second bank, and has, as a whole, a storage area that is greater than the display area of color LCD 116, thereby enabling a scrolling display upward and downward and/or rightward and leftward on the screen of color LCD 116. As a result of the data processing by CPU 126, sound signals to be output are adjusted in level by volume control 154 and amplifier 156, and then outputted to a speaker 158 and/or an earphone jack 160. Sound signals output from speaker 158 and/or earphone jack 160 include game sound effects, voices and music.

Generally speaking, to use the CGB, a user selects a game cartridge 112 containing a desired video game, and inserts that game cartridge into game cartridge slot 118 of the CGB, thereby electrically connecting ROM 142 and other cartridge electronics to the CGB. The user then operates a power switch 121 (see FIG. 1B) to turn on the CGB and operates operating keys 148*a*-148*e* to control video game play. For example, depressing operating key 148*c* may cause the video game to start playing. Actuating operating key 148*a* may cause animated characters to move on color LCD 116 in controllably different directions.

It is of course desirable to use new and more powerful system components (e.g., more powerful processors, faster memory, more memory, etc.) in order to improve the system capabilities and provide an even more fascinating gaming experience. However, because users may have already invested time and money into existing game systems, it is also very desirable to maintain compatibility with existing game cartridges. Thus, users upgrading to the new and more powerful game systems can continue to use game cartridges that have been purchased for use with prior generations of game systems. In addition, these users can play new games that take advantage of the improved capabilities of the game system.

The hand-held display system for playing video games described herein includes a housing grippable by a user's hands, a liquid crystal display viewable by the user gripping the housing, input devices operable by the user when the user grips the housing, and a connector for, in use, operatively connecting to portable storage media storing video game programs for the video games. The hand-held display system further includes first processing circuitry for processing video game programs having a first program specification and second processing circuitry for processing video game programs having a second program specification. In one particular example implementation, the portable storage media are in the form of cartridges housing a semiconductor memory.

This hand-held display system described above and in greater detail below affords many features and advantages including, but not limited to:
    high-power (e.g., 32-bit) first processing circuitry that expands computational abilities and data processing features to permit more interesting games to be played,
    lower power (e.g., 8-bit) second processing circuitry to maintain compatibility with existing game cartridges so that players can continue to play and enjoy games developed for earlier generations of game systems,
    widescreen and non-widescreen display formats on the liquid crystal display,
    cartridge type detection circuitry to detect the cartridge type,
    the input devices include easily accessible shoulder buttons at the upper corners of the portable game system housing to expand the variety of possible operations,
    multi-player (up to four) game playing, even if only one of the portable game systems has a game cartridge inserted therein.

These and many other features and advantages will be better and more completely understood by referring to the following detailed description of example embodiments in conjunction with the drawings.

BRIEF DESCRIPTION OF THE DRAWINGS

FIG. 14 is a diagram showing an example AGB cartridge interface;

FIG. 26 is a more detailed illustration of LCD 27a;

FIGS. 30A and 30B show the features of the various BG modes of the example AGB;

FIG. 35 depicts the MOSAIC register;

FIGS. 36A-36C depict the effect of mosaic size on the display;

FIGS. 43A-43D illustrate the registers BG2X_L, BG2X_H, BG2Y_L, BG2Y_H, BG3X_L, BG3X_H, BG3Y_L, and BG3Y_H that set the starting point for BG data;

FIGS. 44A-44D illustrate the registers BG2PA, BG2PB, BG2PC, BG2PD, BG3PA, BG3PB, BG3PC, BG3PD that set the direction parameters for BG data;

FIGS. 48A and 48B depict data formats in the frame buffer for 32,768-color simultaneous display format (BG modes 3 and 5) and for 256-color display format (BG mode 4), respectively;

FIG. 49 is a memory address map for BG Mode 3 (32,768 colors, 240×160 dots, 1 frame buffer);

FIGS. 50A and 50B are memory address maps for frames 0 and 1, respectively, of the BG Mode 4 (256 colors, 240×160 dots, 2 frame buffers);

FIGS. 51A and 51B are memory address maps for frames 0 and 1, respectively, of BG Mode 5 (32,768 colors, 160×128 dots, 2 frame buffers);

FIG. 57 depicts the four sizes that can be set for the three OBJ shapes.

FIGS. 65, 66, 67, 68A and 68B depict the WININ, WINOUT, BLDMOD, COLEV, and COLY registers, respectively;

FIG. 69 is a table illustrating EVA, EVB and EVY values;

FIGS. 75A-75C depict registers SG30_L, SG30_H and SG31, respectively;

FIGS. 76A-76H depict registers SGWR0_L, SGWR0_H, SGWR1_L, SGWR1_H, SGWR2_L, SGWR2_H, SGWR3_L and SGWR3_H, respectively;

FIG. 79 depicts the SG_BIAS register;

FIGS. 80A-80C depict PWM conversion image;

FIGS. 82A and 82B depict registers DM0SAD_L and DM0SAD_H, respectively;

FIGS. 83A and 83B depict registers DM0DAD_L and DM0DAD_H, respectively;

FIG. 84 depicts register DM0CNT_L;

FIGS. 86A and 86B depict registers DM1SAD_L (DM2SAD_L) and DM1SAD_H (DM2SAD_H), respectively;

FIGS. 87A and 87B depict registers DM1DAD_L (DM2DAD_L) and DM1DAD_H (DM2DAD_H), respectively;

FIG. 88 depicts the register DM1CNT_L (DM2CNT_L);

FIGS. 90A and 90B depict registers DM3SAD_L and DM3SAD_H, respectively;

FIGS. 91A and 91B depict registers DM3DAD_L and DM3DAD_H, respectively;

FIG. 92 depicts the register DM3CNT_L;

FIG. 94 depicts a connection during normal serial communication;

FIGS. 95A-95C are SIO timing charts;

FIG. 103 depicts the register SCCNT_H;

FIGS. 104A-104D depict registers SCD0, SCD1, SCD2 and SCD3, respectively;

FIGS. 111A and 111B depict registers JOYRE_L and JOYRE_H, respectively;

FIGS. 112A and 112B depict registers JOYTR_L and JOYTR_H, respectively;

FIG. 113 depicts register JSTAT;

FIG. 114 depicts JOY Bus communication in response to a device reset command;

FIG. 115 depicts JOY Bus communication in response to a type/status data request;

FIG. 116 depicts JOY Bus communication in response to an AGB data write command;

FIG. 117 depicts JOY Bus communication in response to an AGB data read command;

FIGS. 118A-118C depict various communications between portable game systems;

FIG. 119 depicts register P1;

FIG. 120 depicts register P1CNT;

FIG. 121 depicts register IME;

FIG. 122 depicts register IE;

FIG. 123 depicts register IF;

FIG. 124 shows interrupt addresses in working RAM;

Figure 125A:
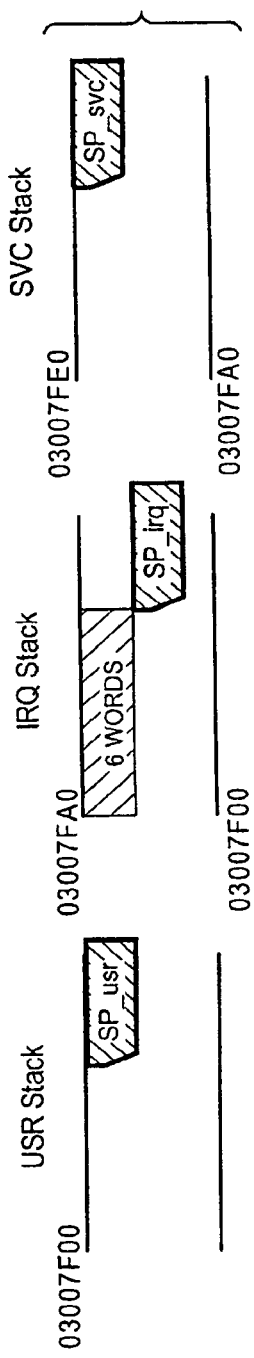
Figure 125B:
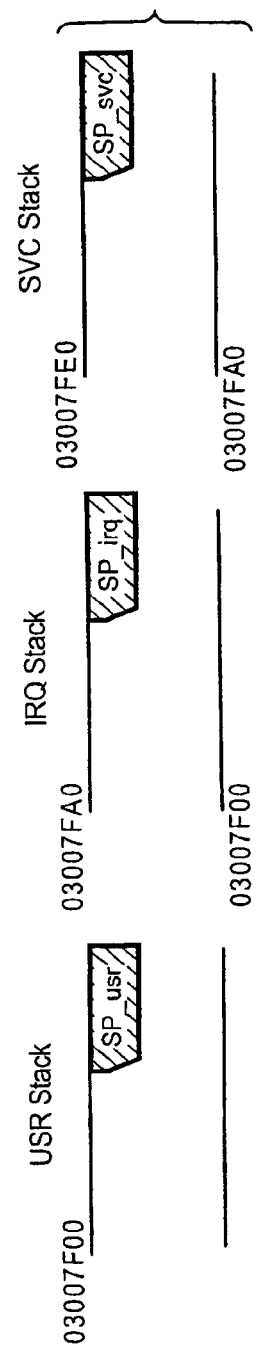
Figure 126A:
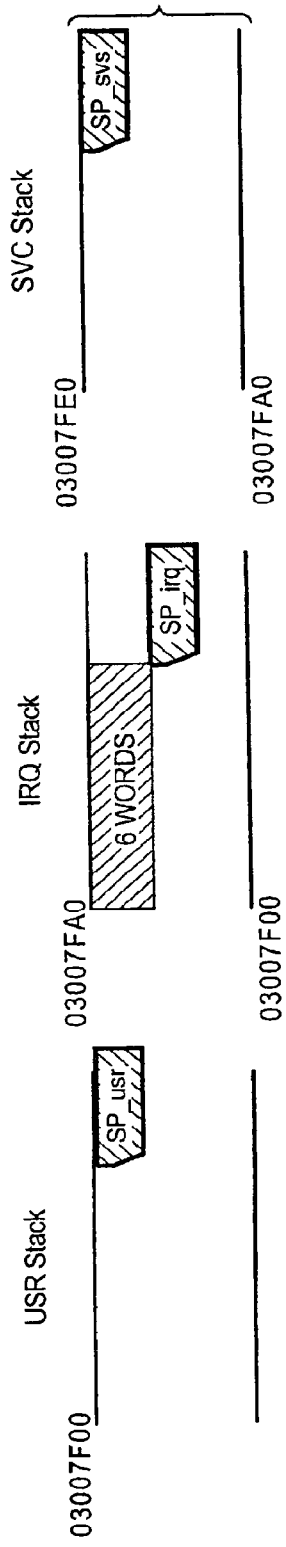
Figure 126B:
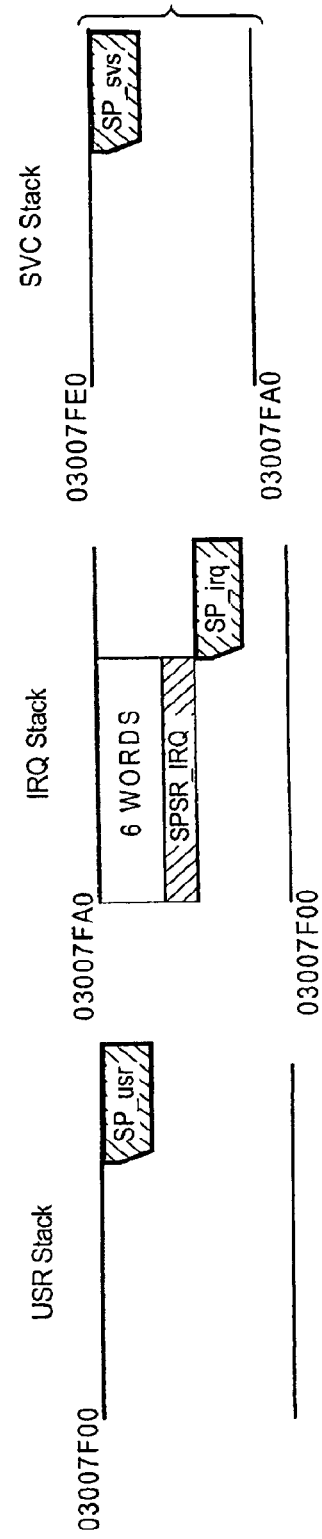
Figure 126C:
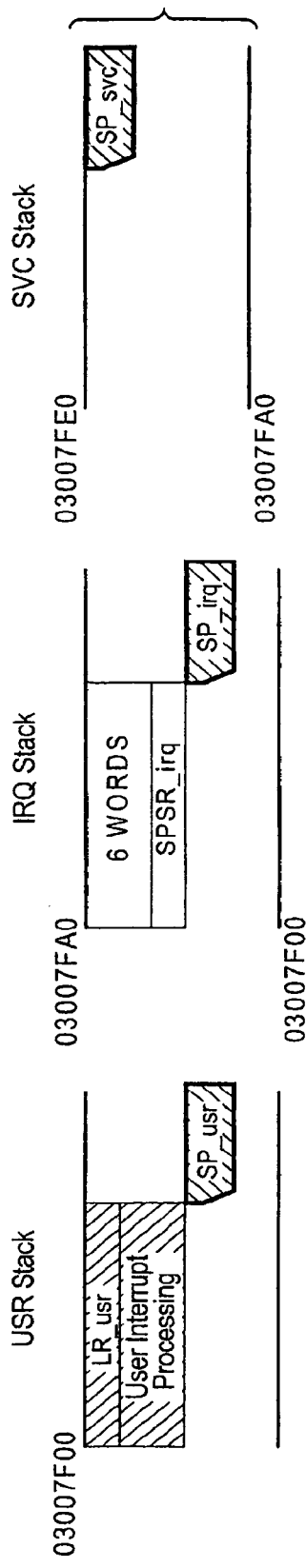
Figure 126D:
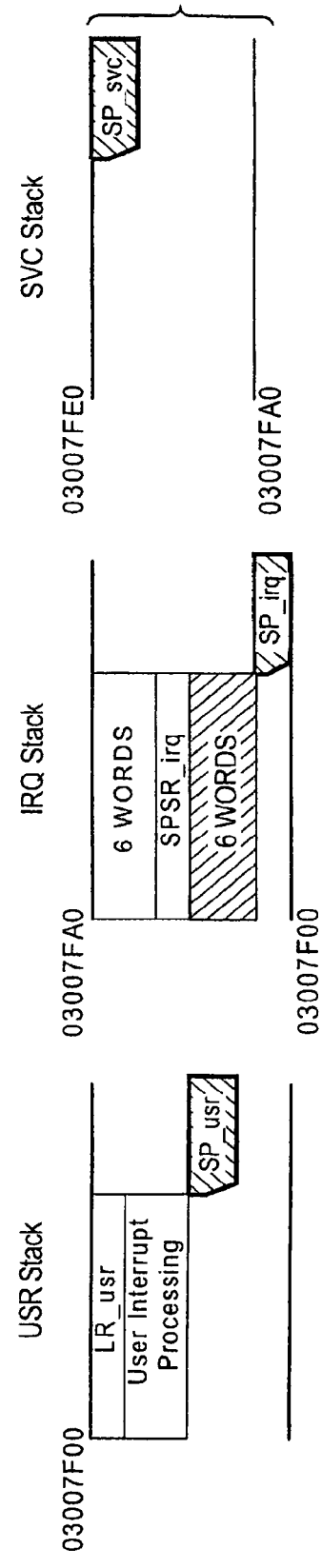
Figure 127A:
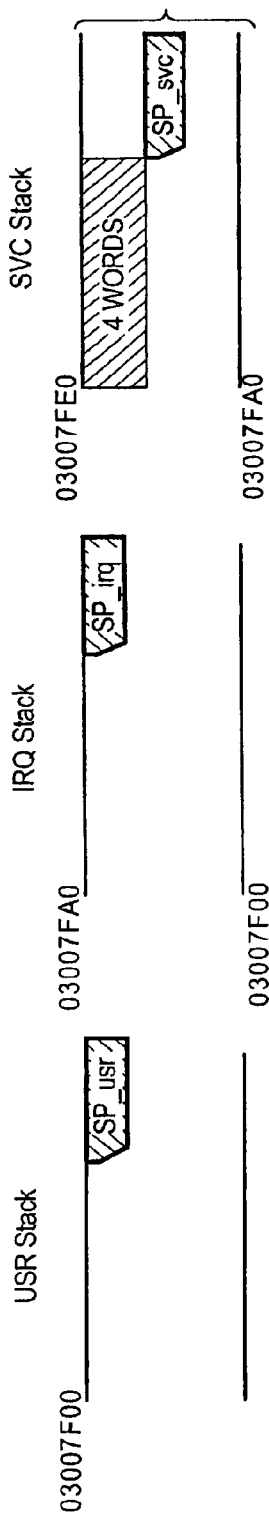
Figure 127B:
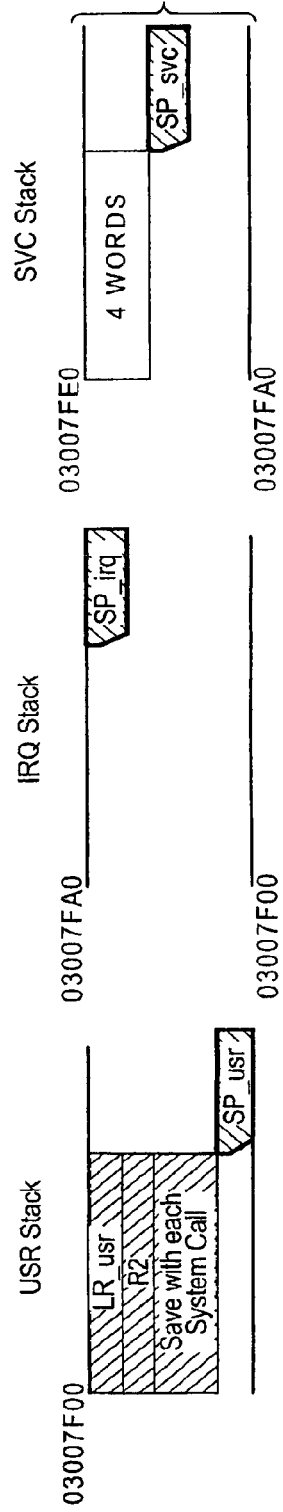
Figure 127C:
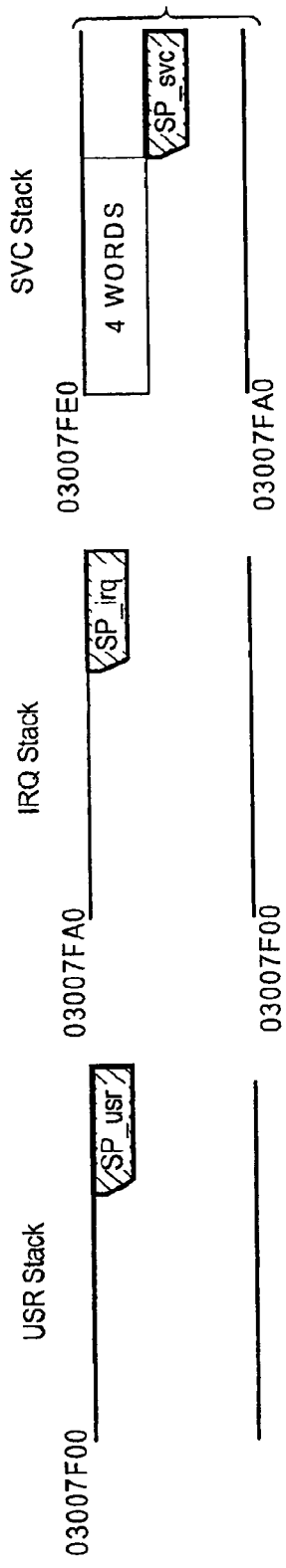
Figure 127D:
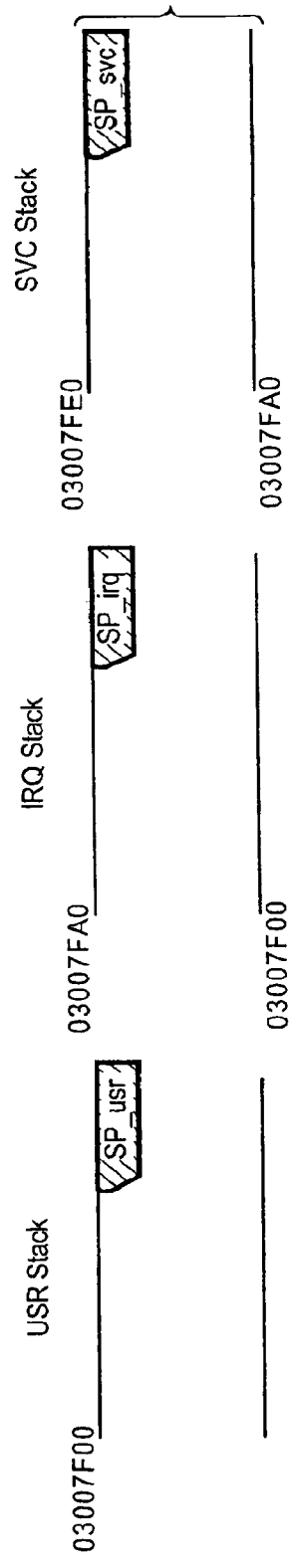
Figure 128A:
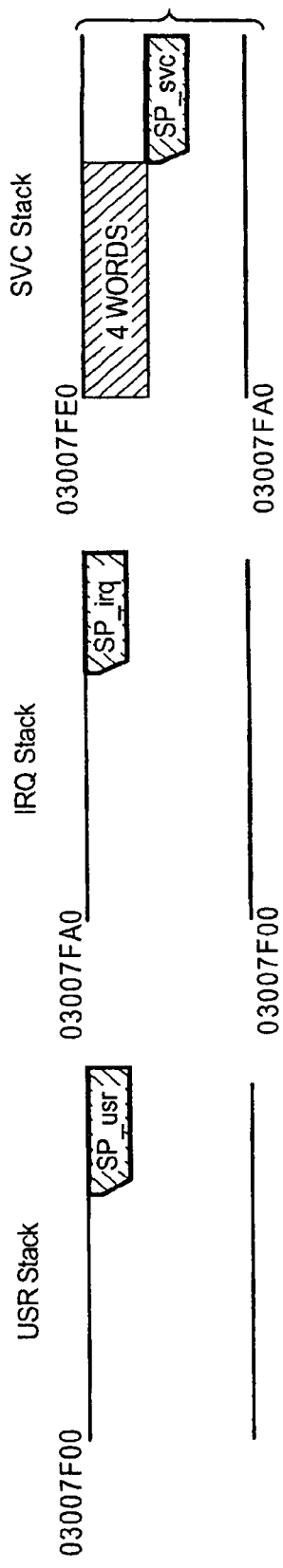
Figure 128B:
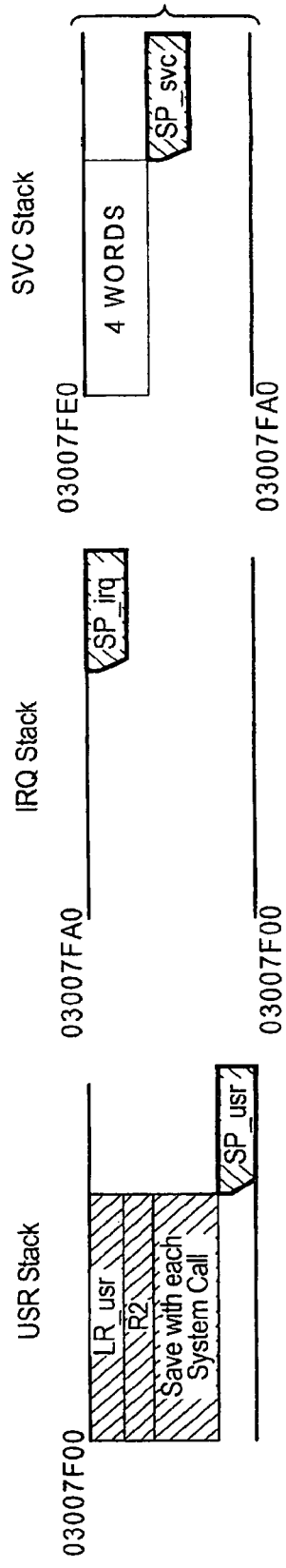
Figure 128C:
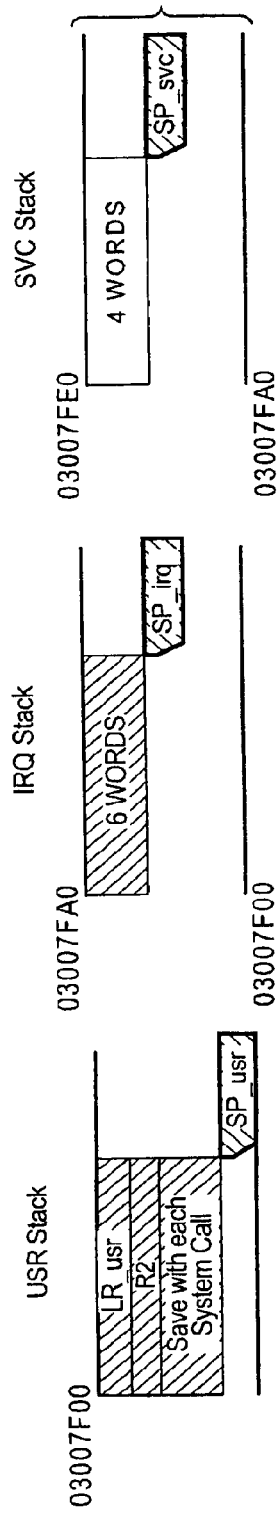
Figure 128D:
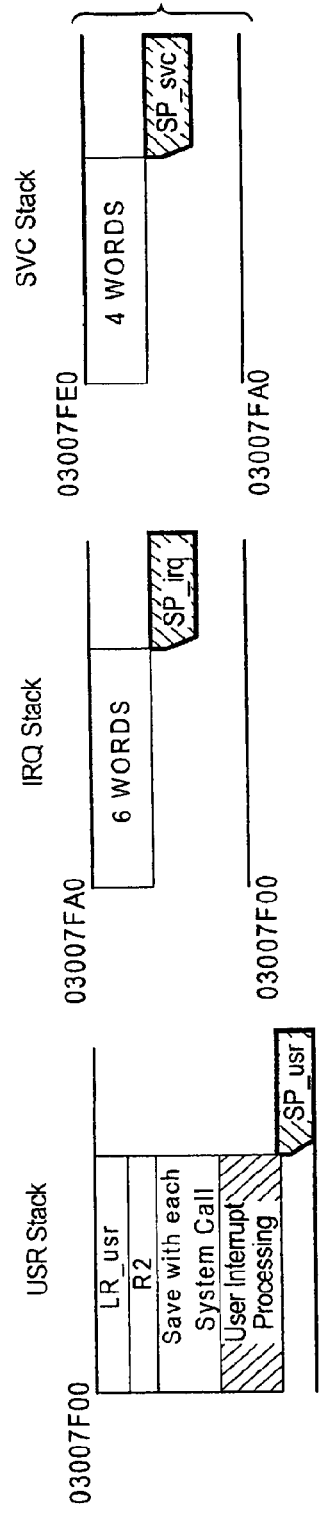
Figure 128G:
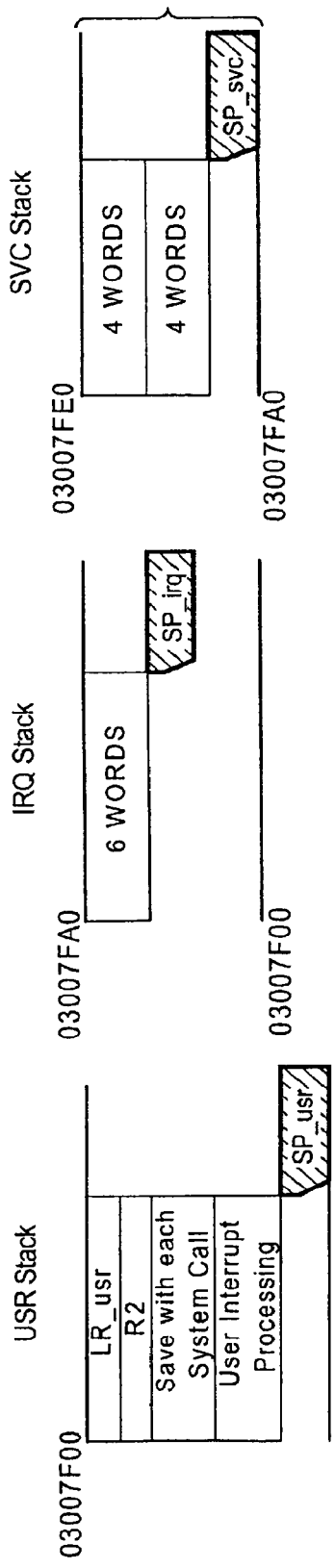
Figure 128H:
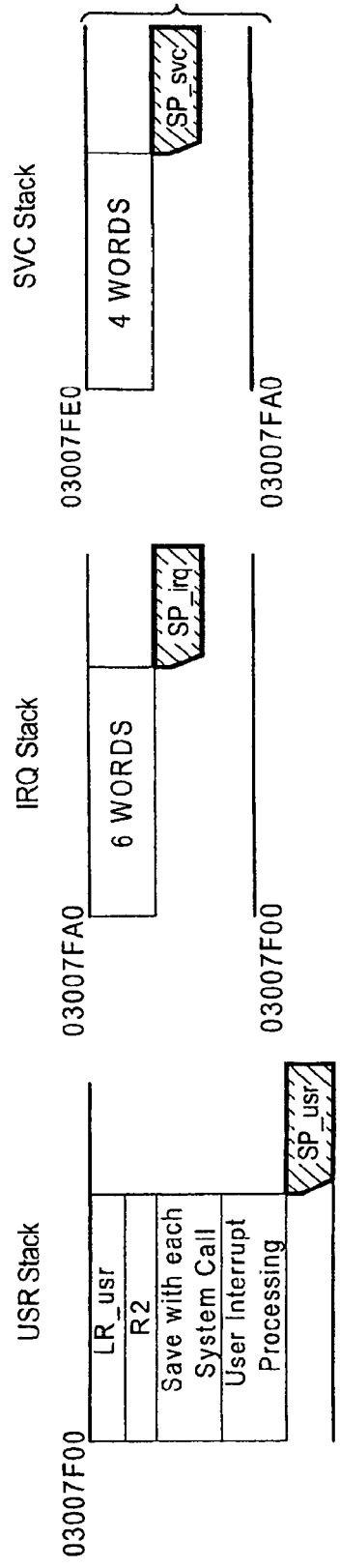
Figure 128I:
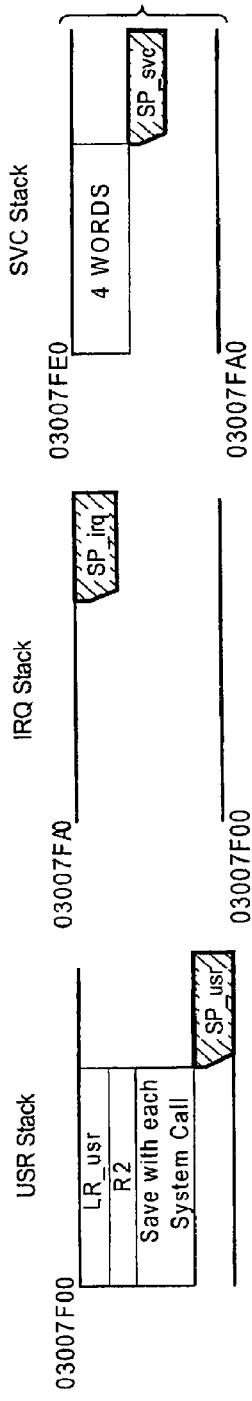
Figure 128J:
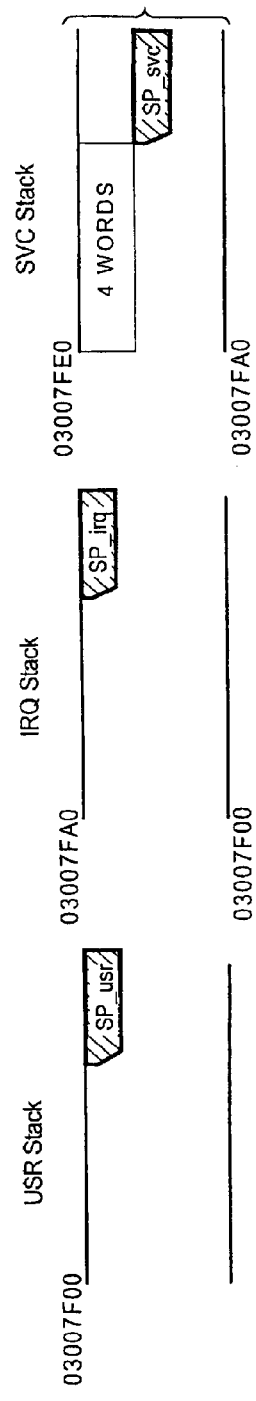
Figure 128K:
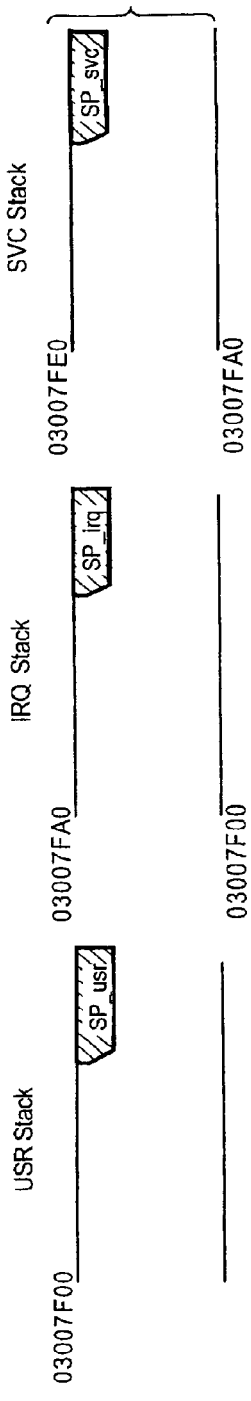
Figure 129:
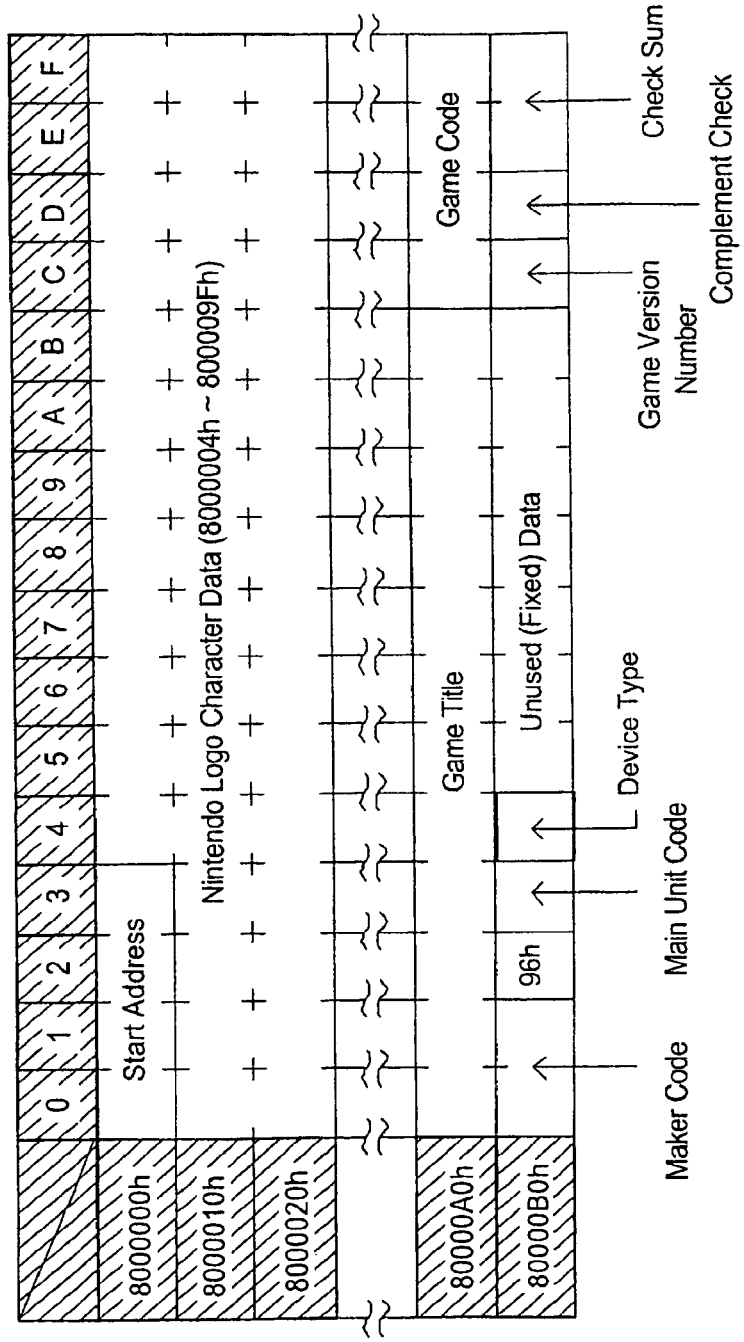
Figure 130A:
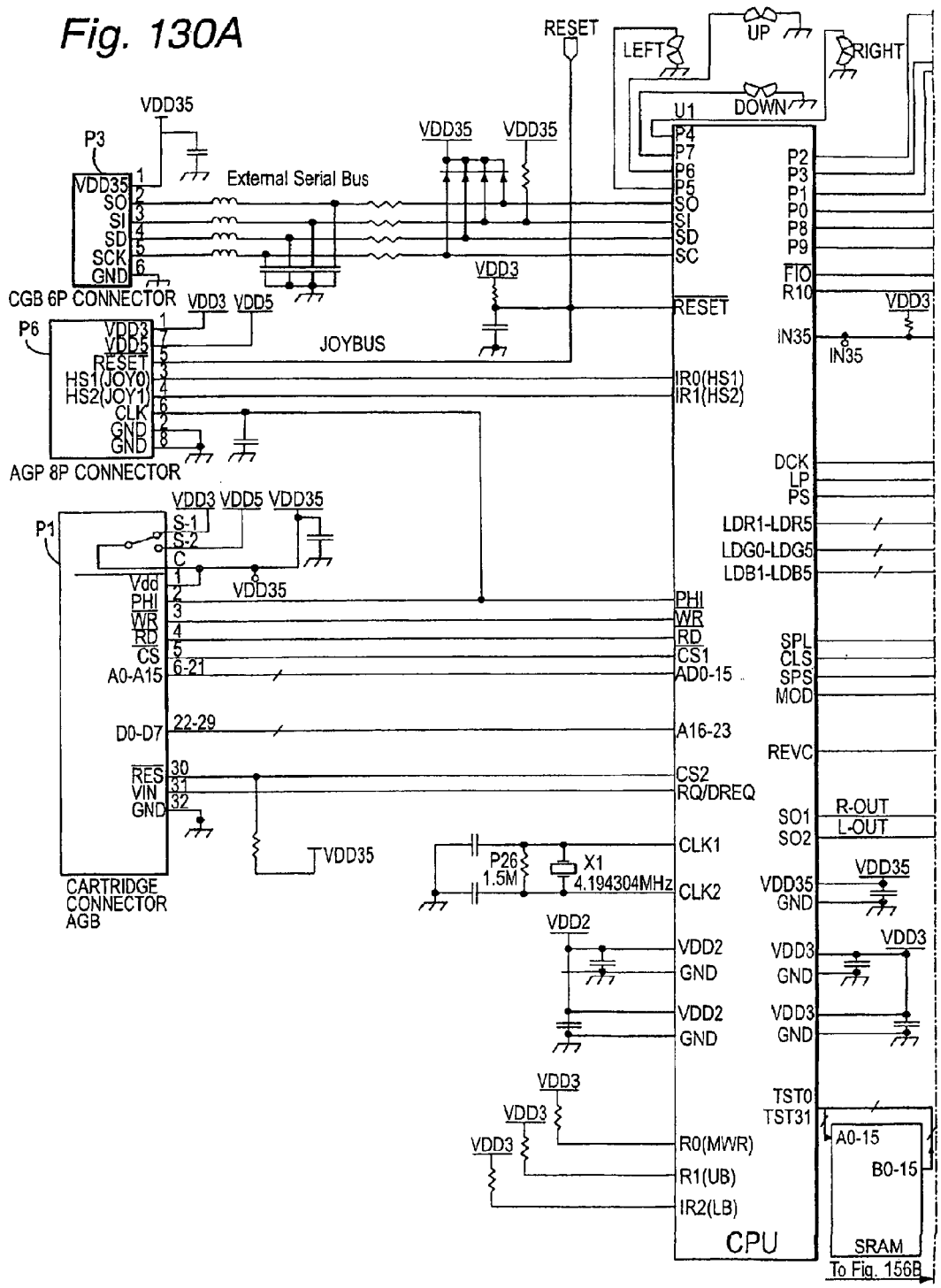
Figure 130B:
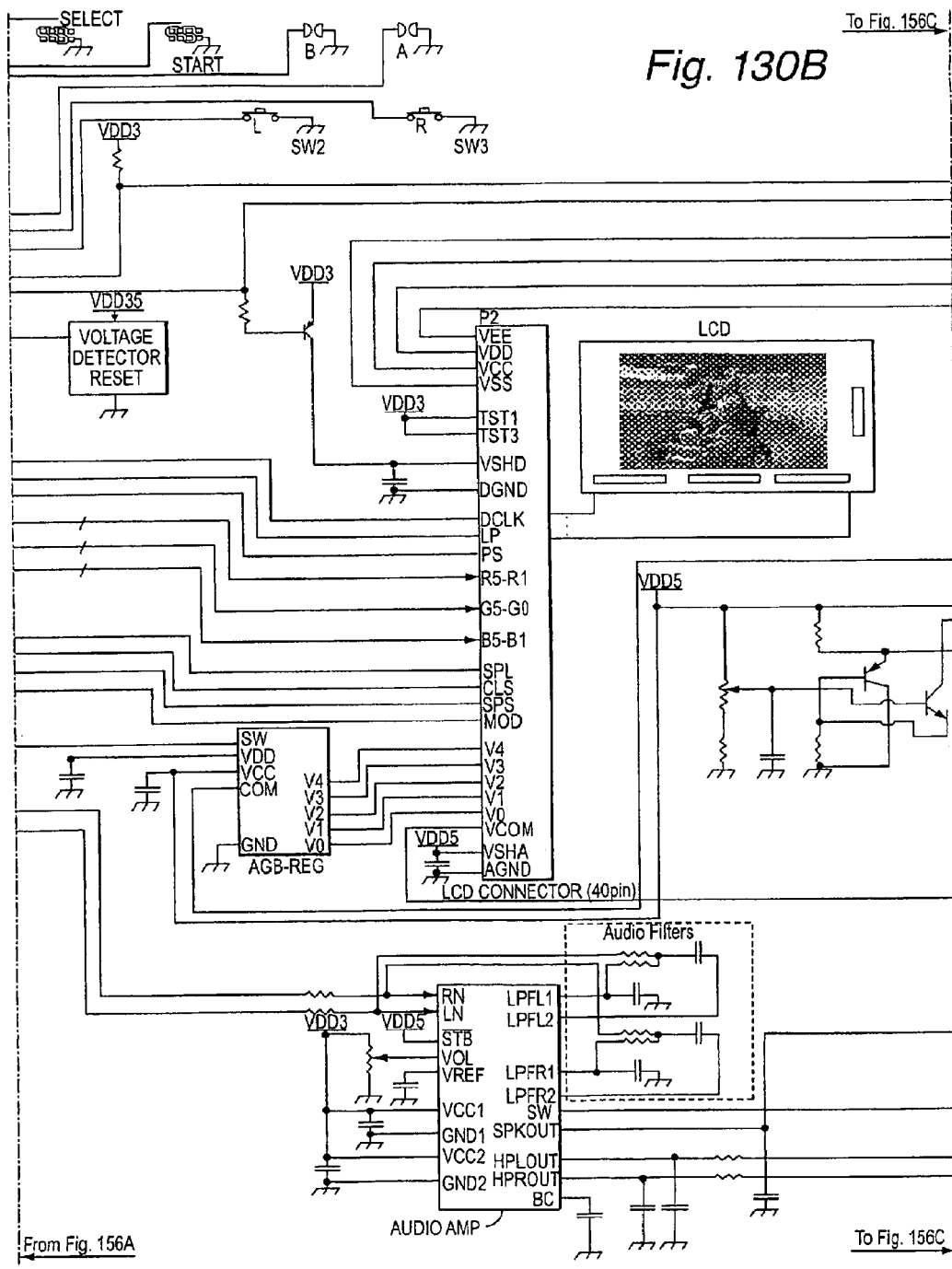
Figure 130C:
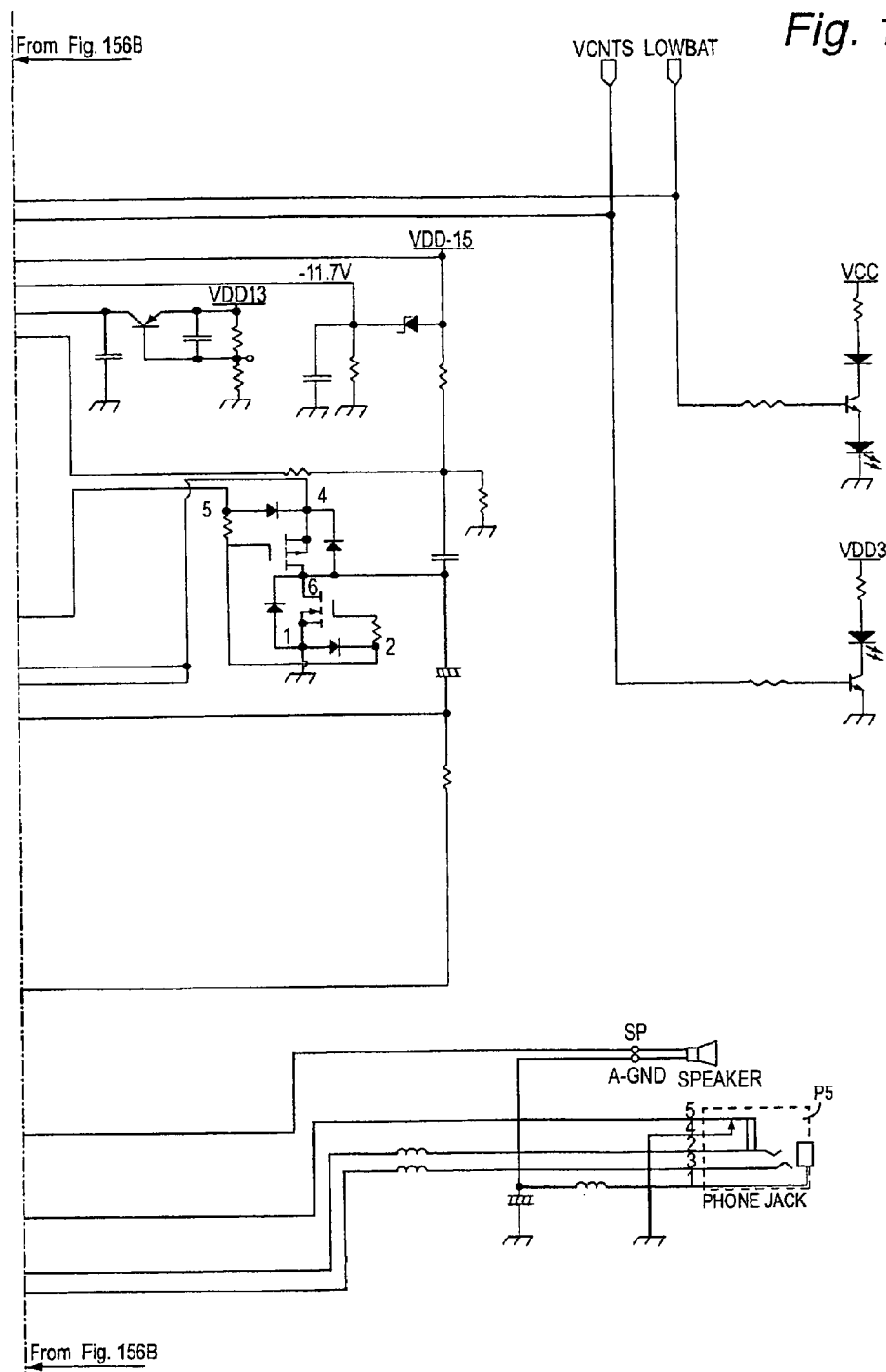
Figure 132A:
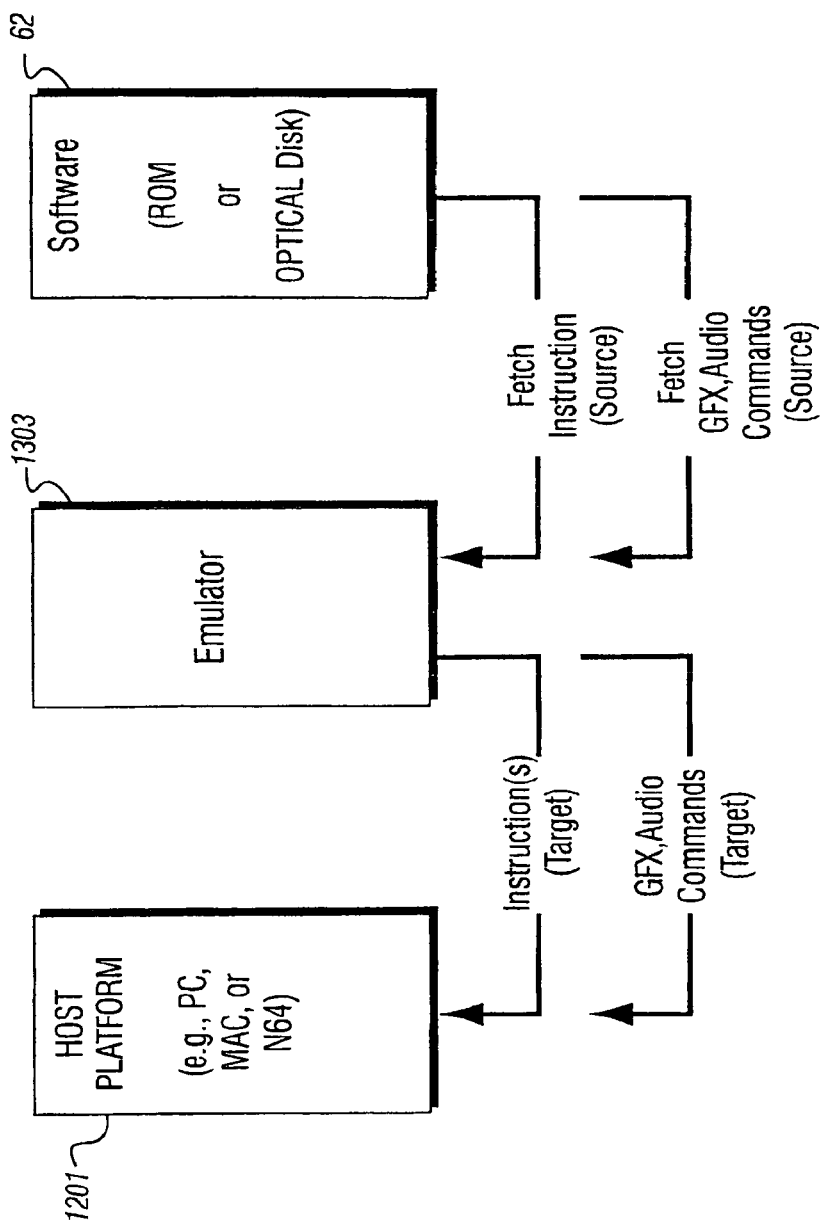
Figure 132B:
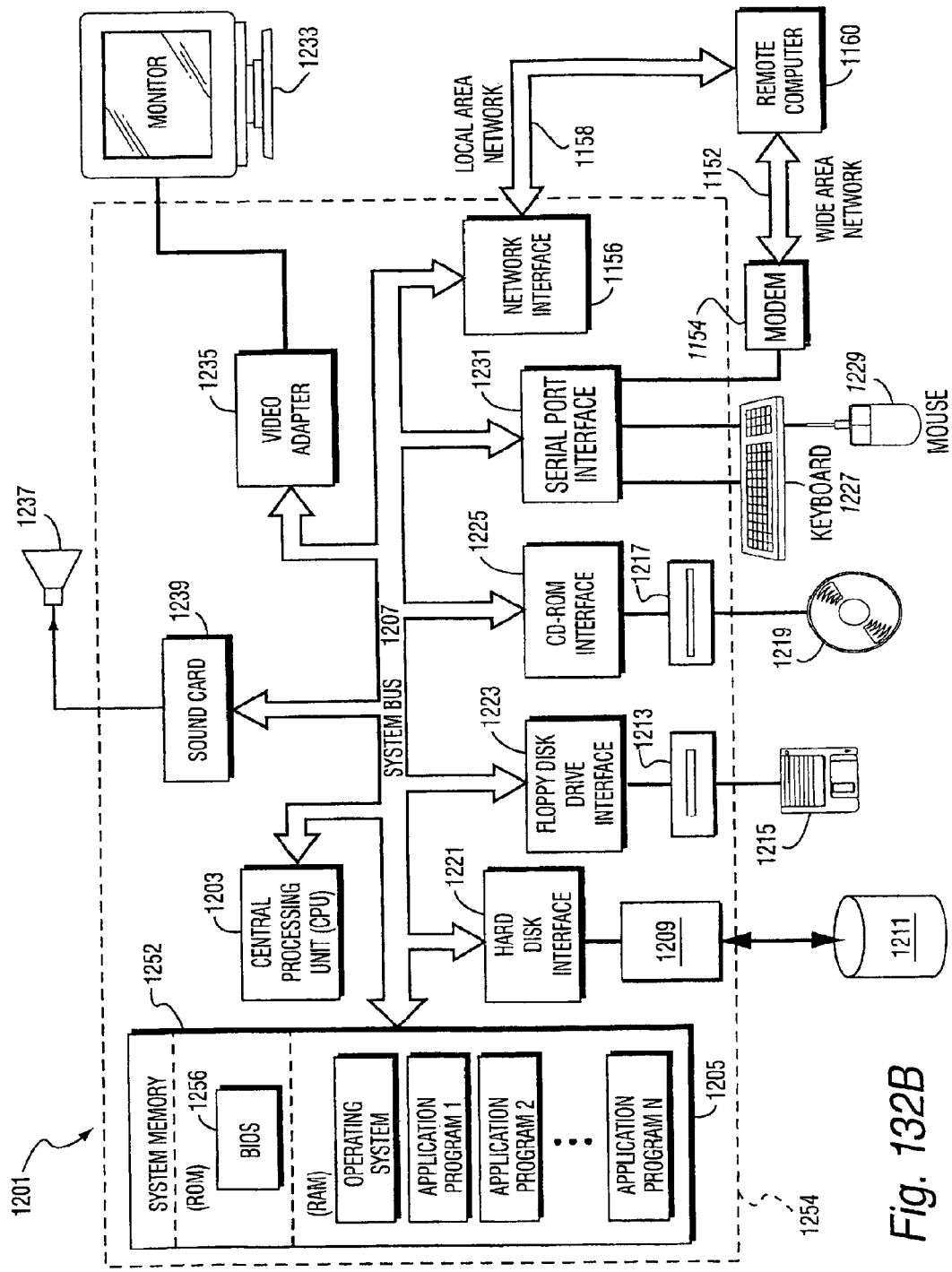
Figure 133A:
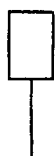
Figure 133B:
Figure 133C:
Figure 133D:
Figure 133E:
Figure 133F:
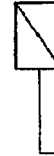

FIGS. 125A-125B depict an example normal interrupt operation;

FIGS. 126A-126D depict an example multiple interrupt operation;

FIGS. 127A-127D depict an example normal system call operation;

FIGS. 128A-128K depict an example multiple system call operation;

FIG. 129 depicts ROM registration data;

FIGS. 130A-130C are a schematic diagram of the example AGB CPU;

FIGS. 131A-131H are a listing of all AGB registers;

FIGS. 132A-132C show example alternative compatible implementations; and

FIGS. 133A-133F are symbols used to represent the attributes of bits used in bit operations.

DETAILED DESCRIPTION OF EXAMPLE EMBODIMENTS

FIGS. 4A-4E are a front perspective view, a rear perspective view, a top-down view, a bottom-up view and a side view, respectively, of an example portable game system AGB. The AGB can be used to play interactive video games with accompanying sound. It can also be used for a variety of other applications including, but not limited to, an address book, a calculator, a date book, and an e-mail application. Video is displayed on display 27a and the sound is output through speaker 42. Display 27a may, for example, be a reflection (non-backlit) TFT color LCD, although the invention is not limited in this respect. Display 27a may also, if desired, be implemented as a touch-sensitive screen. The volume is adjustable by a volume control 35 and headphones (not shown) may be connected to the AGB via a headphone jack 37. An interface 43 is used for interfacing with, for example, other portable game systems; console game systems connected to televisions or other display devices; external devices such as infrared communication circuits, modems, adapters, bar code readers, wireless telephones and the like.

The AGB is powered by batteries (not shown) contained in a battery compartment accessible via a removable compartment cover 29. Power indicator 31 dims as the batteries lose power to provide a visual indication that new batteries are needed. In an alternative implementation, the AGB may also be configured for connection to an AC adapter to permit play without batteries.

To play a video game (or use some other application), the user selects an appropriate storage medium storing the video game (or application) he or she wants to play (or use), and inserts that storage medium into a slot 240 in the AGB. The storage medium may, for example, be in the form of a cartridge housing a memory that stores the game program or application. Such memory is typically semiconductor memory, although optical and magnetic memories are also usable. The user operates a power switch 25b to turn on the AGB and cause the AGB to begin running the video game or application based on the program stored in the storage medium. Of course, it is also possible to provide some games and/or applications in on-board memory of the AGB. Such games and applications may be accessible without inserting a storage medium into slot 240.

Operating keys 33a-33g are used to provide inputs to the AGB. Operating keys 33a and 33b are used, for example, to cause various motions and actions of the game characters displayed on LCD 27a. These motions and actions include a weapon use, a jump and the like. Operating key 33c is used to move a game character displayed on LCD 27a in four directions, e.g, upward, downward, right and left. Operating key 33d is a select key that is used, for example, for game mode selection and the like. Operating key 33e is a start key that is used to start playing a game or to temporarily stop the progress of a game. The AGB is also provided with left and right shoulder buttons 33f and 33g for supplying operating signals. When a player holds the AGB during game play, operating keys 33a and 33b are accessible by the thumb of the right hand, operating key 33c is accessible by the thumb of the left hand, left shoulder button 33f is accessible by the index finger of the left hand and right should button 33g is accessible by the index finger of the right hand. In this way, a user may supply a variety of inputs to the AGB. Depending upon the particular game or application, the various operating keys 33a-33g can perform different functions at different times.

Other input devices may be used with the AGB. For example, if display 27a is implemented as a touch-sensitive screen, a stylus may be used to supply inputs. Various other input devices may also be connected to the AGB via interface 43 or cartridge slot 240. For example, an infrared communication device may be connected to interface 43 to permit communication with other similarly equipped devices. A modem or network interface may be connected to the AGB via interface 43 or via cartridge slot 240 to permit connection to the Internet. A digital camera may be connected to the AGB via cartridge slot 240 to input captured images.

When a game cartridge is inserted into cartridge slot 240, the AGB automatically detects the cartridge type and switches to an appropriate operation mode. More specifically, the AGB includes a connector that, in use, is operatively connected to portable storage media (e.g., game cartridges) storing game programs or other applications. The example AGB includes first processing circuitry for processing programs having a first program specification (e.g., an 8-bit specification) and second processing circuitry for processing programs having a second program specification (e.g., 32-bit specification). The automatic detection of cartridge type may, for example, be based on a physical characteristic of the portable storage medium (e.g., shape of cartridge housing) or may be based on data stored in the portable storage medium.

While the example embodiments are described with reference to a hand-held game system, many of the concepts are applicable to other computing systems such as personal digital assistants (PDAs). For example, it may be desirable to configure a PDA to be compatible with a wide range of accessories, not all of which conform to the same specifications. By using the cartridge type detection techniques described herein and/or by providing first and second processing circuitry as described herein, the number and type of accessories that may be used with the PDA may be increased.

A security system for a hand-held game machine is disclosed in application Ser. No. 09/722,404, filed Nov. 28, 2000, now U.S. Pat. No. 7,089,427, the contents of which are incorporated herein.

Example Electronics of the AGB

Figure 1A:
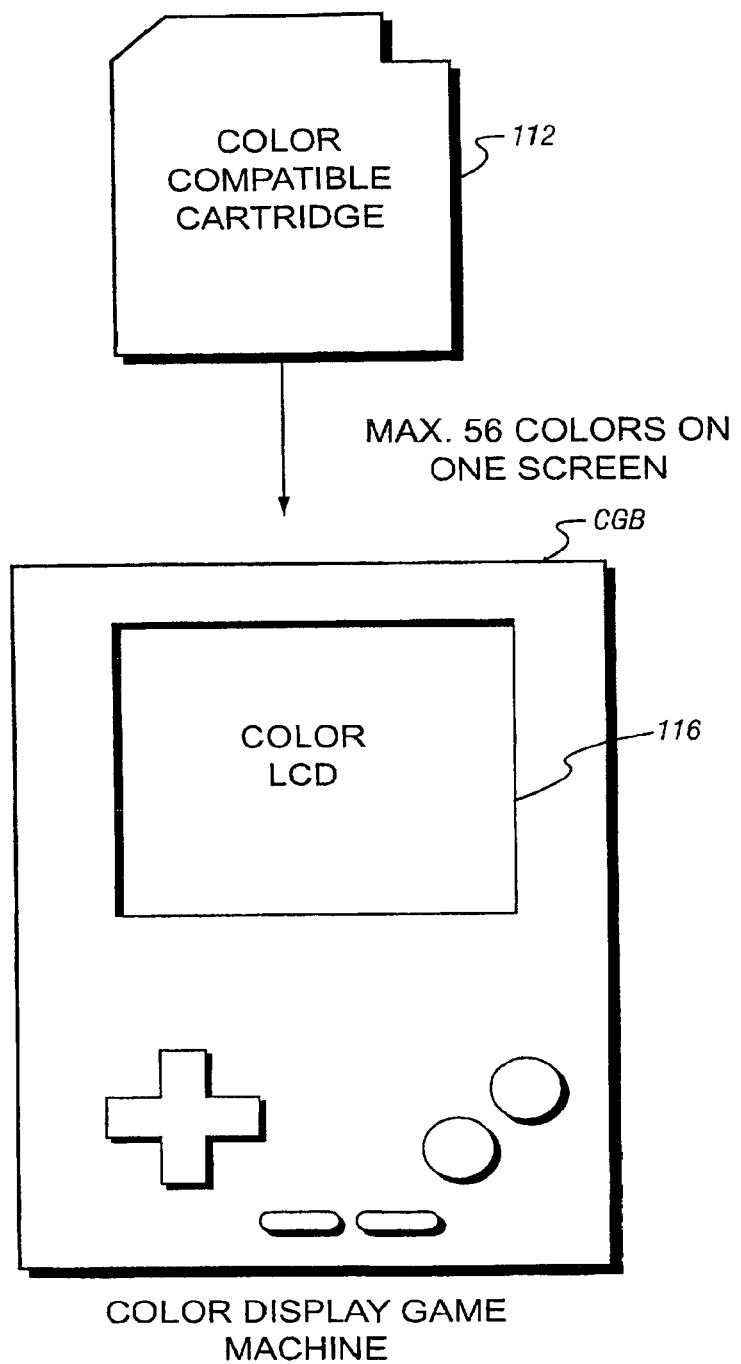
FIG. 1A schematically illustrate a conventional portable game system and a game cartridge selectively attachable to the portable game system.
Figure 1B:
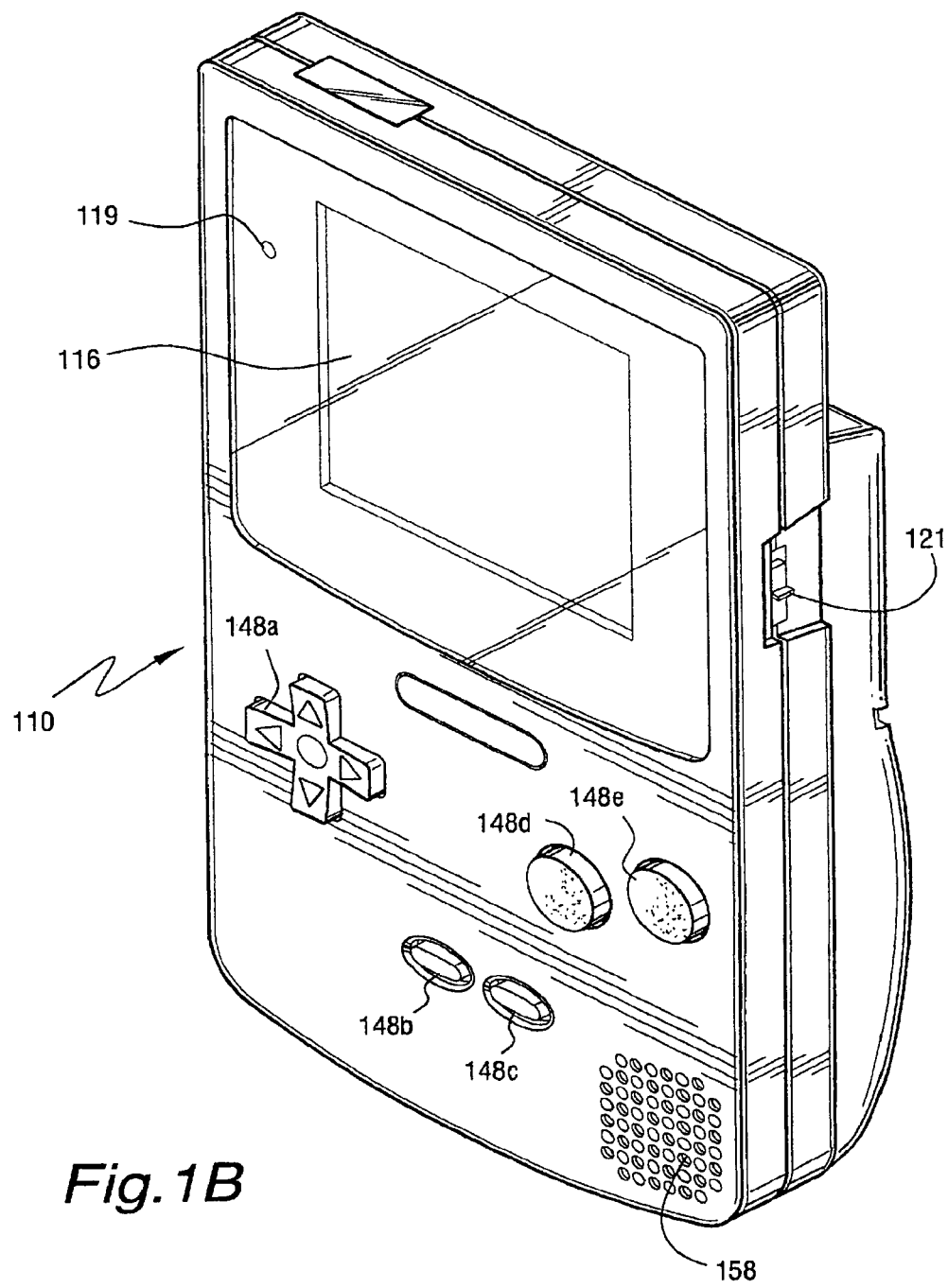
FIG. 1B is a front perspective view of the portable game system shown in FIG. 1A.
Figure 1C:
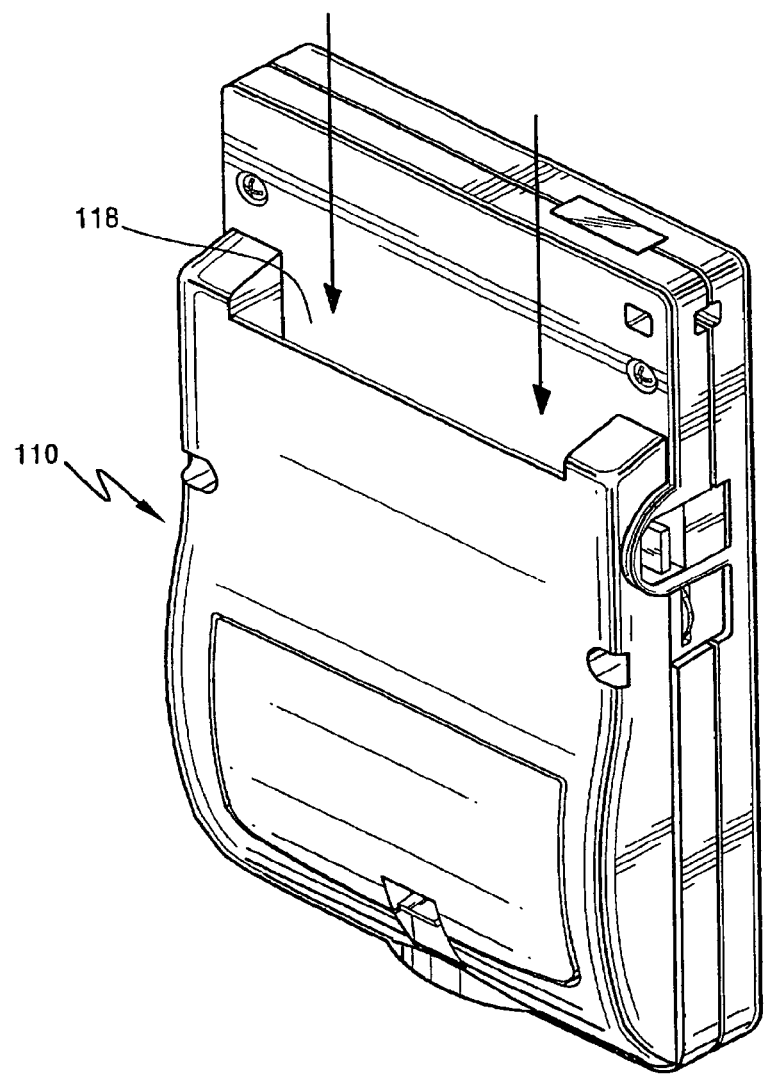
FIG. 1C is a rear perspective view of the portable game system shown in FIG. 1A.
Figure 2:
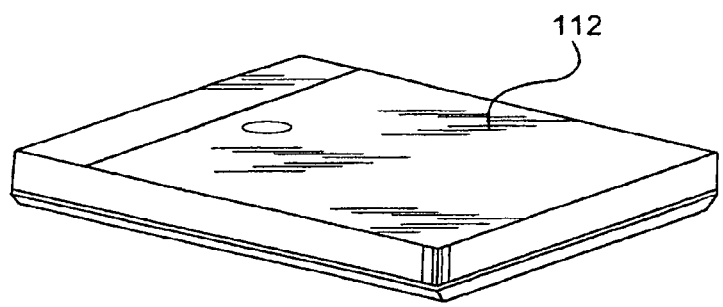
FIG. 2 is an outer appearance of the cartridge 12 shown in FIG. 1A.
Figure 3:
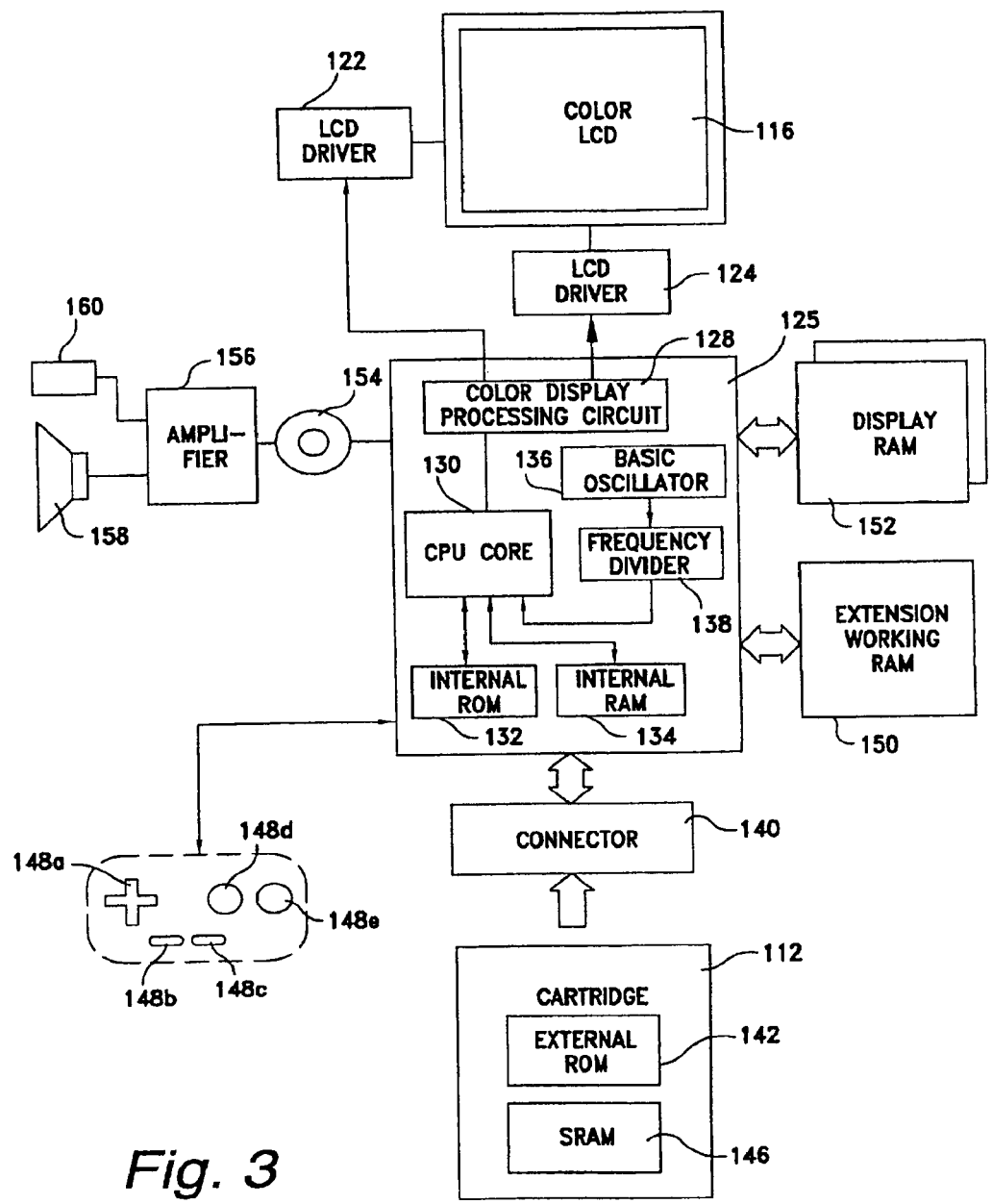
FIG. 3 is an overall block diagram of the game cartridge and game system shown in FIGS. 1A, 1B, 1C and 2.
Figure 4A:
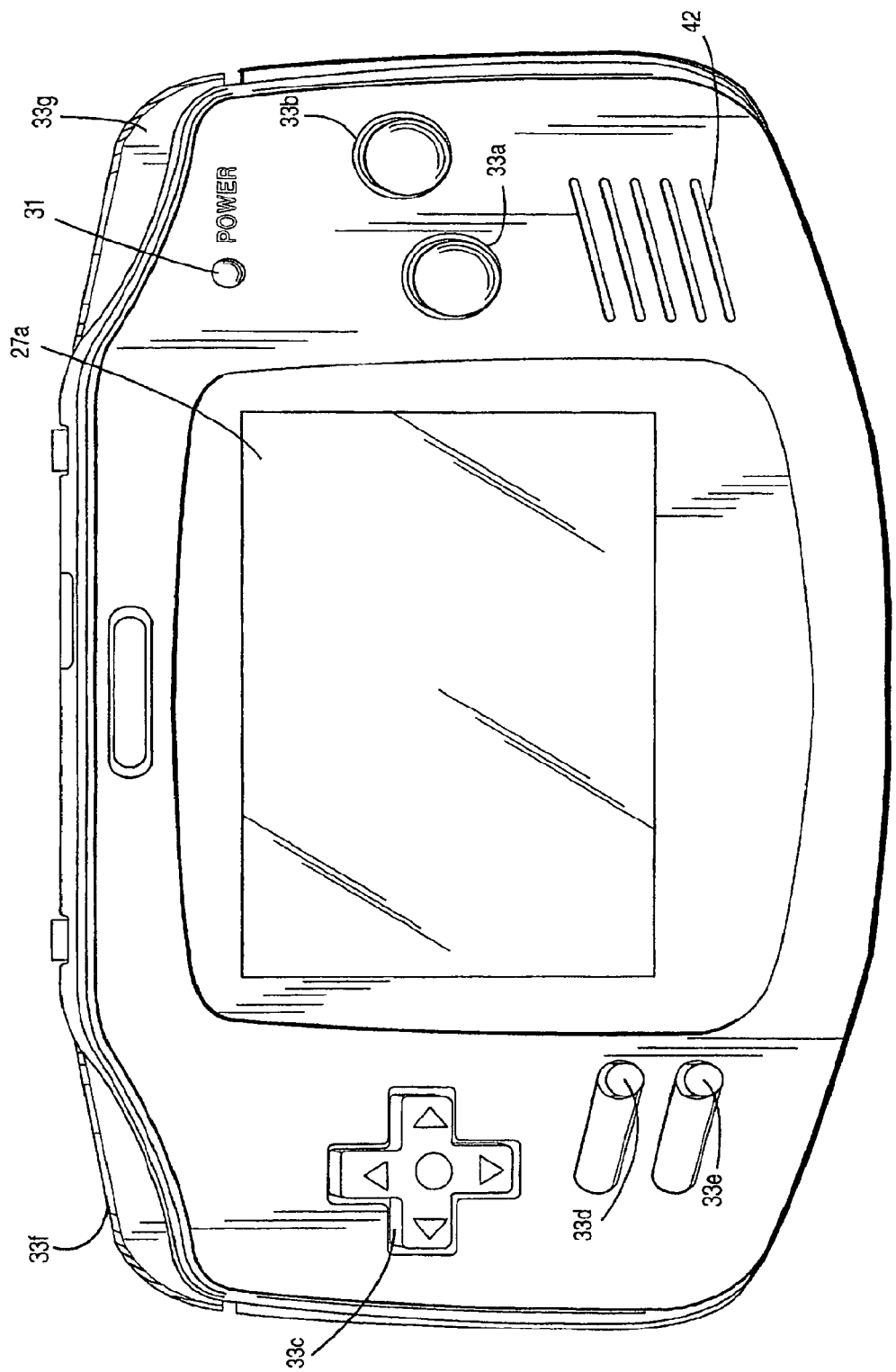
FIGS. 4A-4E are a front perspective view, a rear perspective view, a top-down view, a bottom-up view and a side view, respectively, of an example portable game system AGB.
Figure 4B:
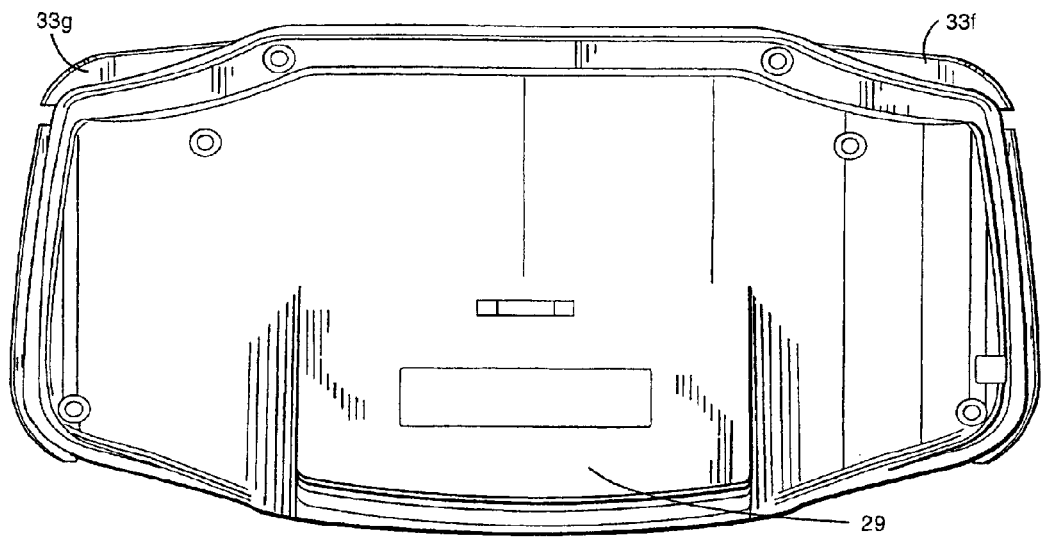
Figure 4C:
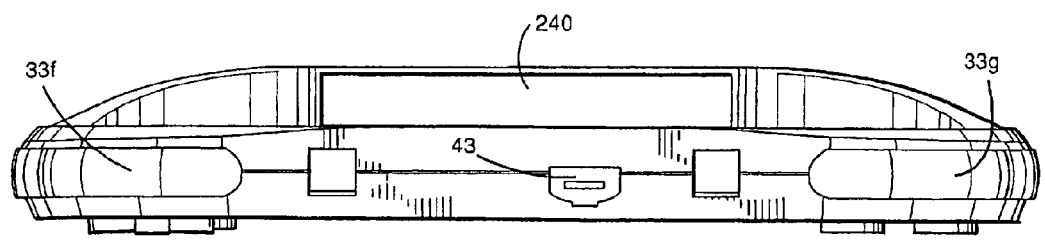
Figure 4D:
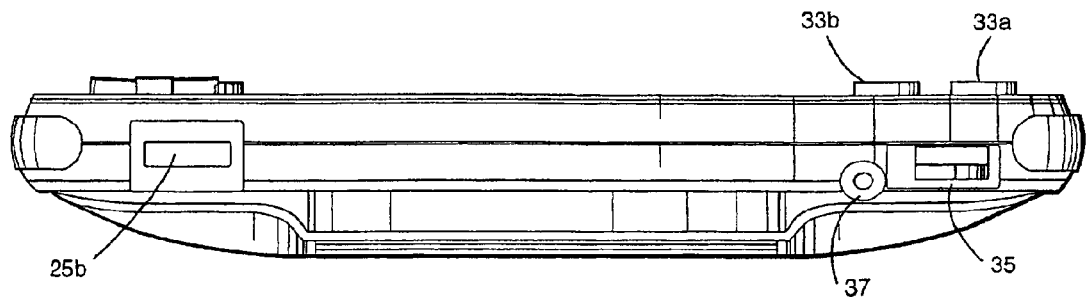
Figure 4E:
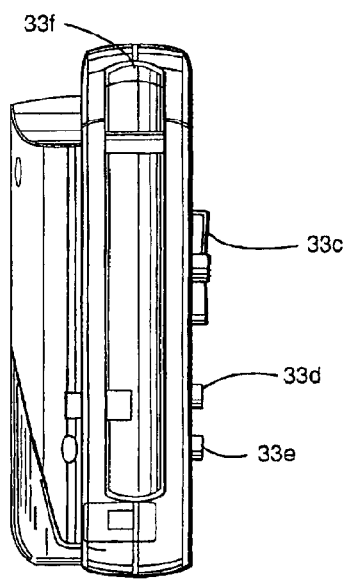

The example AGB includes a 32-bit RISC CPU (e.g., ARM7TDMI/16.78 MHz) to provide high performance. A technical data sheet for the ARM7TDMI is available from Advanced RISC Machines Ltd. (Document No. ARM DDI 0029E). Compatibility with the CGB shown in FIGS. 1-3 is maintained by providing an integral 8-bit CISC CPU. In the example AGB, the 8-bit CISC CPU does not operate at the same time as the AGB CPU, although the invention is not limited in this respect. The example AGB memory characteristics include:

System ROM 16 Kbytes (and 2 Kbytes for CGB System ROM)
Working RAM (WRAM) 32 Kbytes+CPU External 256 Kbytes (2 wait)
VRAM 96 Kbytes
OAM 64 bits×128
Palette RAM 16 bits×512 (256 colors for OBJ; 256 colors for BG)
Game cartridge memory (up to 32 MB: mask ROM or flash memory+up to 512 Kbits: SRAM or flash memory)

The example AGB display characteristics include:
240×160×RGB dots
32,768 colors simultaneously displayable
Special effects features (rotation/scaling, alpha blending, fade-in/fade-out, and mosaic)
4 image system modes The example AGB includes various operating keys and provides four sounds corresponding to CGB sounds and two CPU direct sounds (PCM format). The example AGB also provides for serial communication (8 bit/32 bit, UART, multiplayer, general-purpose, JOY Bus). The example AGB is equipped with a 32-pin connector for game cartridge connection. When a game cartridge is inserted, the example AGB automatically detects its type and switches to either CGB or AGB mode. As will be explained in greater detail below, the following game cartridges can be used with the example AGB:

1. DMG game cartridges, DMG/CGB dual mode game cartridges, and CGB dedicated game cartridges, and
2. AGB-dedicated game cartridges (i.e., game cartridges that only function with AGB).

Figure 5A:
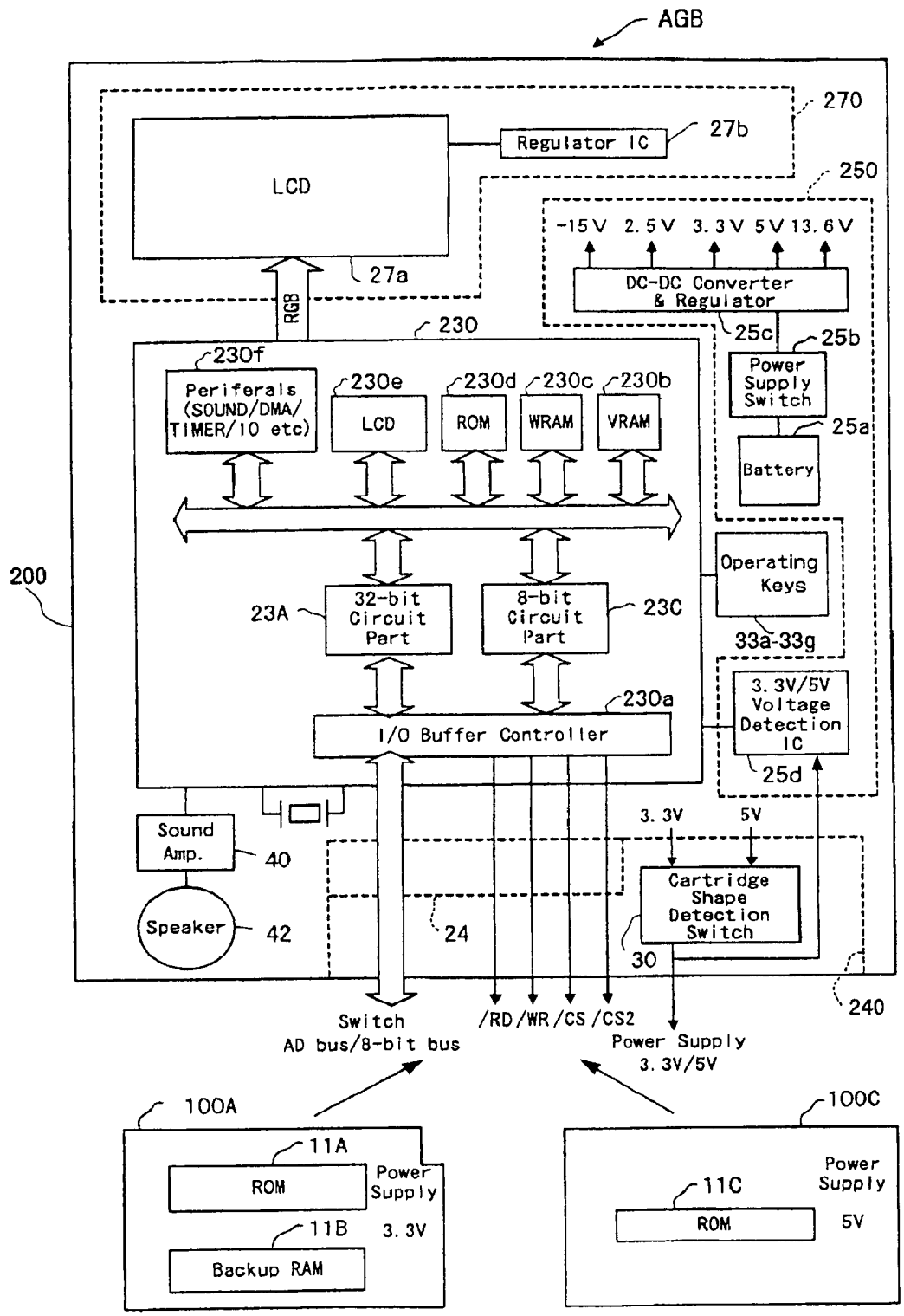
FIG. 5A is a block diagram of example components of the AGB.

FIG. 5A is a generalized system block diagram of the example AGB. The AGB includes a program source 100 and a game system 200. Program source 100 stores information such as a game program (or other application) executable by game system 200, and is structured to be removably attachable to game system 200. FIG. 5A shows two types of program sources 100: program source 100C for the CGB and program source 100A only for the AGB. Hereinafter, program source 100C is referred to as CGB cartridge 100C and program source 100A is referred to as AGB-dedicated cartridge 100A. AGB-dedicated cartridge 100A is basically the same in structure as CGB cartridge 100C and, for the sake of clarity, only the differences therebetween are described.

AGB-dedicated cartridge 100A includes a ROM 11A and a backup RAM 11B for storing programs (such as, but not limited to, game programs) for processing by the 32-bit CPU system in the example AGB. The operating voltage for both ROM 11A and backup RAM 11B is 3.3V. CGB cartridge 100C includes a ROM 11C for storing programs (such as, but not limited to, game programs) for processing by the 8-bit CPU system in the example AGB. The operating voltage for ROM 11C is 5V. AGB-dedicated cartridge 100A and CGB cartridge 100C both include connectors conforming to 8-bit specifications.

Game system 200 includes a CPU 230, cartridge slot 240, a power-supply unit 250, and an LCD unit 270. Liquid crystal display 270 includes LCD 27a and a regulator IC 27b. Cartridge slot 240 is configured to accept both AGB-dedicated cartridges 100A and CGB cartridges 100C. A connector 24 is provided within cartridge slot 240 to engage with the connectors provided on AGB-dedicated cartridges 100A and CGB cartridges 100C. A cartridge shape detection switch 30 is provided to detect a difference in the shapes of the AGB-dedicated cartridges and the CGB cartridge in order to determine which of the two cartridge types is inserted into cartridge slot 240.

CPU 230 includes both an 8-bit circuit 23C for 8-bit processing of programs stored in CGB cartridges 100C, and a 32-bit circuit 23A for 32-bit processing of programs stored in AGB-dedicated cartridges 100A. CPU 230 may be viewed as a dual-processor-type unit. CPU 230 further includes an I/O buffer controller 230a. 32-bit circuit 23A and 8-bit circuit 23C are connected to one side of I/O buffer controller 230a and the internal components of the cartridge inserted in cartridge slot 240 are connected to the other side of I/O buffer controller 230 (via connectors 24 and 13). As such, I/O buffer controller 230a controls input/output data buffering between these components.

CPU 230 also includes VRAM 230b, WRAM 230c, ROM 230d, an LCD controller 230e, and a peripheral circuit 230f, all of which are connected to 32-bit circuit 23A and to 8-bit circuit 23C via a bus. Peripheral circuit 230f carries out processing relevant to sound, DMAs, timers, I/Os, and the like. CPU 230 is also connected to operating keys 33a-33g, a sound amplifier 40, speaker 42, a power-supply unit 250, and LCD unit 270. CPU 230 processes the program(s) stored in a cartridge currently inserted into cartridge slot 240 in response to the user's inputs via operating keys 33a-33g, and then communicates outputs of the processing via LCD 27a and speaker 42.

Power-supply unit 250 includes a power-supply 25a, a power-supply switch 25b, a DC-DC converter 25c, and a voltage detection IC 25d. Power-supply 25a is preferably provided as one or more batteries (e.g., 2 AA disposable batteries or a rechargeable battery pack), and supplies power to DC-DC converter 25c via power-supply switch 25b. DC-DC converter 25c converts the DC power supplied from power-supply 25a to generate various DC voltages. In the example AGB, DC-DC converter 25c generates DC voltages of −15V, 2.5V, 3.3V, 5V, and 13.6V.

Cartridge shape detection switch 30 is connected to DC-DC converter 25c. When the cartridge inserted into cartridge slot 240 is an AGB-dedicated cartridge 100A, cartridge shape detection switch 30 selects a DC voltage of 3.3V for output to the inserted cartridge. When a CGB cartridge 100C is inserted into cartridge slot 240, cartridge shape detection switch 30 selects a DC voltage of 5V for output to the inserted cartridge.

Figure 5B:
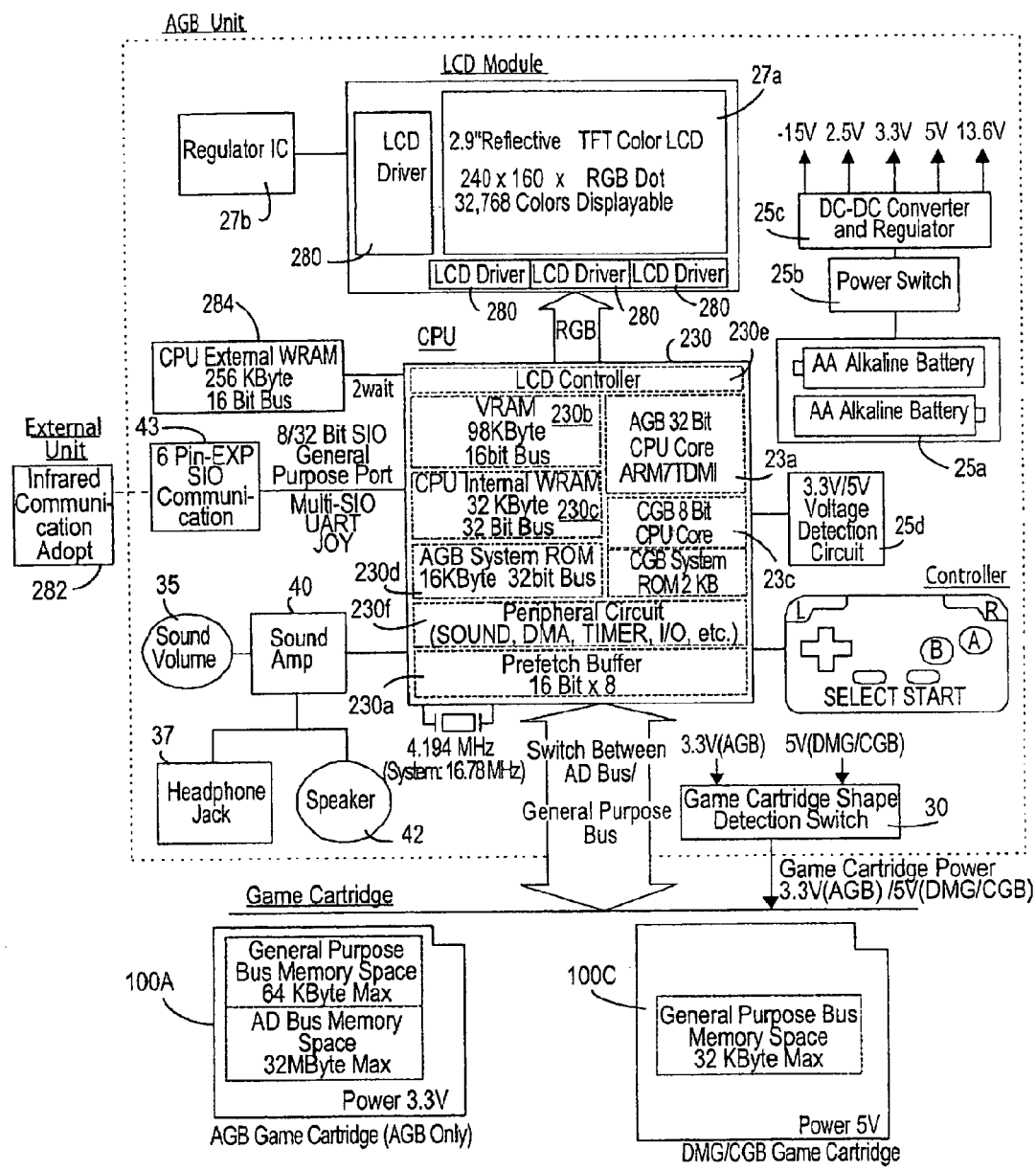
FIG. 5B is a more detailed block diagram of the elements shown in FIG. 5A.

FIG. 5B is a more detailed block diagram of the elements shown in FIG. 5A that provides some additional details regarding some of the elements shown in FIG. 5A. In particular, FIG. 5B shows LCD drivers 280 for driving LCD 27a. FIG. 5B also shows interface 43 having an external unit 282 connected thereto. While the external unit in FIG. 5B is an infrared communication device, the invention is not limited in this respect. An external WRAM 284 is also shown in FIG. 5B.

Figure 5C:
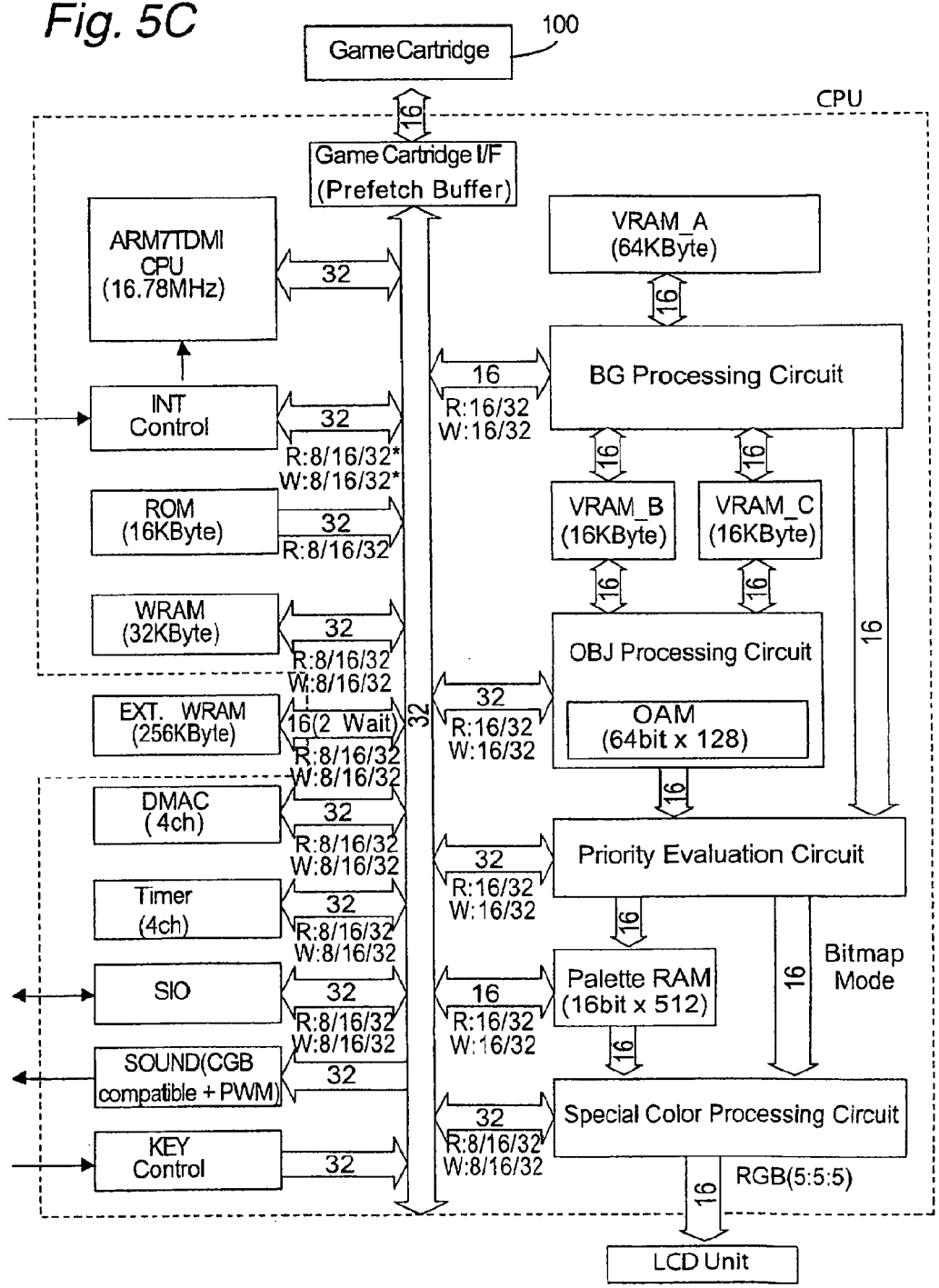
FIG. 5C is a detailed block diagram of CPU 230.

FIG. 5C is a detailed block diagram of CPU 230. In FIG. 5C, the symbols R:8/16/32 and W:8/16/32 mean, for example, that an area of 8 bits/16 bits/32 bits can be accessed when reading and writing, respectively. FIGS. 130A-130C are a schematic diagram of the CPU 230.

Table I shows the memory configuration and access width.

TABLE I

| Memory type | Bus Width | DMA | | CPU | |
|---|---|---|---|---|---|
| | | Read Width | Write Width | Read Width | Write Width |
| OAM | 32 | 16/32 | 16/32 | 16/32 | 16/32 |
| Palette RAM | 16 | 16/32 | 16/32 | 16/32 | 16/32 |
| VRAM | 16 | 16/32 | 16/32 | 16/32 | 16/32 |
| CPU Internal Working RAM | 32 | 16/32 | 16/32 | 8/16/32 | 8/16/32 |
| CPU External Working RAM | 16 | 16/32 | 16/32 | 8/16/32 | 8/16/32 |
| Internal registers | 32 | 16/32 | 16/32 | 8/16/32 | 8/16/32 |
| Game cartridge ROM (mask ROM, Flash memory) | 16 | 16/32 | 16/32 | 8/16/32 | 16/32 |
| Game cartridge RAM (SRAM, Flash memory) | 8 | — | — | 8 | 8 |

Good execution efficiency may be obtained when programs that operate from the game cartridge use 16-bit instructions (16-bit compiler), and those that operate from the CPU internal working RAM use 32-bit instructions (32-bit compiler). In CPU 230, memory addresses are preferably allocated in 8-bit increments, and little-endian format is used in implementing the 8-, 16- and 32-bit access widths. Bit lengths in this application are expressed as shown in Table II:

TABLE II

| Bit Length | Term Used |
|---|---|
| 8 bits | byte |
| 16 bits | half-word |
| 32 bits | word |

Figure 6:
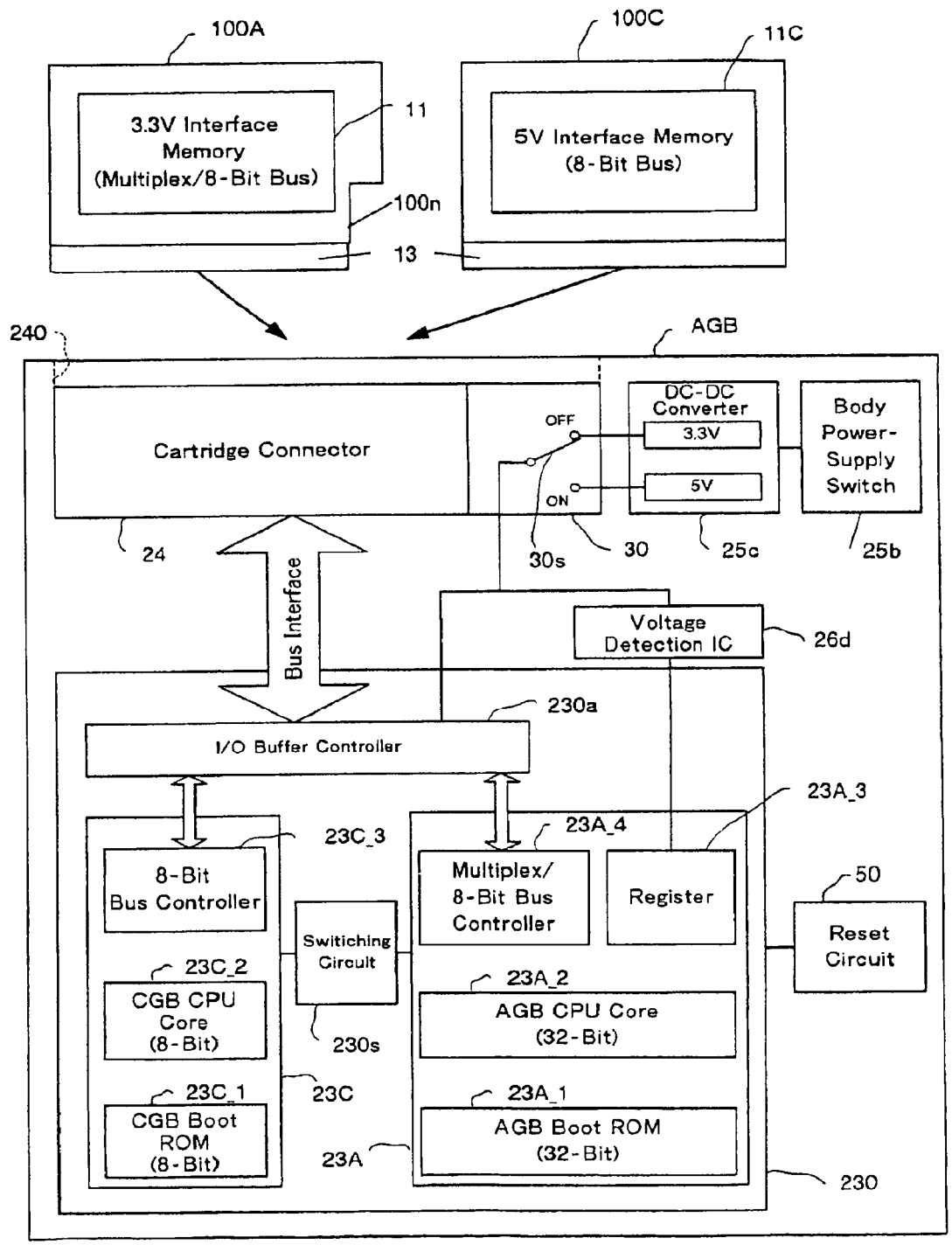
FIG. 6 is a block diagram showing components for identifying cartridge type in the AGB.
Figure 12A:
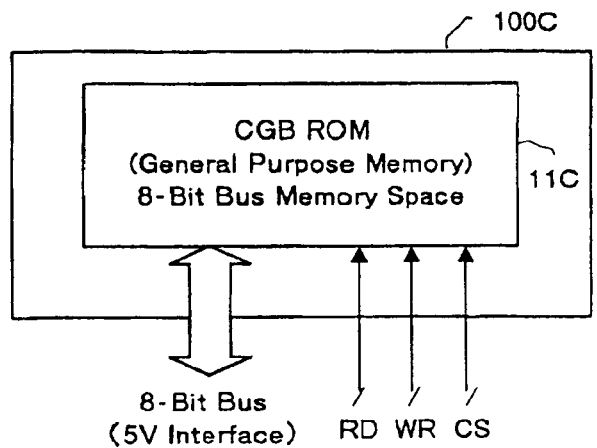
FIGS. 12A and 12B are more detailed block diagrams of the AGB-dedicated cartridge 100A and the CGB cartridge 100C, respectively, shown in FIG. 6.
Figure 12B:
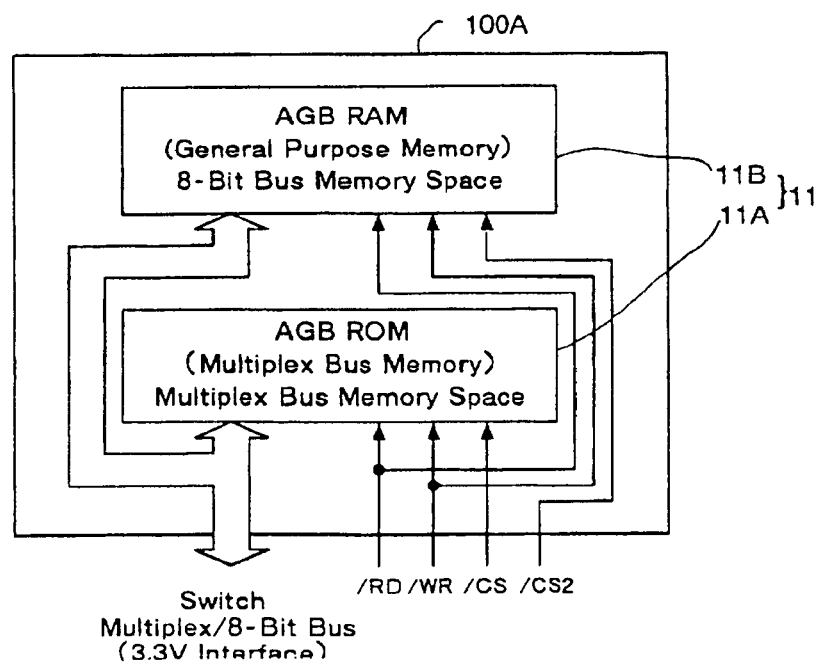
Figure 13:
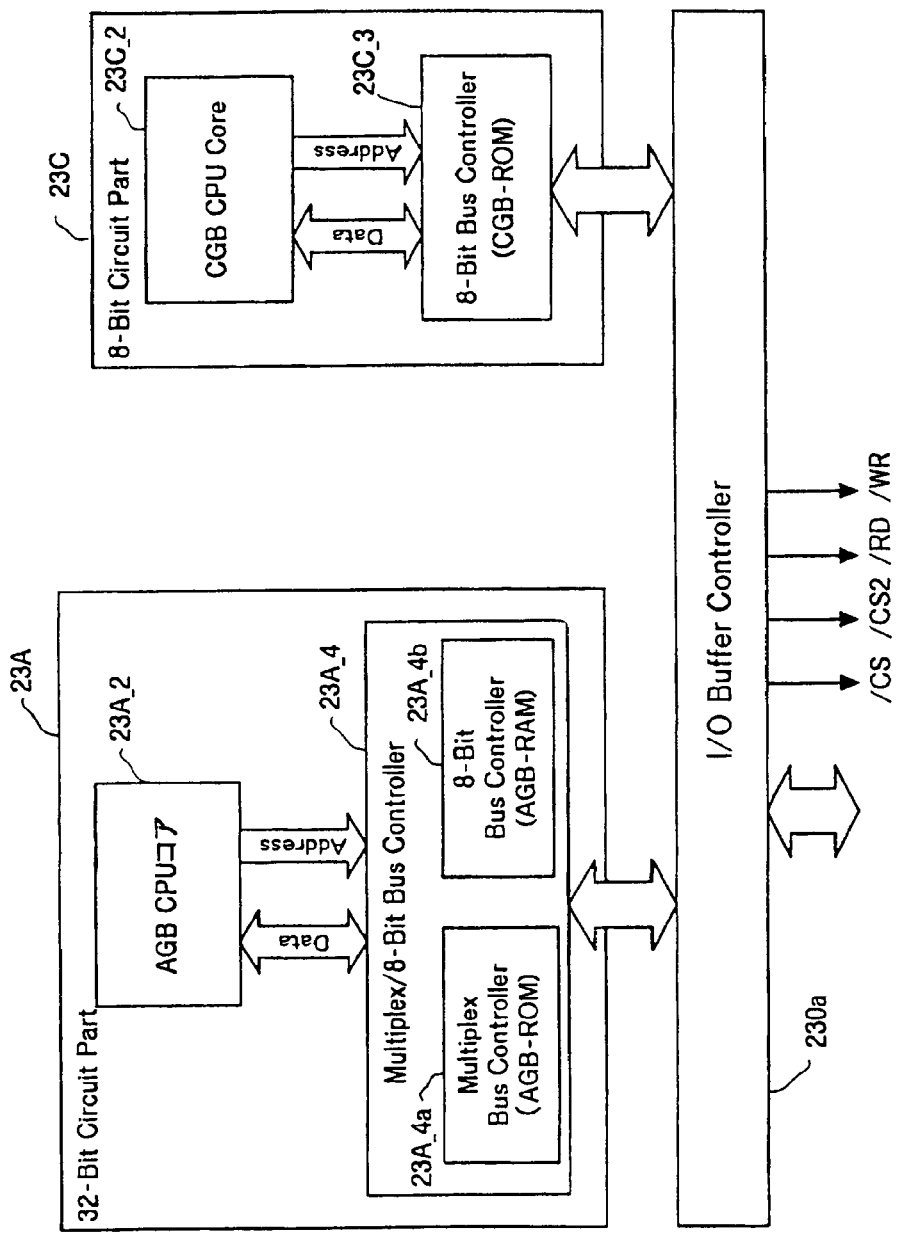
FIG. 13 is a block diagram showing parts of the AGB relevant to bus control.

The relationships among cartridge shape detection switch 30, AGB-dedicated cartridge 100A, and CGB cartridge 100C are described in detail below with reference to FIGS. 6-11. FIG. 6 is a block diagram showing the main elements for identifying cartridge type in the example AGB. In AGB-dedicated cartridge 100A, ROM 11A and backup RAM 11B are shown in FIG. 6 as constituting a 3.3V interface memory 11. With reference to FIGS. 12 and 13, 3.3V interface memory 11 is capable of data transfer in a multiplex mode through an 8-bit bus as will be described in greater detail below. In CGB cartridge 100C, ROM 11C is shown in FIG. 6 as constituting a 5V interface memory.

CPU 230 includes a switching circuit 230s for selectively driving either 32-bit circuit 23A or 8-bit circuit 23C based on a value of a register 23A_3 supplied from a voltage detector 26d. 32-bit circuit 23A includes an AGB boot ROM 23A_1, an AGB CPU core 23A_2, register 23A_3 and a multiplex/8-bit bus controller 23A_4. 8-bit circuit 23C includes a CGB boot ROM 23C_1, a CGB CPU core 23C_2, and an 8-bit bus controller 23C_3.

A reset circuit 50 resets CPU 230 in response to the voltage (3.3V) supplied from DC-DC converter 25c. Cartridge shape detection circuit 30 is provided with a selector 30s. Selector 30s is selectively connected with either the 3.3V output terminal or the 5V output terminal provided in DC-DC converter 25c so that the output from the selected output terminal is supplied to the cartridge inserted into cartridge slot 240. In the example AGB, selector 30s is normally biased to be connected to the 3.3V output terminal (shown as OFF in FIG. 6). Thus, "normal" when referring to selector 30s means a state in which selector 30s is biased to be connected to the 3.3V output terminal.

A method of uniquely selecting an output voltage depending on the cartridge type (i.e., AGB-dedicated cartridge 100A or CGB cartridge 100C) will now be described. Cartridge shape detection switch 30 is positioned so that if a CGB cartridge 100C is inserted into cartridge slot 240, a part of CGB cartridge 100C abuts (comes into contact with) selector 30s. Thus, as a CGB cartridge 100C is pushed into cartridge slot 240, the part abutting selector 30s pushes selector 30s to the 5V output terminal. Thus, selector 30s is no longer connected with the "normal" 3.3V output terminal, but is securely connected with the 5V output terminal and retained at this position while the CGB cartridge 100C remains in cartridge slot 240. With selector 30s being connected to the 5V output terminal, CGB cartridge 100C is supplied with the DC output of 5V from DC-DC converter 25c.

On the other hand, an AGB-dedicated cartridge 100A is shaped so as no part thereof abuts selector 30s when it is inserted into cartridge slot 240. In this case, when an AGB-dedicated cartridge 100A is completely inserted into cartridge slot 240, selector 30s remains "normally" biased and connected to the 3.3V output terminal. As a result, an AGB-dedicated cartridge 100A is supplied with the DC output of 3.3V from DC-DC converter 25c.

Figure 7A:
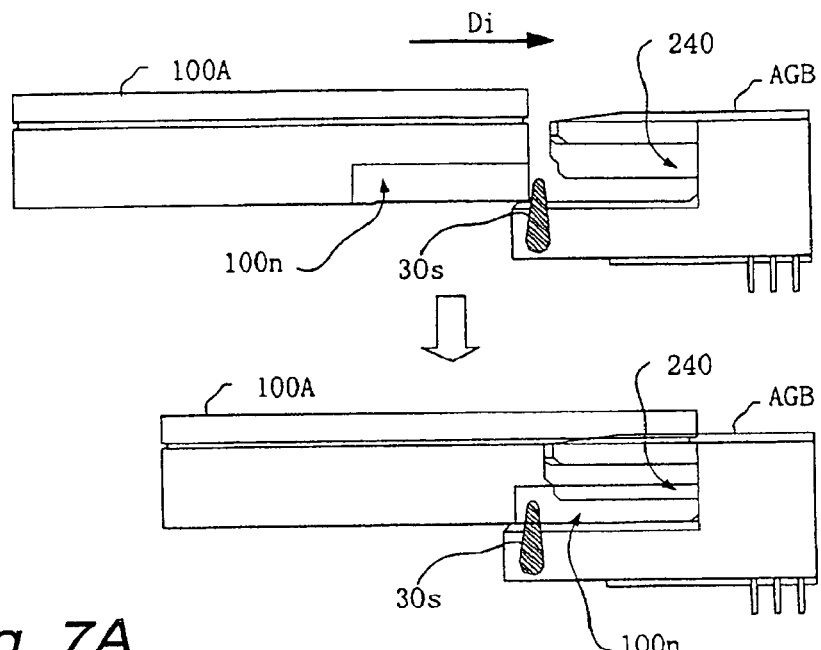
FIGS. 7A and 7B are diagrams for an explanation of a cartridge identification method for the AGB.

The method of identifying the above-described cartridge 100 is described in detail with reference to FIGS. 7-11. First, the case in which selector 30s is in the normal position and is connected to the 3.3V output terminal is described with reference to FIGS. 7A and 7B. FIG. 7A shows, in side view, an AGB-dedicated cartridge 100A both before and after its insertion into cartridge slot 240. In this example, selector 30s is positioned in the vicinity of a side end part of cartridge slot 240 (see also FIG. 8C) and projects into the opening of cartridge slot 240 in a direction that is substantially perpendicular to the insertion direction Di of an end face of AGB-dedicated cartridge 100A. AGB-dedicated cartridge 100A is provided with a notch 100n into which selector 30s is received as the cartridge is inserted into cartridge slot 240 in the Di direction. Notch 100n prevents cartridge 100A from contacting selector 30s when the cartridge is inserted into cartridge slot 240 so that selector 30s remains "normally" biased and connected to the 3.3V output terminal. As a result, an AGB-dedicated cartridge 100A is supplied with the DC output of 3.3V from DC-DC converter 25c.

Figure 7B:
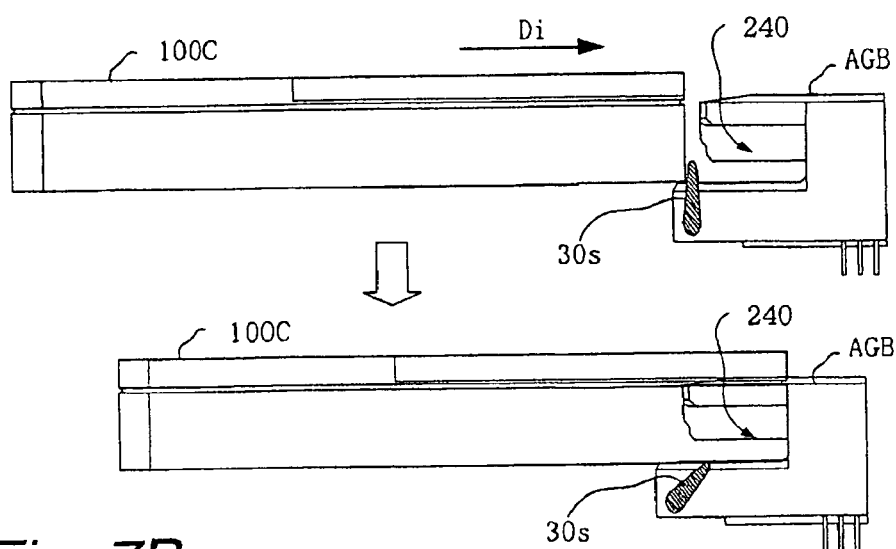

FIG. 7B shows, in side view, a CGB cartridge 100C both before and after its insertion into cartridge slot 240. In this example, unlike AGB-dedicated cartridge 100A, CGB cartridge 100C has no notch in a part adjacent to selector 30s when the cartridge is inserted into cartridge slot 240 in the Di direction. As a result, selector 30s is pushed down by an end face of CGB cartridge 100C, and is connected to the 5V output terminal. Selector 30s is retained in this position while CGB cartridge 100C is in cartridge slot 240. As a result, CGB cartridge 100C is supplied with the DC output of 5V from DC-DC converter 25c.

Figure 8A:
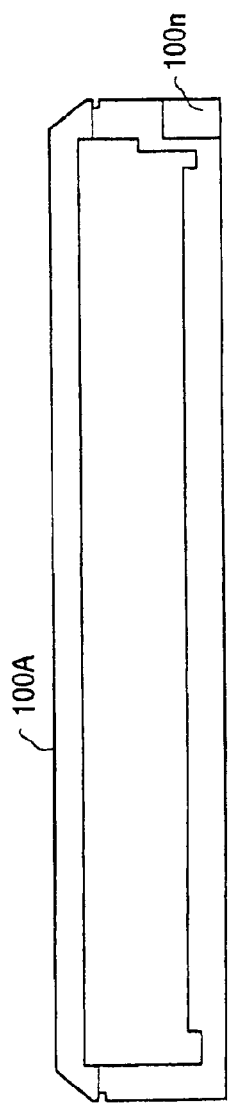
FIGS. 8A and 8B show the end face parts of an AGB-dedicated cartridge and a CGB cartridge, respectively.
Figure 8B:
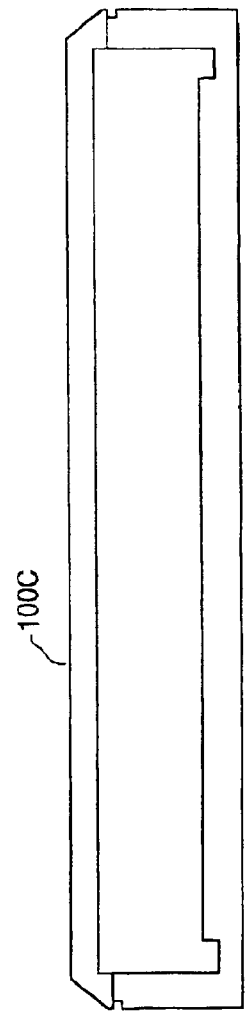
Figure 8C:
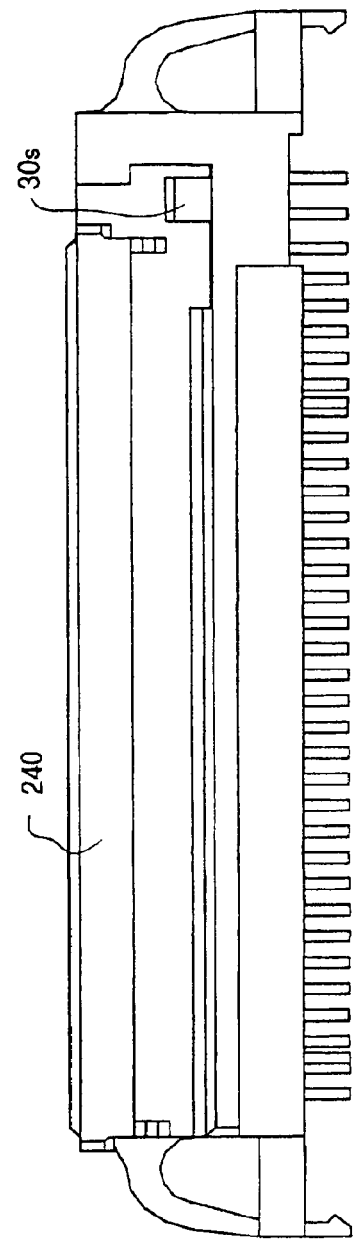
FIG. 8C shows the internal structure of cartridge slot 240.
Figure 9A:
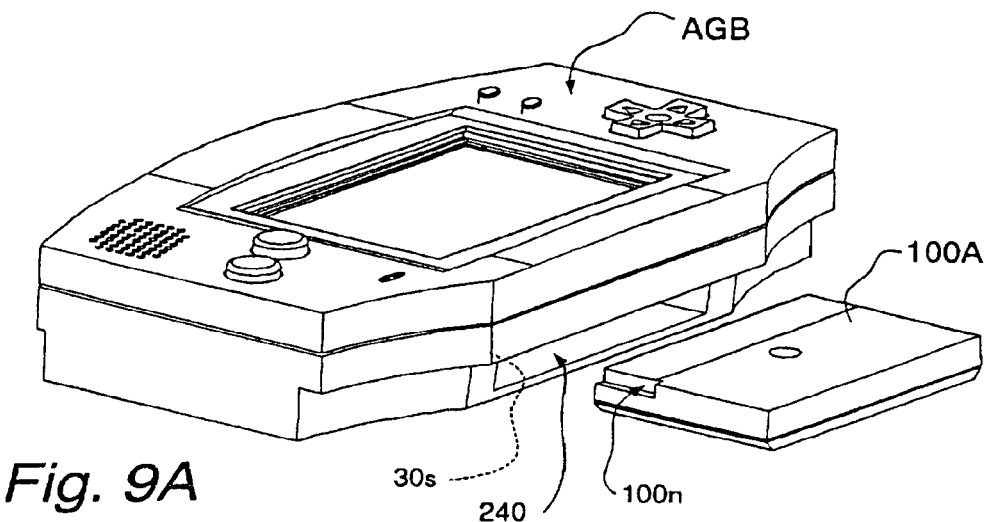
FIG. 9A is an angled, top-down, perspective diagram just prior to insertion of AGB-dedicated cartridge 100A into cartridge slot 240 of the AGB.
Figure 9B:
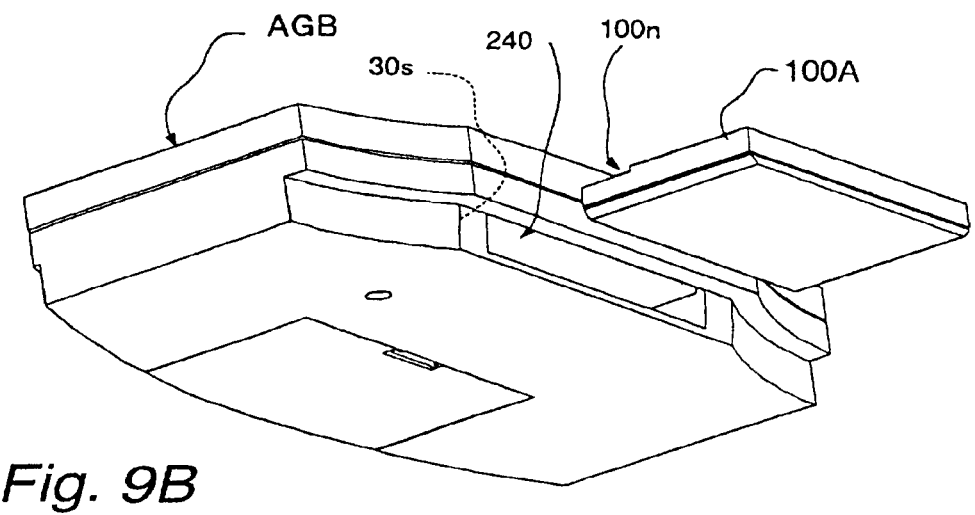
FIG. 9B is an angled, bottom-up, perspective view corresponding to FIG. 9A.
Figure 10A:
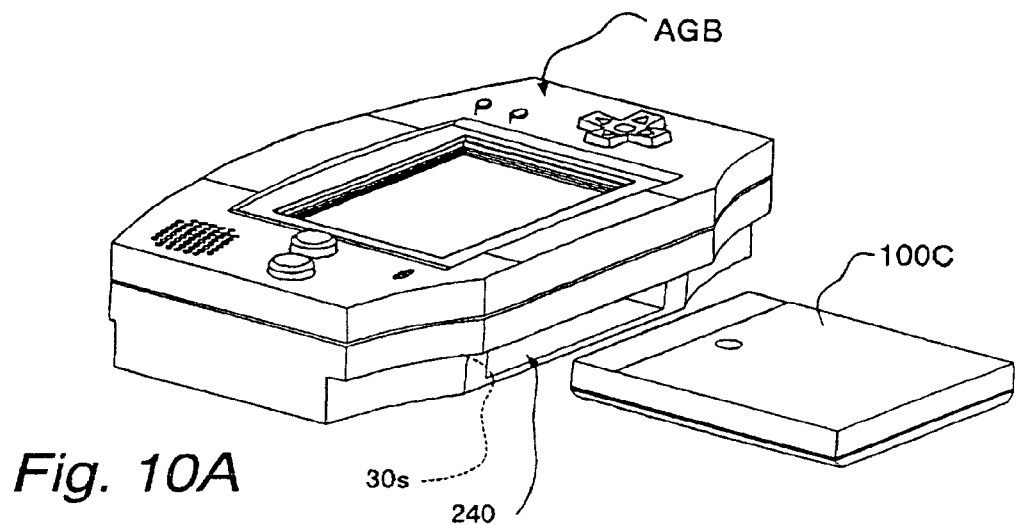
FIG. 10A is an angled, top-down, perspective diagram just prior to insertion of CGB cartridge 100C into cartridge slot 240 of the AGB.
Figure 10B:
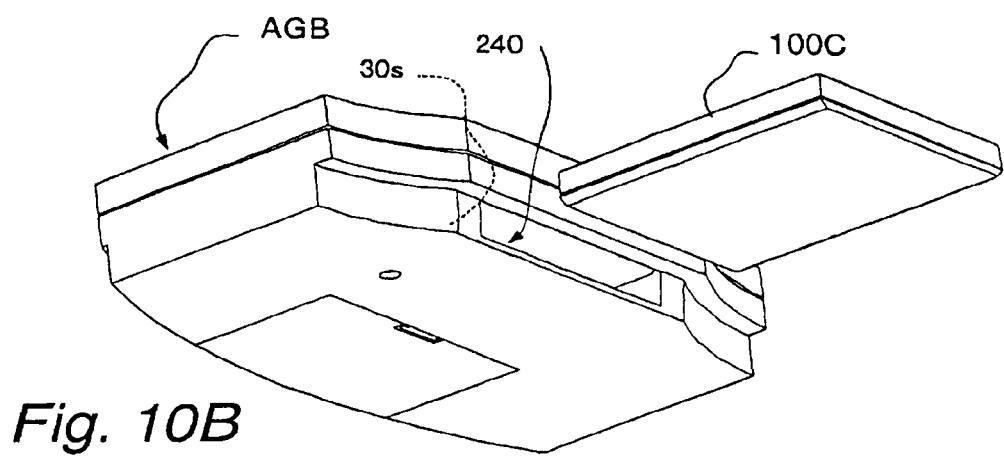
FIG. 10B is an angled, bottom-up perspective view corresponding to FIG. 10A.

FIGS. 8A-8C show, by way of comparison, an end face of AGB-dedicated cartridge 100A (FIG. 8A), an end face of CGB cartridge 100C (FIG. 8B), and the internal structure of cartridge slot 240 into which those end faces are inserted (FIG. 8C). FIGS. 9A and 9B schematically show an AGB-dedicated cartridge 100A just prior to its insertion into cartridge slot 240 of the AGB. More specifically, FIG. 9A is an angled, top-down, perspective diagram just prior to insertion of AGB-dedicated cartridge 100A into cartridge slot 240 of the AGB and FIG. 9B is an angled, bottom-up, perspective view corresponding to FIG. 9A. FIGS. 10A and 10B schematically show a CGB cartridge 100C just prior to its insertion into cartridge slot 240 of the AGB. More specifically, FIG. 10A is an angled, top-down, perspective diagram just prior to insertion of CGB cartridge 100C into cartridge slot 240 of the AGB and FIG. 10B is an angled, bottom-up perspective view corresponding to FIG. 10A.

In the example shown in FIGS. 7-10, a notch 100n is provided in AGB-dedicated cartridge 100A and no notch is provided in CGB cartridge 100C. Of course, the above concept is readily applied in situations in which the cartridges with which it is desired to maintain compatibility already have a notch into which a selector switch projecting into the interior of the cartridge slot may be received. In this case, no notch may be provided in cartridges dedicated to the new system. The normal position for selector 30s should be a position abutting the 5V output terminal. Thus, when a cartridge dedicated to the new system is inserted into cartridge slot, the selector 30s is then switched to select the 3.3V output terminal.

It is also possible to determine cartridge type in other manners. In the above-described examples, cartridge type is identified by whether the shape of the cartridge causes a mechanical engagement of selector 30s. However, cartridge type identification is not limited to mechanical engagement with a cartridge shape detection switch 30. For example, cartridge type identification may be carried using a photoelectric sensor system or a read switch system.

Figure 11A:
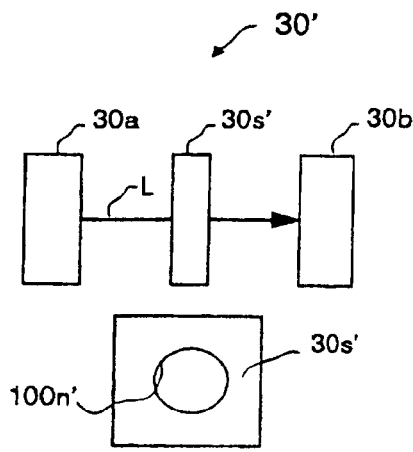
FIGS. 11A-11D are diagrams illustrating a cartridge type identification method using a photoelectric sensor.
Figure 11B:
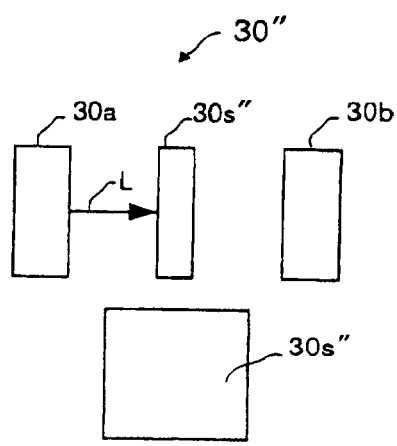

FIGS. 11A and 11B show one type of photoelectric sensor system. FIGS. 11A and 11B show a sensor system in which cartridge type is identified based on whether or not light L transmitted from a light-emitting unit is received by an optical sensor. The cartridge shape detection switches 30' and 30" of FIGS. 11A and 11B, respectively, each include a light-emitting unit 30a and an optical sensor 30b. In the case shown in FIG. 11A, a rib 30s' having an aperture 100n' is additionally included. While aperture 100n' is shown in FIG. 11A as being circular, other shapes may of course be utilized. In the case shown in FIG. 11B, on the other hand, a rib 30s''' having no aperture is provided. The cartridge inserted into cartridge slot 240 is provided with either a rib 30s' having an aperture or a rib 30s''' having no aperture. Light-emitting unit 30a and optical sensor 30b are located in cartridge slot 240. If a cartridge having a rib 30s' (with aperture) is inserted into cartridge slot 240, light emitted by light-emitting unit 30a will be sensed by optical sensor 30b. If a cartridge having a rib 30s''' (no aperture) is inserted into cartridge slot 240, light emitted by light-emitting unit 30a will not be sensed by optical sensor 30b. Thus, by determining whether the optical sensor senses light, cartridges of different types can be identified.

Figure 11C:
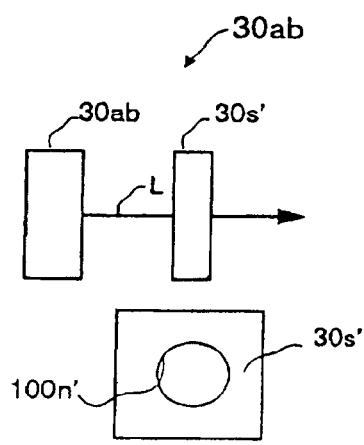
Figure 11D:
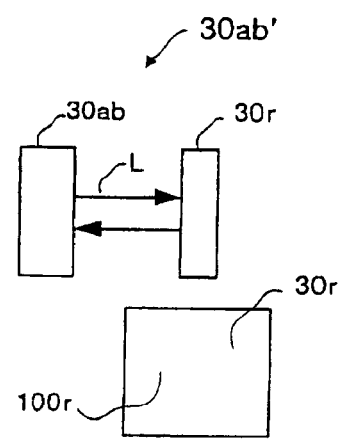

FIGS. 11C and 11D show another type of photoelectric sensor system. FIGS. 11C and 11D show a sensor system in which cartridge type is identified based on whether or not light L transmitted from a light emitting/receiving unit is reflected back to the unit. The cartridge shape detection switches 30ab and 30ab' of FIGS. 11C and 11D, respectively, each include a light emitting/receiving unit 30ab. In the case shown in FIG. 11C, a rib 30s' is provided, while in the case shown in FIG. 11D, a rib 30r is provided. Rib 30r is similar to rib 30s''' (see FIG. 11B) but also includes a reflector 100r for reflecting the light L. The cartridge inserted into cartridge slot 240 is provided with either a rib 30s' or a rib 30r. Light emitting/receiving unit 30ab is located in cartridge slot 240. If a cartridge having a rib 30s' (aperture) is inserted into cartridge slot 240, light emitted by light emitting/receiving unit 30*ab* will not be reflected back to the unit. If a cartridge a rib 30*r* (reflector) is inserted into cartridge slot 240, light emitted by light emitting/receiving unit 30*ab* will be reflected back to the unit. Thus, by determining whether light is received by the light emitting/receiving unit 30*ab*, cartridges of different types can be identified.

Cartridge type can also be identified using a read switch system. In this system, a magnetic substance is provided to one or the other of the AGB-dedicated cartridge 100A and the CGB cartridge 100C. The magnetic substance drives a selector (30*s*) of cartridge shape detection switch 30 located in cartridge slot 240 to one or the other a 3.3V or 5V voltage output terminal.

The operation of the example AGB will now be described with reference to FIGS. 12-19. FIGS. 12A and 12B respectively illustrate the detailed structures of the CGB cartridge 100C and the AGB-dedicated cartridge 100A shown in FIG. 6. As shown in FIG. 12A, CGB cartridge 100C includes ROM 11C (the 5V interface memory). ROM 11C includes a general-purpose memory storing an 8-bit program for the CGB as described above, and has an 8-bit bus memory space. CGB ROM 11C is supplied with a /CS (chip select) signal, a /WR (write) signal, an /RD (read) signal, and is connected to an 8-bit bus (5V interface). As shown in FIG. 11B, in AGB-dedicated cartridge 100A, the 3.3V interface memory 11 includes an AGB ROM 11A having a multiplex bus memory space and an AGB RAM 11B having an 8-bit bus memory space. AGB ROM 11A is supplied with an /RD signal, a /WR signal and a /CS signal and is connected to a switch multiplex/8-bit bus (3.3V interface). AGB RAM 11B is supplied with the /RD signal, the /WR signal and a /CS2 signal and is connected to the switch multiplex/8-bit bus.

FIG. 13 is a block diagram showing parts relevant to bus control in 8-bit circuit 23C and 32-bit circuit 23A. In 32-bit circuit 23A, multiplex/8-bit bus controller 23A_4 includes a multiplex bus controller 23A_4*a* for AGB ROM 11A and an 8-bit bus controller 23A_4*b* for AGB RAM 11B. AGB CPU core 23A_2 outputs an address to multiplex/8-bit bus controller 23A_4. In response thereto, multiplex/8-bit bus controller 23A_4 returns the data corresponding to the address to AGB CPU core 23A_2. In 8-bit circuit 23C, CGB CPU core 23C_2 outputs an address to 8-bit bus controller 23C_3 for CGB ROM 11C. In response thereto, 8-bit bus controller 23C_3 returns the data corresponding to the address to CGB CPU core 23C_2.

FIG. 14 shows a cartridge interface of the example AGB. In FIG. 14, the column designated as "NO" corresponds to a pin number in connector 24 of the AGB. The column designated as "CGB" indicates input/output data when a CGB cartridge 100C is inserted into cartridge slot 240. The column designated "AGB ROM" indicates input/output data when an AGB-dedicated cartridge 100A is inserted into cartridge slot 240 and the AGB ROM is accessed. The column designated "AGB RAM" indicates input/output data when an AGB-dedicated cartridge 100A is inserted into cartridge slot 240 and the AGB RAM is accessed. The column designated "Remarks" provides details about the input/output corresponding to the pin number.

As is apparent from the drawing, in order to carry out the 8-bit program utilizing the sixteen address lines of pin numbers 6 to 21 (A0 to A15) if a CGB cartridge 100C is connected, the 8-bit circuit 23C requests the ROM to output 8-bit data through pin numbers 22 to 29 (D0 to D7). On the other hand, in order to carry out the 32-bit program utilizing the twenty-four address lines of pin numbers 6 to 29 (A0 to A23) if an AGB-dedicated cartridge is connected and the AGB ROM is accessed, the 32-bit circuit 23A requests the ROM to output 16-bit data through the pin numbers 6 to 21 (D0 to D15). In this case, for the pin numbers 6 to 21, address input and data output are carried out in a time-division manner, or in a time-sharing manner. Such an operation mode is referred to as a multiplex mode. Although a data bus for 32-bit circuit 23A is 32-bits wide, an external bus is 16-bits wide. Thus, for example, when 32-bit data is to be transmitted, the data is transmitted in two 16-bit units. If an AGB-dedicated cartridge 100A is connected and the AGB RAM is accessed, the pins in the cartridge interface are allocated similarly to the case in which a CGB cartridge 100C is connected.

Figure 15:
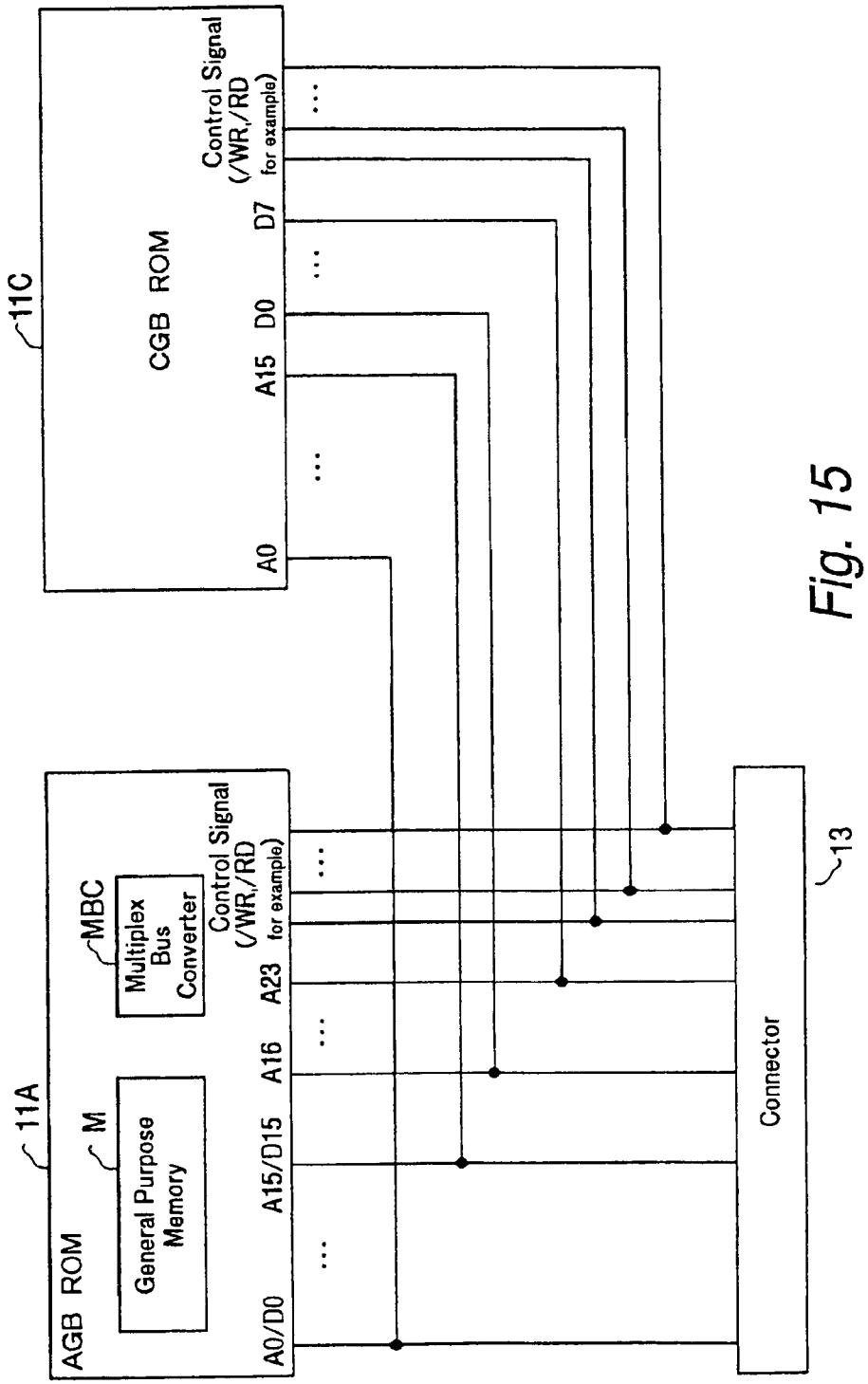
FIG. 15 is a diagram showing the connecting relationship among a connector, AGB ROM, and CGB ROM relevant to the AGB cartridge interface shown in FIG. 14.

FIG. 15 shows the connecting relationship among connector 13, AGB ROM 11A, and CGB ROM 11C described with reference to FIG. 14.

Figure 16A:
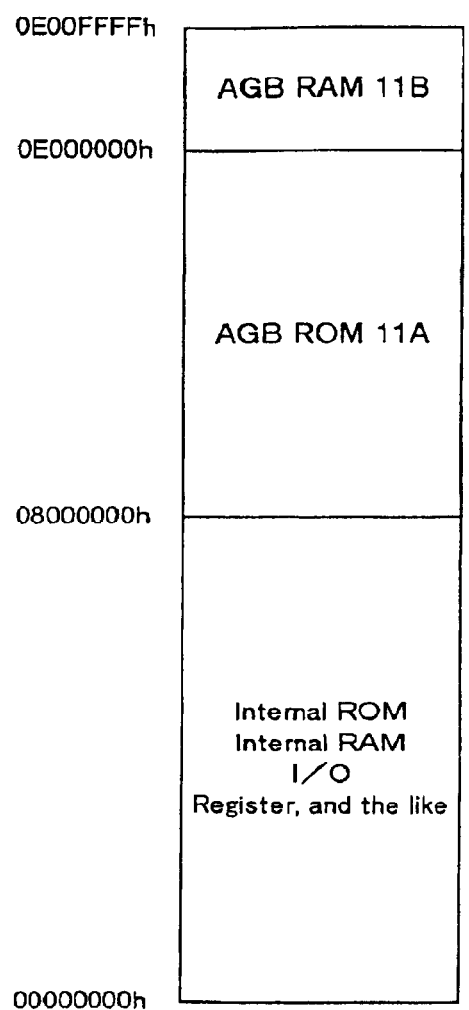
FIGS. 16A and 16B are memory maps for the AGB-dedicated cartridge.
Figure 16C:
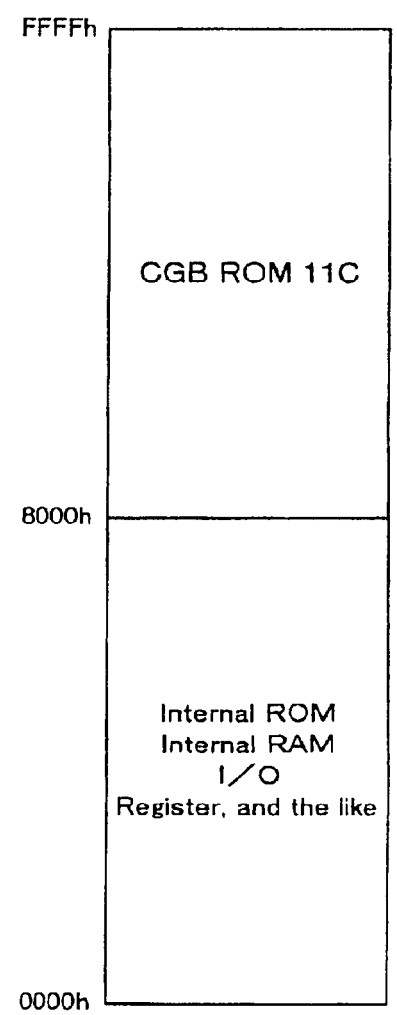
FIG. 16C is a memory map for the CGB cartridge.
Figure 16B:
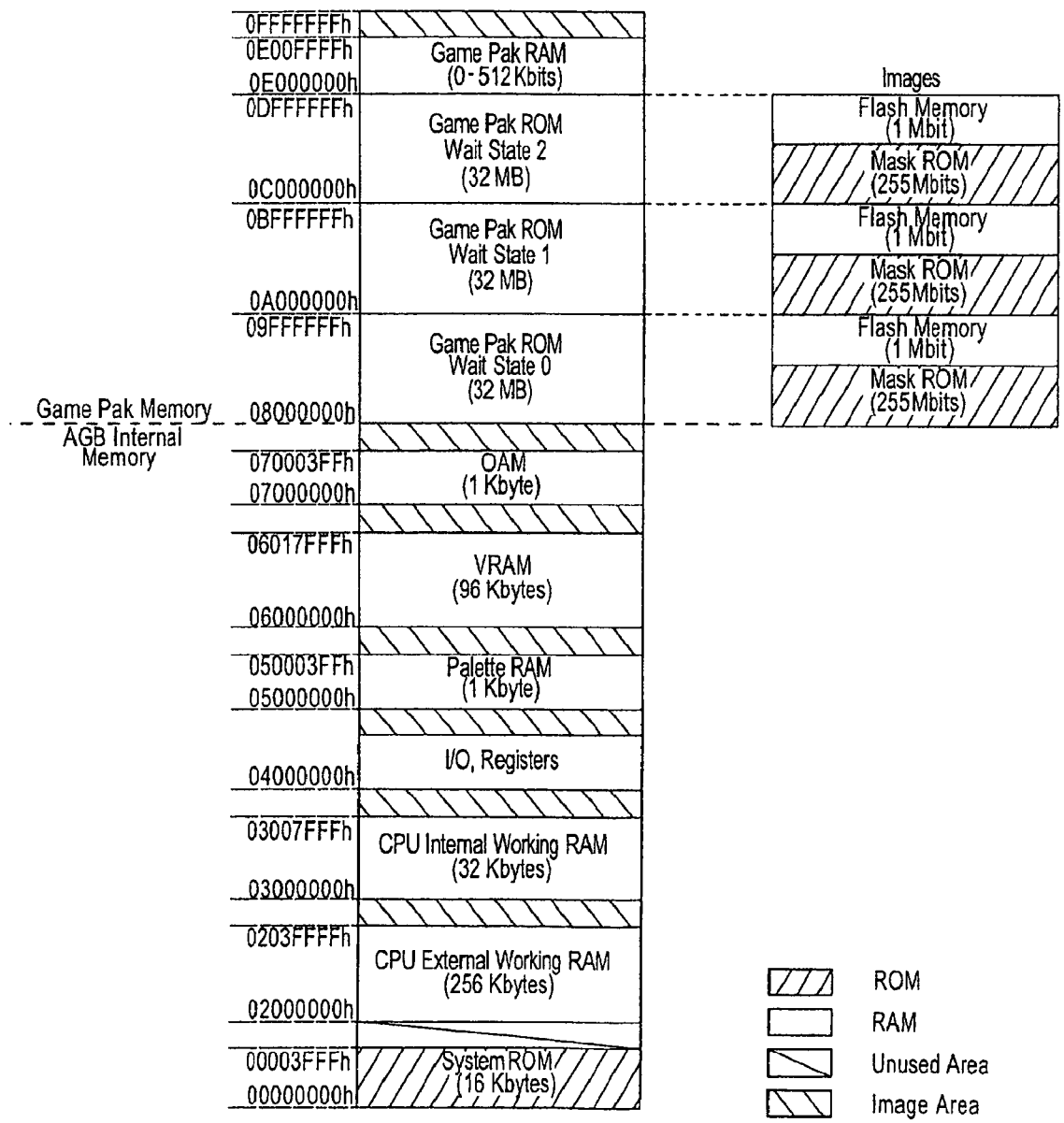

FIGS. 16A and 16B are memory maps for the AGB. FIG. 166A is a memory map of the example AGB when an AGB-dedicated cartridge 100A is connected thereto. The addresses from 00000000h to 07FFFFFFh are a memory space for internal ROM, internal RAM, I/O, registers, and the like; the addresses from 0800000h to 0DFFFFFF are a memory space for AGB ROM 11A; and the addresses from 0E000000h to 0E00FFFFh are a memory space for AGB RAM 11B. FIG. 16B is a more detailed memory map of the example AGB when an AGB-dedicated cartridge 100A is connected thereto. In broad terms, the memory space from 00000000h to 07FFFFFFh is allocated as AGB internal memory and the memory space from 08000000h to 0EFFFFFFh is allocated as game cartridge memory. The 16 Kbytes from 00000000h is the system ROM. The 256 Kbytes from 02000000h is CPU External Working RAM. The specifications of the CPU External Working RAM are 2 Wait 16 bit bus. The 32 Kbytes from 03000000h is CPU Internal Working RAM used to store programs and data. The space beginning at 04000000h is used for I/O and for various registers. The 1 Kbyte from 05000000h is palette RAM used to assign palette colors. The 96 Kbytes from 06000000h is VRAM used for BG and OBJ data. The 1 Kbyte from 07000000h is object attribute memory (OAM) that holds the objects to be displayed and their attributes.

The game cartridge memory includes game cartridge ROM 11A and game cartridge RAM 11B. Three 32 MB game cartridge ROM spaces are allocated to the area beginning from 08000000h. The access speed of each of these spaces can be set separately. Thus, these spaces are designated as "Wait State 0", "Wait State 1" and "Wait State 2". This memory specification enables memory of varying access speeds in the game cartridge ROM to be accessed optimally. The base addresses of the three spaces are 08000000h for "Wait State 0"; 0A000000h for "Wait State 1"; and 0C000000h for "Wait State 2". The upper 1 Mbit of each of these spaces is allocated as flash memory used primarily for saving data. The space beginning at 0E000000h is game cartridge RAM 11B (SRAM or Flash memory) storing up to 512 Kbits of data.

When 32-bit circuit 23A designates the memory space of 08000000h to 0E00000h reserved for AGB ROM 11A, memory transfer is made in the multiplex bus mode, and when 32-bit circuit 23A designates the memory space of 0E000000h to 0E00FFFFh reserved for AGB RAM 11B, memory transfer is made in a normal bus mode.

Although the 32 MB game cartridge memory space is mapped to the area from 08000000h onward, the 32 MB spaces beginning from 0A000000h and 0C000000h are images of the 32 MB space that starts at 08000000h. These images enable memory to be used according to the access speed of the game cartridge memory (1-4 wait cycles).

Figure 17:
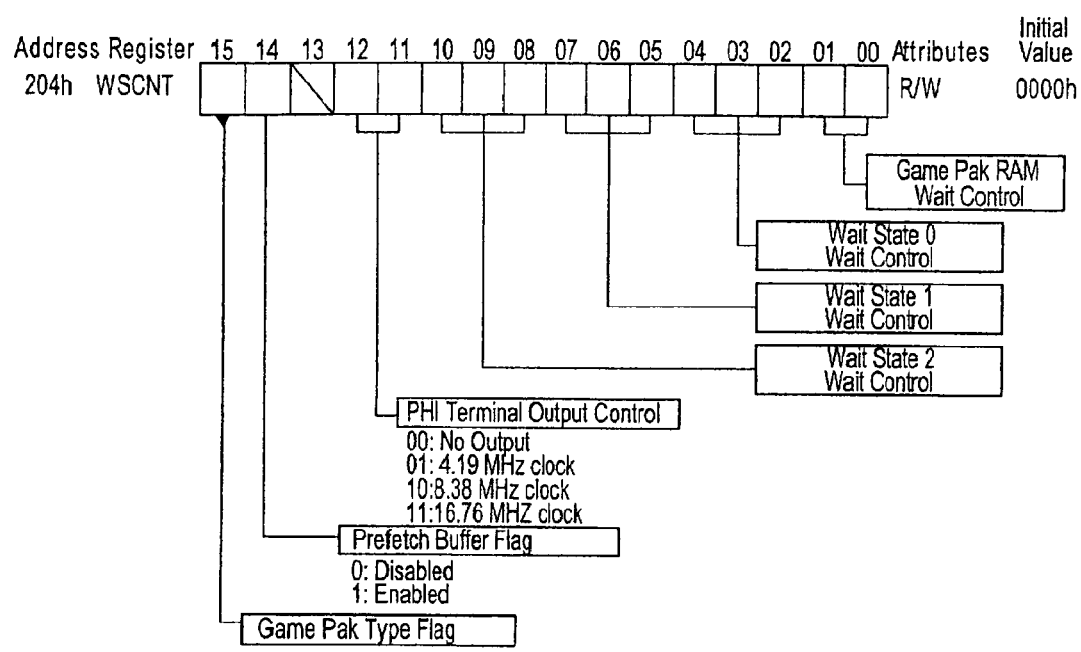
FIG. 17 depicts the WSCNT register.

FIG. 17 shows an example Wait State Control register WSCNT. The register WSCNT and the other registers described herein are provided by way of illustration, not limitation. It will be recognized that various arrangements of, for example, hardware and software registers, hardware and software switches, and data tables may be used to implement the controls described herein. FIGS. 131A-131G provide a listing of all AGB registers and identify the various application figures that illustrate the registers in greater detail. FIGS. 133A-133F are symbols used to represent the attributes of bits used in bit operations.

WSCNT [d15] (Game Cartridge Type Flag) is used by the system ROM.

WSCNT [d14] (Pre-fetch Buffer Flag)—when the pre-fetch buffer flag is enabled (set to 1) and there is some free space, the pre-fetch buffer takes control of the game cartridge bus when the CPU is not using it, and repeatedly reads game cartridge ROM data. When the CPU tries to read instructions from the game cartridge and it hits the pre-fetch buffer, the fetch is completed with no wait with respect to the CPU. If there is no hit, the fetch is done from the game cartridge ROM and there is a wait based on the set wait state. If the pre-fetch buffer flag is disabled (set to 0), the fetch is done from the game cartridge ROM. There is a wait with respect to the CPU based on the wait state associated with the fetch instruction to the game cartridge ROM.

WSCNT [d12-11] (PHI Terminal Output Control) controls the output from the PHI terminal (see FIG. 14). In the example AGB, this is set to 00 (No Output).

WSCNT [d10-08], [d07-05], [d04-02] (Wait State Wait Control) sets the individual wait cycles for each of the three areas (Wait States 0-2) that occur in game cartridge ROM. The relation between the wait control settings and wait cycles is shown in Table III:

TABLE III

| Wait Control Value | Wait Cycles | | | |
|---|---|---|---|---|
| | 1$^{st}$ Access | 2$^{nd}$ Access | | |
| | | Wait State 0 | Wait State 1 | Wait State 2 |
| 000 | 4 | 2 | 4 | 8 |
| 001 | 3 | 2 | 4 | 8 |
| 010 | 2 | 2 | 4 | 8 |
| 011 | 8 | 2 | 4 | 8 |
| 100 | 4 | 1 | 1 | 1 |
| 101 | 3 | 1 | 1 | 1 |
| 110 | 2 | 1 | 1 | 1 |
| 111 | 8 | 1 | 1 | 1 |

In the example AGB, the wait control value is set to 101 (1$^{st}$ access/3 Wait and 2$^{nd}$ access/1 Wait).

WSCNT [d01-00] (Game Cartridge RAM Wait Control) sets the wait cycles for the game cartridge RAM. The relation between the wait control settings and wait cycles is shown in Table IV:

TABLE IV

| Wait Control Value | Wait Cycles |
|---|---|
| 00 | 4 |
| 01 | 3 |
| 10 | 2 |
| 11 | 8 |

FIG. 16C is a memory map of the AGB when a CGB cartridge 100C is connected thereto. The memory space from 0000h to 07FFh is reserved for internal ROM, internal RAM, I/O, registers, and the like and memory space from 8000h to FFFFh is for CGB ROM 11C.

Figure 18A:
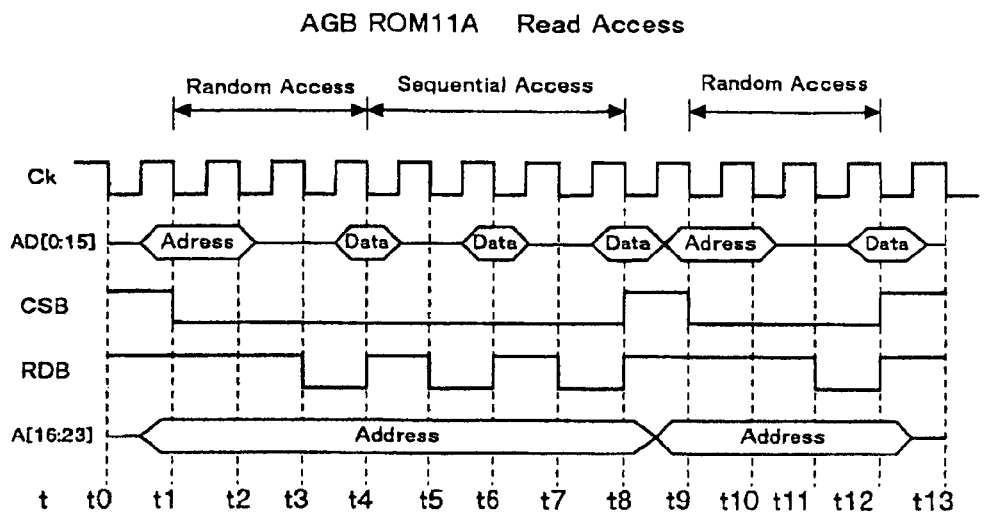
FIGS. 18A-18E are timing charts for read and write accesses of the AGB-dedicated cartridge.

The read/write access operations in the AGB ROM 11A, AGB RAM 11B, and CGB ROM 11C will now be described with reference to the timing charts of FIGS. 18A-18F. FIG. 18A is a timing chart for the read access of AGB ROM 11A. In FIG. 18A, Ck is the system clock waveform; AD[0:15] is the multiplex of address and data for AO/DO to A15/D15 (pin numbers 6 to 21 shown in FIG. 14); CSB is the chip select bar (/CS) for pin number 5 shown in FIG. 14; RDB is the read bar (/RD) for pin number 4 shown in FIG. 14; A[16:23] is an address output of address A16 to A23 for pin numbers 22 to 29 shown in FIG. 14; and t0 to t13 indicate respective times synchronized with a falling edge of the system clock Ck.

In FIG. 18A, AGB ROM 11A is subjected to random-access control during times t1 to t4, to sequential-access control during times t5 to t8, and to random-access control again during times t9 to t12. During times t1 to t8, CSB is set low. RDB is set low intermittently, i.e., during times t3 to t4, times t5 to t6, and times t7 to t8. Under such conditions, a read address is first outputted to AD[0:15] from slightly before t1 until slightly after t2, and then data is sequentially accessed from slightly before t4 until slightly before t9 so that the data is sequentially read over three blocks. After the time slightly before time t9, random-access control is initiated.

Sequential access occurs when addresses are sequentially read for memory contents. Thus, when the addresses are sequential, the CPU has no need to output any address, and the memory addresses can be counted up using only a control signal (RDB). That is, data can be read faster because no time is taken for outputting addresses. Alternatively, program data may be sequentially read in advance so as to smoothly activate the program.

Random access occurs when addresses are non-sequentially read for memory contents. Thus, an address must be input every time memory is read, and reading data therefore takes time. As such, in AGB ROM 11A, random access control and sequential control are both applied.

A multiplexed bus reduces the number of pins needed for an interface bus because one or more pins are used for both addresses and data. Therefore, data output cannot be done without address input, and consequently access speed takes longer than a normal bus. This problem can be addressed if the above-described sequential-access control is applied. To carry out sequential-access control, however, the memory side must be provided with a special circuit (address counter) to be described below.

Figure 18D:
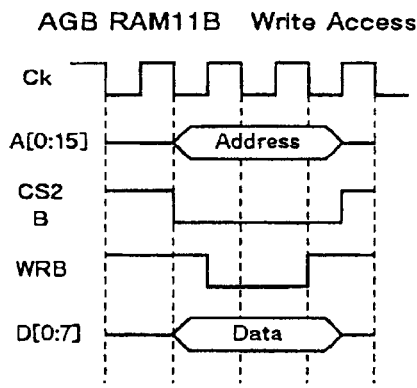
Figure 18E:
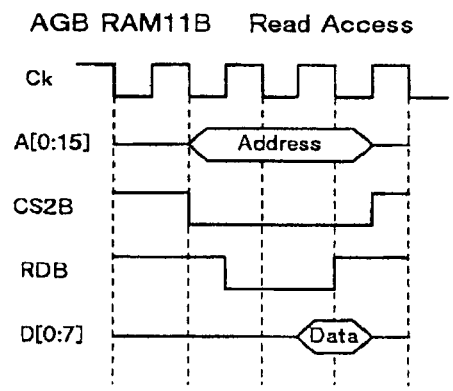
Figure 18F:
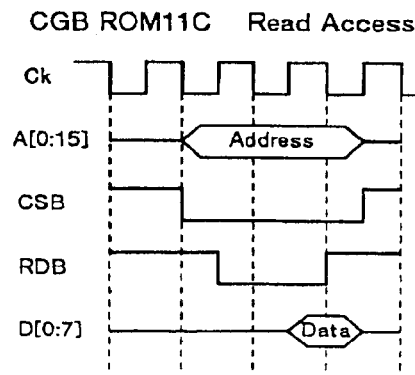
FIG. 18F is a timing chart for the read access of the CGB cartridge.
Figure 18B:
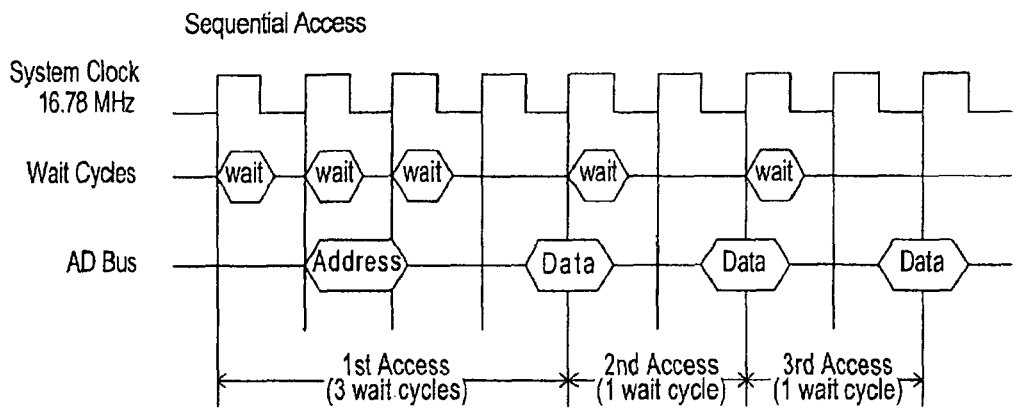
Figure 18C:
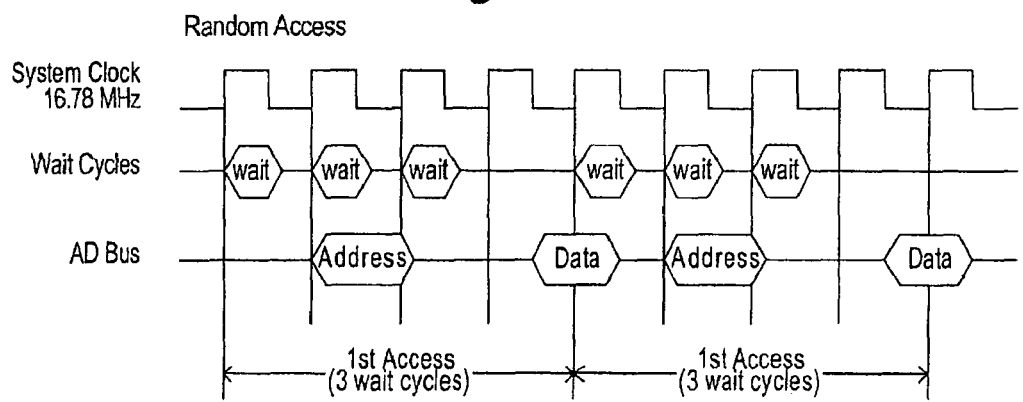

FIGS. 18B and 18C are timing charts illustrating in more detail sequential and random game cartridge ROM access, respectively, with 3 wait cycles on the first access and 1 wait cycle on the second access.

FIG. 18D shows a timing chart for the write access of AGB RAM 11B; FIG. 18E shows a timing chart for the read access of AGB RAM 11B; and FIG. 18F shows a timing chart for the read access of CGB ROM 11C. The reference characters in FIGS. 18D-18F are the same as those used in the description for FIG. 18A.

A multiplex conversion circuit including an address counter to enable sequential access will be described with reference to FIG. 19. In a multiplex bus converter MBC, A[23:16] input into an address counter AC refers to A23 to A16 (the upper address of the CPU), and AD[15:0] refers to A15 to A0 and data D15 to D0 (the lower address of the CPU). In the address counter AC, a chip select signal (/CS) is supplied to a LOAD input, and a read signal (/RD) is supplied to a CLOCK input. Based on these four inputs, address counter AC outputs a memory address bus signal MA [23:0]. A memory data bus MD[15:0] is connected to AD[15:0], and then the data D15 to D0 is returned in response to the memory address bus signal.

Figure 19:
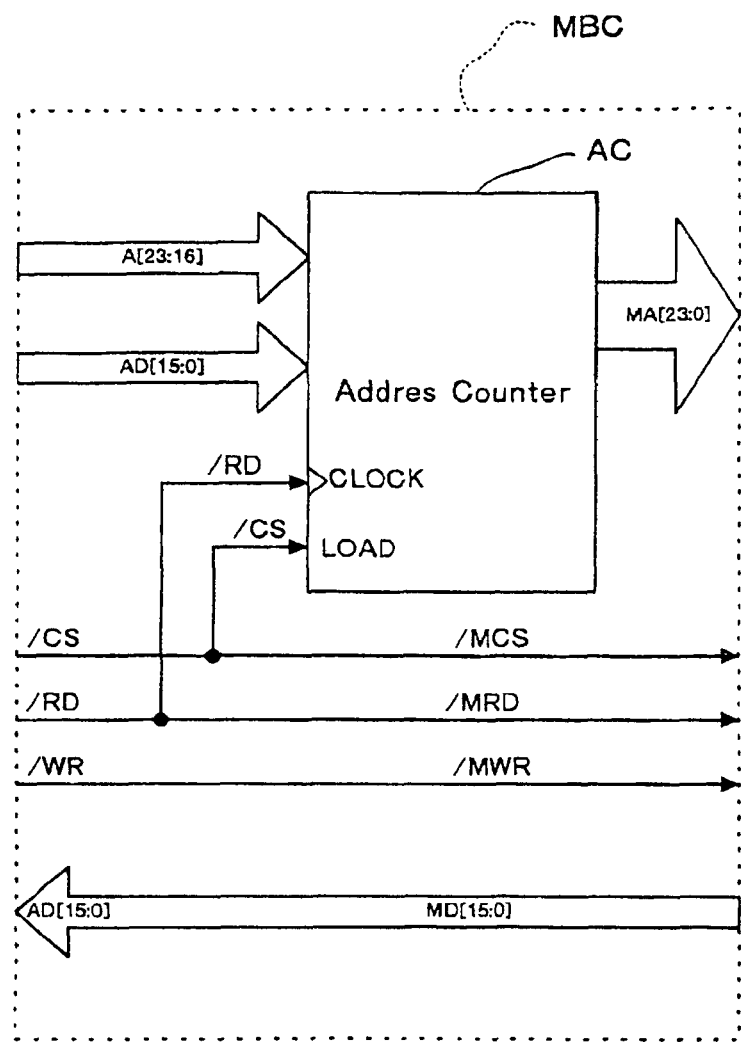
FIG. 19 is a block diagram of a multiplex conversion circuit.

In a multiplex bus converter MBC structured as in FIG. 19, address counter AC is a 24-bit counter, the A[23:16] signal and the AD[15:0] signal are both loaded when /CS falls, and the memory address bus signal MA [23:0] is generated. The /RD signal is supplied to the address counter AC as a count-up signal. As a result, sequential access control can be realized. Here, data output from the memory is controlled by the /CS signal and the /RD signal.

Figure 20:
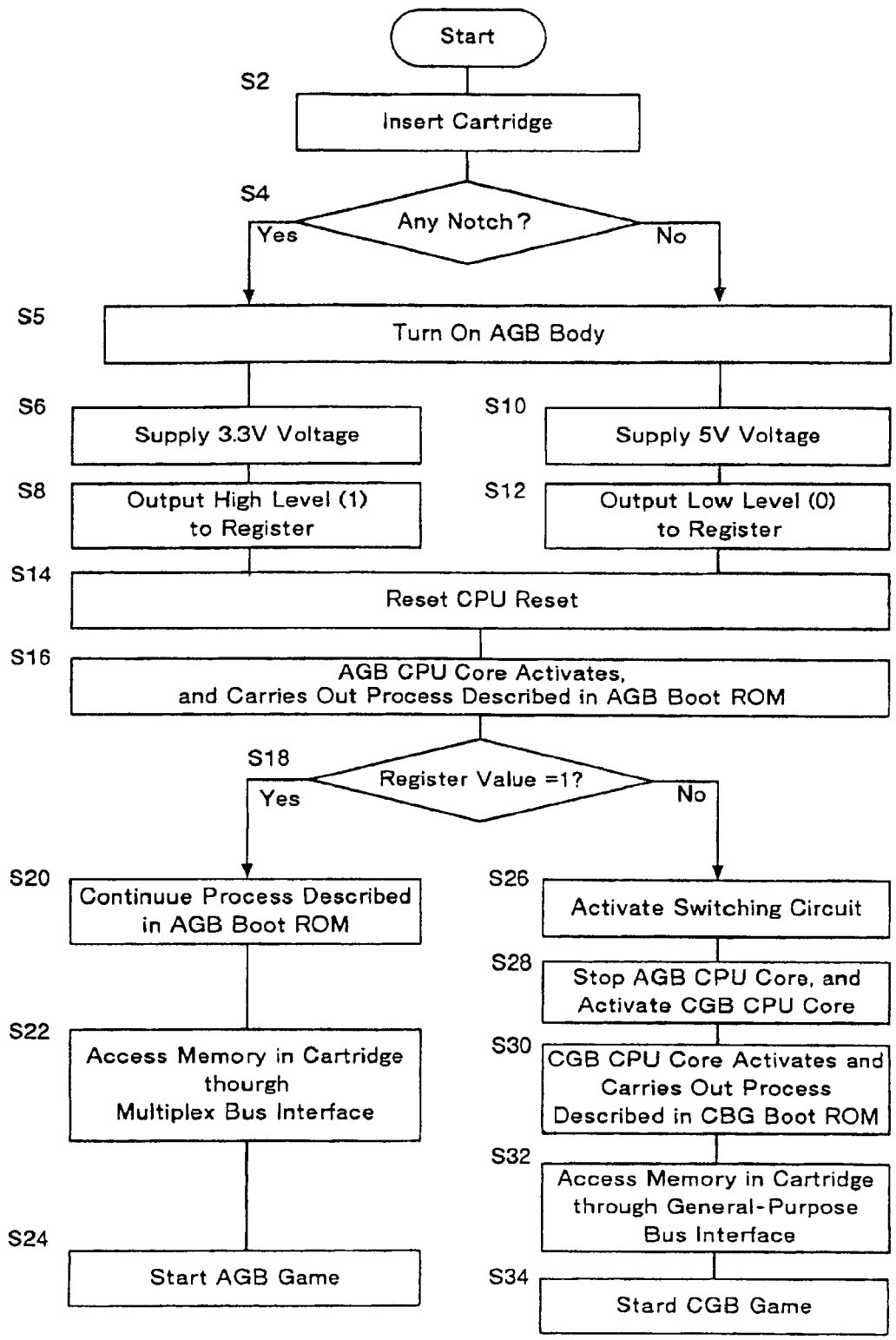
FIG. 20 is a flowchart of the operation of the example AGB.

The operation of the example AGB will be described with reference to FIG. 20. At step S2, a cartridge is inserted into cartridge slot 240 of the AGB. At step S4, cartridge shape detection switch 30 determines, based on the state of selector 30s, whether the inserted cartridge is an AGB-dedicated cartridge 100A or a CGB cartridge 100C. More specifically, when the cartridge is an AGB-dedicated cartridge 100A, selector 30s remains OFF (normal position), and is connected to the 3.3V output terminal in DC-DC converter 25c. When the cartridge is a CGB cartridge 100C, on the other hand, selector 30s moves from the normal position (OFF), and is connected to the 5V output terminal (ON). When the cartridge is completely inserted into cartridge slot 240, a user turns ON power-supply switch 25b of the AGB (S5). If selector 30s is OFF in step S4, the operation proceeds to step S6. At step S6, DC-DC converter 25c supplies, via cartridge shape detection switch 30, a DC voltage of 3.3V to the cartridge, to I/O buffer controller 230a in CPU 230 and to voltage detection IC 25d. At step S8, voltage detection IC 25d detects the voltage of 3.3V supplied via cartridge shape detection switch 30, and then outputs to register 23A_3 a high-level (level 1) signal to indicate that an AGB-dedicated cartridge 100A is inserted into cartridge slot 240. Then, the operation proceeds to step S14.

If cartridge shape detection switch 30 is ON when the cartridge is completely inserted into cartridge slot 240, the operation proceeds from step S5 to step S10. At step S10, the cartridge is already inserted into cartridge slot 240. Thus, DC-DC converter 25c supplies, via cartridge shape detection switch 30, a DC voltage of 5V to the cartridge, to I/O buffer controller 230a in CPU 230, and to voltage detection IC 25d. At step S12, voltage detection IC 25d detects the DC voltage of 5V supplied via cartridge shape detection switch 30, and then outputs to register 23A_3 a low-level (level 0) signal to indicate that a CGB cartridge 100C is engaged. Then, the operation proceeds to step S14.

At step S14, in response to voltage input (3.3V) from DC-DC converter 25c, reset circuit 50 clears the reset of CPU 230. The operation proceeds to step S16 at which AGB CPU core 23A_2 in CPU 230 is activated and the boot code in AGB boot ROM 23_1 is started. The operation proceeds to step S18 where AGB CPU core 23A_2 reads register 23A_3 to determine whether the value written therein is 1 or 0. If the value is 1 (i.e., an AGB-dedicated cartridge 100A is inserted in cartridge slot 240), the operation proceeds to step S20. At step S20, the processing of the boot code in AGB boot ROM 23A_1 continues. Then, the operation proceeds to step S22 where AGB-dedicated cartridge 100A is accessed using the multiplex bus interface. At step S24, based on the data read out at step S22, a 32-bit game stored in AGB-dedicated cartridge 100A is started.

If at step S18, the value in register 23A_3 is 0 (i.e., a CGB cartridge 100C is inserted in cartridge slot 240), the operation proceeds to step S26 where switching circuit 230s is activated. The operation then proceeds to step S28 where, in accordance with switching circuit 230s, AGB CPU core 23A_2 is stopped and CGB CPU core 23C_2 is activated. The operation then proceeds to step S30 where CGB CPU core 23C_2 executes the processing described in CGB boot ROM 23C_1. The operation then proceeds to step S32 where the memory in CGB cartridge 100C is accessed through a general-purpose bus interface. Memory access by the general-purpose interface is described above with reference to FIGS. 14 and 15. The operation then proceeds to step S34 where, based on the data read out from CGB cartridge 100C in step S32, an 8-bit game stored in CGB cartridge 100C is started.

In the example embodiment, as already described, the cartridge type inserted into cartridge slot 240 is identified for switching between a bus mode for AGB ROM 11A and for CGB ROM 11C. In an alternative embodiment, the bus mode may be switched depending on a value of the reading address from the CPU.

In the above-described flowchart, the operations in steps S2 to S14 are executed by providing notch 100n for an AGB-dedicated cartridge 100A, and by placing selector 30s of cartridge shape detection switch 30 in such manner as to be accommodated in notch 100n, and as to be connected, as the normal position, to the 3.3V output terminal of DC-DC converter 25c. Then, the steps S16 to S34 are carried out by components provided in CPU 230. The output from voltage detection IC 25d in steps S8 and S12 determines which results follow after the processing at step S12. Thus, it is determined, based on the presence or absence of notch 100n in the cartridge, whether the multiplex bus interface is used for access at step S22 or the general-purpose bus interface is used for access at step S32. Thus, notch 100n provided in the cartridge functions as a bus mode selector.

Figure 21A:
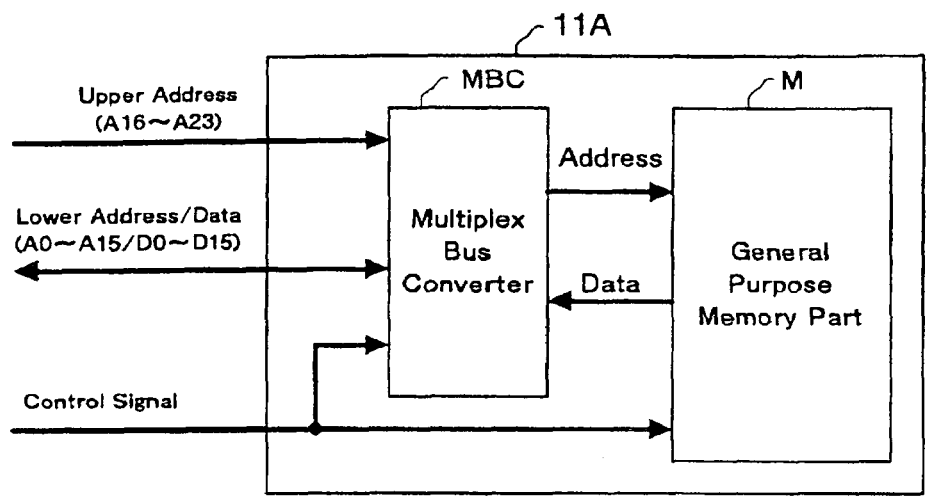
FIGS. 21A and 21B are block diagrams showing the structure of the AGB ROM.

The structure of the AGB ROM 11A will now be described with reference to FIGS. 21A and 21B. FIG. 21A shows an example one-chip structure as custom ROM. In FIG. 21A, AGB ROM 11A is composed of the multiplex bus converter MBC and general-purpose memory M on one chip. The upper addresses A16 to A23 shown in FIG. 14 are inputted to multiplex bus converter MBC. In addition, along with input of the lower addresses A0 to A15, output of the data D0 to D15 is multiplexed and then executed. Multiplex bus converter MBC outputs an address to the general-purpose memory M, while the general-purpose memory M outputs data to the multiplex bus converter MBC. Multiplex bus converter MBC and general-purpose memory M both receive a control signal, and thus are controlled in operation.

Figure 21B:
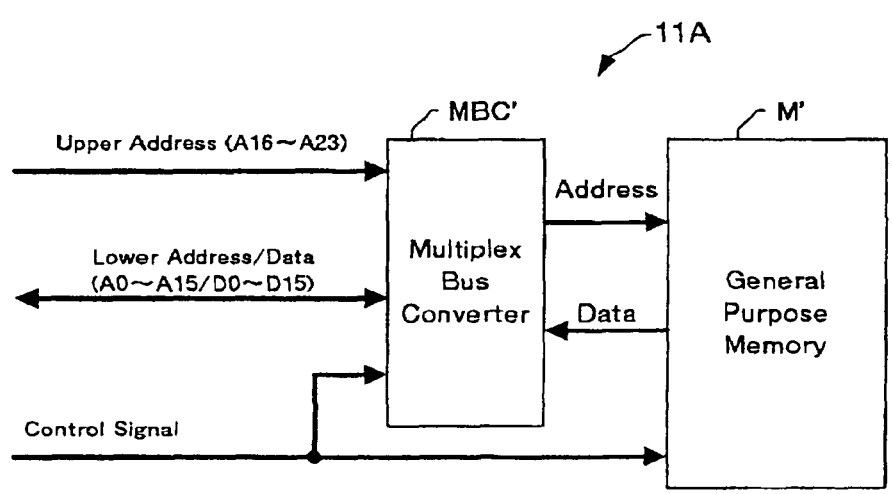

FIG. 21B shows AGB ROM 11A, unlike the custom ROM whose components are placed on a single chip as shown in FIG. 21A, having a multiplex bus converter MBC' and a general-purpose memory M' individually wired as discrete chips. Such structure is more easily manufactured than the one chip structure shown in FIG. 21A. In examples shown in FIGS. 21A and 21B, AGB ROM 11A is composed of a write-once mask ROM, but of course, may be composed of a write-many flash ROM, or the like.

Other examples of the cartridge type identification mechanisms will now be described with reference to FIGS. 22-25.

Figure 22:
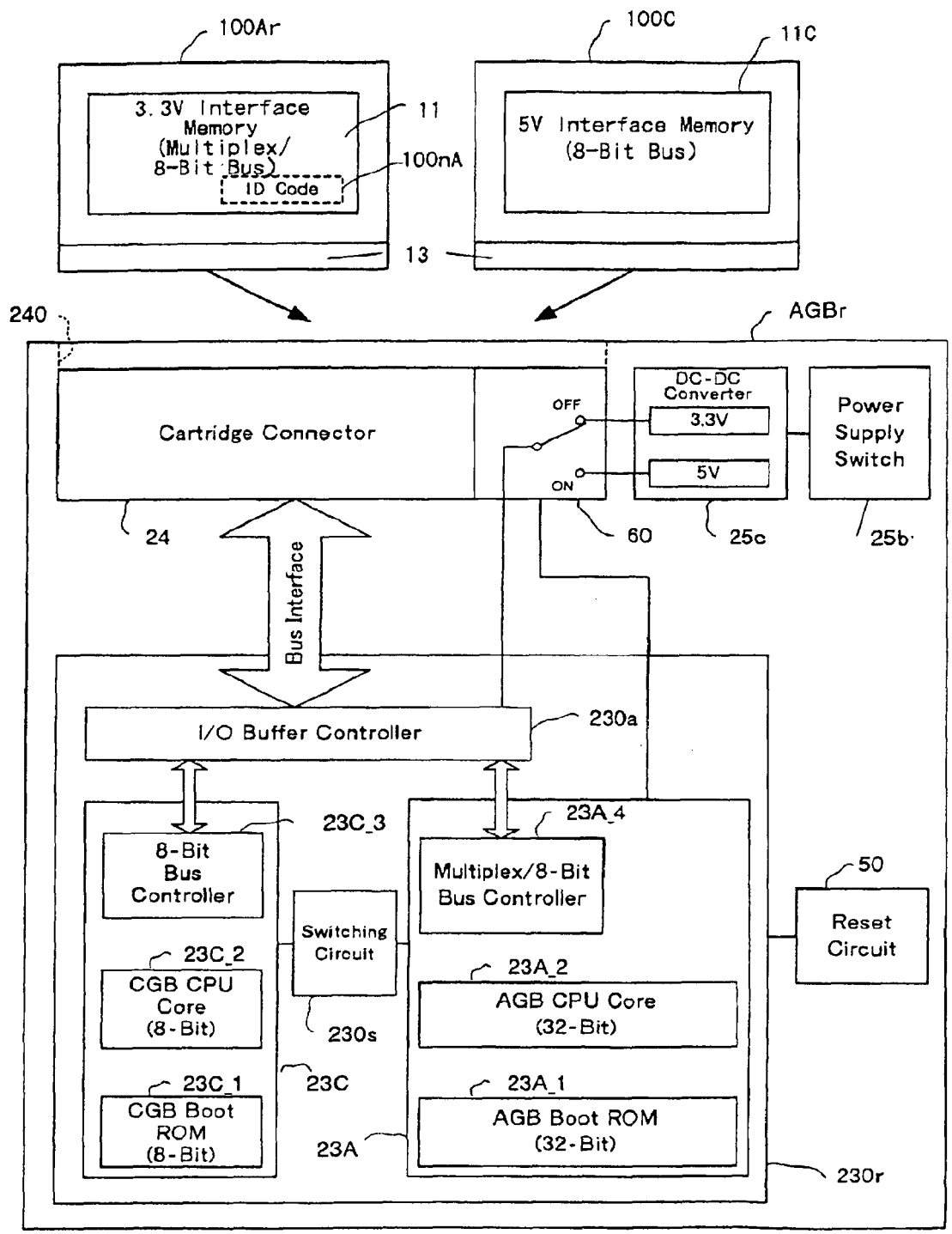
FIG. 22 is a block diagram of an example AGBr in which cartridge type identification processing is based on an identification code.
Figure 23:
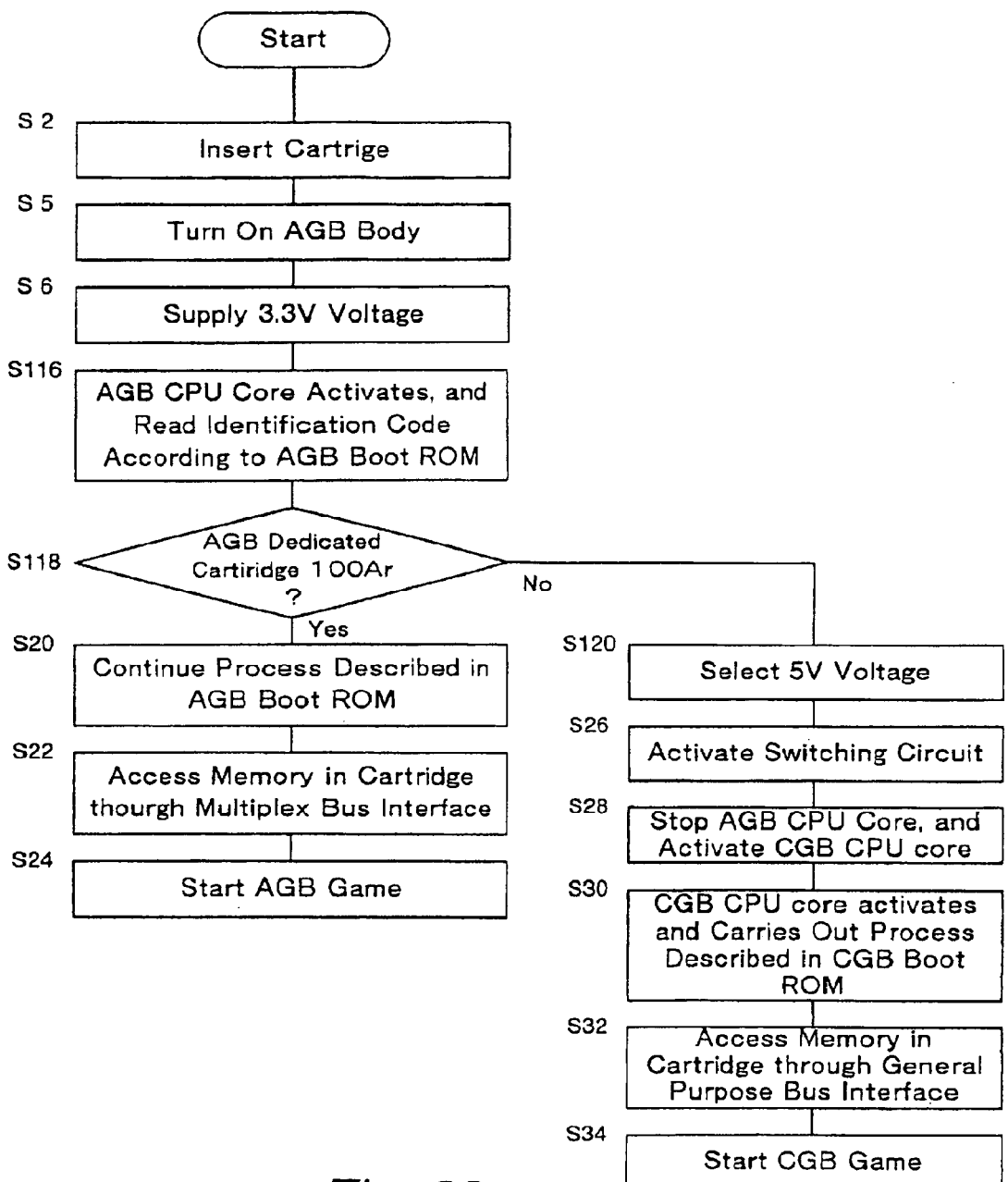
FIG. 23 is a flowchart of the operation of the example AGBr shown in FIG. 22.

An example of discriminating between an AGB-dedicated cartridge 100A and a CGB cartridge 100C using an identification code will now be described with reference to FIGS. 22 and 23. In particular, an identification code corresponding to the cartridge type is stored in a storage device provided in the cartridge and the identification code is read when power is turned on. FIG. 22 is a block diagram showing main parts relevant to identifying the cartridge type using an identification code. An example portable game system AGBr in this embodiment is provided with a voltage selector 60 instead of a cartridge shape detection switch 30 as in the example AGB shown in FIG. 6. An AGB-dedicated cartridge 100Ar is used with the AGBr. The AGBr does not include the voltage detector 26d or the register 23A_3 provided in the AGB. Voltage selector 60 is connected to 32-bit circuit 23A, and is controlled by a control signal outputted therefrom.

AGB-dedicated cartridge 100Ar includes an identification code region 100nA provided in the 3.3V interface memory 11. Region 100 nA stores an identification code representing the cartridge type. Like cartridge shape detection switch 30 in the AGB, voltage selector 60 is a switch for selecting an output from DC-DC converter 25c. However, voltage selector 60 operates electronically rather than mechanically. Because of this difference, AGB-dedicated cartridge 100Ar does not require and does not include the voltage detector 26d or the register 23A_3 that are included in AGB-dedicated cartridge 100A. For the purpose of discriminating from the CPU 230 shown in FIG. 6, the CPU in FIG. 22 is designated as CPU 230r.

The operation for identifying cartridge type using the identification code in the AGBr will now be described. When the AGBr is turned on, a voltage of 3.3V is supplied to the cartridge. Then, AGB CPU core 23A_2 is activated. AGB CPU core 23A_2 is operable to attempt to read an identification code from a specific region in memory provided in the cartridge inserted into cartridge slot 240. If the code is read successfully read and if the code identifies an AGB-dedicated cartridge 100Ar, AGB CPU core 23A_2 keeps working. If identification code does not identify an AGB-dedicated cartridge 100Ar, or if the attempt to read the identification code fails, AGB CPU core 23A_2 identifies the inserted cartridge as a CGB cartridge 100. In this case, 32-bit circuit 32A controls voltage selector 60 to select 5V. AGB CPU core 23A_2 then starts switching circuit 230s. Switching circuit 230s stops AGB CPU core 23A2, and starts CGB CPU core 23C_2.

The operation of the example AGBr will now be described with reference to the flowchart shown in FIG. 23. At step S2, the cartridge is inserted into cartridge slot 240 in the AGBr. At step S5, a user turns on power-supply switch 25b of the AGBr. At step S6, DC-DC converter 25c supplies, via voltage selector 60, a DC voltage of 3.3V to the cartridge and I/O buffer controller 230a of CPU 230r. Then, operation proceeds to step S116. At step S116, AGBr CPU core 23A_2 in CPU 230r is activated, starts executing the processing described in AGBr boot ROM 23A_1, and then attempts to read the identification code stored in the identification code region of the inserted cartridge. When connector 24 is engaged with AGBr-dedicated cartridge 100Ar, the identification code is read from identification code region 100nA. On the other hand, when connector 24 is engaged with CGB cartridge 100Cr, no AGBr identification code is read.

The operation then proceeds to step S118. At step S118, the cartridge type is determined based on the identification code read in step S116. In this example, it is determined whether the inserted cartridge is an AGBr-dedicated cartridge 100Ar. If it is determined that the inserted cartridge is an AGBr-dedicated cartridge 100Ar, the operation proceeds to the above-described steps S20, S22, and S24 which are explained above with reference to FIG. 20.

If it is determined at S118 that the inserted cartridge is not an AGBr-dedicated cartridge 100Ar (e.g., the inserted cartridge is a CGB cartridge 100C), the operation proceeds to step S120. At step S120, voltage selector 60 selects 5V instead of 3.3V. Then, the operation proceeds to the above-described steps S26, S28, S30, S32, and S34 which are explained above with reference to FIG. 20.

The operations of steps S116 and S118 will now be described in greater detail. As one example, assume the cartridge inserted into cartridge slot 240 of the AGBr is an AGBr-dedicated cartridge 100Ar having an AGBr identification code stored therein. If an AGBr-dedicated cartridge 100Ar is inserted, the above-described operations are performed. If a CGB cartridge 100C is inserted, however, it cannot be normally accessed at step S116. This is because the voltage supplied to the cartridge in step S6 is 3.3V. In any event, even if the CGB cartridge is successfully accessed, it has no identification code region 100nA. As a result, at step S116, no identification code for an AGBr-dedicated cartridge 100Ar is read out; thus it is determined that a CGB cartridge 100Cr is inserted.

The AGB-dedicated cartridge 100Ar and the CGB cartridge 100Cr may be driven by the same voltage level (e.g., 3.3V), and may each be provided with memory that is accessible by common bus control (e.g., separate bus control) so as to store the identification code only. If so, AGB CPU core 23A_2 becomes accessible to the memory regardless of the cartridge type, and can correctly read the identification code from the identification code region 100nA or an identification code region 100nC.

Figure 24:
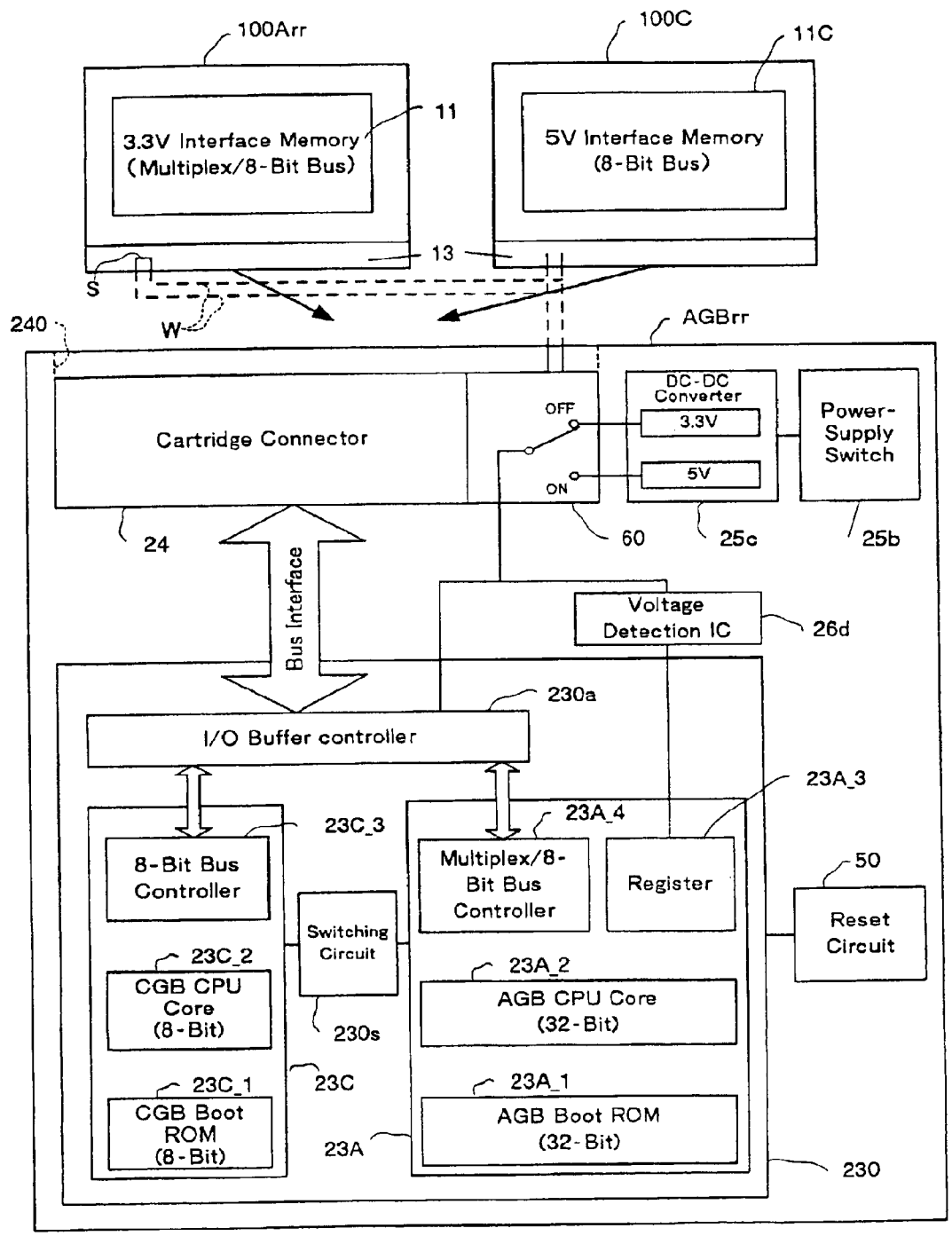
FIG. 24 is a block diagram of an example AGBrr in which cartridge type identification is based on a short circuit.
Figure 25:
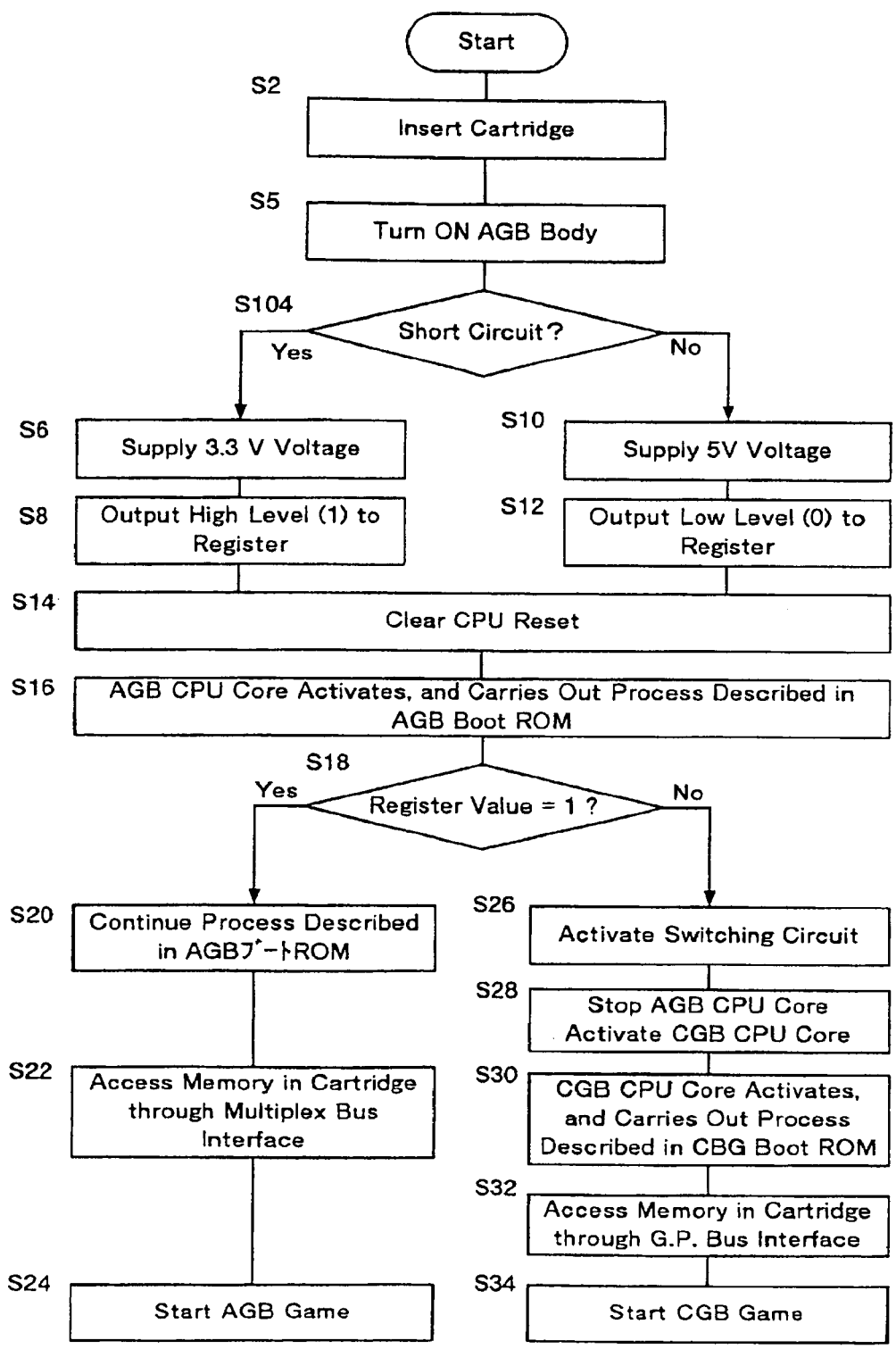
FIG. 25 is a flowchart of the operation of the example AGBrr shown in FIG. 24.

A method for identifying the cartridge type using a signal-line short will be described with reference to FIGS. 24 and 25. FIG. 24 is a block diagram showing parts relevant to the cartridge type identifying operation. An example portable game system AGBrr in this embodiment is provided with voltage selector 60 instead of a cartridge shape detection switch 30 as in the example AGB shown in FIG. 6. An AGBrr-dedicated cartridge 100A is used with the AGBrr. Cartridge slot 240 of the AGBrr is provided with two signal lines W extending from voltage selector 60. AGBrr-dedicated cartridge 100Arr is provided with a short S that causes those two signal lines W to short out when an AGBrr-dedicated cartridge 100Arr is inserted into cartridge slot 240.

In the AGBrr, the signal lines W are not shorted when a CGB cartridge 100C is inserted into cartridge slot 240. However, when an AGB-dedicated cartridge 100Arr is inserted into cartridge slot 240, the two signal lines W are shorted by the short. Detection of the shorting of the two signal lines W enables the AGBrr to identify the cartridge type. Based on whether the signal lines W are shorted or not, voltage selector 60 selects either 3.3V or 5V.

The operation of the AGBrr for identifying cartridge type based on the shorting of signal lines W is similar to the operation for identifying cartridge type using identification codes. In the AGBrr, AGB CPU 23A_2 detects the shorting of the signal lines instead of reading the identification code. Because only the short is detected, it is possible to correctly detect the short even when the supplied voltage is 3.3V.

The operation of the AGBrr will be described with reference to the flowchart shown in FIG. 25. The operation of information processing device AGBrr is described with a focus on the steps relevant to this example. At step S2, a cartridge is inserted into cartridge slot 240 in the AGBrr. At step S5, a user turns on power-supply switch 25b of the AGBrr. At step S104, a determination is made as to whether the signal lines W are shorted. If the signal lines W are shorted as determined by the short S provided in AGBrr-dedicated cartridge 100Arr, steps S6 to S34 described above are executed. If the signal lines W are not shorted (e.g., because CGB cartridge 100C has no short), the above-described operations of steps S10 to S34 are executed.

Example Liquid Crystal Display

Figure 26:
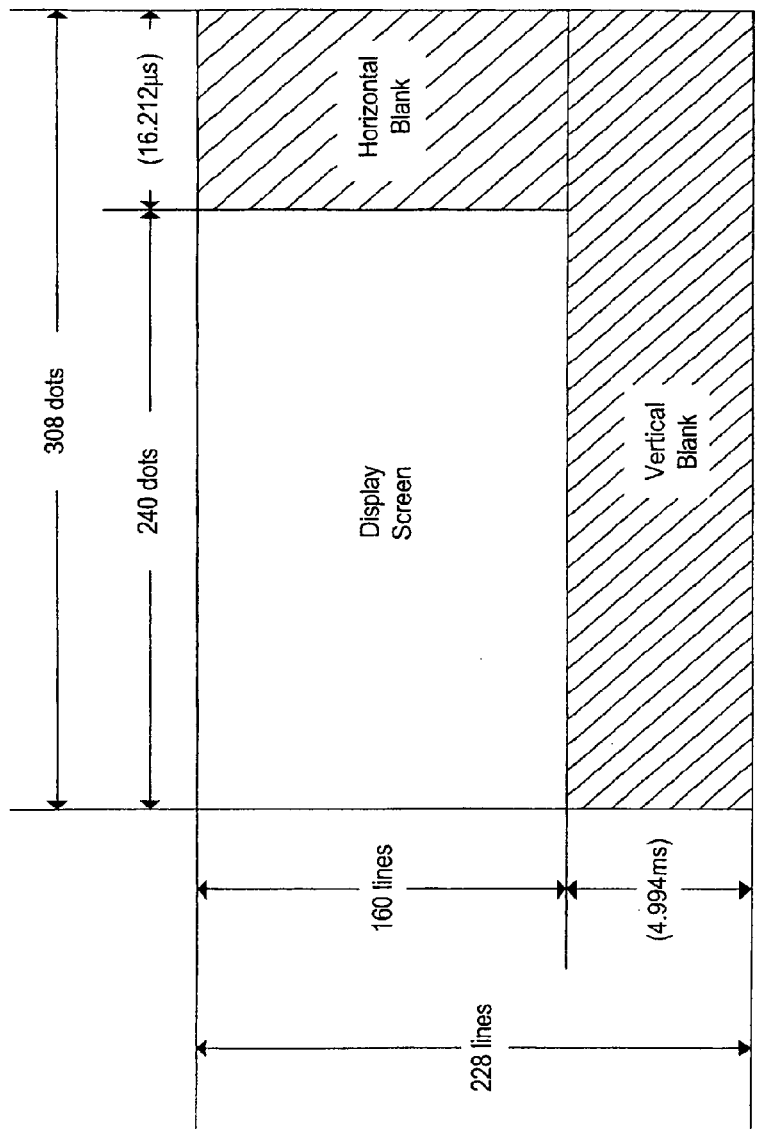

The liquid crystal display of the example AGB is shown in FIG. 26. The example AGB uses a 2.9 inch-wide reflective TFT color liquid crystal display screen. The vertical blanking interval of the example AGB is longer than that of the CGB and its horizontal blanking interval is fixed. Table V sets forth the display characteristics:

TABLE V

| | Item | Value | Interval |
|---|---|---|---|
| Display screen size | Number of dots per horizontal line | 240 dots | 57.221 microseconds |
| | Number of horizontal lines | 160 lines | 11.749 milliseconds |
| Total number of dots | Number of dots per horizontal line | 308 dots | 73.433 microseconds |
| | Number of horizontal lines | 228 lines | 16.743 milliseconds |
| Blanking | Number of dots per horizontal blank | 68 dots | 16.212 microseconds |
| | Number of horizontal lines per vertical blank | 68 lines | 4.994 milliseconds |
| Scanning cycle | H interval frequency | 13.618 kHz | 73.433 microseconds |
| | V interval frequency | 59.727 Hz | 16.743 milliseconds |

The example AGB may display images in widescreen format (e.g., 240×160) or in non-widescreen format (e.g., 160× 140). The non-widescreen format includes borders around the displayed images and may be used, for example, to display CGB games developed for the CGB. It is also possible to provide a switching capability so that games (e.g., CGB games) may be selectively displayed in either the widescreen or non-widescreen format. The switching from one format to another may be accomplished using one of the shoulder buttons (e.g., button 33g).

Liquid Crystal Display Status

V Counter

Figure 27:
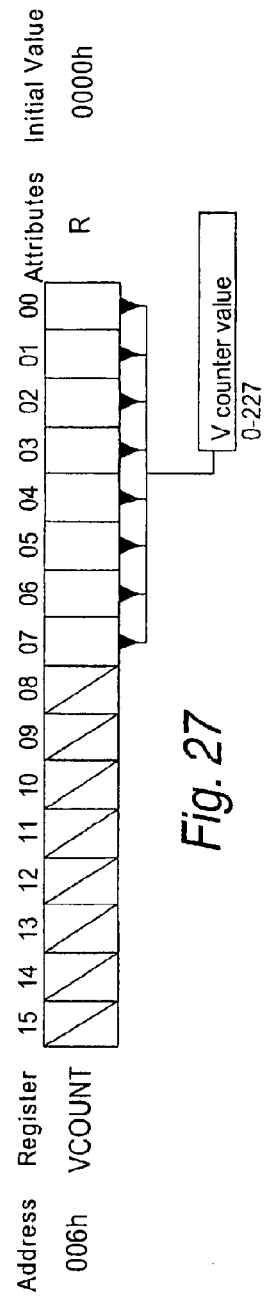
FIG. 27 depicts the VCOUNT register.

The VCOUNT register shown in FIG. 27 can be used to read which of the total of 228 LCD lines is currently being rendered. VCOUNT [d07-00] are the V counter value and a value in the range of 0-227 is read. A value of 0-159 indicates that rendering is in progress and a value of 160-227 indicates a vertical blanking interval.

General LCD Status

Figure 28:
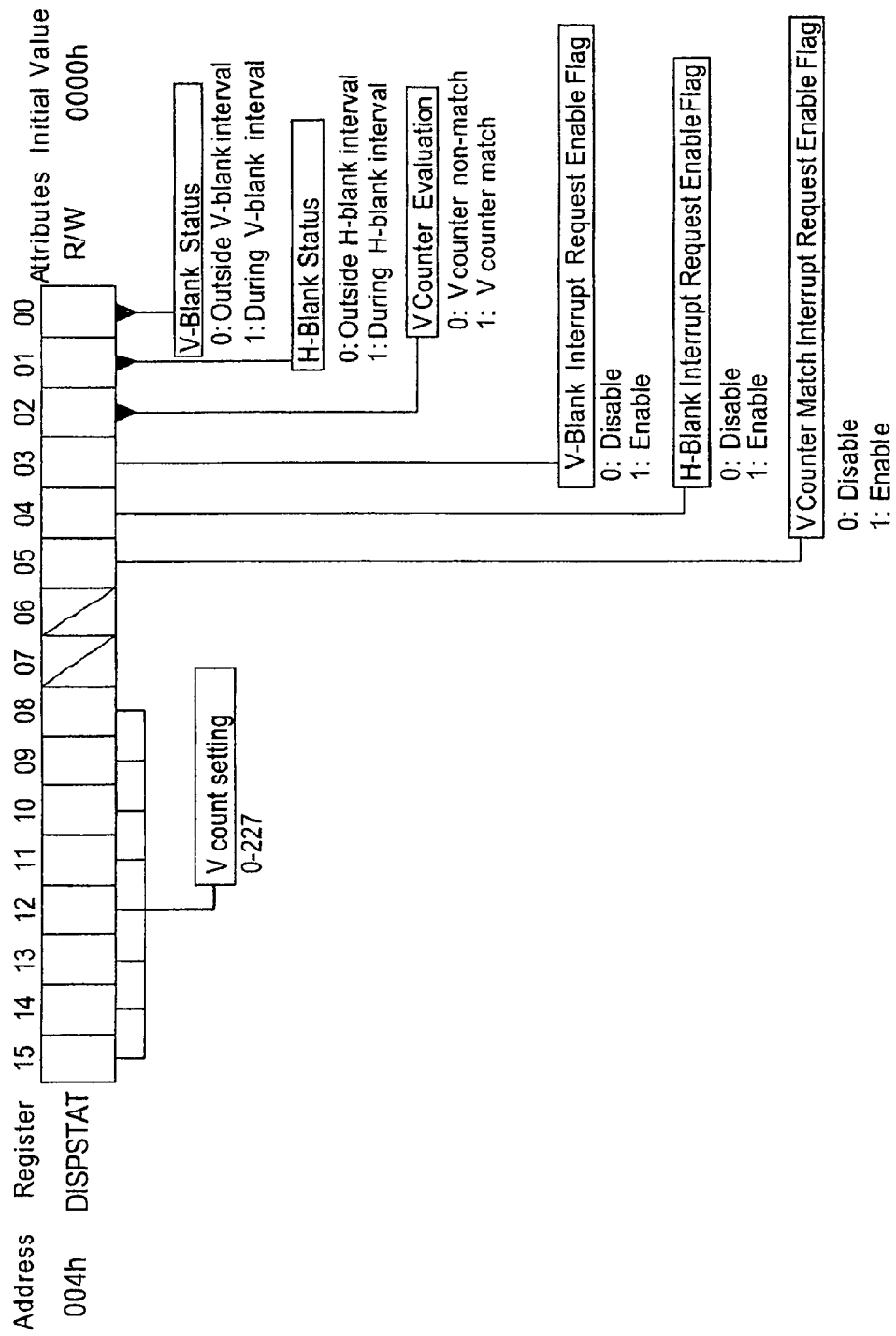
FIG. 28 depicts the DISPSTAT register.

The DSIPSTAT register shown in FIG. 28 can be used for status and interrupt requests.

DISPSTAT [d15-08] (V Count Setting) can be used to set the value used for V counter evaluation and V counter match interrupts. The range for this setting is 0-227.

DISPSTAT [d05] (V Counter Match Interrupt Request Enable Flag) allows an interrupt request to be generated when the value of the V counter setting and the value of the line actually rendered (VCOUNT register value) agree.

DISPSTAT [d04] (H-Blank Interrupt Request Enable Flag) allows an interrupt request to be generated during horizontal blanking.

DISPSTAT [d03] (V-Blank Interrupt Request Enable Flag) allows an interrupt to be generated during vertical blanking.

DISPSTAT [d02] (V Counter Evaluation) is a flag that indicates whether the V count setting and the V count register value match. It is set while they match and automatically reset when they no longer match.

DISPSTAT [d01] (H-Blank Status) can check whether a horizontal blanking interval is currently in effect.

DISPSTAT [d00] (V-Blank Status) can check whether a vertical blanking interval is currently in effect.

Example Image System

Figure 29:
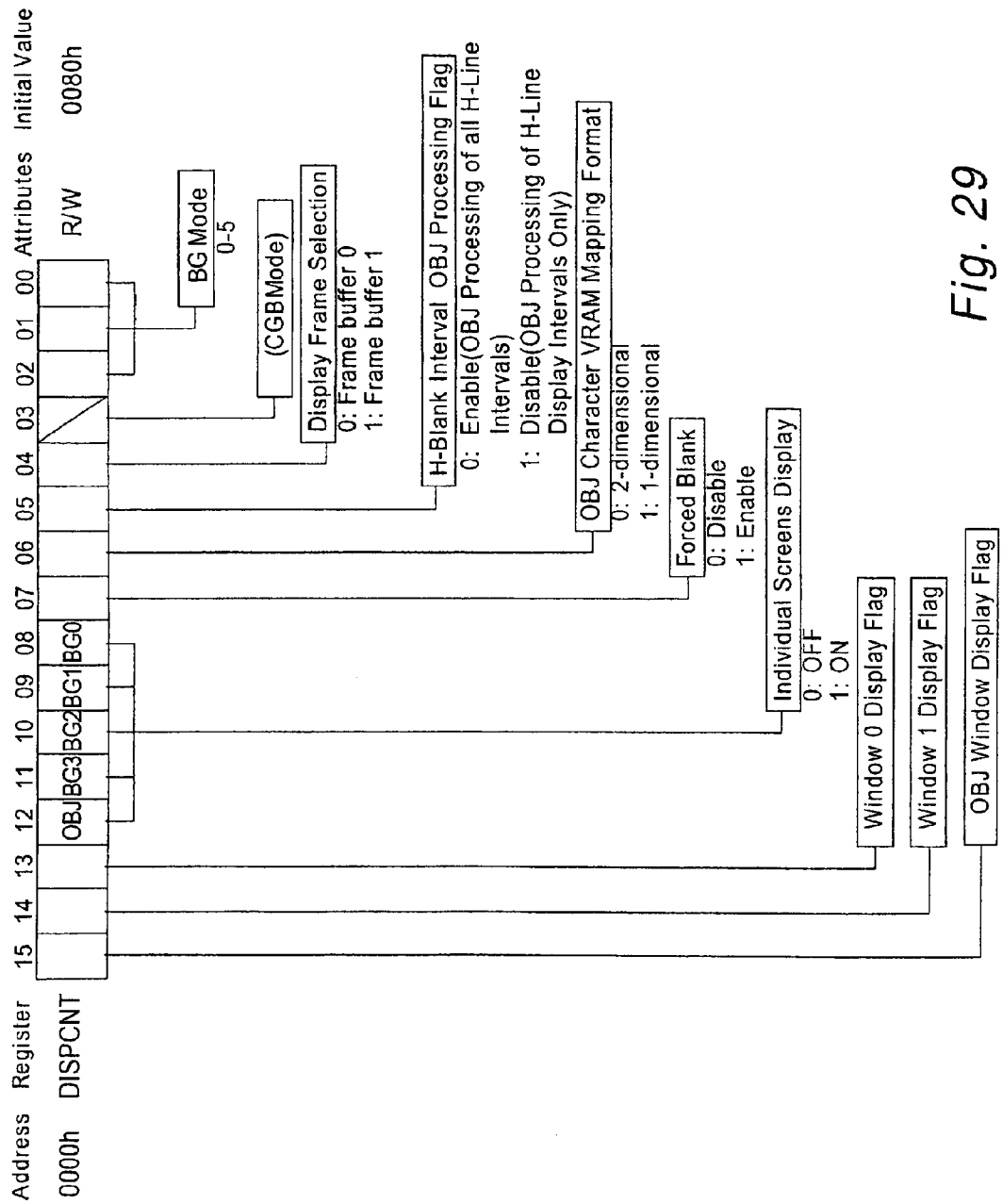
FIG. 29 depicts the DISPCNT register.

The example AGB can use different image systems depending on the purpose of the software. These display-related items are changed mainly using the DISPCNT register shown in FIG. 29.

DISPCNT [d15] (OBJ Window Display Flag) is a master flag that controls whether the OBJ window is displayed. The object window is described in greater detail below.

DISPCNT [d14], [d13] (Display Flags for Windows 0 and 1) are master flags that control whether windows 0 and 1 are displayed. The window feature is described in greater detail below.

DISPCNT [d12-08] (Individual Screens Display Flags) allows individual control of whether OBJ, BG3, BG2, BG1 and BG0, respectively, are displayed.

DISPCNT [d07] (Forced Blank)—setting this bit causes the CPU to forcibly halt operation of the image processing circuit, allowing access to VRAM, color palette RAM, OAM, and the internal registers. The LCD screen displays white during a forced blank. However, the internal HV synchronous counter continues to operate even during a forced blank. When the internal HV synchronous counter cancels a forced blank during a display period, the display begins from the beginning, following the display of three vertical lines.

DISPCNT [d06] (OBJ Character VRAM Mapping Format) specifies the VRAM mapping format for an OBJ character. A setting of 0 causes the OBJ character to be handled in memory mapped 2-dimensional format. A setting of 1 causes the OBJ character to be handled in memory mapped 1-dimensional format. The OBJ character VRAM mapping formats will be explained in greater detail below.

DISPCNT [d05] (H-Blank Interval OBJ Processing Flag) is set to 0 to execute OBJ render processing of all H-Line intervals (including H-Blank intervals). A setting of 1 executes OBJ render processing of the display intervals only and not for H-blank intervals. Thus, when the user accesses OAM or OBJ VRAM during an H-blank interval, this bit needs to be set. However, maximum OBJ display performance cannot be obtained in this situation.

DISPCNT [d04] (Display Frame Selection) allows selection of one of the frame buffers for rendering when rendering in bitmap format in a mode in which there are 2 frame buffers (BG modes 4 and 5). A setting of 0 selects the contents of frame buffer 0 for rendering; a setting of 1 selects the contents of frame buffer 1 for rendering.

DISPCNT [d03] (CGB Mode) is controlled by the system and is not typically accessible. As discussed above, the example AGB is equipped with 2 CPUs. In AGB mode, a 32-bit RISC CPU starts, and in CGB mode, an 8-bit CISC CPU starts.

DISPCNT [d02-00] (BG Mode) selects the BG mode from a range of 0-5. BG modes are explained in greater detail below.

BG Modes

Details of BG Modes

In the example AGB, changing the BG mode allows character format and bitmap format to be used selectively, as appropriate. In BG modes 0, 1 and 2, rendering to the LCD screen is performed in a character format suitable for the game. In BG modes 3, 4 and 5, rendering the LCD screen is performed in bitmap format. FIGS. 30A and 30B show the various features of the BG modes.

In BG mode 3, one frame memory is available that can display 32,768 colors, which is suitable for rendering still images. BG modes 4 and 5 allow double buffering using two frame memories, and are thus suited for rendering animated video. The method of controlling text BG scrolling is different from that of BG rotation/scaling and bitmap BG scrolling. This is discussed in greater detail below.

VRAM Memory Maps

Figure 31:
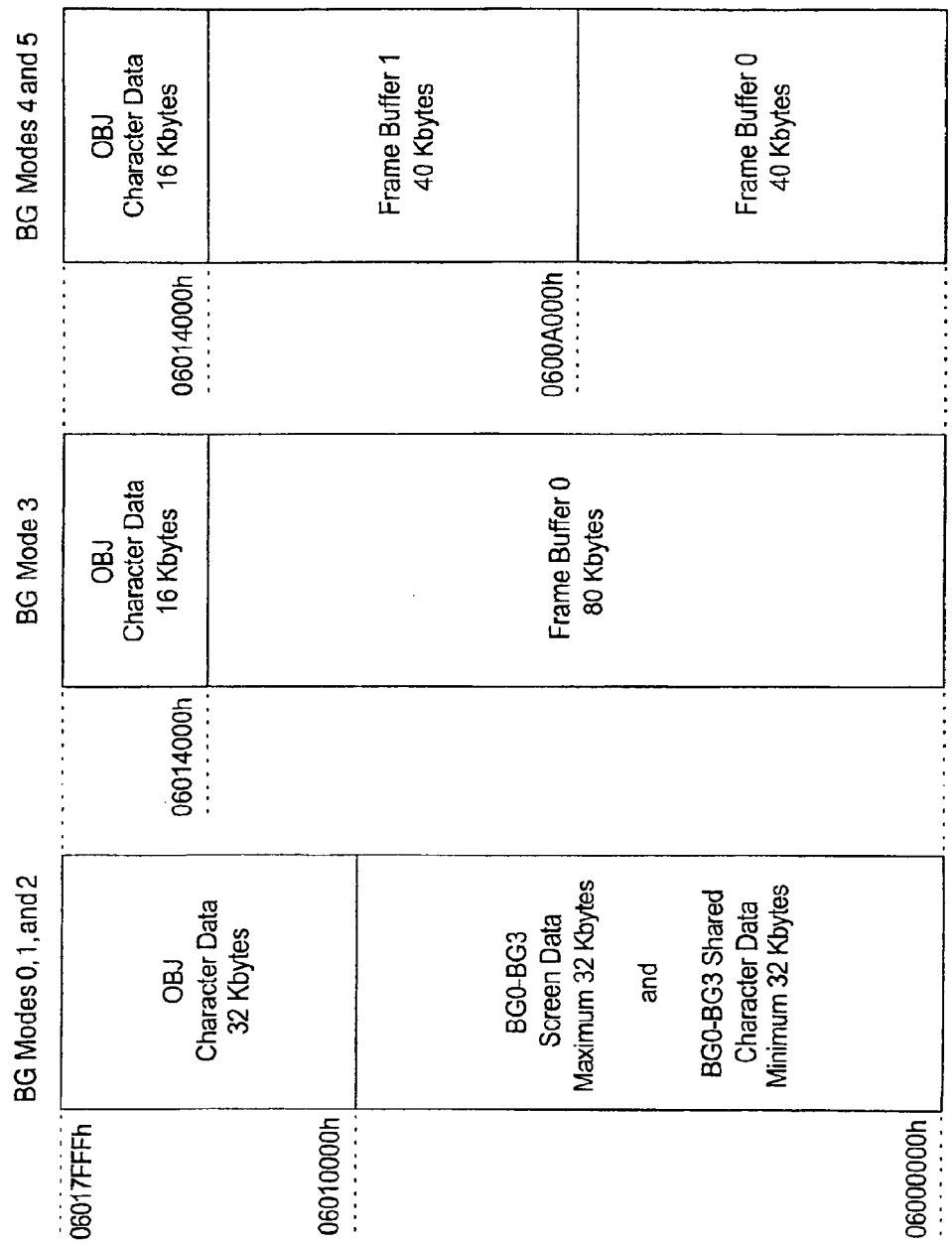
FIG. 31 is a memory map of the VRAM in the various BG modes.

The VRAM (96 Kbyte) memory maps in the various BG modes are shown in FIG. 31. The screen and character data areas can be mapped in the 64 Kbyte BG area in BG modes 0, 1 and 2. This is explained in greater detail below.

Example Rendering Functions

The example AGB CPU has 96 Kbytes of built-in VRAM. Its rendering functions include BG and OBJ display capability. The method used for BG rendering varies with the BG mode as will now be described.

Character Mode BG (BG Modes 1 and 2)

In character mode, the components of the BG screen are basic characters of 8×8 dots.

BG Control

There are four BG control registers (registers BG0CNT, BG1CNT, BG2CNT and BG3CNT), corresponding to the maximum number of BG screens. Registers BG0CNT and BG1CNT are exclusively for text BG control, while BG2CNT and BG3CNT also support BG rotation and scaling control. The registers used by the BG modes are set forth in Table VI:

TABLE VI

| BG Mode | BG Control Register | | | |
|---|---|---|---|---|
| | BG0CNT | BG1CNT | BG2CNT | BG3CNT |
| 0 | BG0 (text) | BG1 (text) | BG2 (text) | BG3 (text) |
| 1 | BG0 (text) | BG1 (text) | BG2 (rotation/scaling) | — |
| 2 | — | — | BG2 (rotation/scaling) | BG3 (rotation/scaling) |

The contents of the BG control registers are discussed below with reference to FIGS. 32A and 32B.

Figure 32A:
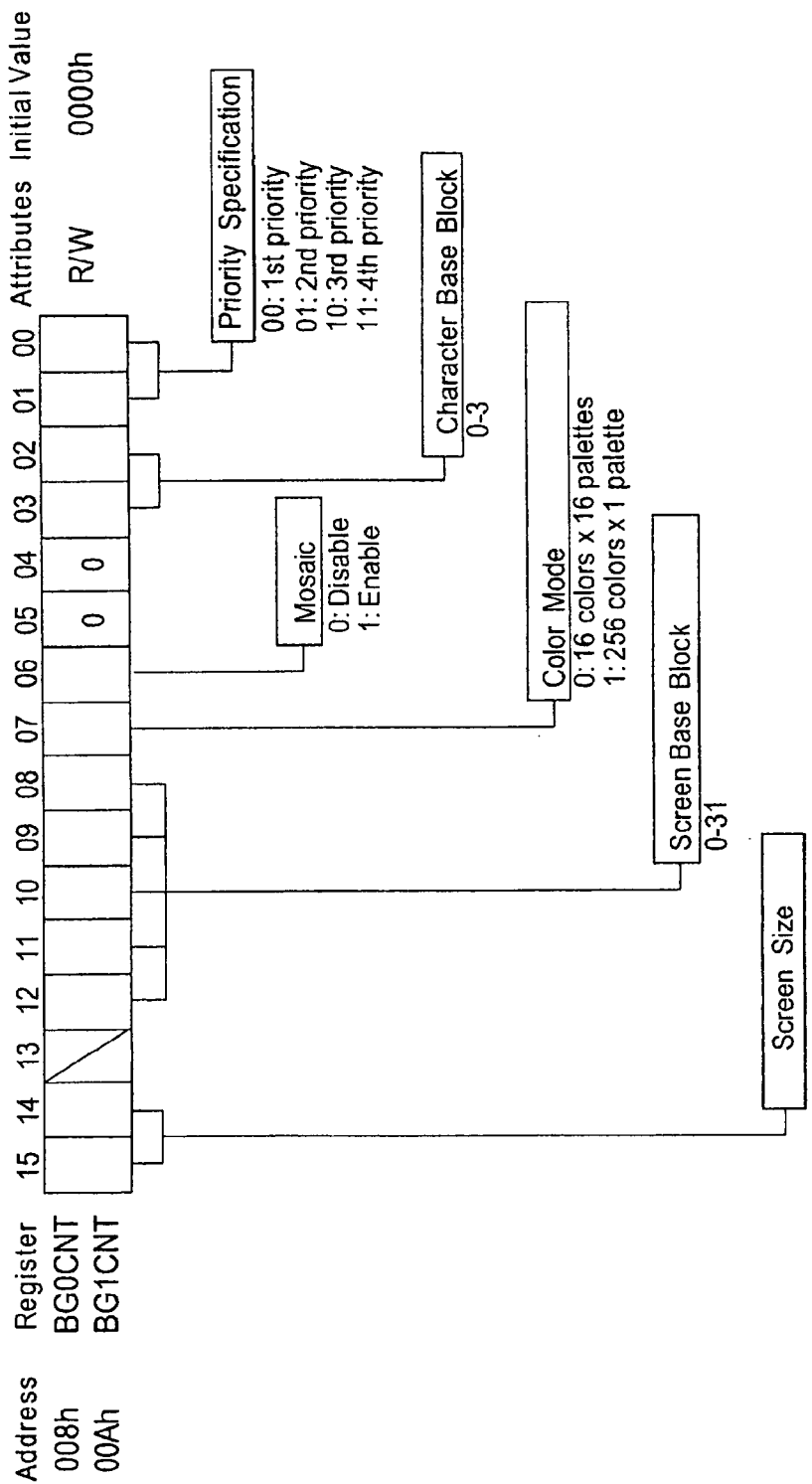
FIG. 32A depicts the BG0CNT (BG1CNT) register.
Figure 32B:
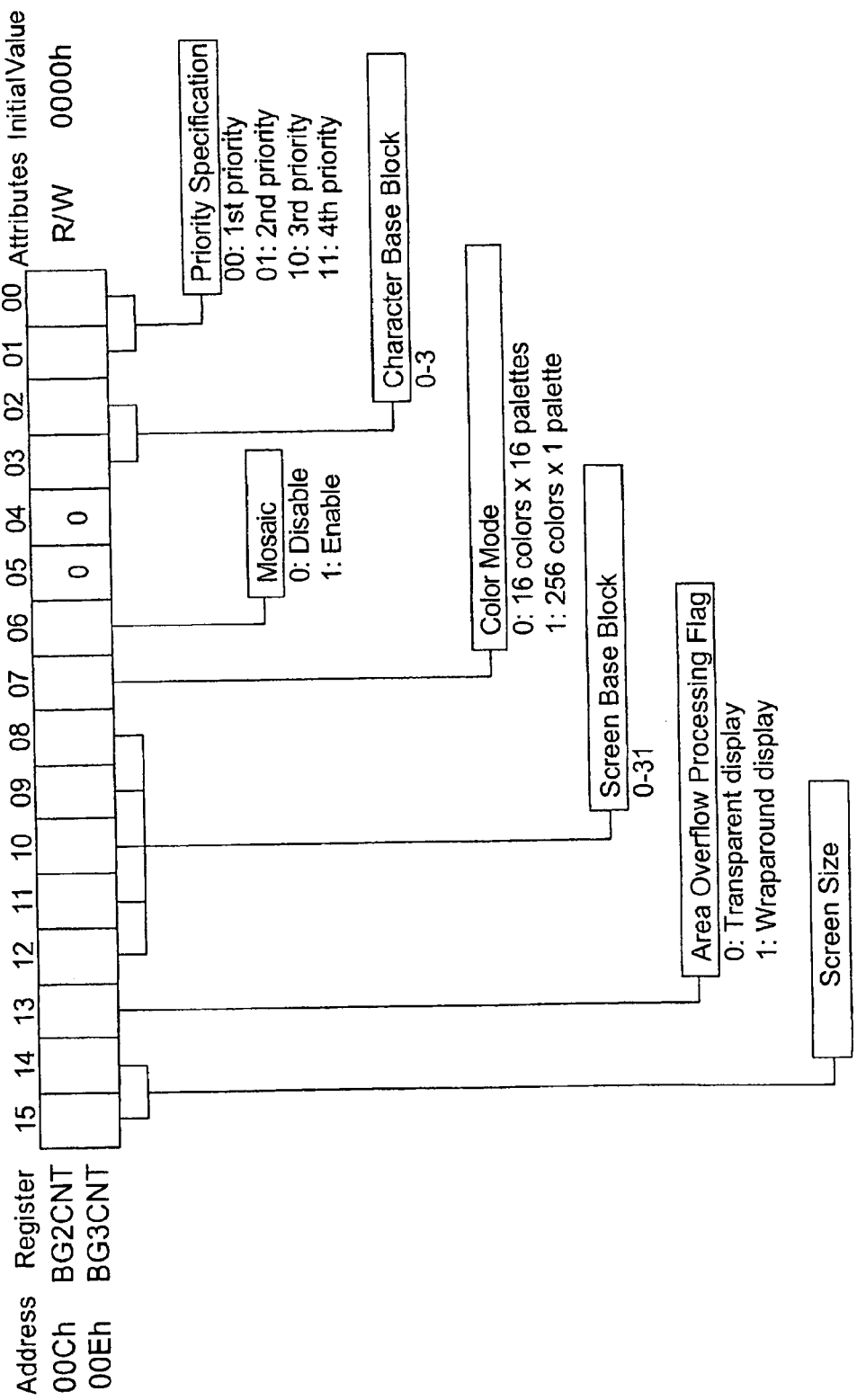
FIG. 32B depicts the BG2CNT (BG3CNT) register.
Figure 33A:
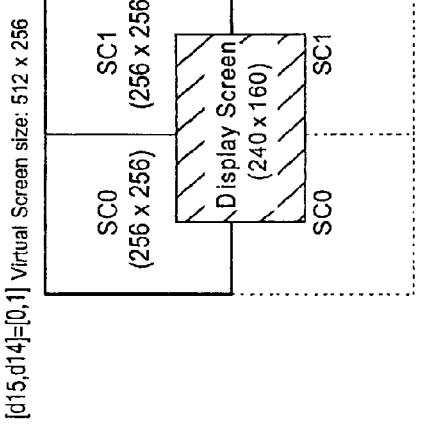
FIGS. 33A-33D illustrate screen sizes for text BG screens.
Figure 33B:
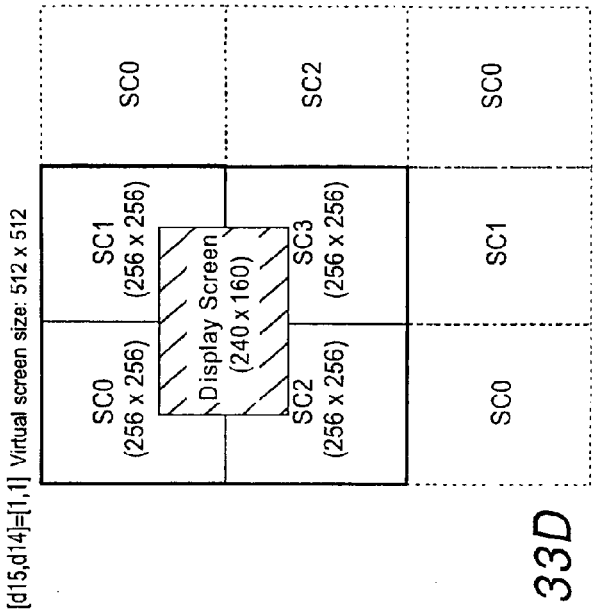
Figure 33C:
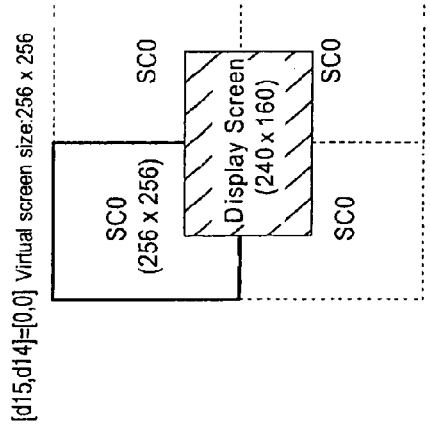
Figure 33D:
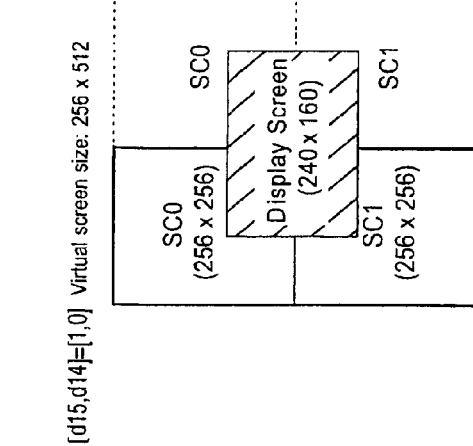
Figure 34A:
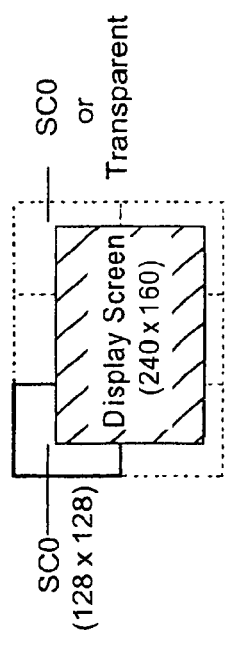
FIGS. 34A-34D illustrate screen sizes for rotation/scaling BG screens.
Figure 34B:
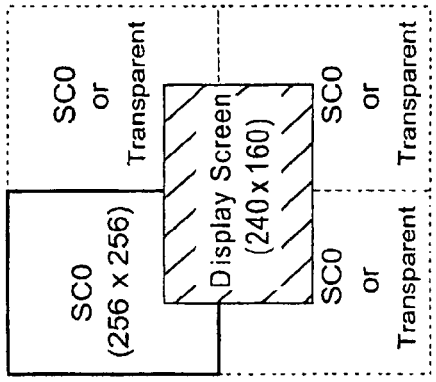
Figure 34D:
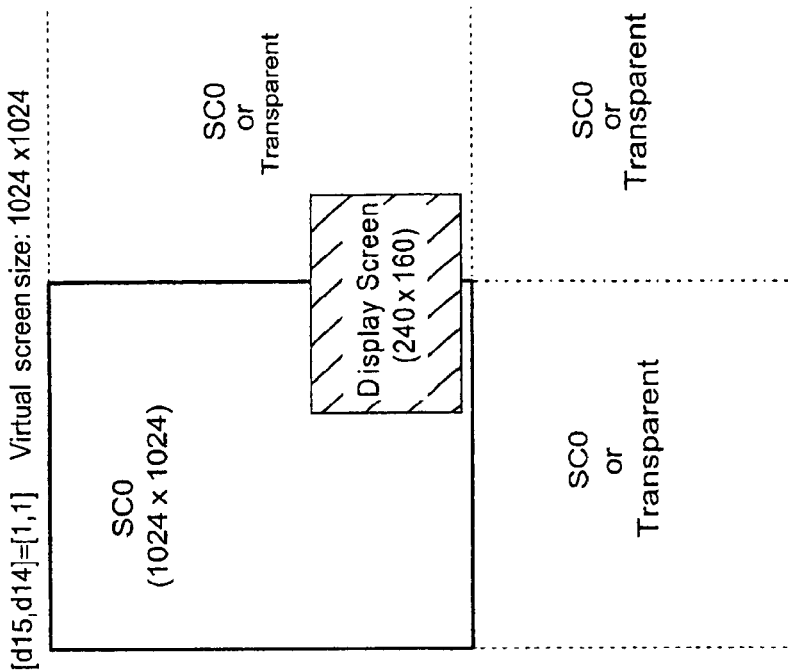
Figure 34C:
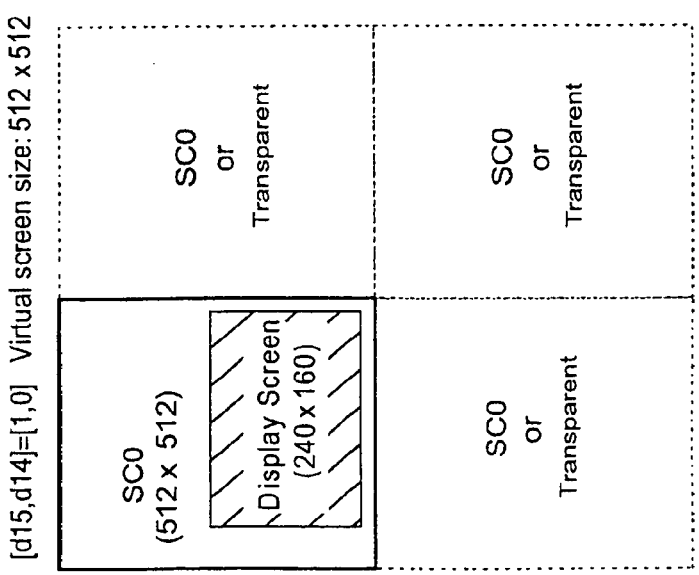

With reference to FIGS. 32A and 32B, BG*CNT [d15-14] (Screen Size) allow the screen size for the BG as a whole to be specified. When a value other than the maximum is specified, the remaining VRAM area can be used for character data. Table VII sets forth the screen size settings and the corresponding screen sizes:

TABLE VII

| Screen Size | Text Screen | | Rotation/Scaling Screen | |
|---|---|---|---|---|
| Setting | Screen Size | Screen Data | Screen Size | Screen Data |
| 00 | 256 × 256 | 2 Kbytes | 128 × 128 | 256 Bytes |
| 01 | 512 × 256 | 4 Kbytes | 256 × 256 | 1 Kbyte |
| 10 | 256 × 512 | 4 Kbytes | 512 × 512 | 4 Kbytes |
| 11 | 512 × 512 | 8 Kbytes | 1024 × 1024 | 16 Kbytes |

FIGS. 33A-D provide an overview of screen sizes for text BG screens and FIGS. 34A-D provide an overview of screen sizes for rotation/scaling BG screens.

BG2CNT, BG3CNT [d13] (Area Overflow Processing) can be used to choose whether the area of the screen into which an overflow occurs is displayed as transparent or wraps around the display screen when the display screen overflows the boundaries of the virtual screen due to a rotation/scaling operation.

BG*CNT [d12-08] (Screen Base Block Specification) specify the starting block in VRAM at which screen data are stored (32 steps: 0-31; 2-Kbyte increments).

BG*CNT [d07] (Color Mode) specifies whether to reference BG character data in 16 colors×16 palettes format or 256 colors×1 palette format.

BG*CNT [d06] (Mosaic) turns BG mosaic processing on and off.

BG*CNT [d03-02] (Character Base Block Specification) specify the starting block in VRAM at which the character data to be displayed in the BG is stored (4 steps: 0-3; 16-Kbyte increments).

BG*CNT [d01-00] (Priority Among BGs) specifies the priority of BG0, BG1, BG2 and BG3. With the default value (same priority value specified for all), the order of priority is BG0, BG1, BG2, and BG3. However, this order can be changed to any desired order. Values of 0 (highest priority) to 3 can be specified. When the BG priority has been changed, care should be taken in specifying the pixels used for color special effects.

Mosaic Size

Mosaic size is set in the MOSAIC register shown in FIG. 35. Mosaic is turned on/off for each BG by the mosaic flag of the corresponding BG control register. The mosaic value specifies how many dots of a normal display should make up each large dot displayed. With reference to FIGS. 36A-C, counting from the upper left-most dot on the screen, the number of dots equal to the mosaic size are used in the mosaic display; the other dots are overwritten by the mosaic. If the mosaic size value is 0, a normal display is seen even if mosaic is turned on.

VRAM Mapping Address of BG Data

Figure 37:
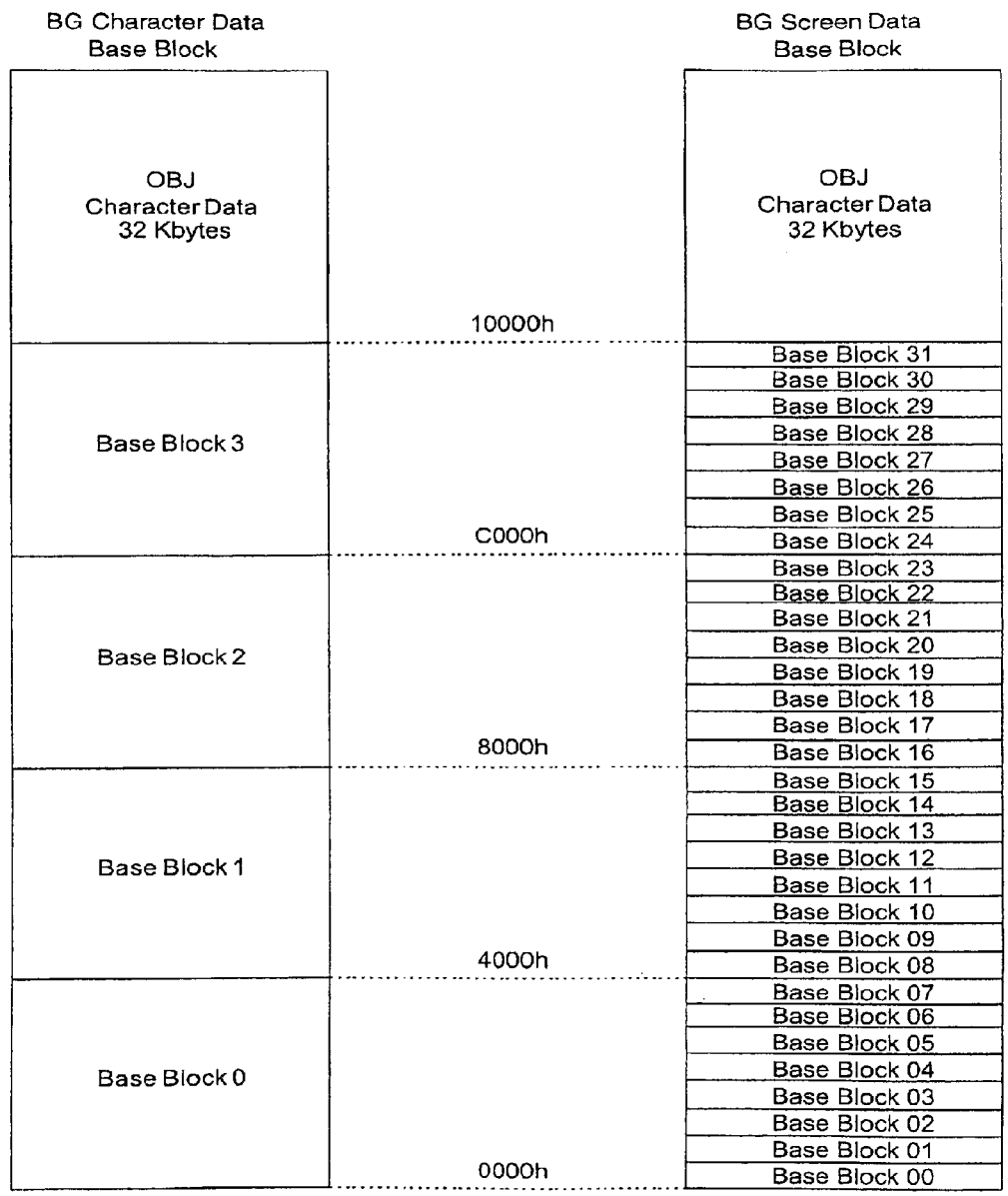
FIG. 37 illustrates VRAM base blocks for BG data.

The starting BG data (BG character and screen data) are stored in the 64-Kbyte BG area of VRAM. FIG. 37 illustrates the VRAM base blocks for BG character data and BG screen data.

BG Character Data

The starting address for referencing BG character data can be specified using the character base block specification of the BG control register. The amount of data depends on the number of character data items stored and the data format (color formats: 256 colors×1 palette or 16 colors×16 palettes).

BG Screen Data

The starting address for referencing BG screen data can be set using the screen base block specification of the BG control register. The amount of data depends on the type of BG screen (text or rotation/scaling) and the screen size. These can be set by the BG control register.

Character Data Format

There are two formats for character dot data: 16 colors×16 palettes and 256 colors×1 palette. The same format is used for OBJ and BG. The data is held in VRAM in the form indicated in FIGS. 38A and 38B.

16 Colors×16 Palettes

Figure 38A:
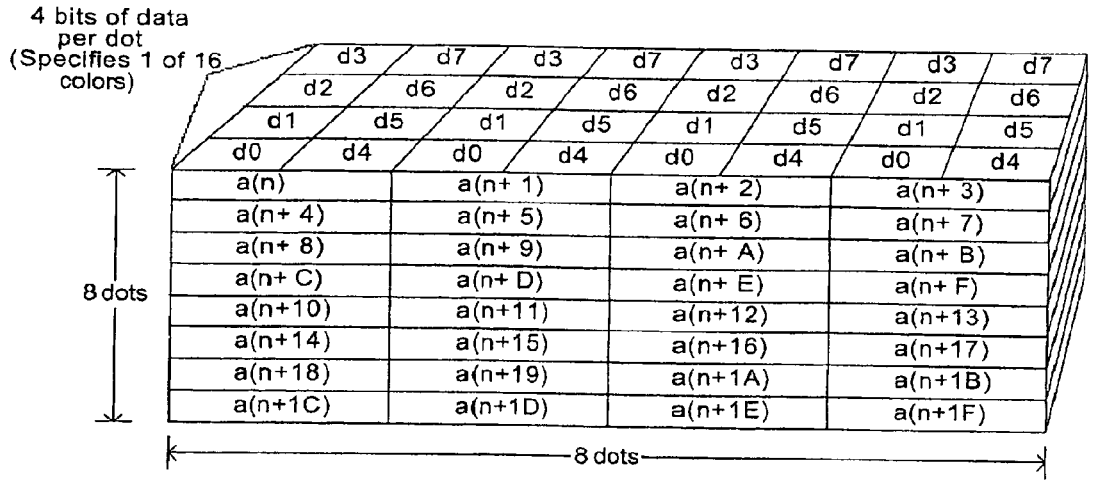
FIGS. 38A and 38B illustrate how data is held in VRAM for a 16 color×16 palette format and a 256 colors×1 palette format, respectively.

With reference to FIG. 38A, in the 16 colors×16 palettes format, there are 2 dots per address. Thus, the amount of data for each basic character is 20H×8 bits.

256 Colors×1 Palette

Figure 38B:
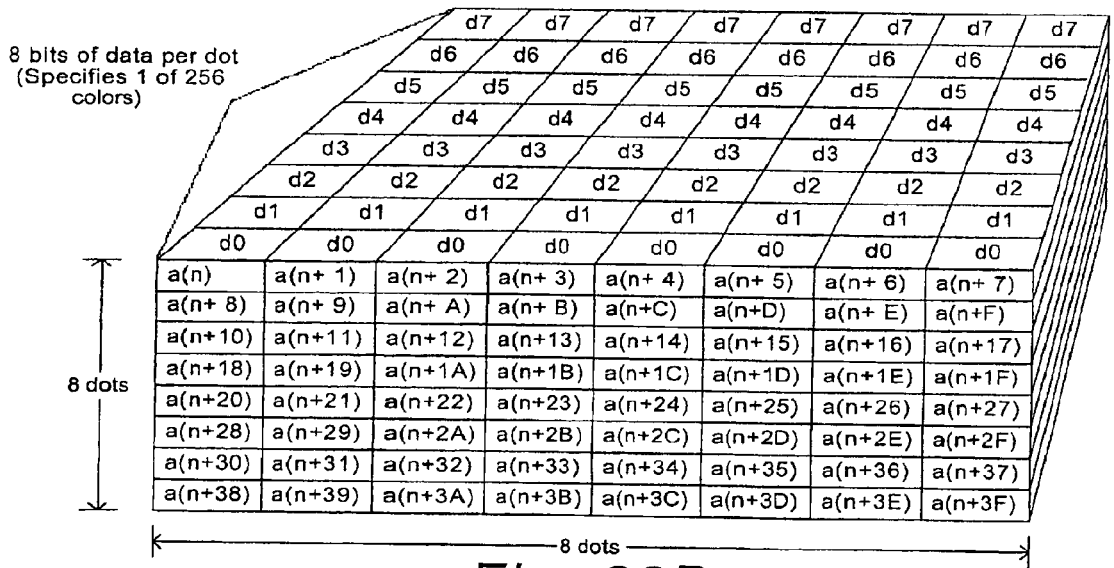

With reference to FIG. 38B, there is 1 dot specified per address. Thus, the amount of data for each basic character is 40H×8 bits.

BG Screen Data Format

A BG screen is considered to be the 8×8 dot unit that represents the size of the basic character, and the BG screen data specifies the characters that are arranged. BG screen data should be stored beginning at the starting address of the BG screen base block specified in the BG control register. The number of screen data items specified per BG depends on the screen size setting in the BG control register. BG screen data for text and rotation/scaling screens are specified in the formats described below.

Text BG Screen

Figure 39A:
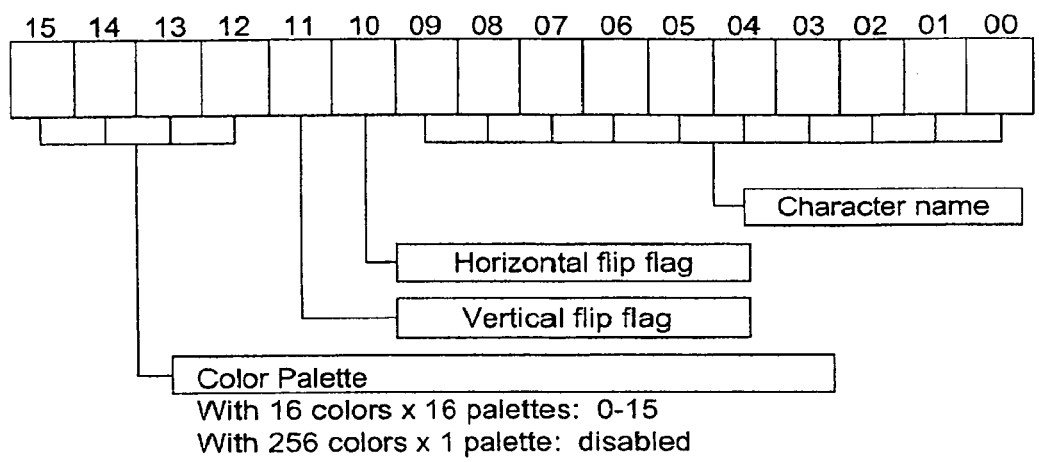
FIGS. 39A and 39B illustrate the screen data format for a text BG screen and a rotation/scaling BG screen, respectively.

With reference to FIG. 39A, a text BG screen includes two bytes of screen data per basic character. 1,024 character types can be specified.

[d15-12] (Color Palette) of the screen data specify the palette to be applied to the character. Specifically, if the color mode specification in the BG control register is 16 colors×16 palettes, bits [d15-12] specify palette 0-15 as the palette to be applied to the character. This is disabled when the color mode specification is 256×1 palette.

[d11] (Vertical Flip Flag) of the screen data enables the BG character to be flipped vertically. A setting of 1 produces the vertical-flip display.

[d10] (Horizontal Flip Flag) of the screen data enables the BG character to be flipped horizontally. A setting of 1 produces the horizontal-flip display.

[d09-00] (Character Name) of the screen data specify the number of the character that has the character base block starting address specified in the BG control register as its starting point.

Rotation/Scaling BG Screen

Figure 39B:
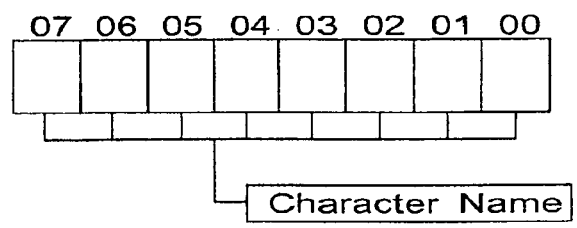

With reference to FIG. 39B, the rotation/scaling BG screen consists of one byte of screen data per basic character. 256 character types can be specified. The character data must be classified as 256 colors×1 palette. The color mode specification in the BG control register is disabled for a rotation/scaling screen.

The example AGB provides a high degree of freedom in using the BG area of VRAM. Consequently, VRAM should be managed with the following points in mind:

1. There are 2 formats for BG character data (defined by 16 and 256 colors), and these can be used together.
2. The BG character data base block can be selected from among 4 blocks (BG control register).
3. The BG screen data base block can be selected from among 32 blocks (BG control register).
4. The screen size (amount of VRAM used) can be set for each BG (BG control register).
5. Text and rotation/scaling BGs can be present and used together in a BG screen.

In managing VRAM, particular care is required in BG mode 1, because text BG screens (which can handle BG character data in both 256 colors×1 palette and 16 colors×16 palettes) and rotation/scaling BG screens (which can handle only 256 colors×1 palette) may be used together.

BG Screen Data Address Mapping for the LCD Screen

Text BG

Figure 40A:
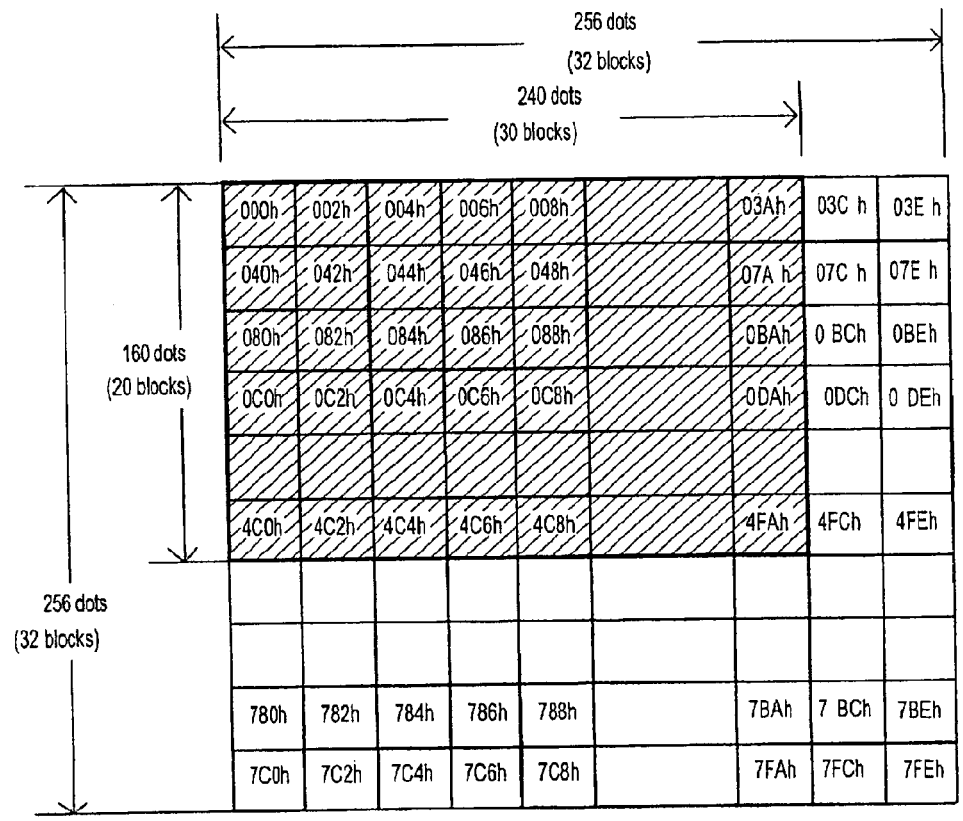
FIGS. 40A-40D illustrate text BG screen data address maps for screen sizes of 256×256 dots, 512×256 dots, 256× 512 dots, and 512×512 dots, respectively.
Figure 40B:
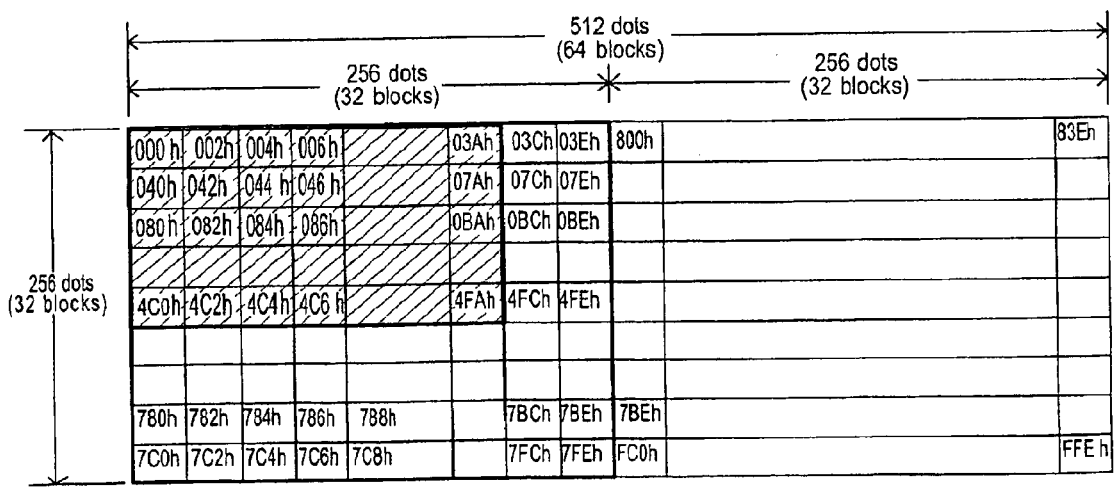
Figure 40C:
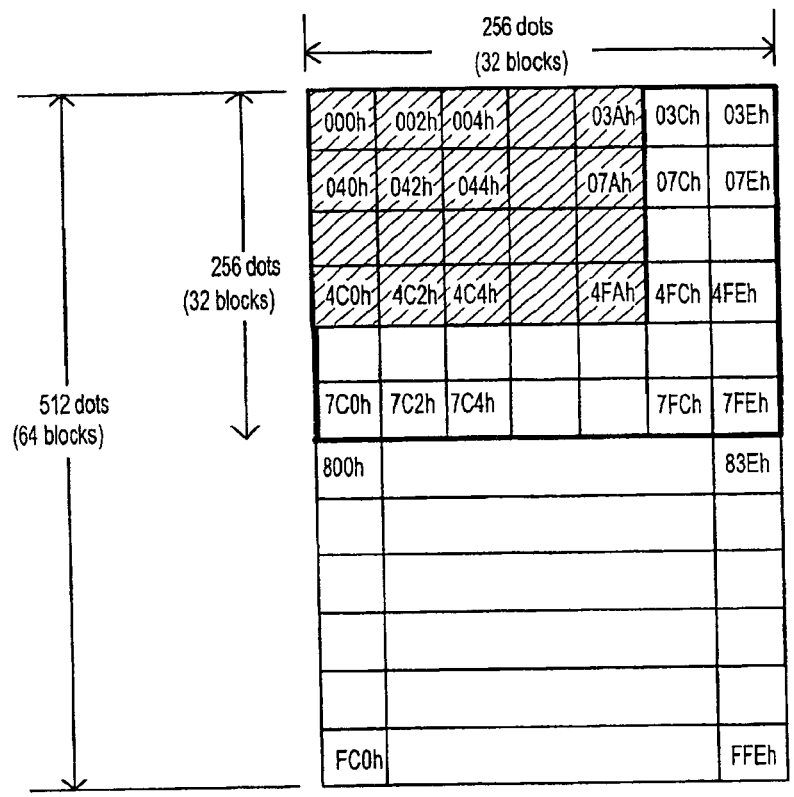
Figure 40D:
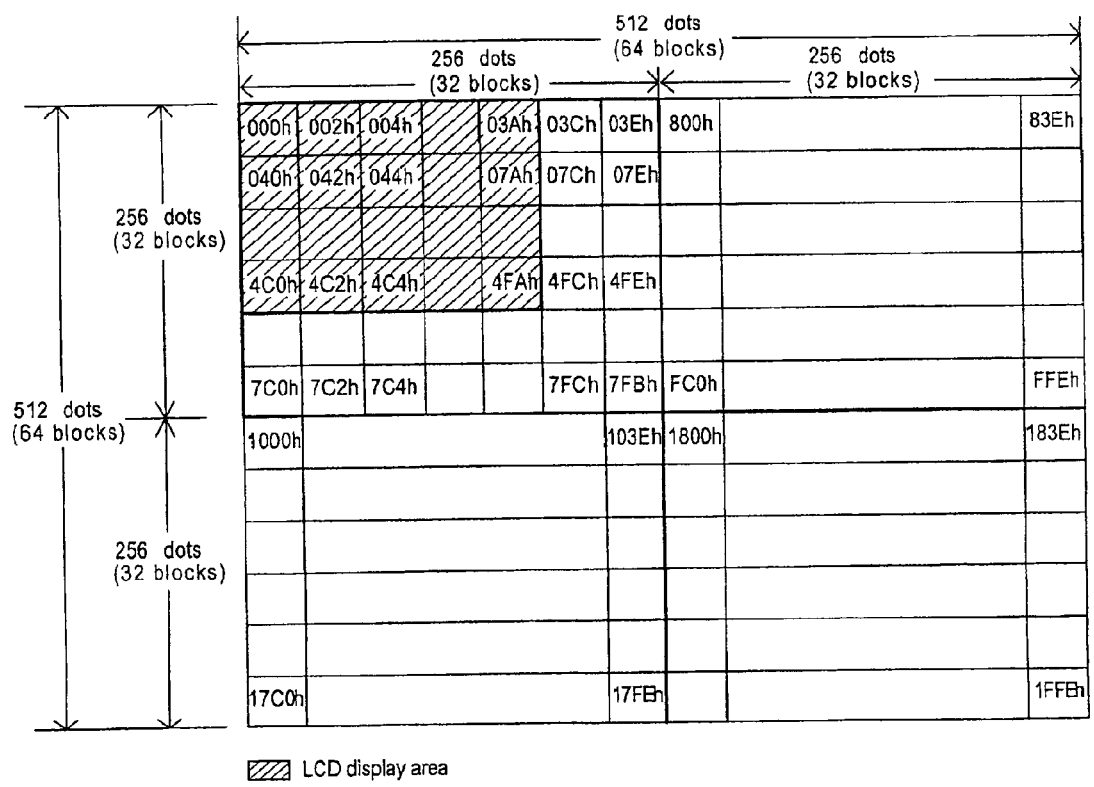

FIG. 40A shows a virtual screen size of 256×256 dots; FIG. 40B shows a virtual screen size of 512×256 dots; FIG. 40C shows a virtual screen size of 256×512 dots; and FIG. 40D shows a virtual screen size of 512×512 dots.

Rotation/Scaling BG

Figure 41A:
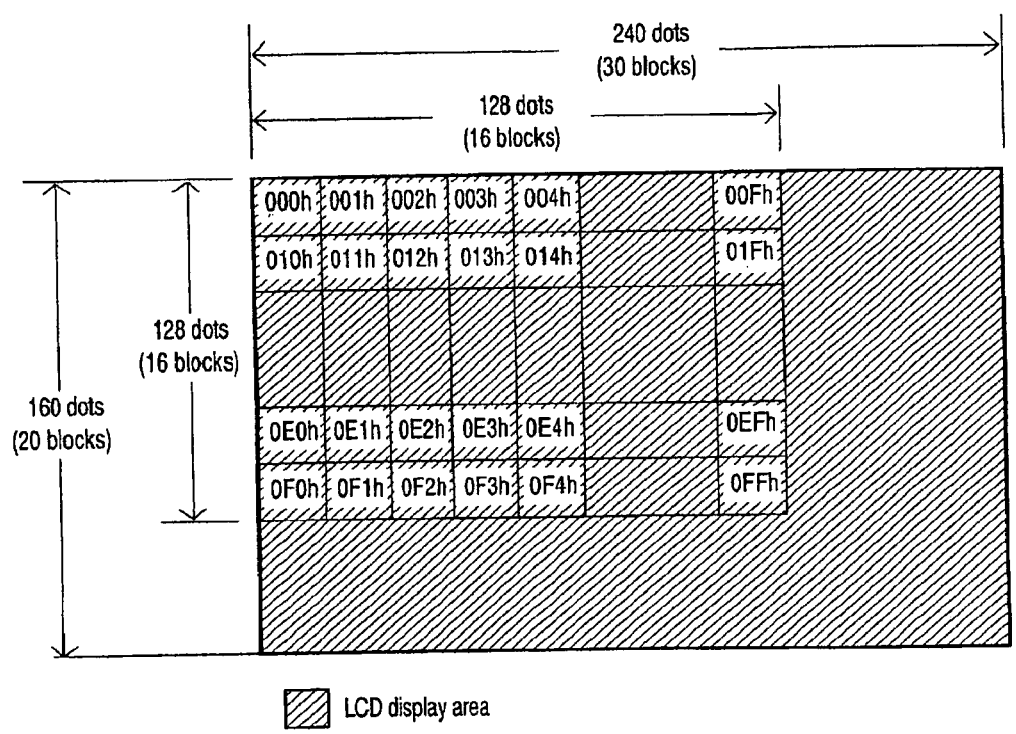
FIGS. 41A-41D illustrate rotation/scaling screen data address maps for screen sizes of 128×128 dots, 256×256 dots, 512×512 dots, and 1024×1024 dots, respectively.
Figure 41B:
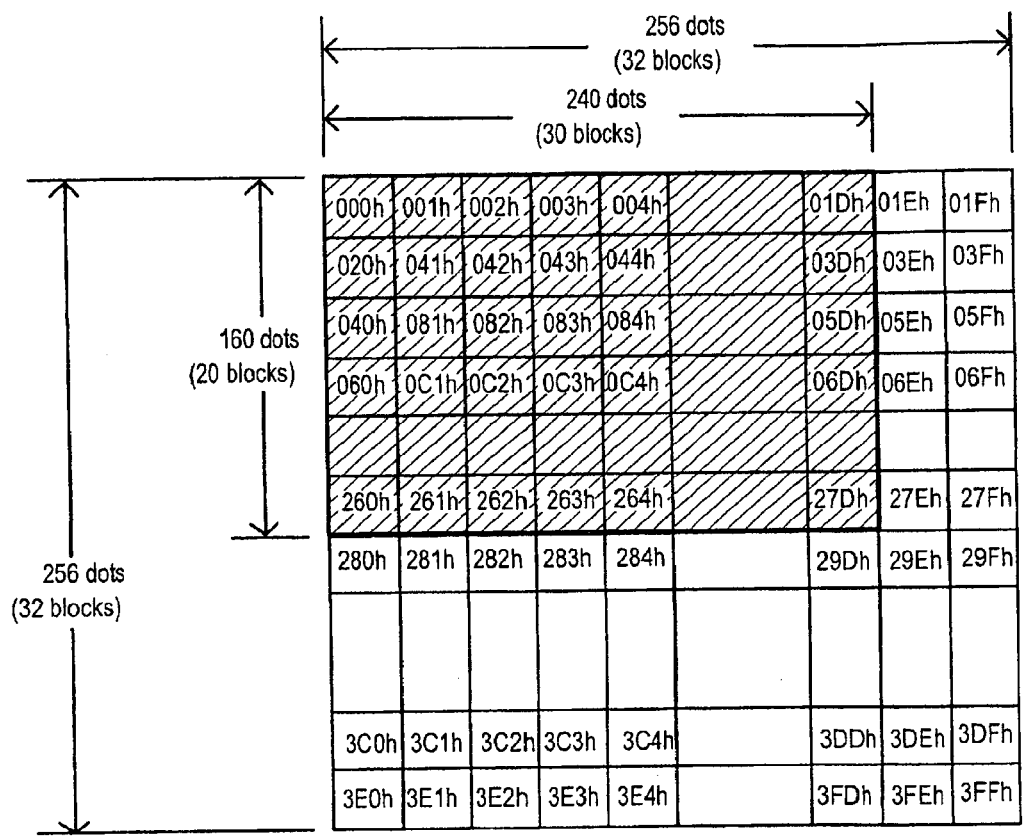
Figure 41C:
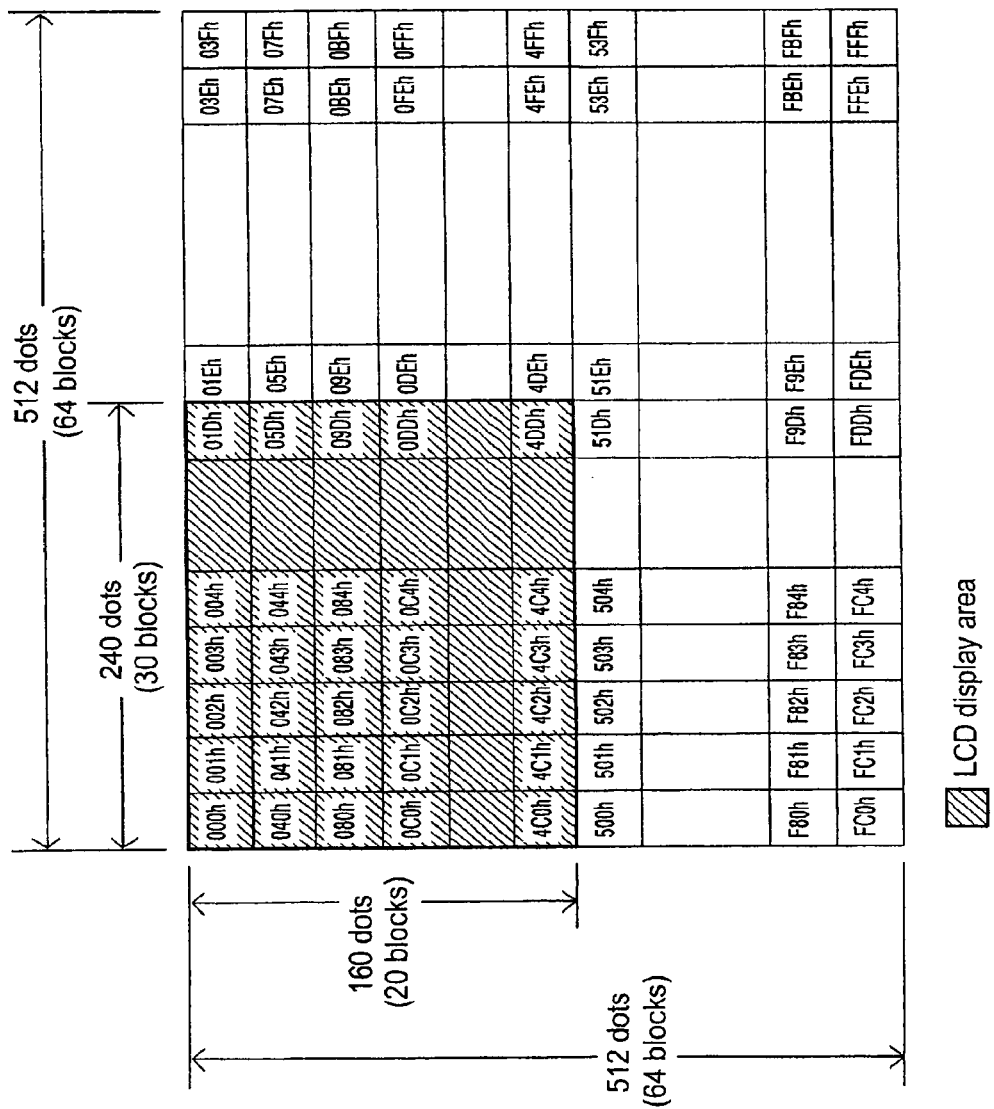
Figure 41D:
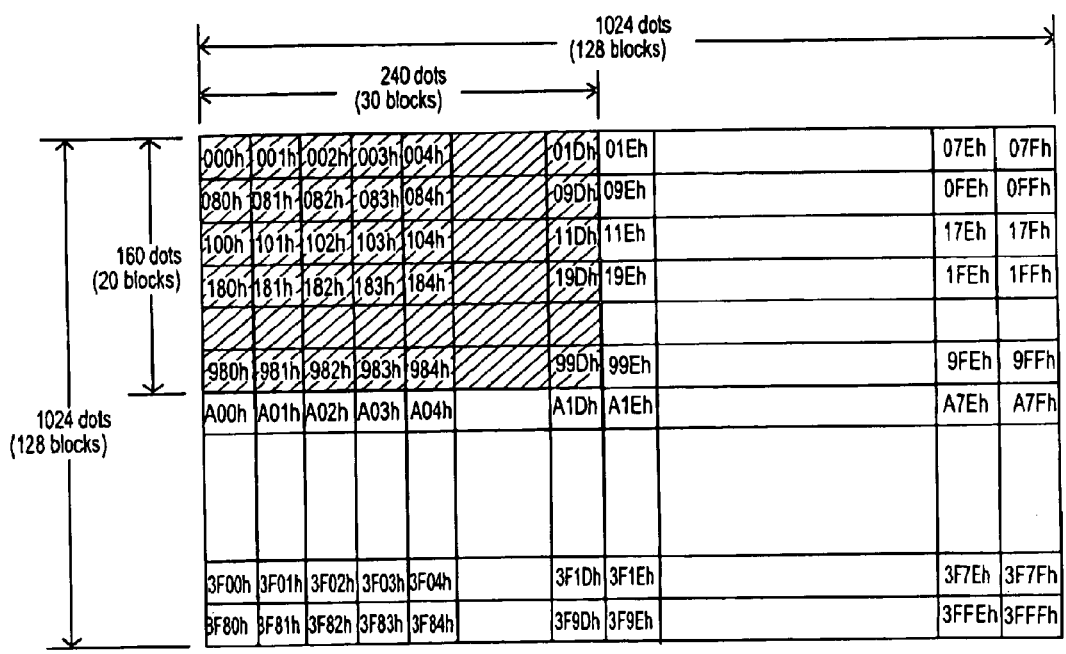

FIG. 41A shows a virtual screen size of 128×128 dots; FIG. 41B shows a virtual screen size of 256×256 dots; FIG. 41C shows a virtual screen size of 512×512 dots; and FIG. 41D shows a virtual screen size of 1024×1024 dots.

BG Rotation and Scaling Features

Figure 42A:
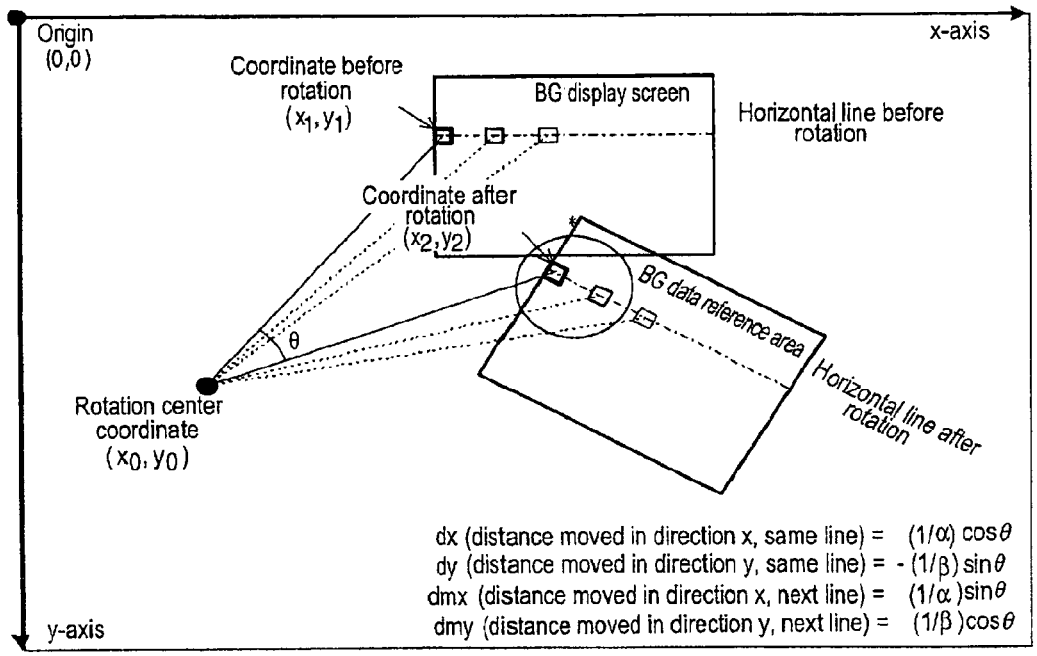
FIGS. 42A and 42B are diagrams that illustrate BG rotation and scaling data.
Figure 42B:
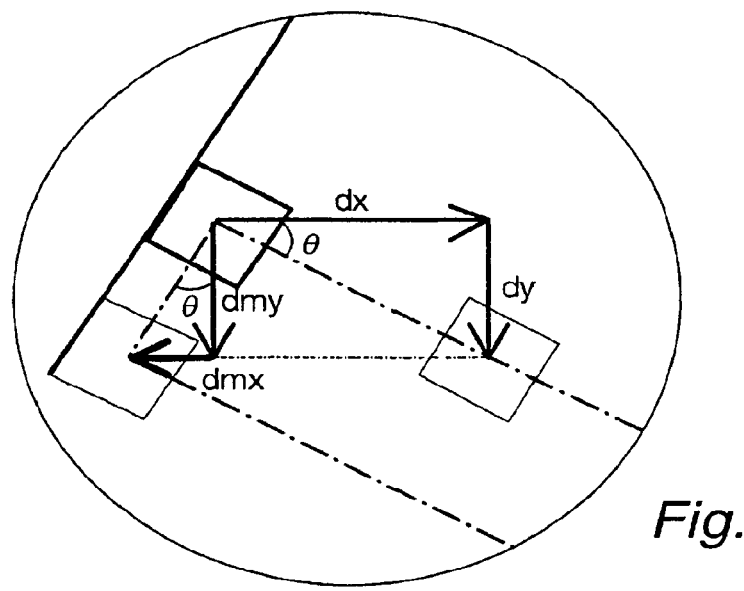

Rotation and scaling of the BG as a whole can be performed in a rotation/scaling BG screen. With rotation, BG data is referenced as shown in FIGS. 42A and 42B. BG rotation and scaling are implemented in the example AGB using the following arithmetic expressions:

$$\begin{pmatrix} x_2 \\ y_2 \end{pmatrix} = \begin{pmatrix} A & B \\ C & D \end{pmatrix} \begin{pmatrix} x_1 - x_0 \\ y_1 - y_0 \end{pmatrix} + \begin{pmatrix} x_0 \\ y_0 \end{pmatrix}$$

$$A = \frac{1}{\alpha}\cos\theta,$$

$$B = \frac{1}{\alpha}\sin\theta,$$

$$C = \frac{1}{\beta}\sin\theta,$$

$$D = \frac{1}{\beta}\cos\theta$$

$$x_2 = A(x_1 - x_0) + B(y_1 - y_0) + x_0$$

$$y_2 = C(x_1 - x_0) + D(y_1 - y_0) + y_0$$

Parameters used in rotation and scaling operations are specified for BG2 and BG3 in the registers shown in FIGS. 43A-D and FIGS. 44A-D. The registers in FIGS. 43A-43D set the starting point of BG data and the registers of FIGS. 44A-D set the direction parameters of BG data. The registers for the starting point of BG data are also used when scaling/rotation BG and bitmap mode BG are offset displayed (scrolled). There is also an offset register for Text BG.

Operations Used in BG Rotation/Scaling Processing

The operations used in BG rotation/scaling processing are:
1. Using software, the results of the rotation/scaling operation for the left-upper coordinate of the display screen are determined and this is set as the starting point of the BG data reference in registers BG2X_L, BG2X_H, BG2Y_L, BG2Y_H, BG3X_L, BG3X_H, BG3Y_L, and BG3Y_H shown in FIGS. 43A-43D. The set values are signed fixed-point numbers (8 bits for fractional portion, 19 bits for integer portion, and 1 bit for sign, for a total of 28 bits). The BG data reference direction is set in BG2PA, BG2PB, BG2PC, BG2PD, BG3PA, BG3PB, BG3PC, and BG3PD shown in FIGS. 44A-44D. The set values are signed fixed-point numbers (8 bits for fractional portion, 7 bits for integer portion, and 1 bit for sign, for a total of 16 bits).
2. The image processing circuit sums the increases in the x direction (dx, dy) in relation to the BG data reference starting point set in the above registers, and calculates the x-coordinate.
3. When the line is advanced, the increases in the y direction (dmx, dmy) are summed in relation to the reference starting point, and the coordinate of the rendering starting point for the next line is calculated. The processing in step 2) is then performed.
4. If a register for the BG data reference starting point is rewritten during an H-blanking interval, the y-direction summation for that register is not calculated. The CPU uses this mode to change the center coordinate and the rotation/scaling parameters for each line.

Area Overflow Processing

When the display screen overflows the boundaries of the virtual screen due to a rotation/scaling operation, this BG control register can be used to select whether the area of the screen into which the overflow occurs is transparent or wraps around the display screen. See FIG. 32B.

BG Scrolling

Figure 45A:
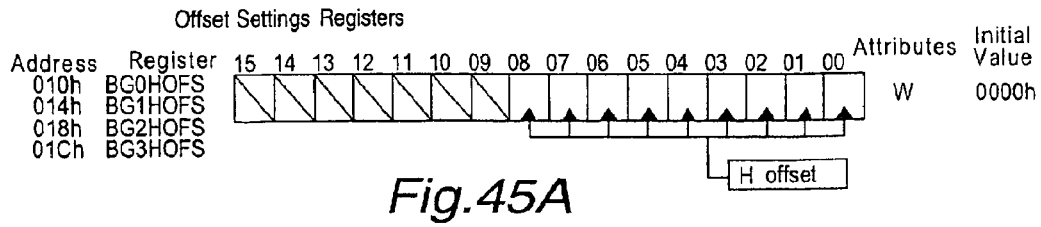
FIGS. 45A and 45B depict the horizontal offset registers BG0HOFS, BG1HOFS, BG2HOFS and BG3HOFS and the vertical offset registers BG0VOFS, BG1VOFS, BG2VOFS and BG3VOFS, respectively.
Figure 45B:
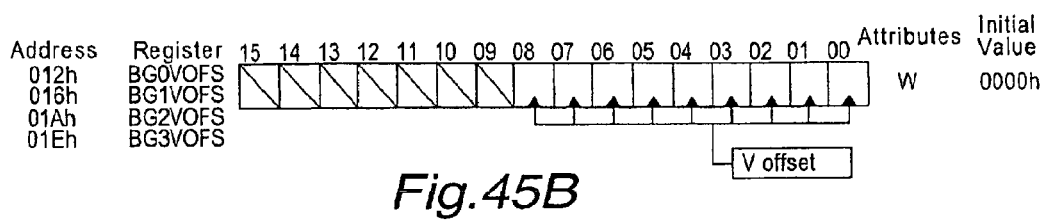
Figure 46:
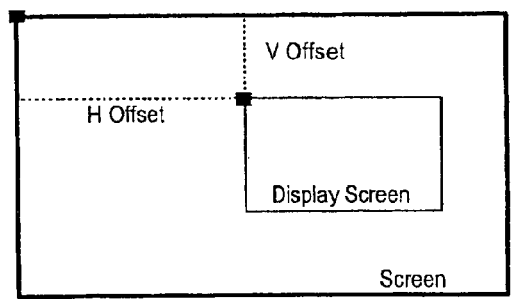
FIG. 46 illustrates horizontal and vertical offsets on a display screen.

For each text BG screen, the offset on the display screen can be specified in 1-dot increments. The offset register is only valid for Text BG. In order to offset display scaling/rotation BG and bitmap mode BG, the BG reference starting point is set. The offset setting registers BG*HOFS and BG*VOFS are shown in FIGS. 45A and 45B and an illustration depicting horizontal and vertical offset is shown in FIG. 46.

Bitmap Mode BGs (BG Modes 3-5)

In the bitmap modes, the components of the BG screen are handled in pixel units, and the contents of VRAM (frame buffer) are displayed as color data for each dot on the screen.

BG Control

Figure 47:
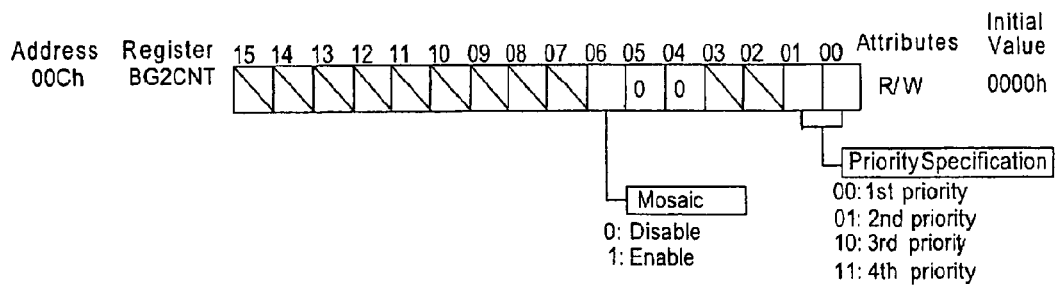
FIG. 47 depicts the BG2CNT register.

The bitmap BG will be assumed to be BG2. Therefore, in order to display the content of the frame buffer on the LCD screen, the BG2 display flag is set to ON in the DISPCNT Register (see FIG. 29). For BG control, the BG2CNT register shown in FIG. 47 is used.

BG2CNT [d06] (Mosaic) controls the ON/OFF of mosaic processing for BG2. When ON, the settings for the Mosaic Size Register, MOSAIC, are referenced (see FIG. 35).

BG2CNT [d01-00] (Priority Among BGs) set priority among BGs. Because in bitmap mode there is only one BG plane (other than the backdrop plane), there is no priority relationship among BGs, but priorities can be set up with OBJs.

BG Rotation/Scaling

The parameters for Bitmap BG Rotation/Scaling use BG2 related registers (BG2X_L, BG2X_H, BG2Y_L, BG2Y_H, BG2PA, BG2PB, BG2PC, and BG2PD). With Bitmap BG, if the displayed portion exceeds the edges of the screen due to the rotation/scaling operation, that area becomes transparent.

Pixel Data

In the bitmap modes, only the amount of pixel data corresponding to the size of the display screen can be stored in VRAM. Available bitmap modes allow the simultaneous display of 32,768 colors (BG modes 3 and 5) and the display of 256 of the 32,768 colors (BG mode 4). The format of the data in the frame buffer differs between the modes as described below.

1. 32,768-Color Simultaneous Display Format (BG Modes 3 and 5)—Palette RAM is not referenced and each pixel uses a half-word as shown in FIG. 48A.

2. 256-Color (of 32,768) Display Format (BG Mode 4)—Palette RAM color data (256 of the 32,768 colors storable) are referenced and each pixel uses 1 byte as shown in FIG. 48B.

Pixel Data Address Mapping for the LCD Screen

The different address mappings for the different BG modes are described below with reference to FIGS. 49-51. The frame buffer (VRAM) starts at address 06000000h. Thus, to see the addresses used by the CPU, 6000000h should be added to the addresses shown in FIGS. 49-51.

BG Mode 3 (32,768 Colors, 240×160 Dots, 1 Frame Buffer)

Because there is a single frame buffer, this mode is used mainly for still images. However, it enables 32,768 colors to be displayed simultaneously over the full screen. The address mapping for this BG mode is shown in FIG. 49.

BG Mode 4 (256 Colors, 240×160 Dots, 2 Frame Buffers)

Two frame buffers are allocated in VRAM, making this mode suitable for full-motion video. Of the total of 32,768 colors, 256 can be displayed simultaneously over the full screen. The address mapping for this mode is shown in FIGS. 50A and 50B.

BG Mode 5 (32,768 Colors, 160×128 Dots, 2 Frame Buffers)

Although there are 2 frame buffers, the display area is limited in this mode to enable simultaneous display of 32,768 colors. The address mapping for this mode is shown in FIGS. 51A and 51B.

OBJ (Object)

OBJ Function Overview

Objects are in character format regardless of the BG mode. However, the number of basic characters that can be defined varies depending on the BG mode as illustrated with reference to Table VIII.

TABLE VIII

| Item | Function |
|---|---|
| Number of display colors | 16 colors/16 palettes or 256 colors/1 palette (mixed display possible) |
| Number of characters (8 × 8 dots) | 1024 (16 colors × 16 palettes): in BG modes 0-2<br>512 (256 colors × 1 palette): in BG modes 0-2<br>512 (16 colors × 16 palettes): in BG modes 3-5<br>256 (256 colors × 1 palette): in BG modes 3-5 |
| Character size | 8 × 8-64 × 64 dots (12 types) |
| Max. number per screen | 128 (64 × 64 dot conversion) |
| Max. number per line | 128 (8 × 8 dot conversion) |
| Color special effects | HV flip, semi-transparency, mosaic, priority specification, OBJ windows |

OBJ Display Capability on a Single Line

The single-line OBJ display capability shown in Table VIII is the capability at maximum efficiency. When the displayed OBJ are arranged continuously from the start of OAM, the OBJ display capability on a single line can be calculated using the following formula:

(Number of $H$ Dots×4−6)/Number of Rendering Cycles=$OBJ$ Displayable on a single line(Max. of 128)

The "Number of H Dots" is usually 308 dots, but when the H-Blank Interval OBJ Processing Flag for Register DISPCNT is set to 1, there are 240 dots. "×4" expresses the number of cycles that the OBJ Rendering Circuit can use per one dot. "−6" represents the number of cycles needed for processing before OBJ rendering at the start of the H Line. The "Number of Rendering Cycles" and the corresponding number of OBJ displayable for a single line is expressed in Table Ix.

TABLE IX

| | Number of Rendering Cycles | | Number of OBJ displayable on single line | |
|---|---|---|---|---|
| OBJ H Size | Normal OBJ | Rotation/ Scaling OBJ | Normal OBJ | Rotation/ Scaling OBJ |
| 8 | 8 | 26 | 128 | 47 |
| 16 | 16 | 42 | 76 | 29 |
| 32 | 32 | 74 | 38 | 16 |
| 64 | 64 | 138 | 19 | 8 |
| 128 (double the size of 64) | X | 266 | X | 4 |

If the number for non-displayed (outside of the screen) OBJ in the OAM is lower than that for displayed OBJ, the bigger the non-displayed OBJ's size is, the less efficient the rendering will be.

Character Data Mapping

With OBJ character data, the basic character is 8×8 dots, and characters between 8×8 and 64×64 dots can be handled (total of 12 types). The base address of OBJ character data is a fixed VRAM base address. The OBJ character data capacity allocated is either 32 Kbytes or 16 Kbytes, depending on the BG mode. There are 2 types of mapping to the character area, and they can be specified in bit [d06] of the DISPCNT register (see FIG. 29).

VRAM 2-Dimensional Mapping for OBJ Characters

Figure 52:
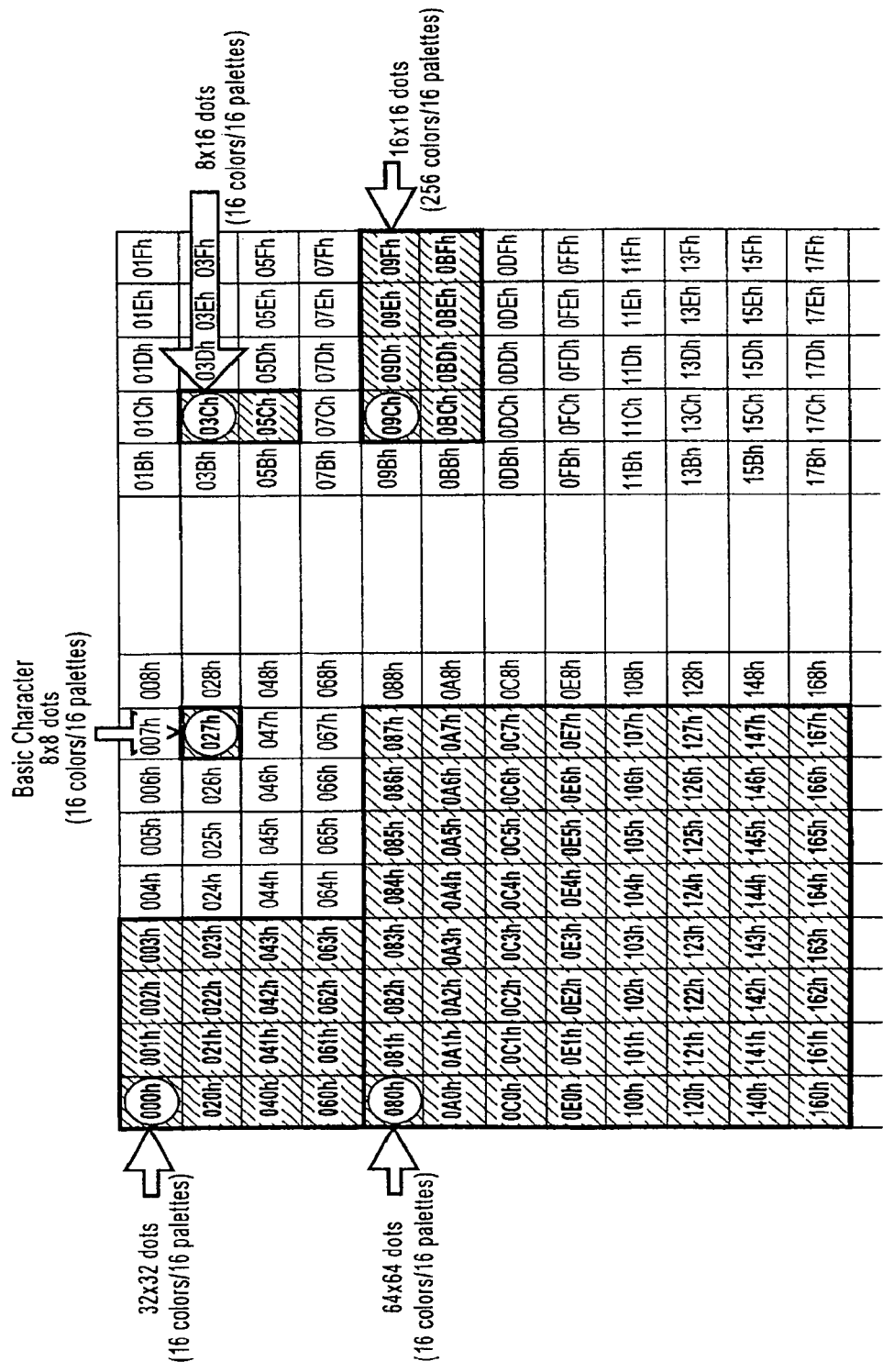
FIG. 52 is a memory map for a 2-dimensional mapping mode.

Setting the DISPCNT register bit [d06] to 0 results in the 2-dimensional mapping mode shown in FIG. 52.

VRAM 1-Dimensional Mapping for OBJ Characters

Figure 53:
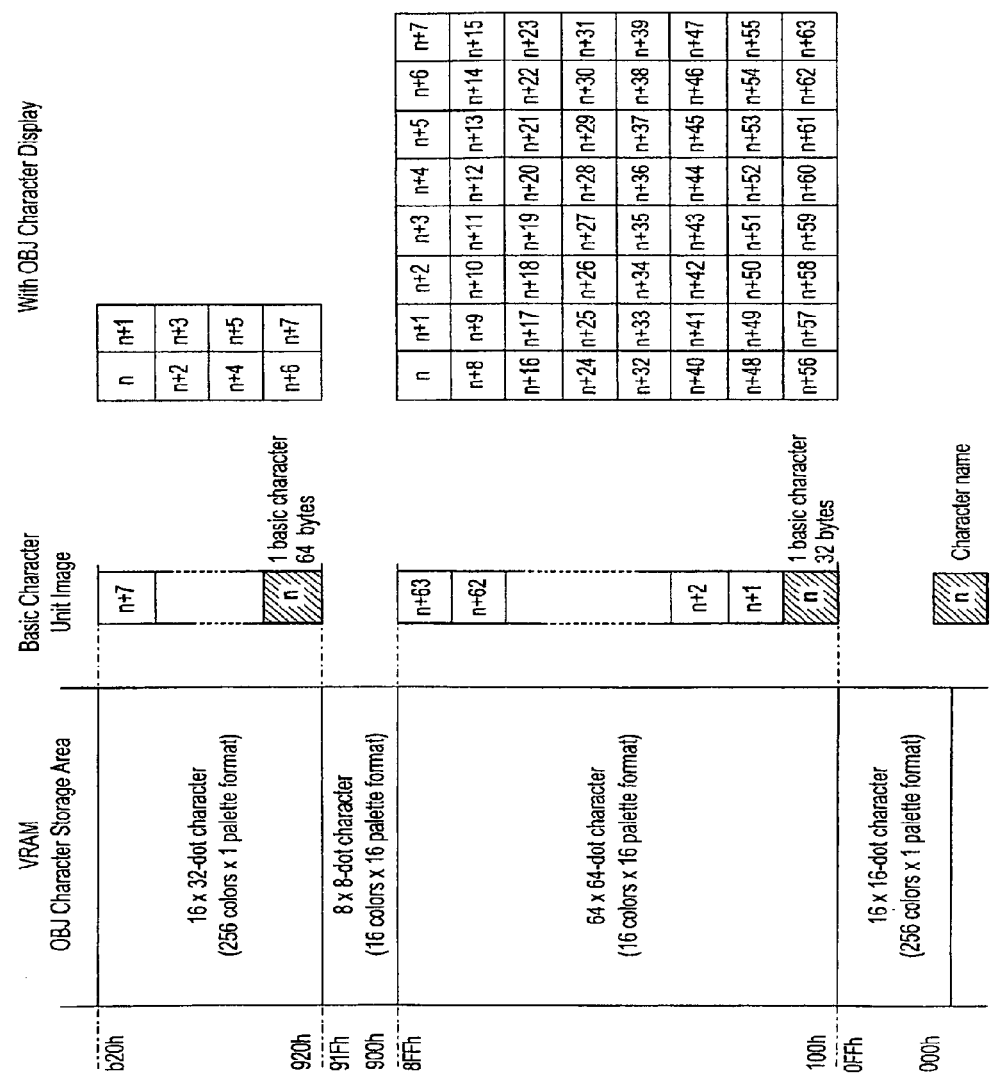
FIG. 53 is a memory map for a 1-dimensional mapping mode.

Setting the DISPCNT register bit [d06] to 1 results in the 1-dimensional mapping mode shown in FIG. 53. The data that make up a character are stored in contiguous addresses.

OAM

OBJs are displayed by placing data in OAM. OBJ data for 128 OBJs can be written to internal CPU OAM (addresses 07000000h-070003FFh), and 128 OBJ characters of an arbitrary size can be displayed on the LCD.

OAM Mapping

Figure 54:
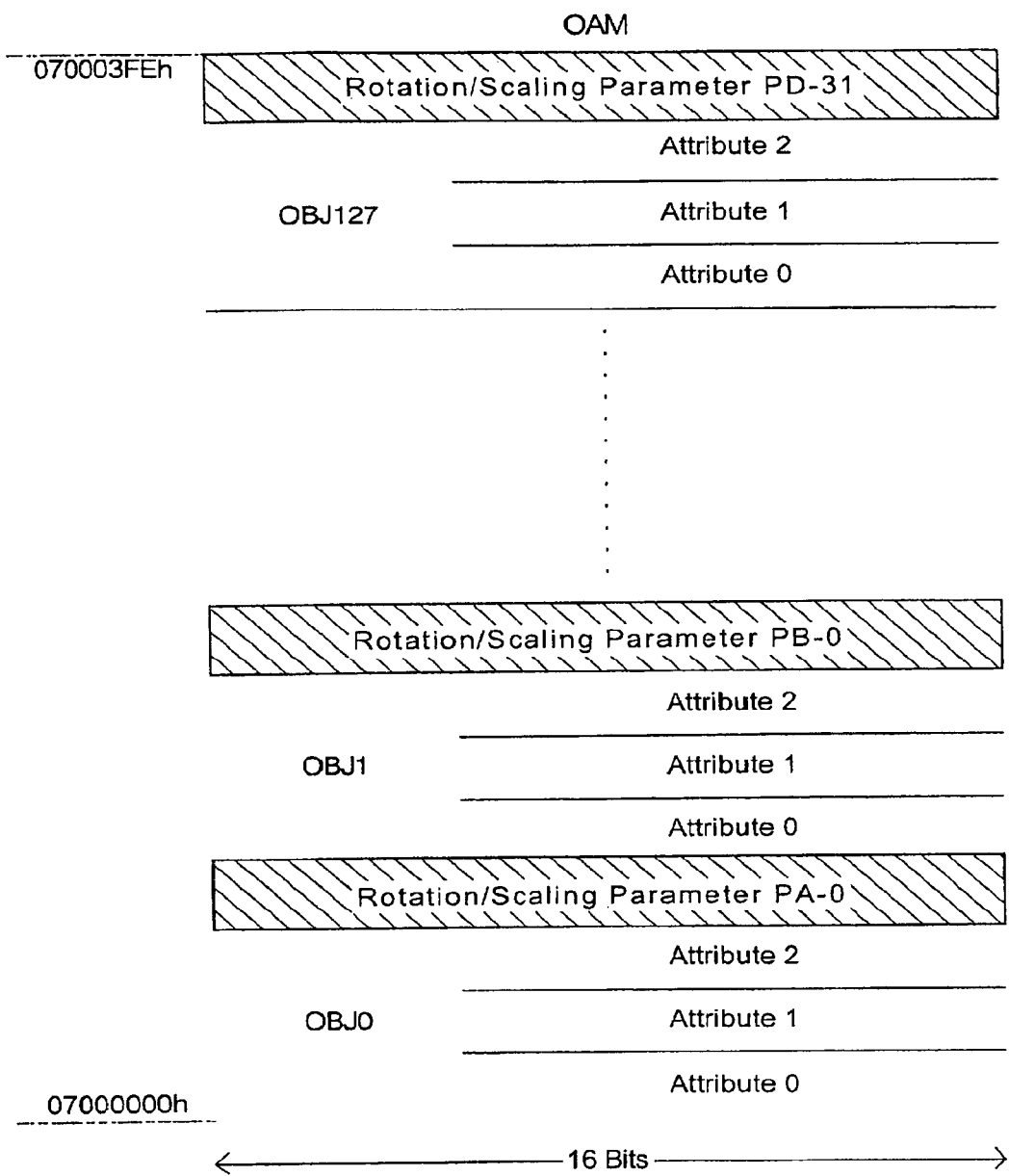
FIG. 54 depicts rotation/scaling parameter combinations written to OAM.

OBJ attributes occupying 48 bits×128 OBJs can be written to OAM. In addition, when rotation/scaling are performed for an OBJ, a total of 32 instances of rotation/scaling parameter combinations (PA, PB, PC, and PD) can be written to OAM, as shown in FIG. 54.

Figure 55A:
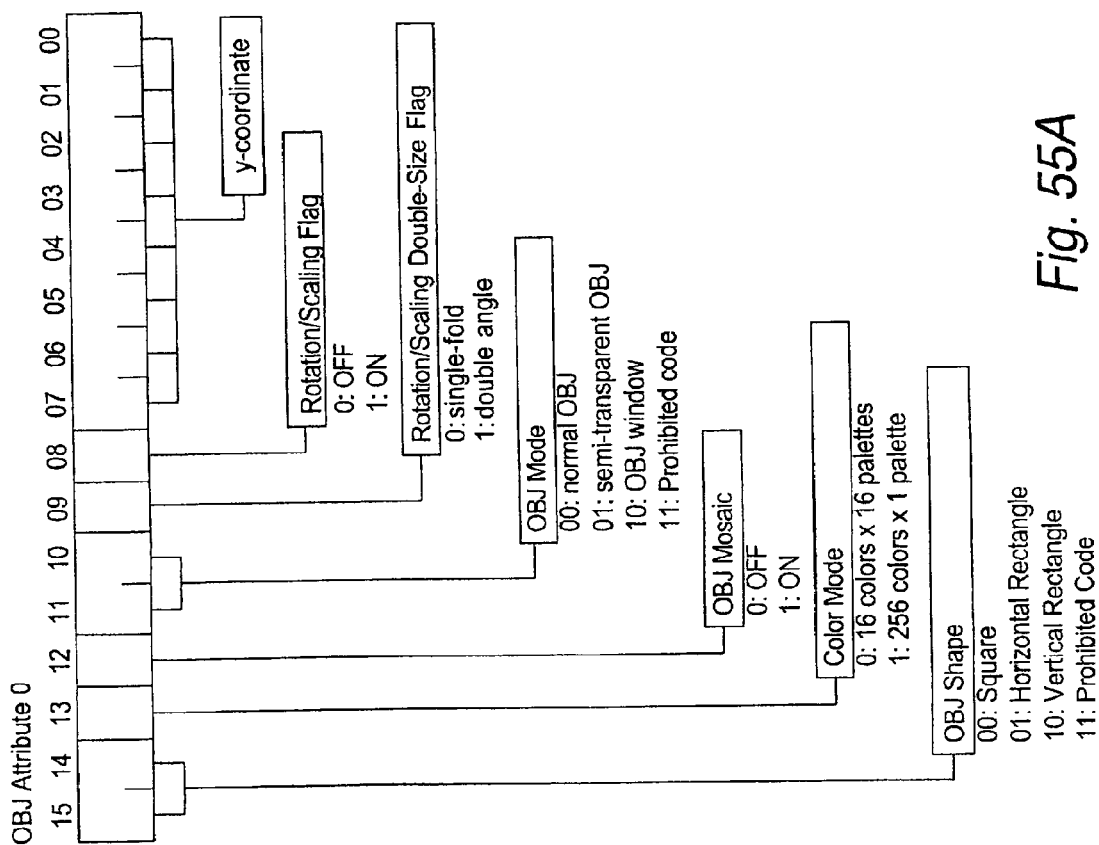
FIGS. 55A-55C illustrate OBJ Attribute 0, OBJ Attribute 1 and OBJ Attribute 2 data, respectively.
Figure 55B:
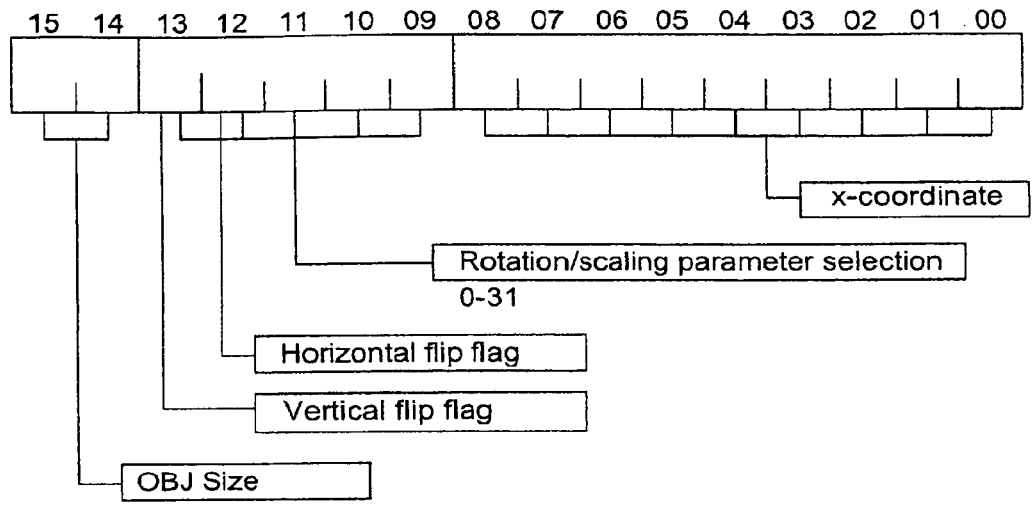
Figure 55C:
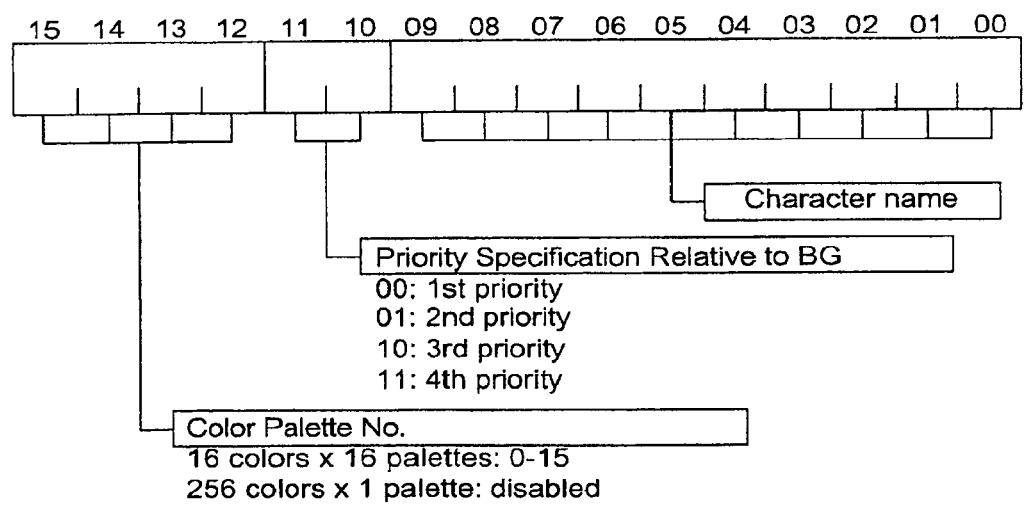

The OBJ Attribute registers are shown in FIGS. 55A-55C. With reference to FIG. 55A, [d15-14] (OBJ Shape) select the OBJ character shape: square, horizontal rectangle, or vertical rectangle. In the example AGB, [d15-14]=11 is prohibited.

[d13] (Color Mode Flag) specifies whether the OBJ data format is 16 colors×16 palettes mode or 256 colors×1 palette mode.

[d12] (OBJ Mosaic Flag) turns mosaic for OBJs on and off.

[d11-10] (OBJ Mode) specify whether an OBJ is a normal OBJ or a semitransparent OBJ. A normal OBJ is specified by 00, a semi-transparent OBJ by 01, and an OBJ window by 10. In the example AGB, [d11-10]=11 is prohibited. When a semi-transparent OBJ is specified, color special effects processing can be performed. The color special effects are described below. OBJs for which an OBJ window specification is used are not displayed as normal OBJs—dots with non-zero character data are used as the OBJ window.

Figure 56:
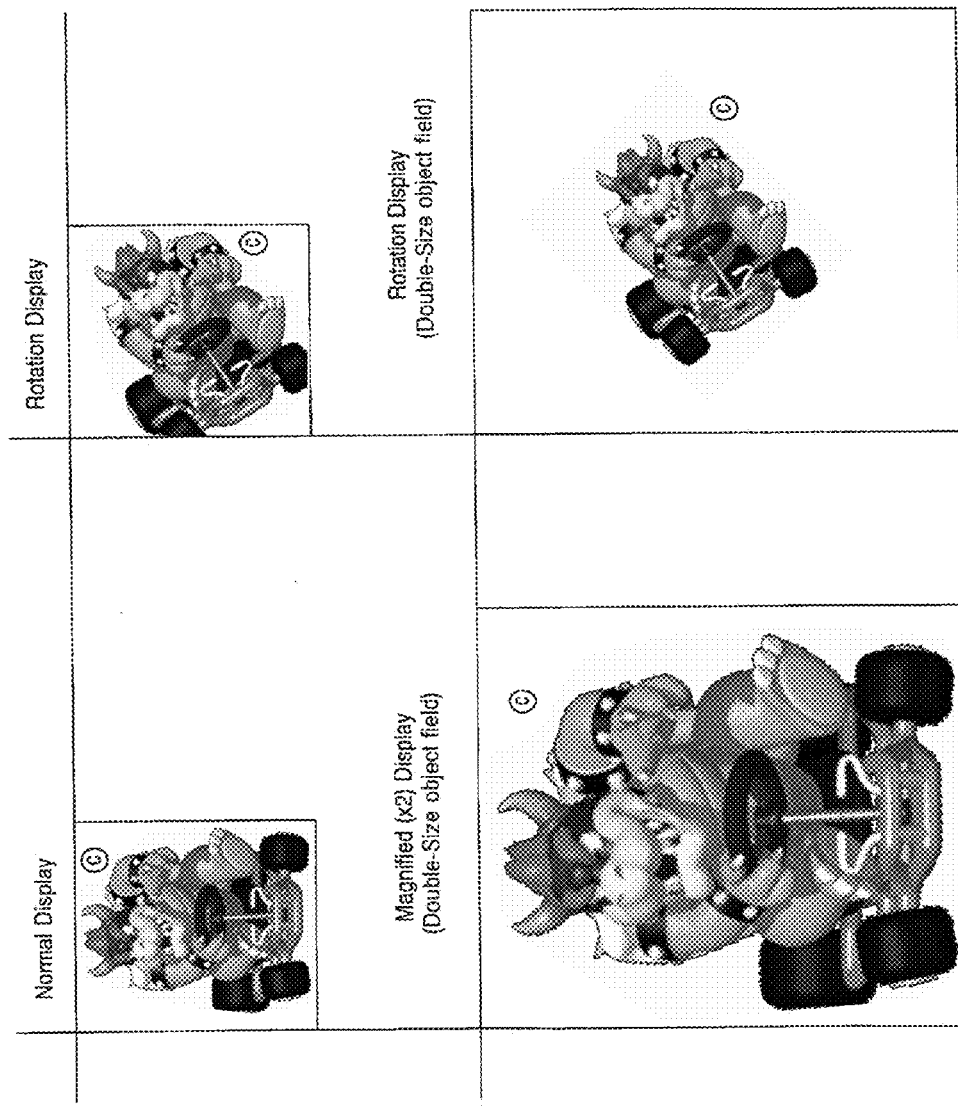
FIG. 56 illustrates normal display, rotation display, magnified display and rotation display (double-size character field) for an OBJ character.

[d09] (Rotation/Scaling Double-Size Flag)—OBJs are limited in size by the OBJ field (8×8–64×64 dots), and the character data may surpass the boundaries of this field when rotated. This problem can be avoided by implementing a pseudo double-size for the OBJ field, by setting the double-size flag to 1. With this setting, the OBJ does not surpass the boundaries of the OBJ field even if the OBJ display is magnified by up to two-fold. By way of example with reference to FIG. 56: 64×64 dot OBJ field→128×128 dot field displayed with rotation processing. However, the OBJ display position is shifted. With the double-size flag set to 0, display of the portion protruding from the edges is cut off.

[d08] (Rotation/Scaling Flag) allows rotation processing for the OBJ to be enabled and disabled. With the OBJ rotation/scaling feature enabled by setting this bit to 1, the maximum number of OBJs displayed per line is decreased.

[d07-00] (Y-coordinate) allows the y-coordinate of the OBJ in the display screen to be specified.

The OBJ Attribute 1 register is shown in FIG. 55B.

Figure 57:
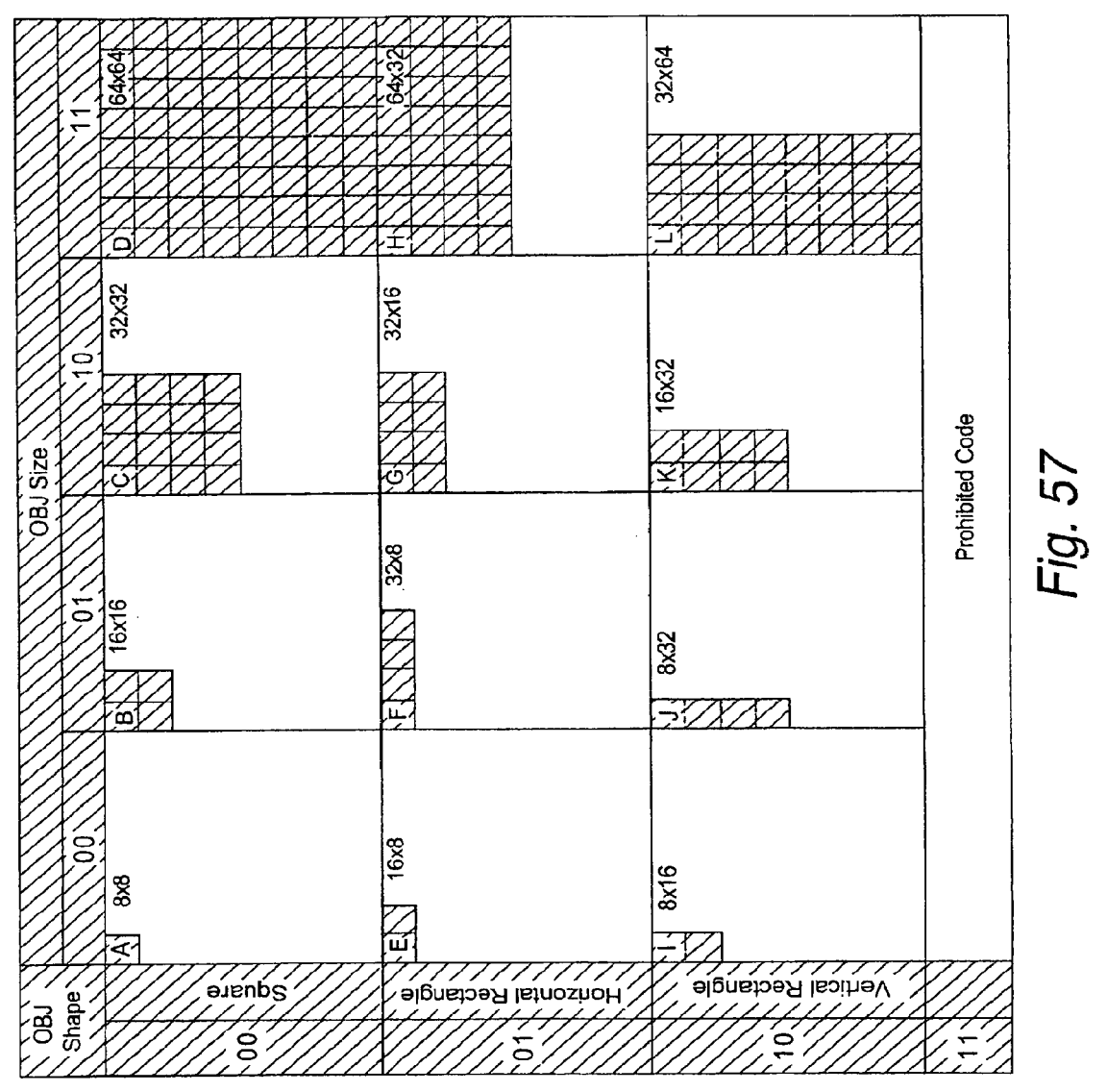

[d15-14] (OBJ Size)—linked to the specification of the OBJ size for Attribute 0, the size for the OBJ Character is also specified. For each of the three OBJ shapes, four sizes can be set as shown in FIG. 57.

[d13] [d12] (Vertical and Horizontal Flip Flags) allow the OBJ to be flipped horizontally and vertically, respectively. A normal display is produced by a setting of 0 and a flip display is produced by a setting of 1. When the rotation/scaling flag ([d08] of OBJ Attribute 0) is enabled, bits [d13] [d12] can also be used as the high-order bits of the rotation/scaling parameter selection.

[d13-09] (Rotation/Scaling Parameter Selection)—the parameters used in OBJ rotation/scaling processing are selected from the 32 parameters registered in OAM.

[d08-00] (X-Coordinate) specifies the x-coordinate of the OBJ on the display screen.

The OBJ Attribute 2 register is shown in FIG. 55C.

[d15-12] (Color Palette No.) designate the color palette number. When 16 colors×16 palettes format is specified in the color mode bit, these bits specify 1 of the 16 palettes to apply to the character data. When 256 colors×1 palette format is specified in the color mode bit, these bits are disabled.

[d11-10] (Priority Relative to BG) specify the display priority of the OBJ relative to BG. Display priority of OBJ and BG will be described below.

[d09-00] (Character Name) writes the number of the basic character located at the start of the OBJ character data mapped in VRAM.

16 Colors×16 Palettes (Color Mode=1)

Allows selection of 1,024 characters.

256 Colors×1 Palette (Color Mode=0)

Allows selection of 512 characters.

Bit 0 fixed at 0 in 2-dimensional mapping mode.

BG Mode is 3-5 (Bitmap Mode)

OBJ character data RAM is halved to 16 KB, so character name numbers 0-511 are disabled and numbers 512 and greater are used.

OBJ Rotation/Scaling Feature

Figure 58A:
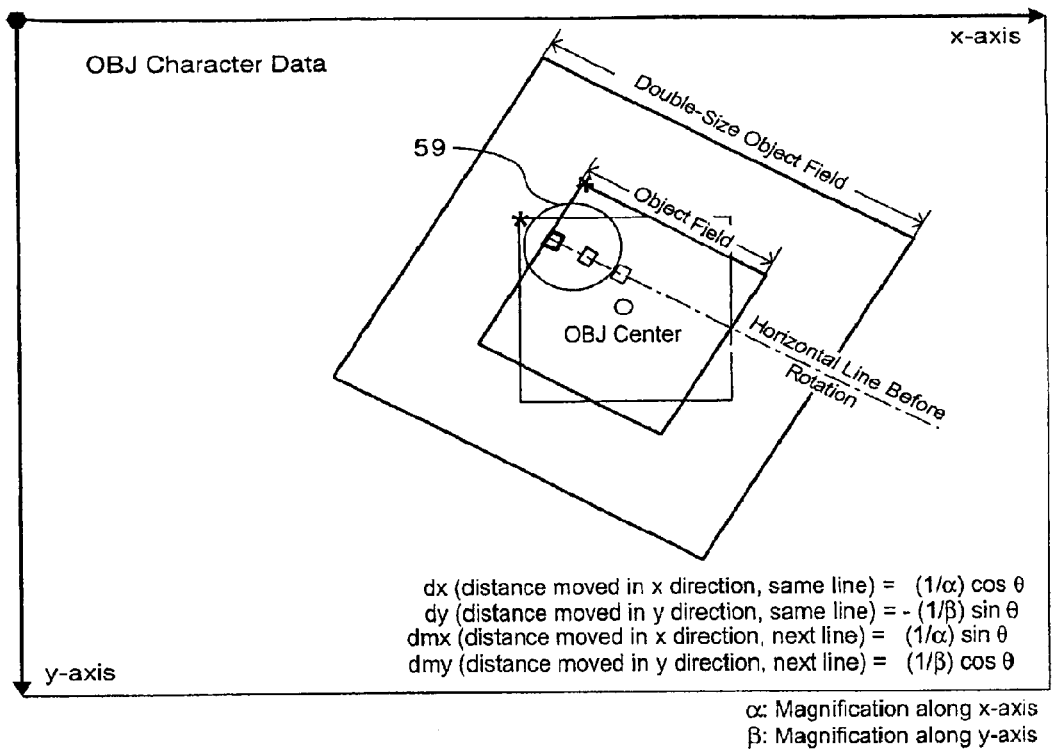
FIGS. 58A and 58B are diagrams that illustrate OBJ rotation and scaling data.
Figure 58B:
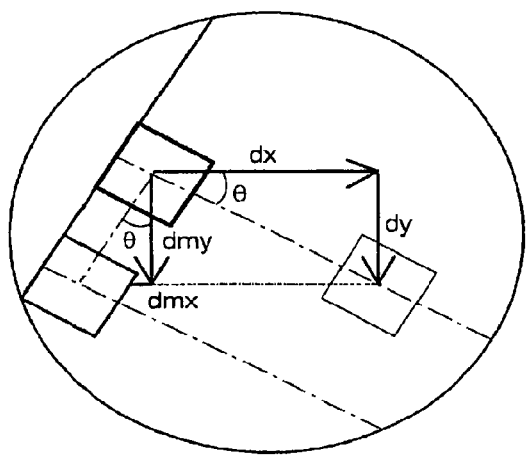
Figure 59A:
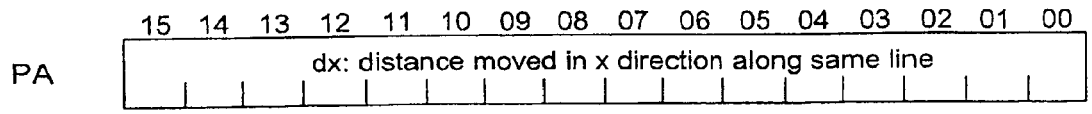
FIGS. 59A-59D depict the PA, PB, PC and PD parameters.
Figure 59B:
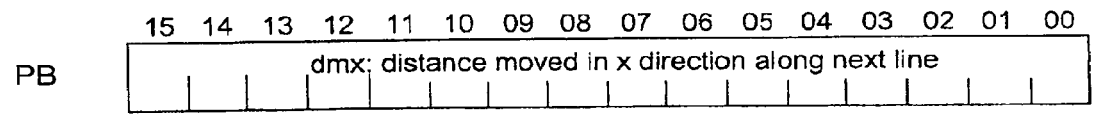
Figure 59C:
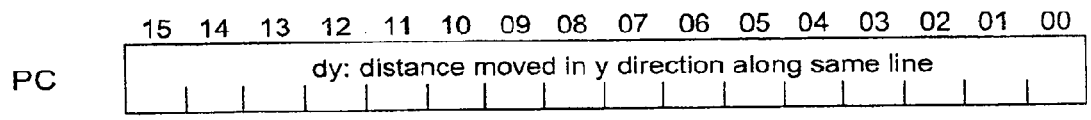
Figure 59D:
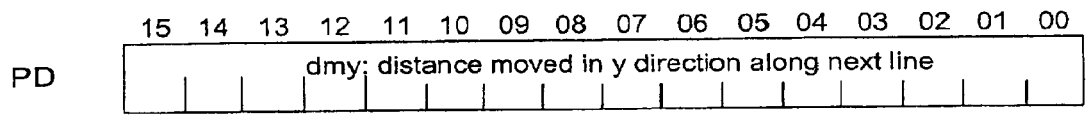

The rotation and scaling feature for OBJ is essentially the same as that for BG. With reference to FIGS. 58A and 58B, when an OBJ is displayed, the OBJ character data are referenced horizontally, beginning from the left-uppermost position. Rotation display can be achieved by adding an angle to the reference direction. The center of rotation is fixed at the center of the OBJ field. If a reference point surpasses the specified OBJ size, it becomes transparent.

Operations Used in OBJ Rotation/Scaling Processing

The following operations are used in OBJ Rotation/Scaling Processing:

1. Specify the rotation/scaling parameter number to be applied in OBJ Attribute 1 of the OAM.

2. The image-processing circuit sums the increases in the x direction (dx, dy) in relation to the center of rotation (OBJ field center), which serves as reference point, to calculate the x-direction coordinates.

3. When the line is advanced, the increases in the y-direction (dmx, dmy) in relation to the reference point are summed to calculate the coordinate of the starting point for rendering the next line. The processing in step 2) above, is then performed.

Rotation/Scaling Parameters

The rotation/scaling parameters are illustrated in FIGS. 59A-59D. These parameters specify the direction of character data reference in OBJ rotation/scaling processing. The values set for PA, PB, PC, and PD are signed, fixed-point numbers (8-bit fractional portion, 7-bit integer portion, 1-bit sign, for a total of 16 bits). These 4 parameters are used together as a single group, which can be placed in any of 32 areas in OAM.

Display Priority of OBJ and BG

Priority Among BGs

Priority among BGs can be set to any of a plurality of levels. In the example AGB, priority among BGs can be set to any one of four levels. When BGs have the same priority setting, the BG with the lowest BG number is given priority.

Priority Among OBJs

Priority among OBJs can be set to any of a plurality of levels. In the example AGB, priority among OBJs can be set to any one of four levels. When OBJs have the same priority setting, the OBJ with the lowest OBJ number is given priority.

Priority Among BGs and OBJs

Figure 60:
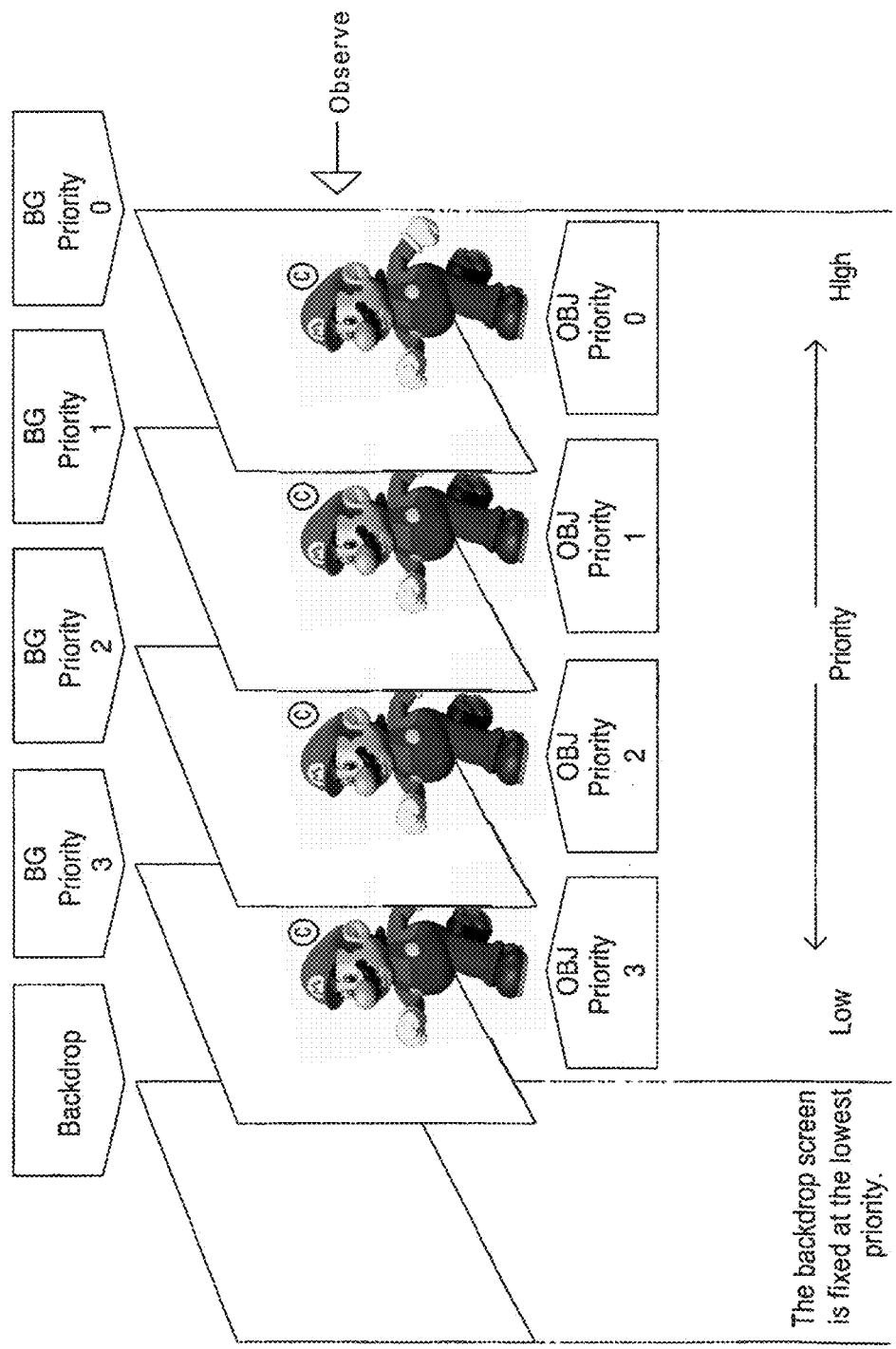
FIG. 60 illustrates the priority of OBJs and BGs.

The priority of each OBJ in relation to the BG can be set to a plurality of levels. As shown in FIG. 60, in the example AGB, the priority can be set to one of four levels. The backdrop screen is fixed at the lowest priority.

Color Palettes

Color Palette Overview

The LCD unit of the example AGB can display 32 levels of red, 32 levels of green, and 32 levels of blue, for a total of 32,768 colors. The number of colors that can be displayed at once varies with the BG mode. Color palettes are used in defining character-format BGs and OBJs. As noted above, bitmap-format BG modes 3 and 5 are not palette formats. Color palettes come in the following two forms:

1. 16 Colors×16 Palettes

This mode provides 16 color palettes, each consisting of 16 colors. Color 0 for OBJ and BG palettes is forcibly allocated to transparent (color specification disabled).

2. 256 Colors×1 Palette

This mode allocates all 256 of its colors to 1 palette. Color data are represented by 15 bits (5 for Red, 5 for Green, and 5 for Blue). Colors can be selected from the total of 32,768. OBJ color 0 and BG color 0 are forcibly allocated to transparent (color specification disabled).

Color 0 Transparency

Color 0 transparency is used to render the pixels of low-priority OBJs or BGs as transparent. The color specified for color 0 of BG palette 0 is applied to the backdrop, which has the lowest priority.

Color Palette RAM

Figure 61:
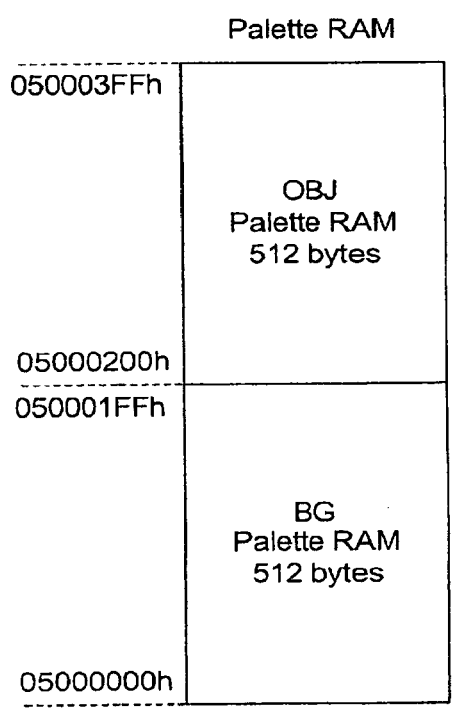
FIG. 61 illustrates the palette RAM.

OBJs and BGs use separate palettes. The size of palette RAM is large enough (512 bytes) to hold data (16-bit) for up to 256 colors (of 32,768) that can be specified. The memory map of the OBJ and BG palettes is shown FIG. 61.

Figure 62B:
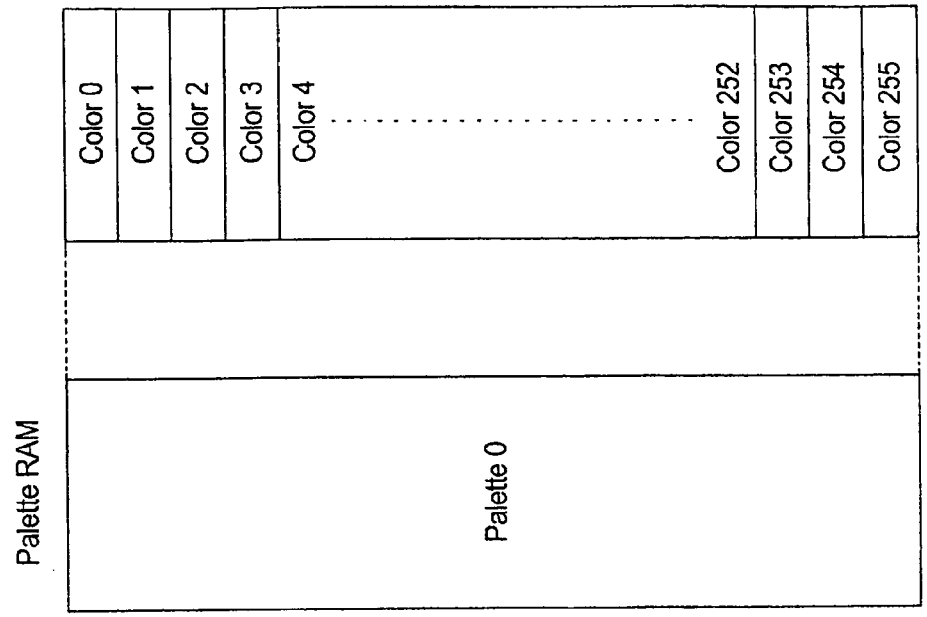
FIGS. 62A and 62B depict how the palette RAM is referenced in the 16 colors×16 palettes mode and the 256 colors×1 palette modes, respectively.
Figure 62A:
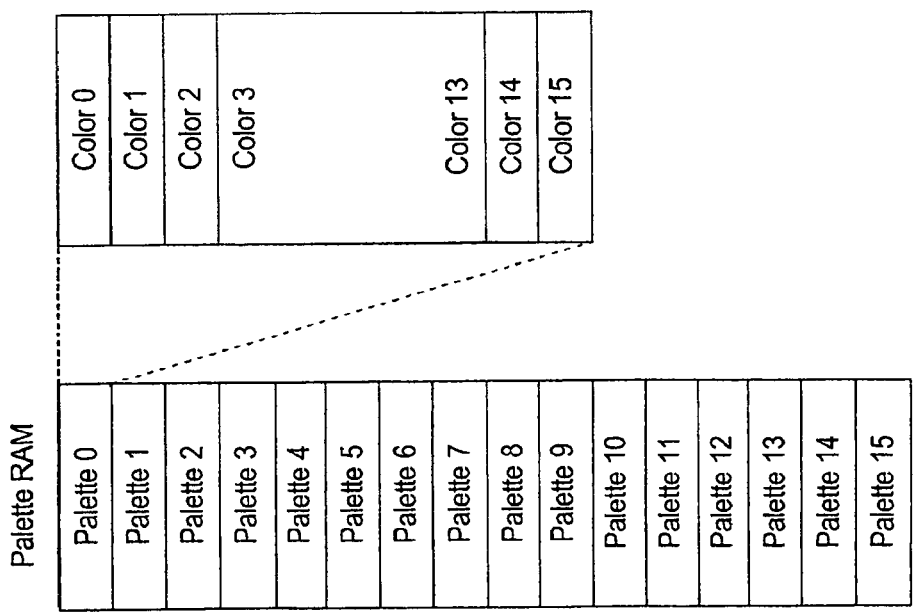

Either of 2 modes (16 colors×16 palettes and 256 colors×1 palette) can be selected for OBJ and BG. Palette RAM for these modes is referenced as shown in FIGS. 62A and 62B.

Color Data Format

Figure 63:
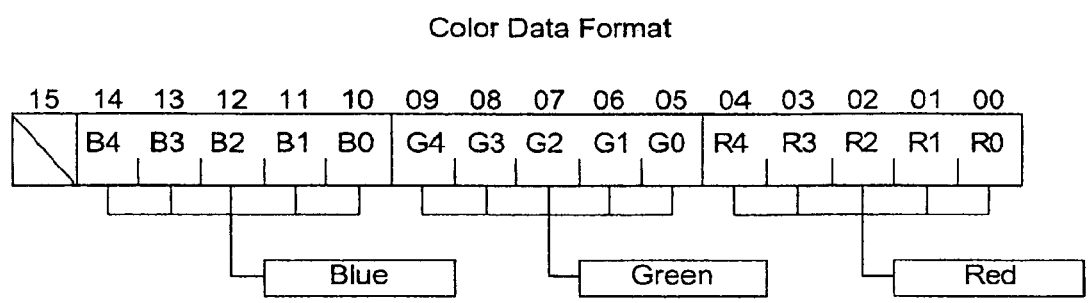
FIG. 63 illustrates the color data format.

The color data format is shown in FIG. 63 and allows 1 of 32,768 colors to be specified.

Window Feature

The example AGB can display multiple windows simultaneously. In the example AGB described herein, two windows can be displayed simultaneously. Display of the areas inside and outside the windows can be separately turned on and off. In addition, scrolling and color special effects such as rotation, alpha blending, and fade-in/fade-out can be performed for each window.

Window Position Setting

Figure 64:
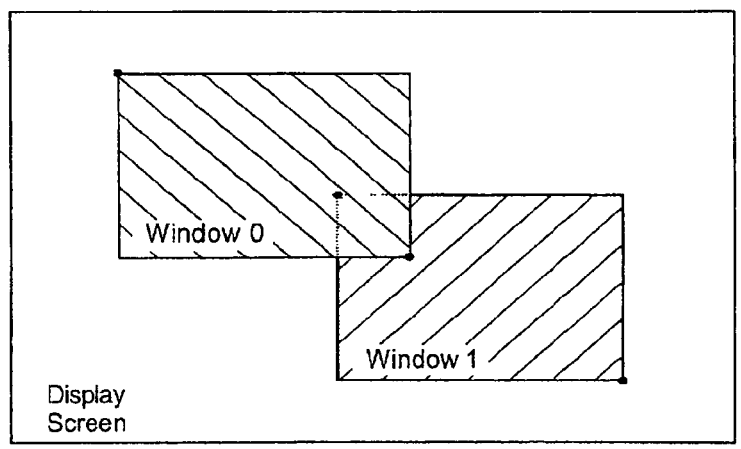
FIG. 64 illustrates a window display in which window 0 has a high priority than window 1.

The window position setting specifies the upper-left and lower-right coordinates of a rectangular area. These settings specify the window's position and size. When a non-rectangular window is displayed, the values of these registers are updated during H-blanking intervals. FIG. 64 shows a window display example in which window 0 has a higher display priority than Window 1.

Window Control

The window control registers control operations such as turning window display on and off. However, the master window display flag of the DISPCNT register has a higher priority than the WININ and WINOUT registers. The DISPCNT register is discussed above with reference to FIG. 29.

Control of Inside of Window

Figure 65:
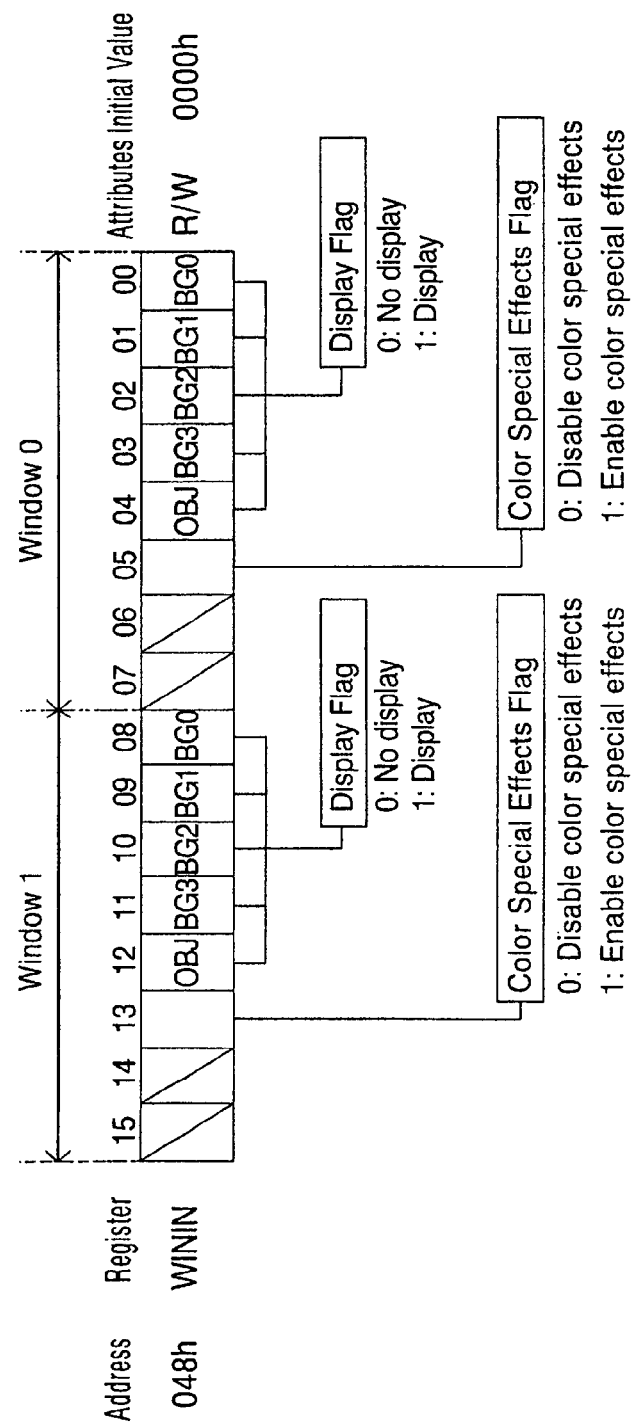

The WININ register shown in FIG. 65 controls display of the area inside windows 0 and 1. The high-order bits (d13-8) control Window 1, while the low-order bits (d5-0) control Window 0.

Control of Outside of Window and Inside of OBJ Window

Figure 66:
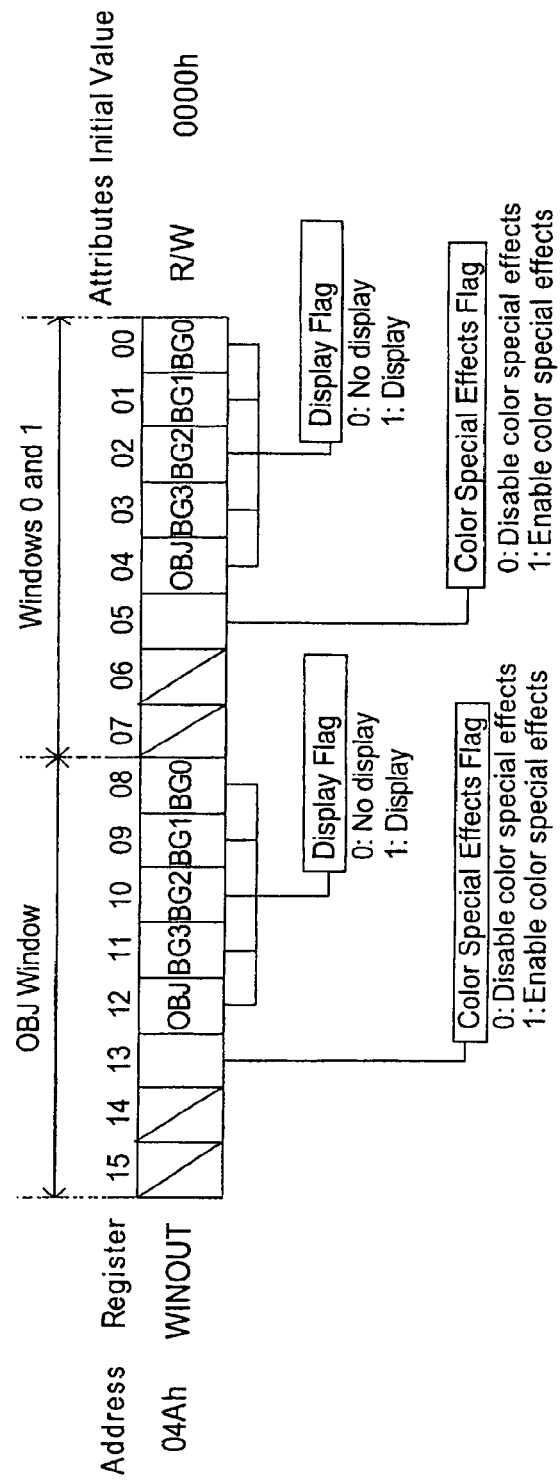

The WINOUT register shown in FIG. 66 controls display of the area outside the window. It controls both windows 0 and 1. In addition, it controls display of the area inside the OBJ window.

The register contents are now described.

WININ [d12-08][d04-00], WINOUT[d12-08][d04-00] (Display Flags) turn display of the OBJ and BG 3-0 on and off. A setting of 0 turns the corresponding display off, and a setting of 1 turns the corresponding display on.

WININ [d13][d05], WINOUT[d13][d05] (Color Special Effects Flags) enable/disable color special effects. Specifically, a setting of 0 disables color special effects and a setting of 1 enables special effects. Color special effects will be described below.

Color Special Effects

The AGB provides the following color special effects. The area in which these effects are applied can be limited using a window.

1. Alpha Blending—this effect performs arithmetic operations on two selected surfaces and implements processing for 16 levels of semi-transparency.

2. Fade-in/Fade-out—this effect performs arithmetic operations on one selected surface and implements processing for 16 levels of brightness.

Selection of Color Special Effects

Figure 67:
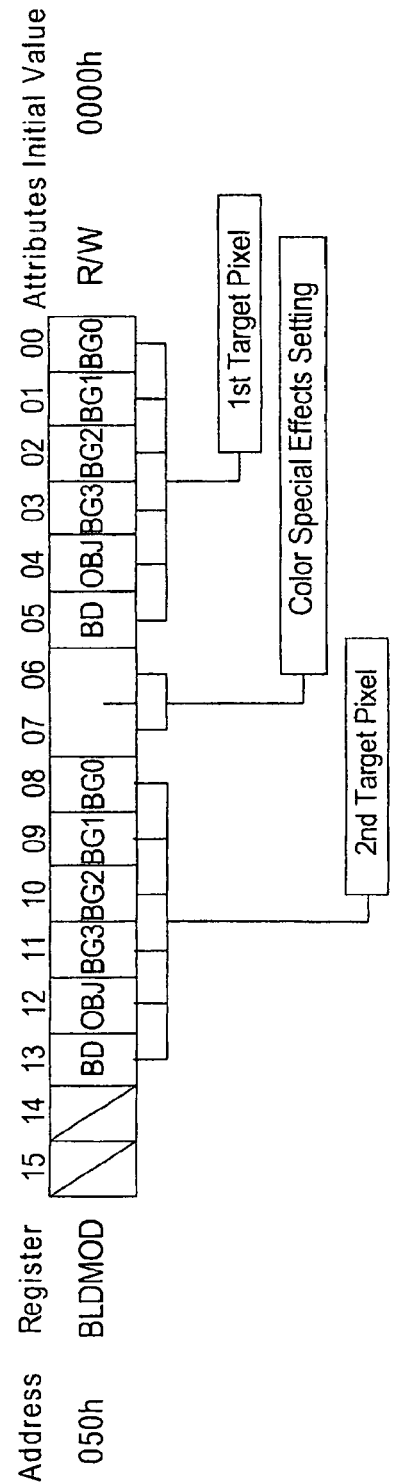

The types of color special effects and the target pixels, are determined by the BLDMOD register shown in FIG. 67. Although color special effects are specified by the BLDMOD register, for alpha blending, which involves processing between surfaces, the two target surfaces must have suitable priorities. In addition, semi-transparent OBJs are individually specified in OAM, and color special effects for the OBJ as a whole, are specified in the BLDMOD register. These specifications are summarized in Table X:

TABLE X

| BLDMOD | | | |
|---|---|---|---|
| d07 | D06 | Type | Color Special Effects Processing |
| 0 | 0 | No special effects | Normally, color special effects processing is not performed. 16-level semi-transparency processing (alpha blending) is performed only when a semi-transparent OBJ is present and is followed immediately by a second target screen. |
| 0 | 1 | Alpha blending (semi-transparency processing) | If the first target screen is followed immediately by a second target screen, 16-level semi-transparency processing (alpha blending) is performed. The bits of the backdrop of the first |

TABLE X-continued

| BLDMOD | | | |
|---|---|---|---|
| d07 | D06 | Type | Color Special Effects Processing |
| | | | target screen should be turned off ([d05] = 0). When OBJ = 1 for the first target pixel, processing is executed for all OBJs regardless of OBJ type. When OBJ = 0, processing is executed only if the OBJ is semi-transparent. |
| 1 | 0 | Brightness increase | Gradually increases brightness for first target screen. The entire screen can gradually be made whiter by setting all bits of the specification for the first target screen to 1. When OBJ = 1 for the first target screen, processing for increased brightness is executed only for normal objects. If a semi-transparent OBJ is the first target screen, alpha blending processing is always executed. |
| 1 | 1 | Brightness decrease | Brightness is gradually decreased for the first target screen. The entire screen can gradually be made blacker by setting all bits of the specification for the first target screen to 1. When OBJ = 1 for the first target screen, processing for decreased brightness is performed only for normal objects. If a semi-transparent OBJ is the first target screen, alpha blending processing is always executed. |

Color Special Effects Processing

Coefficients for Color Special Effects

The coefficients used in alpha blending processing are specified in EVA and EVB of the COLEV register shown in FIG. 68A. The coefficient used in processing brightness changes is specified in EVY of the COLY register shown in FIG. 68B. With reference to FIG. 69, the values of EVA, EVB, and EVY are numbers less than 1 and are obtained by multiplying $1/16$ by an integer.

The color special effects arithmetic expressions that use the coefficients are shown below.

1. Alpha Blending (16 Levels of Semi-Transparency) Operations

Display color($R$)=1st pixel color($R$)×$EVA$+2nd pixel color($R$)×$EVB$

Display color($G$)=1st pixel color($G$)×$EVA$+2nd pixel color($G$)×$EVB$

Display color($B$)=1st pixel color($B$)×$EVA$+2nd pixel color($B$)×$EVB$

2. Brightness Increase Operations

Display color($R$)=1st pixel($R$)+(31−1st pixel($R$))×$EVY$

Display color($G$)=1st pixel($G$)+(63−1st pixel($G$))×$EVY$

Display color($B$)=1st pixel($B$)+(31−1st pixel($B$))×$EVY$

3. Brightness Decrease Operations

Display color($R$)=1st pixel($R$)−1st pixel($R$)×$EVY$

Display color($G$)=1st pixel($G$)−1st pixel($G$)×$EVY$

Display color($B$)=1st pixel($B$)−1st pixel($B$)×$EVY$

Sound

Figure 70:
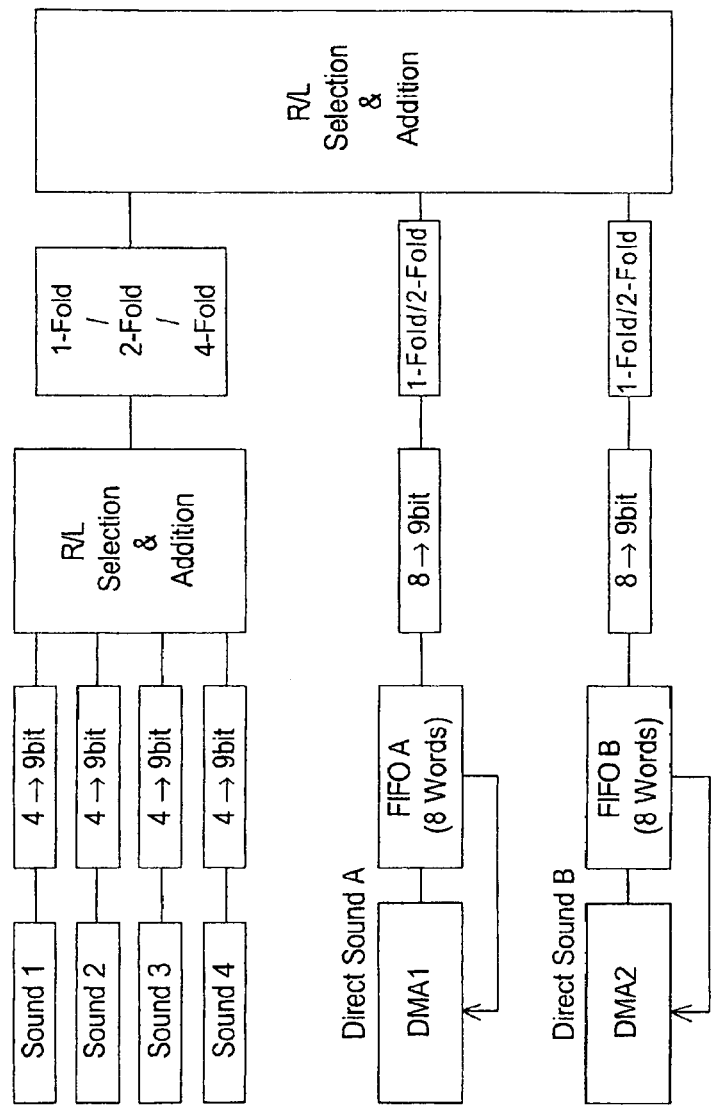
FIG. 70 is a sound block diagram.

FIG. 70 is a block diagram of an example sound system for the AGB device. As shown in FIG. 70, in addition to four channels of CGB-compatible sound, the AGB device has two channels A and B of direct sound. Direct sounds A and B provide playback of linear 8-bit audio data using the timer and DMA. Sound 1 allows generation of rectangular waveforms with sweep (frequency change) and envelope (volume change) functions. Sound 2 allows generation of rectangular waveforms with envelope functions. Sound 3 allows playback of any waveform recorded in waveform RAM. Sound 4 allows white noise generation. The synthesis ratio of sounds 1-4 to direct sound can be specified.

Figure 71A:
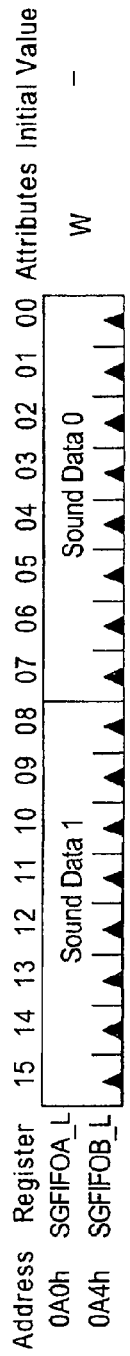
FIGS. 71A and 71B depict the SGFIFOA_L (SGFIFOB_L) and SGFIFOA_H (SGFIFOB_H) registers, respectively.
Figure 71B:
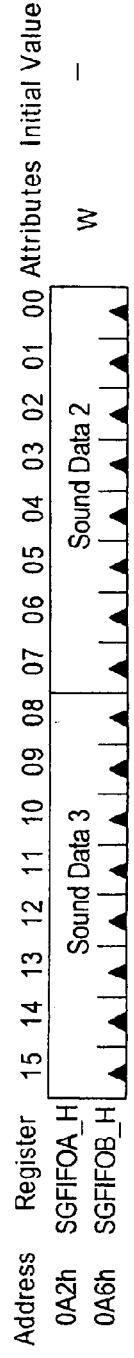

Macro-based, programmable MIDI and sound effects playback may be provided using the Factor 5 MusyX Audio Tool. The MusyX Audio Tool includes a certified Dolby™ Surround Sound encoder for continuous sample streaming and psycho-acoustic effects. It offers up to 32 mixed sample voices and fully supports the synthetic Programmable Sound Generation (PSG) voices which have been adopted from the CGB system. The key features of the sound effects playback are:

Synthesizer
Up to 32 mixed sample voices
Fully supports the synthetic Programmable Sound Generation (PSG) voices from CGB
Mixes samples in 16 bits to avoid premature clipping artifacts
Uses sample interpolation to reduce sample aliasing noise
Features pulse-width-modulated synthesis
Supports a true stereo delay buffer for reverb effects
Supports surround real time encoding for psycho-acoustic effects
Uses both dynamic and fixed voice allocation
Fully scalable
True 32-bit highly optimized assembler core routines
Sequencer
Uses MIDI-1 files with arbitrary loop points
Ability to dynamically speed up or slow down the speed of the song at run time as well as from the MIDI master track
Special MIDI controller can affect dynamic voice allocation
Can temporarily freeze song states in order to cue jingles
General
Number of sequenced songs is only limited by game cartridge memory Up to 16384 samples can be specified
Up to 16384 sound effects can be created
Direct Sounds A and B Direct sounds have two channels A and B that provide for playback of linear 8-bit audio data. The audio data are set to a bias level of 00h and are 8-bit data (+127 to −128), obtained by 2's complement. Audio data are transferred sequentially to the sound FIFOs A and B (8 word capacity) using the sound transfer mode of DMAs A and B, respectively. The sampling rate can be set to an arbitrary value using Timers 0 and 1 (described below). FIGS. 71A and 71B show the sound FIFO input registers SGFIFOA_L (SGFIFOB_L) and SGFIFOA_H (SGFIFOB_H). All sounds are PWM modulated at the final portion of the sound circuit. Thus, if the 8-bit audio sampling frequency and the timer settings are matched with the PWM sampling frequency, clean sound can be produced.

The operations for direct sound will now be described.

1. The Timer channel to be used (0 or 1) is selected using the sound control register SGCNT0_H.
2. A "0 clear" is performed for FIFO A and FIFO B using the sound control register SGCNT0_H, and the sequencer is initialized.
3. If sound is to be produced immediately after starting the direct sound, the first 8 bits of linear audio data is written to the FIFO with a CPU write.
4. The transfer mode for DMA 1 or 2 is specified.
5. The direct sound output settings are specified in the sound control register.
6. The timer is started.

After the preceding operations, the direct sound is executed as follows.

1. When the specified timer overflows due to a count up, the audio data are passed from the FIFO to the sound circuit.
2. If 4 words of data remain in the FIFO as the transfer count progresses, the FIFOs for direct sounds A and B output a data transfer request to the specified DMA channel.
3. If the DMA channel receiving the request is in sound FIFO transfer mode, 4 words of data are provided to the sound FIFO (the DMA WORD COUNT is ignored).
4. These steps are repeated beginning from step 1.

Sound 1

Sound 1 is a circuit that generates rectangular waveforms with sweep (frequency change) and envelope (volume change) functions. The contents of NR10, NR11, NR12, NR13 and NR14 for sound 1 are described with reference to FIGS. 72A-72C and are based on those of the CGB.

Figure 72A:
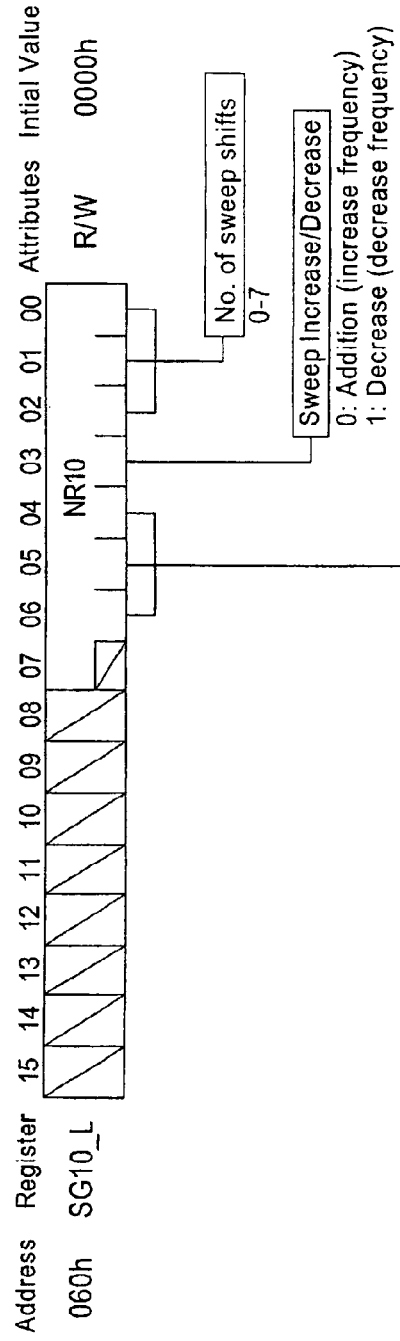
FIGS. 72A, 72B and 72C depict the SG10_L, SG10_H and SG11 registers, respectively.

FIG. 72A shows the register SG10_L that defines the NR10 byte whose bits relate to the sweep time, the sweep increase/decrease and the number of sweep shifts.

SG10_L [d06-04] (Sweep Time) specify the interval for frequency change. The possible settings for these bits and the corresponding sweep time are shown in Table XI in which f128=128 Hz.

TABLE XI

| Setting | Sweep Time |
|---|---|
| 000 | Sweep OFF |
| 001 | 1/f128 (7.8 ms) |
| 010 | 2/f128 (15.6 ms) |
| 011 | 3/f128 (23.4 ms) |
| 100 | 4/f128 (31.3 ms) |
| 101 | 5/f128 (39.1 ms) |
| 110 | 6/f128 (46.9 ms) |
| 111 | 7/f128 (54.7 ms) |

SG10_L [d03] (Sweep Increase/Decrease) specifies whether the frequency increases or decreases, "0" being used to specify increase frequency and "1" being used to specify decrease frequency. When the sweep function is not used, the increase/decrease flag is preferably set to "1".

SG10_L [d02-00] (Number of Sweep Shifts) specifies the number of sweeps. The frequency data with a single shift are determined according to the following formula, with $f_{(t)}$ signifying the frequency after a shift and $f_{(t-1)}$ signifying the frequency before the shift:

$$f_{(t)} = f_{(t-1)} \pm \frac{f_{(t-1)}}{2^n}$$

$f_{(0)}$ = Initial frequency data

If the addition according to this formula produces a value containing more than 11 bits, the sound output is stopped and the Sound 1 ON flag (bit 0) of NR52 byte (see FIG. 78C) is reset. With subtraction, if the subtrahend is less than 0, the pre-subtraction value is used. However, if the specified setting is 0, shifting does not occur and the frequency is unchanged.

Figure 72B:
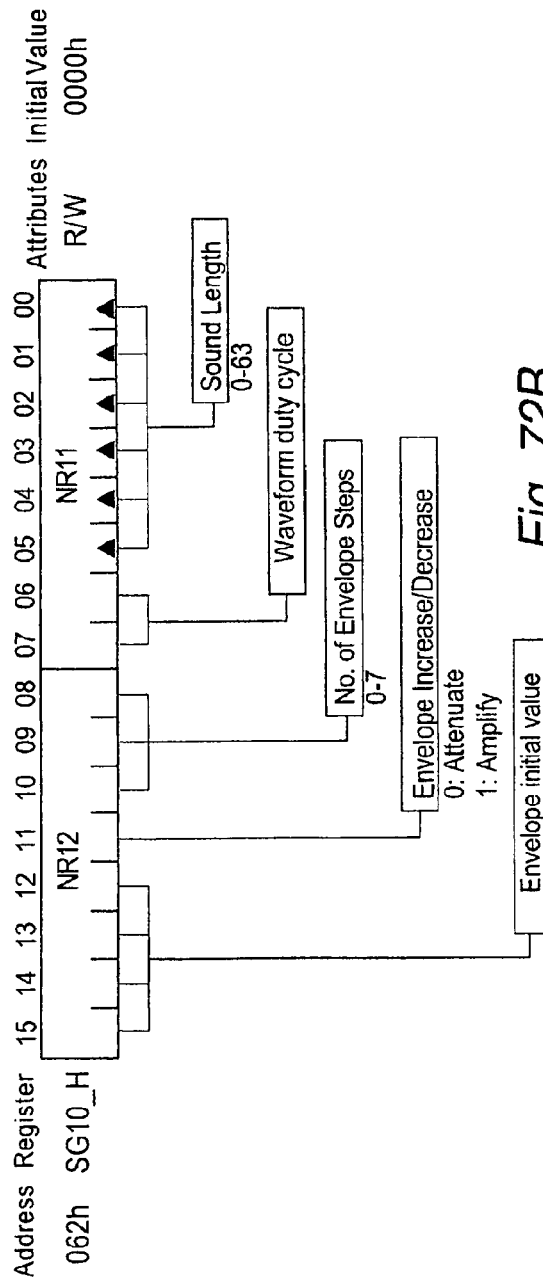

FIG. 72B shows the register SG10_H that defines the NR11 and NR12 bytes whose bits relate to envelope initial value, envelope increase/decrease, number of envelope steps, waveform duty cycle, and sound length.

SG10_H [d15-12] (Envelope Initial Value) allows specification of any of 16 levels ranging from maximum to mute.

SG10_H [d11] (Envelope Increase/Decrease) specifies whether to increase or decrease the volume (0:attenuate, 1:amplify).

SG10_H [d10-08] (Number of Envelope Steps) sets the length of each step of envelope amplification or attenuation. With n the specified value, the length of 1 step (steptime) is determined by the following formula:

$$\text{steptime} = n \times \frac{1}{64} \text{ (sec)}$$

When n=0, the envelope function is turned off.

Figure 73:
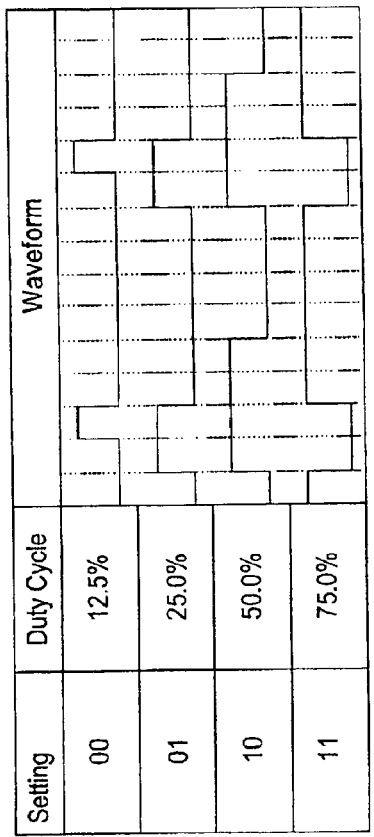
FIG. 73 illustrates waveform duty cycles to which SG10_H [d07-06] can be set.

SG10_H [d07-06] (Waveform Duty Cycle) specify the proportion of amplitude peaks for the waveform. With reference to FIG. 73, the setting "00" specifies a duty cycle of 12.5%; "01" specifies a duty cycle of 25.0%; "10" specifies a duty cycle of 50.0%; and "11" specifies a duty cycle of 75.0%.

SG10_H [d05-00] (Sound Length) specify the sound length. With st signifying the sound length, the length of the output sound is determined by the following formula:

$$\text{time} = (64 - st) \times \frac{1}{256} \text{ (sec)}$$

Figure 72C:
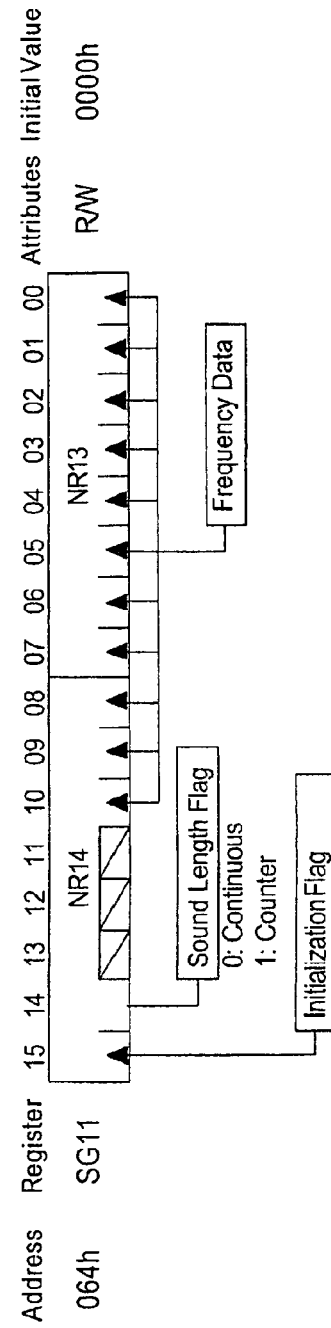

FIG. 72C shows the register SG11 that defines the NR13 and NR14 bytes whose bits relate to an initialization flag, a sound length flag and frequency data.

SG11 [d15] (Initialization Flag) is an initialization flag. A setting of "1" causes Sound 1 to restart.

SG11 [d14] (Sound Length Flag) is a sound length flag. When this flag is "0", sound is continuously output. When this flag is "1", sound is output only for the length of time specified for the sound length in NR11. When sound output ends, the Sound 1 ON flag of NR52 is reset.

SG11 [d10-00] (Frequency Data) is frequency data. With fdat signifying the frequency, the output frequency (f) is determined by the following formula:

$$f = \frac{4194304}{4 \times 2^3 \times (2048 - fdat)} \text{Hz}$$

Thus, the specifiable range of frequencies is 64 to 131.1 kHz.

When the sweep function is not used, the sweep time should be set to 0 and the sweep increase/decrease flag should be set to 1. If the sweep increase/decrease flag of NR10 is set to 0, the number of sweep shifts set to a non-zero value and sweep OFF mode set, sound production may be stopped. When changing the contents of the envelope register (NR12) while a sound is executing (ON flag is 1), the initial flag is preferably set after setting the values in the envelope register.

Sound 2

Sound 2 is a circuit that generates rectangular waveforms with envelope functions. The contents of NR21, NR22, NR23 and NR24 for Sound 2 are described with reference to FIGS. 74A and 74B and are based on those of the CGB device.

Figure 74A:
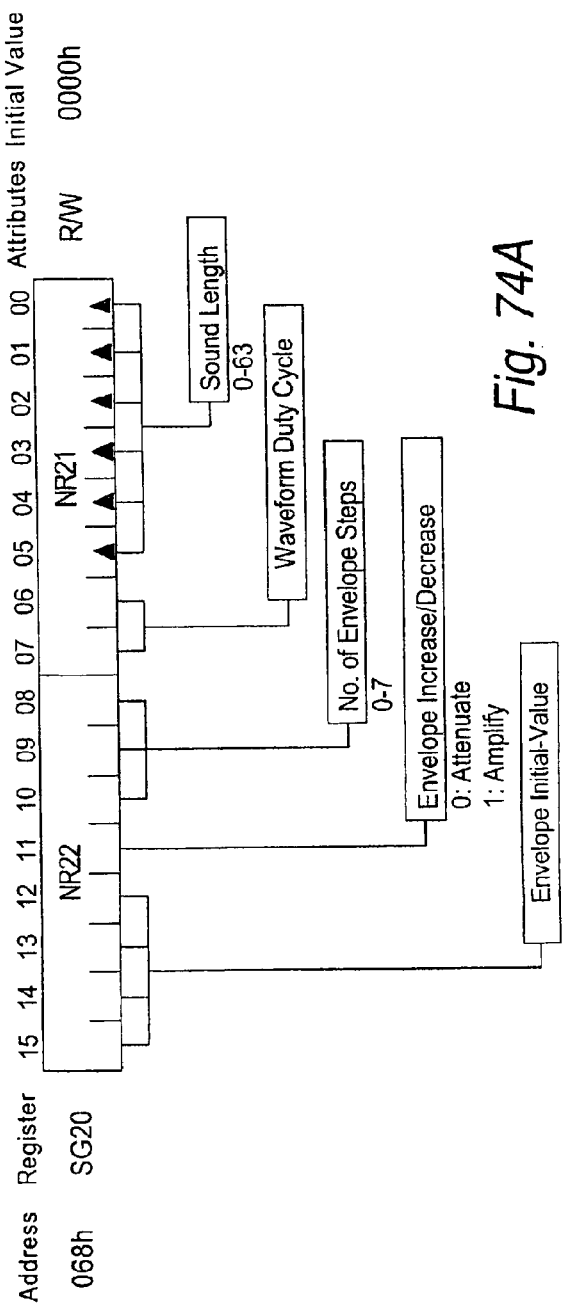
FIGS. 74A and 74B depict registers SG20 and SG21, respectively.

FIG. 74A shows the register SG20 that defines the NR21 and NR22 bytes whose bits relate to the envelope initial value, the envelope increase/decrease, the number of envelope steps, the waveform duty cycle, and the sound length.

SG20 [d15-12] (Envelope Initial Value) specify any one of sixteen levels ranging from maximum to mute for the envelope initial value.

SG20 [d11] (Envelope Increase/Decrease) specifies whether volume will increase or decrease.

SG20 [d10-08] (Number of Envelope Steps) sets the length of 1 step of envelope amplification or attenuation. With n signifying the value specified, the length of 1 step (steptime) is determined by the following equation:

$$\text{steptime} = n \times \frac{1}{64} \text{ (sec)}$$

When n=0, the envelope function is turned off.

SG20 [d07-06] (Waveform Duty Cycle) specifies the proportion of waveform amplitude peaks.

SG20 [d05-00] (Sound Length) signifies the sound length. With st signifying the sound length data, the length of the output sound is determined by the following equation:

$$\text{time} = (64 - st) \times \frac{1}{256} \text{ (sec)}$$

Figure 74B:
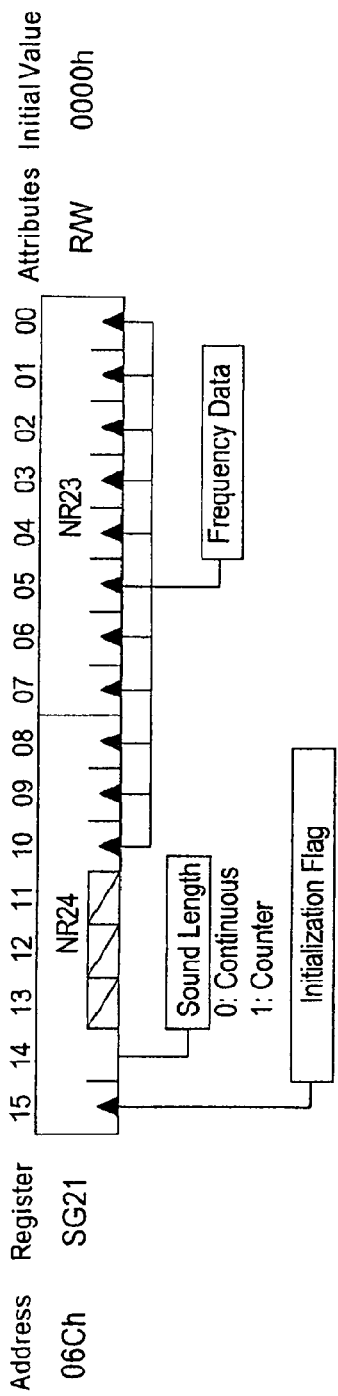

FIG. 74B shows the register SG21 that defines the NR23 and NR24 bytes whose bits relate to the initialization flag, the sound length, and the frequency data.

SG21 [d15] (Initialization Flag) is an initialization flag. A setting of "1" causes Sound 2 to be restarted.

SG21 [d14] (Sound Length) signifies the sound length. A setting of "0" is for continuous sound output and a setting of "1" is for sound output only for the time specified in the sound length data of NR21. When sound output ends, the Sound 2 ON flag of NR52 is reset.

SG21 [d10-00] (Frequency Data) is frequency data. With fdat signifying the frequency data, the output frequency is determined by the following equation:

$$f = \frac{4194304}{4 \times 2^3 \times (2048 - fdat)} \text{Hz}$$

Thus, the frequency range that can be specified is 64 to 131.1 KHz.

When changing the contents of the envelope register (NR22) while a sound is executing (ON flag is "1"), the initialization flag is preferably set after specifying a value for the envelope register.

Sound 3

The Sound 3 circuit outputs arbitrary waveforms and can automatically read waveform patterns (1 cycle) in waveform RAM and output them while modifying their length, frequency and level. The capacity of the waveform RAM of Sound 3 in the AGB device (total of 64 steps) is twice that in the GGB device, and can be used as 2 banks of 32 steps or as 64 steps. In addition, an output level of ¾ output can be selected.

The contents of NR30, NR31, NR32, NR33 and NR34 for Sound 3 are described with reference to FIGS. 75A-75C.

Figure 75A:
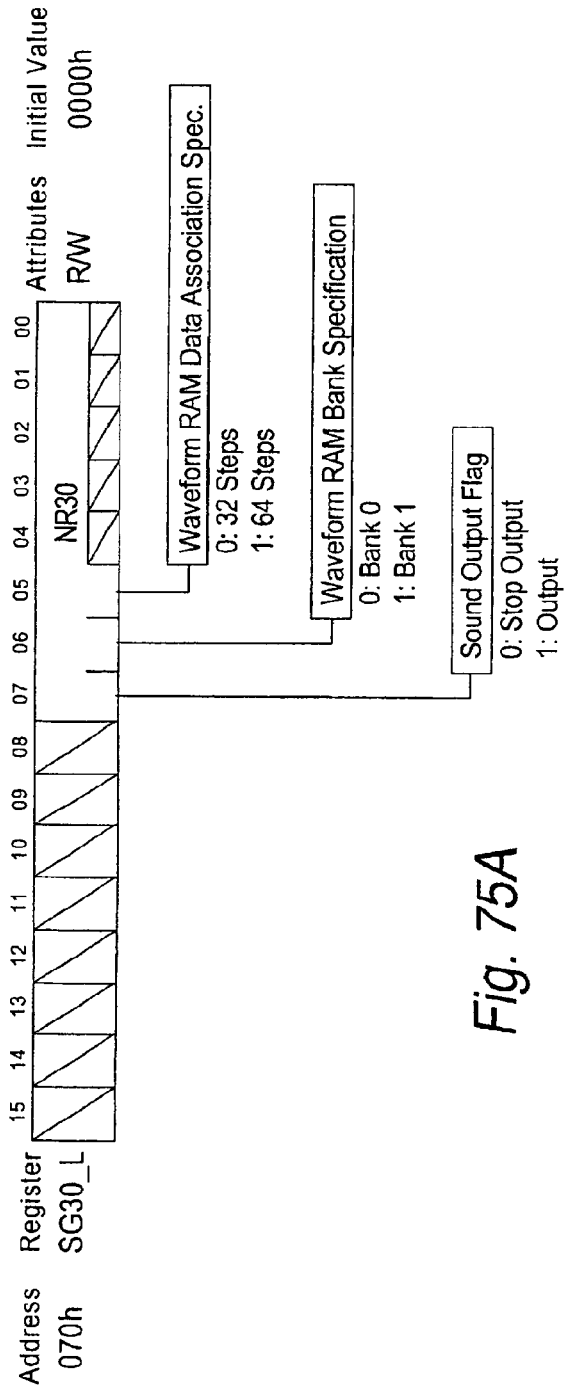

FIG. 75A shows the register SG30_L that defines the NR30 byte whose bits relate to the sound output flag, the waveform RAM bank specification and the waveform RAM data association specification.

SG30_L [d07] (Sound Output Flag) is a sound output flag. Sound output stops when this flag is "0" and sound output occurs when this flag is "1".

SG30_L [d06] (Waveform Bank Specification) provides a waveform bank specification. Two banks of waveform RAM are provided, banks 0 and 1. The Sound 3 circuit plays the waveform data in the specified bank. "0" specifies bank 0 and "1" specifies bank 1.

SG20_L [d05] (Waveform Bank Data Association Specification) provides a waveform RAM data association. When "0" is specified, 32-step waveform pattern is constructed under normal operation. With a setting of "1", the data in the bank specified by NR30 [d06] (waveform RAM bank specification) is played, followed immediately by the data in the back bank. The front bank 32 steps and the back bank 32 steps combine to form a waveform pattern with a total of 64 steps.

FIG. 75B shows the register SG30_H that defines the NR31 and NR32 bytes whose bits relate to the forced ¾ output level specification, the output level selection and the sound length.

SG30_H [d15] (Forced ¾Output Level Specification Flag) is a forced ¾ output level specification flag. With "0" specified, the output level specified in NR32 [d14-13] is used. With "1" specified, a ¾ output level is forced regardless of the setting in NR32 [d14-13].

SG30 H [d14-13] (Output Level Selection) is the output level selection. The Sound 3 output level selection are shown in Table XII:

TABLE XII

| Setting | Output Level |
|---------|--------------|
| 00 | Mute |
| 01 | Outputs the waveform RAM data unmodified |
| 10 | Outputs the waveform RAM data with the contents right-shifted 1 bit (½) |
| 11 | Outputs the waveform RAM data with the contents right-shifted 2 bits (¼) |

SG30_H [d07-00] (Sound Length) represents the sound length. The sound length is determined by the following formula, with st signifying the sound length setting:

$$\text{time} = (256 - st) \times \frac{1}{256} \text{ (sec)}$$

FIG. 75C shows the register SG31 that defines the NR33 and NR34 bytes whose bits relate to the initialization flag, the sound length flag, and the frequency data.

SG21 [d15] (Initialization Flag) is an initialization flag. A setting of 1 causes Sound 3 to restart.

SG31 [d14] (Sound Length Flag) is the sound length flag. When this flag is "0", sound is continuously outputted. When this flag is "1", sound is output only for the length of time specified for the sound length in NR31. When sound output ends, the Sound 3 ON flag of NR52 is reset.

SG31 [d10-00] (Frequency Data) is frequency data. With fdat signifying the frequency, the output frequency (f) is determined by the following formula:

$$f = \frac{4194304}{4 \times 2^3 \times (2048 - fdat)} \text{Hz}$$

Thus, the specifiable range of frequencies is 64 to 131.1 kHz.

When changing the frequency during Sound 3 output, the initialization flag is preferably not set to avoid possibly corrupting the contents of the waveform RAM. With sounds 1, 2 and 4, the initialization flag can be set without problems.

Waveform RAM

Waveform RAM includes a 4-bit×32 step waveform pattern. It has two banks, with [d06] of SG30_L used for bank specification. The Sound 3 circuit plays the waveform data specified by the bank setting, while the waveform RAM not specified is the waveform RAM accessed by the user. The waveform RAM registers are shown in FIGS. 76A-76H.

Sound 4

Figure 77A:
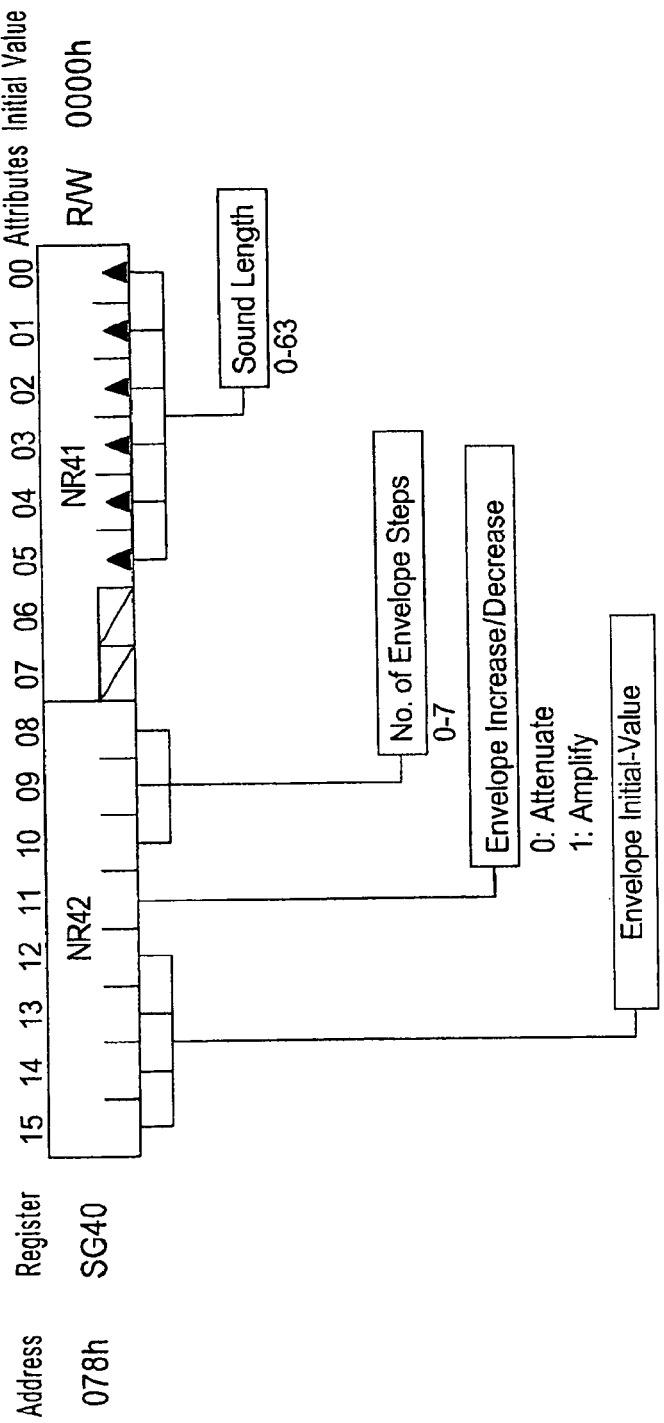
FIGS. 77A and 77B depict registers SG40 and SG41, respectively.

Sound 4 is a circuit that generates white noise. The contents of NR41, NR42, NR43, and NR44 for Sound 4 are described with reference to FIGS. 77A and 77B and are based on those of the CGB.

SG40 [d15-12] (Envelope Initial-Value) allows specification of any of 16 levels ranging from maximum to mute.

SG40 [d11] (Envelope Increase/Decrease) specifies whether to increase or decrease the volume.

SG40 [d10-08] (Number of Envelope Steps) sets the length of each step of envelope amplification or attenuation. With n the specified value, the length of 1 step (steptime) is determined by the following formula:

$$\text{steptime} = n \times \frac{1}{64} \text{ (sec)}$$

When n=0, the envelope function is turned off.

SG40 [d05-00] (Sound Length) specifies the sound length. With st signifying the sound length, the length of the output sound is determined by the following formula:

$$\text{time} = (64 - st) \times \frac{1}{256} \text{ (sec)}$$

Figure 77B:
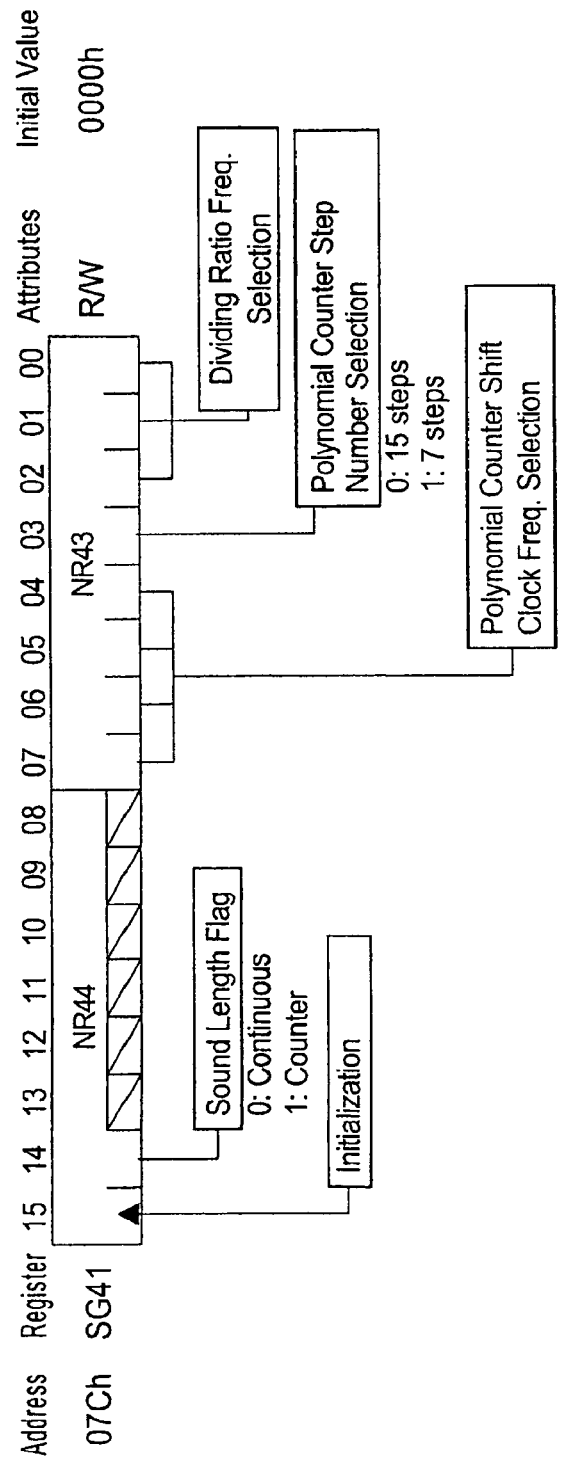

FIG. 77B shows the register SG41 that defines the NR43 and NR44 bytes whose bits relate to the initialization flag, the sound length flag, polynomial counter shift clock frequency selection, polynomial counter step number selection, and dividing ratio frequency selection.

SG41 [d15] (Initialization Flag) is an initialization flag. A setting of 1 causes Sound 4 to be restarted.

SG41 [d14] (Sound Length) is a sound length flag. Continuous sound output is provided if set to 0 and sound is output only for the time specified in the sound length data of NR41 if set to 1. When sound output ends, the Sound 4 ON flag of NR52 is reset.

SG41 [d07-04] (Polynomial Counter Shift Clock Frequency Selection) determines the shift clock frequency. With n signifying the specified value, the shift clock frequency (shiftfreq) is selected as shown in the following formula:

$$\textit{shiftfreq} = \text{dividing\_ratio\_frequency} \times \frac{1}{2^{(n+1)}}$$

In the example AGB, 1110 and 1111 are prohibited codes.

SG41 [d03] (Polynomial Counter Step Number Selection)—a value of 0 selects 15 steps; 1 selects 7 steps.

SG41 [d02-00] (Dividing Ratio Frequency Selection)— selects a 14-step pre-scalar input clock to produce the shift clock for the polynomial counter. With f=4.194304 MHz, selection is as shown in Table XIII:

TABLE XIII

| Setting | Dividing Ratio Frequency |
| --- | --- |
| 000 | f × 1/2³ × 2 |
| 001 | f × 1/2³ × 1 |
| 010 | f × 1/2³ × (1/2) |
| 011 | f × 1/2³ × (1/3) |
| 100 | f × 1/2³ × (1/4) |
| 101 | f × 1/2³ × (1/5) |
| 110 | f × 1/2³ × (1/6) |
| 111 | f × 1/2³ × (1/7) |

When changing the contents of the envelope register (NR22) while a sound is executing (ON flag is 1), the initialization flag should be set after specifying a value for the envelope register.

Sound Control

Figure 78A:
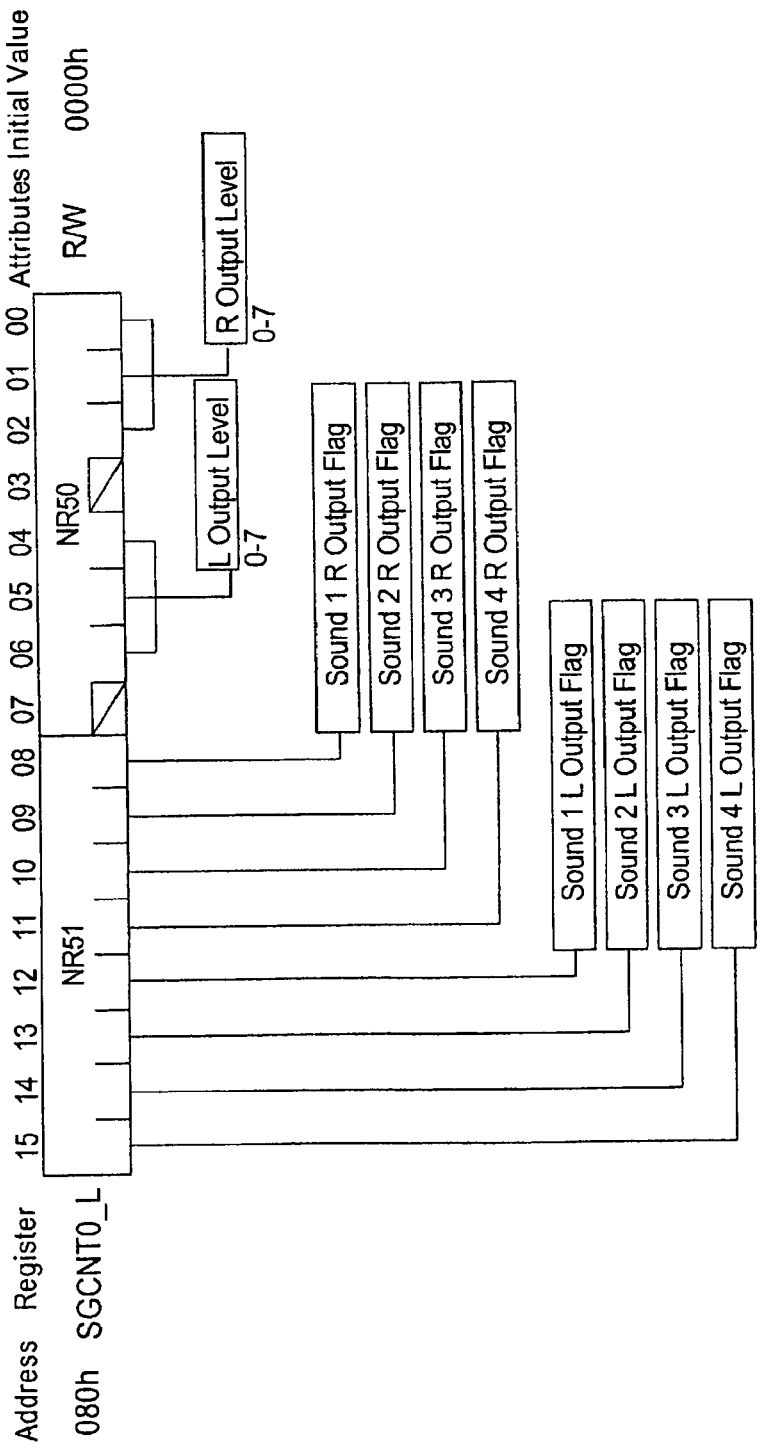
FIGS. 78A-78C depict registers SGCCNT0_L, SGCCNT0_H and SGCNT1, respectively.
Figure 78B:
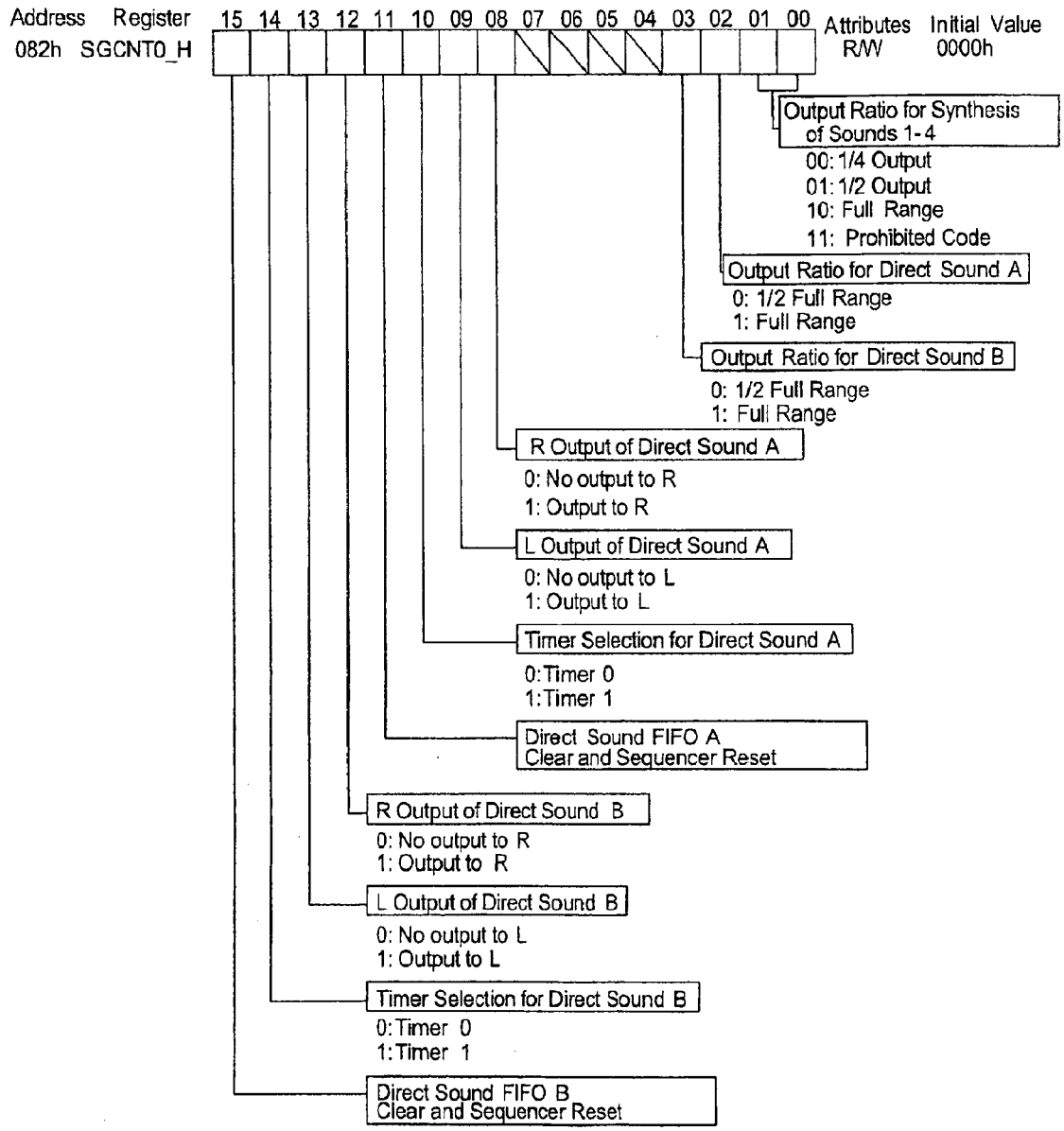

The output ratio for direct sound and sound can be set using the SGCNT0_H register shown in FIG. 78B. Final sound control can be achieved with the SGCNT0_L register shown in FIG. 78A. NR50 and NR51 which make up the SGCNT0_L are each based on their counterparts in CGB.

The register SGCNT0_L is shown in FIG. 78A. SGCNT0_L [d15-12] (L Output Flag for each Sound) are respective L output flags for each sound. There is no output of a sound to L when the corresponding flag is 0. A sound is output to L when the corresponding flag is set to 1.

SGCNT0_L [d11-08] (R Output Flag for each Sound) are respective R output flags for each sound. There is no output of a sound to R when the corresponding flag is 0. A sound is output to R when the corresponding flag is set to 1.

SGCNT0_L [d06-04] (L Output Level) sets the L output level to any of 8 levels. There is no effect on direct sound.

SGCNT0_L [d02-00] (R Output Level) sets the R output level to any of 8 levels. There is no effect on direct sound.

Figure 78C:
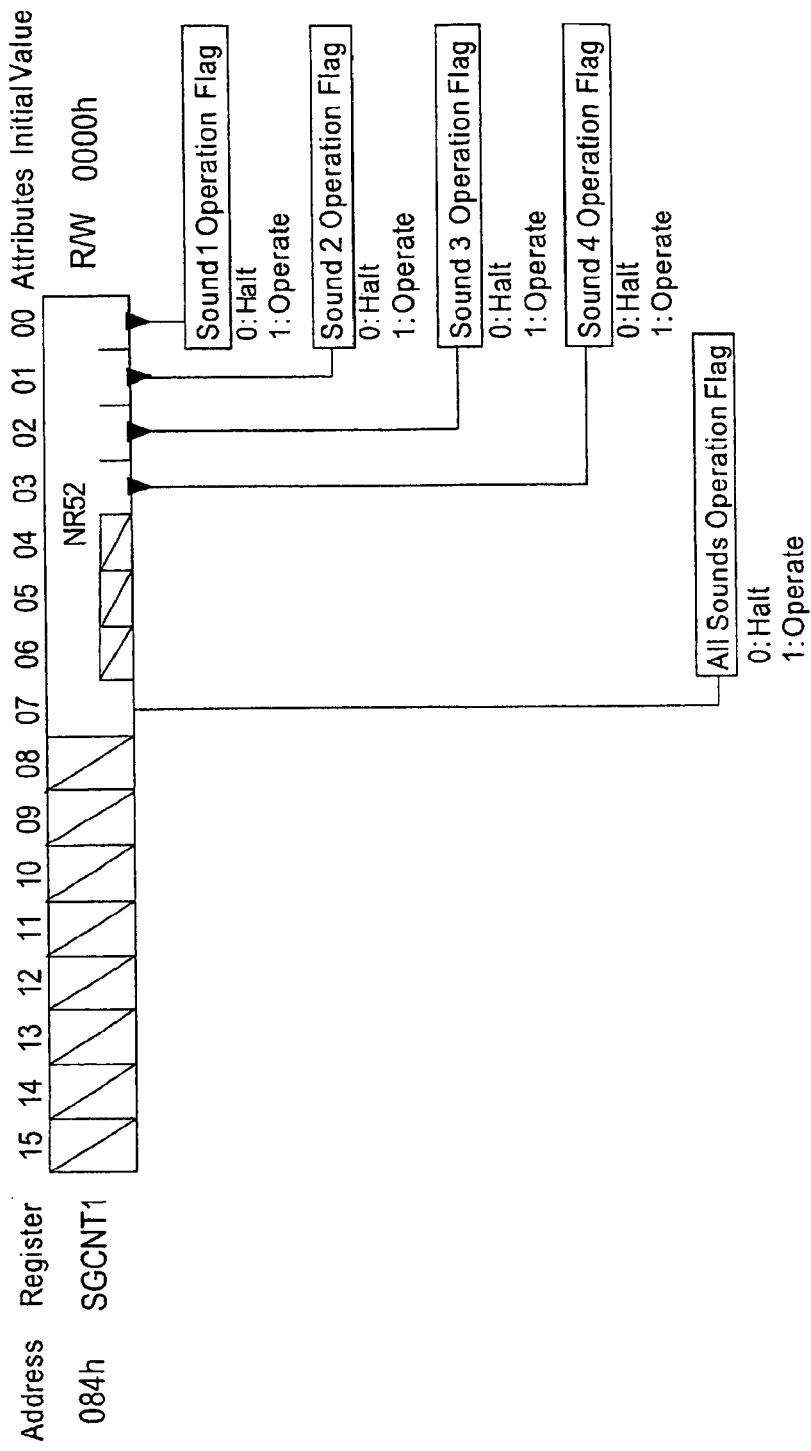

The SGCNT1 register is shown in FIG. 78C. SGCNT1 [d07] (All Sounds Operation Flag) is a master flag that controls whether sound functions as a whole are operating. A setting of 0 halts all sound functions including direct sound, producing a mute state. In this situation, the contents of Sound related registers are reset. A setting of 1 enables all sound functions.

SGCNT1 [d03, d03, d01, d00] (Sound Operation Flags) are sound operation flags for the respective sounds and each sound circuit's status can be referenced. Each sound is set during output, and when in counter mode, it is reset after the time passes which was set up with the length data.

The SGCNT0_H register is shown in FIG. 78B. SGCNT0_H [d15], [d11] (FIFO Clear and Sequencer Reset for Each Direct Sound)—with direct sound, the sequencer counts the number of times data is transmitted from the FIFO to the mixing circuit. A setting of 1 resets the FIFO and sequencer used for each direct sound. When this bit is read, 0 is returned.

SGCNT0_H [d14], [d10] (Timer Selection for Each Direct Sound) specifies the timer used for each direct sound. A setting of 0 selects timer 0, and a setting of 1 selects timer 1. The same timer can be specified for both direct sounds (A and B).

SGCNT0_H [d13], [d09] (L Output for Each Direct Sound) controls the output to L for each direct sound. A setting of 0 results in no output to L; a setting of 1 causes output to L.

SGCNT0_H [d12], [d08] (R Output for Each Direct Sound) controls the output to R for each direct sound. A setting of 0 results in no output to R; a setting of 1 causes output to R.

SGCNT0_H [d03], [d02] (Output Ratio for Each Direct Sound) selects the output level for each direct sound. A setting of 0 produces output that is ½ of full range. A setting of 1 results in full-range output.

SGCNT0_H [d01-00] (Output Ratio for Synthesis of Sounds 1-4) specifies the output level for the synthesis of sounds 1-4. A setting of 00 results in output that is ¼ of full range. A setting of 01 results in output that is ½ of full range. A setting of 10 results in full-range output. In the example AGB, a setting of 11 is prohibited.

Sound PWM Control

Bit modulation format PWM is used in the example AGB sound circuit. When no sound is produced, the duty waveform is output, and bias voltage is provided. The PWM circuit is stopped when the setting for duty is 0h.

The SG_BIAS register shown in FIG. 79 is used by system ROM. SG_BIAS [d15-14] (Amplitude Resolution/Sampling Cycle) sets the amplitude resolution and sampling cycle frequency during PWM modulation. The DMG compatible sound is input at 4 bits/130.93 KHz so, in order to have accurate modulation, the sampling frequency must be set high. Direct sound will arbitrarily decide the sampling frequency based on the timer setting. By using the sampling frequencies listed in Table XIV, an accurate modulation can be done. Thus, in order to increase authenticity of sound, the amplitude resolution needs to be set higher. When producing both compatible sound and direct sound, a value should be set that will work for both.

TABLE XIV

| Setting | Amplitude Resolution | Sampling Frequency |
|---------|---------------------|--------------------|
| 00 | 9-bit | 32.768 KHz |
| 01 | 8-bit | 65.536 KHz |
| 10 | 7-bit | 131.072 KHz |
| 11 | 6-bit | 262.144 KHz |

FIGS. 80A-80C show a PWM Conversion Image.

SG_BIAS [d09-00] (Bias Level) is used by system ROM and its value is preferably not changed.

Timers

Figures 81A, 81B:
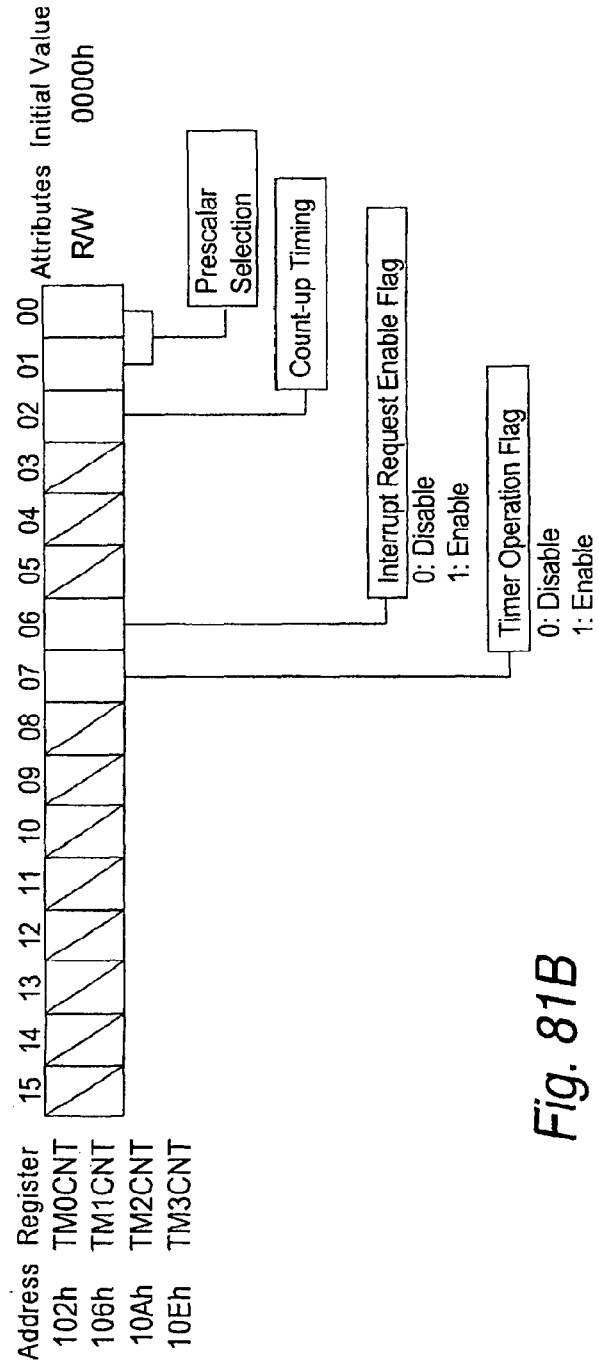
FIGS. 81A and 81B depict timer setting register TM0D (TM1D, TM2D, TM3D) and the timer control register TM0CNT (TM1CNT, TM2CNT, TM3CNT), respectively.

The example AGB is equipped with 4 channels of 16 bit timers. Of these, timers 0 and 1 can be used to set the interval for the supply of data from the FIFO(s) for direct sounds A and B. This interval is set by timer overflow. The timer setting registers TM0D, TM1D, TM2D and TM3D are shown in FIG. 81A. The timer control registers TM0CNT, TM1CNT, TM2CNT and TM3CNT are shown in FIG. 81B.

TM*CNT [d07] is a timer operation flag that starts and stops the timer. A setting of 0 stops the timer, and a setting of 1 starts the timer.

TM*CNT [d06] is an interrupt request enable flag that controls whether an interrupt request flag is generated by an overflow. No interrupt is generated with a setting of 0. An overflow does generate an interrupt if the setting is 1.

TM*CNT [d02] is a count-up timing bit. With a setting of 0, count-up is performed in accordance with the pre-scalar specification in [d01-00]. With a setting of 1, overflow of the timer channel one number lower starts a count-up regardless of the pre-scalar specification. This mode is suitable for purposes such as time measurement over relatively long periods. The count-up timing specification is disabled for Timer 0, which counts up in accordance with the pre-scalar specification.

TM*CNT [d01-00] are pre-scalar selection bits that allow selection of a pre-scalar based on the system clock (16.78 MHz) as shown in Table XV:

TABLE XV

| Setting | Pre-scalar (Count-Up Interval) | |
|---------|-------------------------------|---|
| 00 | System clock | (59.595 ns) |
| 01 | 64 cycles of system clock | (3.814 microseconds) |
| 10 | 256 cycles of system clock | (15.256 microseconds) |
| 11 | 1024 cycles of system clock | (61.025 microseconds) |

DMA Transfer

The example AGB has 4 DMA transfer channels. The highest priority of these channels is DMA0, followed in order by DMA1, DMA2, and DMA3. If a DMA with a higher priority than the currently executing DMA begins execution, the execution of the current DMA is temporarily halted, and the DMA with the higher priority is executed. Once this DMA finishes, the original DMA resumes execution from where it was halted. Illustrative uses of the DMA channels that take into account these priorities are described below.

DMA 0

Because this DMA has the highest priority, it is not interrupted by other DMA channels. Thus, it is generally used for reliable processing over a limited period, as is required for purposes such as horizontal-blanking DMA.

DMA 1 and DMA 2

These DMAs are used for direct sound functions, which require relatively high priority, or for general-purpose transfers.

DMA 3

This DMA is used for the most general types of transfers. The following settings are performed when using DMA:

1. Specify the transfer source address in the source address register.
2. Specify the transfer destination address in the destination address register.
3. Set the number of data items in the word-count register.
4. Specify the transfer method to be used in the DMA control register.

When transferring data to OAM or OBJ VRAM by DMA during H-blanking, the H-blank is preferably first be freed from OBJ display hardware processing periods using the DISPCNT register.

DMA 0

DMA 0 allows different areas of internal memory in the main unit to access one another. It has the highest priority of the DMA channels.

The source address registers DM0SAD_L and DM0SAD_H shown in FIGS. 82A and 82B specify the source address using 27 bits. The area 00000000h-07FFFFFFh (internal memory area of main unit) can be specified.

The destination address registers DM0DAD_L and DM0DAD_H shown in FIGS. 83A and 83B specify the destination address using 27 bits. The area 00000000h-07FFFFFFh (internal memory area of main unit) can be specified.

The word count register DM0CNT_L shown in FIG. 84 specifies the number of bytes transferred by DMA0, using 14 bits. The number can be specified in the range 0000h-3FFFh. Thus, in 16-bit data transfer mode, up to 32,766 bytes can be transferred, and in 32-bit data transfer mode, up to 65,532 bytes can be transferred.

Figure 85:
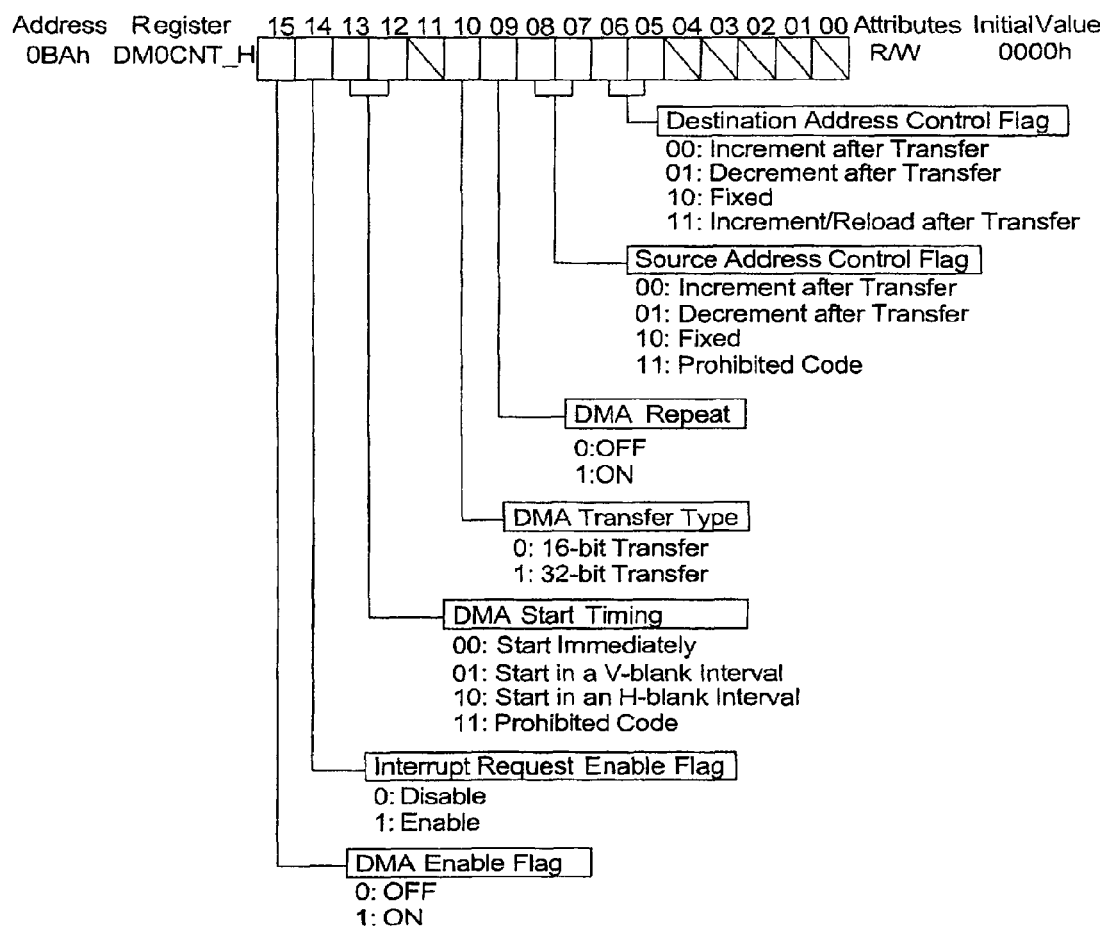
FIG. 85 depicts register DM0CNT_H.

The DMA control register DM0CNT_H is shown in FIG. 85. DM0CNT_H [d15] (DMA Enable Flag) is a DMA enable flag. A setting of 0 disables DMA. A setting of 1 enables DMA, and after the transfer is completed it is reset.

DM0CNT_H [d14] (Interrupt Request Enable Flag) is an interrupt request enable flag that enables an interrupt request to be generated when DMA transfer of the specified word count has been completed. No request is generated with a setting of 0; a request is generated with a setting of 1.

DM0CNT_H [d13-12] (DMA Transfer Timing) specify the DMA transfer timing. The timing of the DMA transfer can selected from the options in Table XVI.

TABLE XVI

| Setting | DMA Start-up Timing |
| --- | --- |
| 00 | Start Immediately |
| 01 | Start during a V-blanking interval - starts at the beginning of a V-blanking interval (approximately 4.993 milliseconds) |
| 10 | Start during an H-blanking interval - starts at the beginning of an H-blanking interval (approximately 16.212 microseconds). If this accompanies OAM access, the H-blanking interval must first be freed of OBJ display hardware processing periods. |
| 11 | Not used |

DM0CNT_H [d10] (DMA Transfer Type) sets the bit length of the transfer data. With a setting of 0, the data are transferred by DMA in 16-bit (half-word) units. With a setting of 1, the data are transferred by DMA in 32-bit (word) units.

DM0CNT_H [d09] (DMA Repeat) turns the DMA repeat function ON and OFF. With the DMA repeat function set to ON, if V-blanking or H-blanking intervals are selected as the timing of DMA startup, DMA is restarted when the next startup condition occurs (a V-blank or H-blank). In this mode, restarting will continue as long as the DMA enable flag is not set to 0. When the DMA repeat function is set to OFF, DMA halts as soon as the amount of data specified by the value in the word-count register has been transferred.

DM0CNT_H [d08-07] (Source Address Control Flag) specifies the control of the source address after each DMA transfer. A setting of 00 causes an increment; a setting of 01 causes a decrement; and a setting of 10 causes it to be fixed. The setting of 11 is not used.

DM0CNT_H [d06-05] (Destination Address Control Flag) specifies the control of the destination address after each DMA transfer. A setting of 00 causes an increment; a setting of 01 causes a decrement; and a setting of 10 causes it to be fixed. A setting of 11 causes an increment and after all transfers end, a reload (i.e., the setting is returned to what it was when the transfer started) is done.

DMA 1 and 2

DMA channels 1 and 2 provide access between the game cartridge bus/internal memory of the main unit and internal memory of the main unit, or between the game cartridge bus/internal memory of the main unit and the direct sound FIFO. Transfers to direct-sound FIFO can be accomplished only by using DMA 1 and 2.

The source address registers DM1SAD_L (and DM2SAD_L) and DM1SAD_H (and DM2SAD_H) shown in FIGS. 86A and 86B specify the source address using 28 bits. The memory space 00000000h-0FFFFFFFh can be specified.

The destination address registers DM1DAD_L (and DM2DAD_L) and DM1DAD_H (and DM2DAD_H) shown in FIGS. 87A and 87B specify the destination address using 27 bits. The memory space 00000000h-07FFFFFFh (internal memory area of main unit) can be specified.

The word count register DM1CNT_L (and DM2CNT_L) shown in FIG. 88 specifies the number of bytes transferred by DMA 1 and DMA 2, using 14 bits. The number can be specified in the range 0001h-3FFFh. Thus, in 16-bit data transfer mode, up to 32,766 bytes can be transferred, and in 32-bit data transfer mode, up to 65,532 bytes can be transferred. The word-count register setting is disabled in direct-sound FIFO transfer mode. With each request received from sound FIFO, 32 bits×4 words of sound data are transferred.

Figure 89:
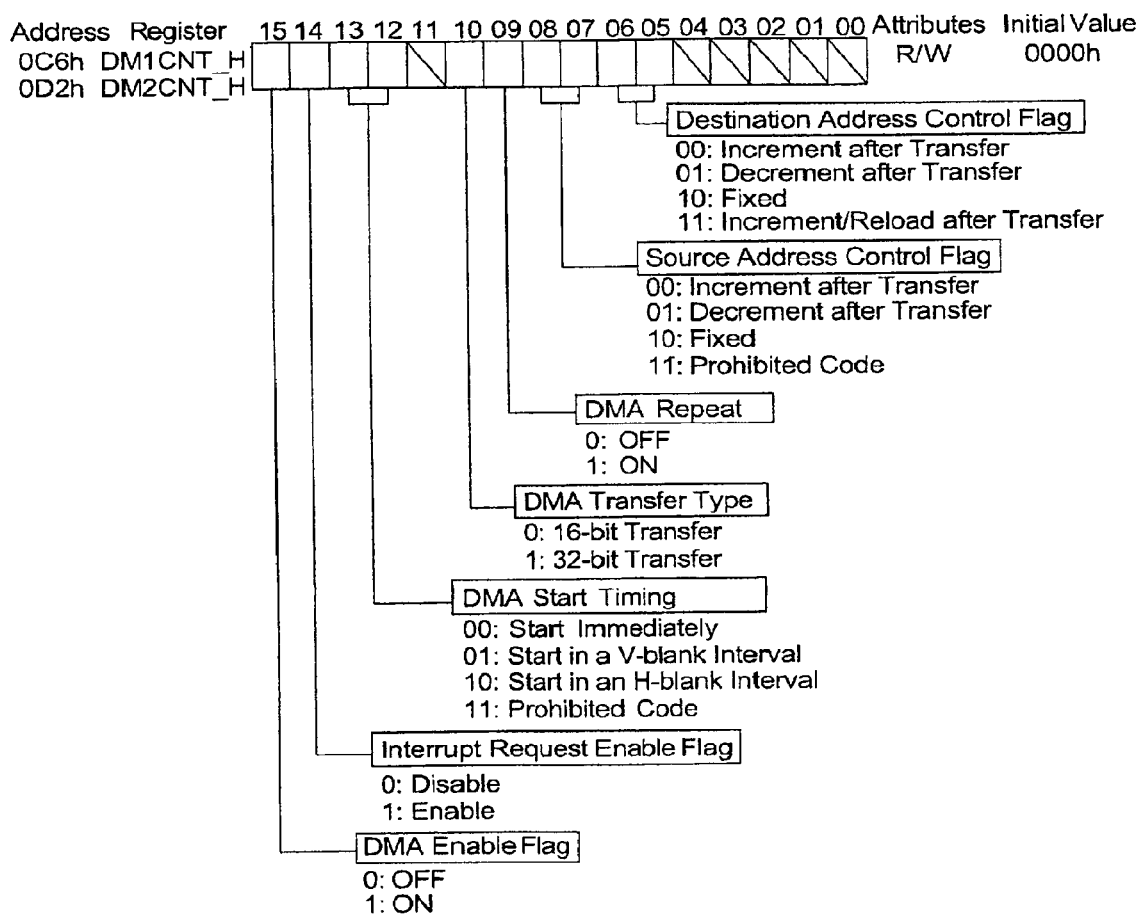
FIG. 89 depicts the register DM1CNT_H (DM2CNT_H)

The DMA Control register DM1CNT_H (and DM2CNT_H) is shown in FIG. 89. DM(1,2)CNT_H [d15] (DMA Enable Flag) enables/disables the DMA function. A setting of 0 disables the DMA function. A setting of 1 enables the DMA function, and after the transfer is completed, it is reset.

DM(1,2)CNT_H [d14] (Interrupt Request Enable Flag) enables an interrupt request to be generated when DMA transfer of the specified word count has been completed. No request is generated with a setting of 0; a request is generated with a setting of 1.

DM(1,2)CNT_H [d13-12] (DMA Transfer Timing) sets the timing of the DMA transfer. This timing can be selected from the options in Table XVII.

TABLE XVII

| Setting | DMA Startup Timing |
| --- | --- |
| 00 | Start immediately |
| 01 | Start during a V-blanking interval - starts at the beginning of a V-blanking interval (approximately 4.993 milliseconds) |
| 10 | Start during an H-blanking interval - starts at the beginning of an H-blanking interval (approximately 16.212 microseconds). If this accompanies OAM access, the H-blanking interval should first be freed of OBJ display hardware processing periods. |
| 11 | Start when request generated by Direct-Sound FIFO - starts when a request is received from direct-sound FIFO. Specify sound FIFO as the |

TABLE XVII-continued

| Setting | DMA Startup Timing |
|---|---|
| | destination address. Also set the DMA repeat function [d09] to ON. |

DM(1,2)CNT_H [d10] (DMA Transfer Type) sets the bit length of the transfer data. With a setting of 0, the data are transferred by DMA in 16-bit (half-word) units. With a setting of 1, the data are transferred by DMA in 32-bit (word) units. In direct-sound FIFO transfer mode, the data are transferred in 32-bit units.

DM(1,2)CNT_H [d09] (DMA Repeat) turns the DMA repeat function ON and OFF. With the DMA repeat function set to ON, if V-blanking or H-blanking intervals are selected as the timing of DMA startup, DMA is restarted when the next startup condition occurs (a V-blank or H-blank). In this mode, restarting will continue as long as the DMA enable flag is not set to 0. When the DMA repeat function is set to OFF, DMA halts as soon as the amount of data specified by the value in the word-count register has been transferred. This bit should be set to 1 in direct-sound FIFO transfer mode.

DM(1,2)CNT_H [d08] (Source Address Control Flag) specifies the control of the source address after each DMA transfer. A setting of 00 causes an increment; a setting of 01 causes a decrement; and a setting of 10 causes it to be fixed. A setting of 11 is not used. When the game cartridge bus has been set to the source address, increment should be selected.

DM(1,2)CNT_H [d07] (Destination Address Control Flag) specifies the control destination address after each DMA transfer. A setting of 00 causes an increment; a setting of 01 causes a decrement; and a setting of 10 causes it to be fixed. A setting of 11 causes an increment to be carried out and then a reload (i.e., return to setting at start of transfer) is done after every transfer is completed. When in direct sound FIFO transfer mode, the destination address is fixed and unrelated to the setting.

DMA 3

DMA 3 provides memory access between the game cartridge bus and internal memory of the main unit, or between different areas of internal memory of the main unit. The source address registers DM3SAD_L and DM3SAD_H shown in FIGS. 90A and 90B specify the source address using 28 bits. The memory space 00000000h-0FFFFFFFh (internal memory of main unit and game cartridge memory area) can be specified.

The destination address registers DM3DAD_L and DM3DAD_H shown in FIGS. 91A and 91B specify the destination address using 28 bits. The area 00000000h-0FFFFFFFh (internal memory area of main unit and game cartridge memory area) can be specified.

The word count register DM3CNT_L shown in FIG. 92 specifies the number of bytes transferred by DMA 3, using 16 bits. The number can be specified in the range 0001h-FFFFh. Thus, in 16-bit data transfer mode, up to 65535×2=131070 bytes can be transferred, and in 32-bit data transfer mode, up to 65,535×4=262140 bytes can be transferred.

Figure 93:
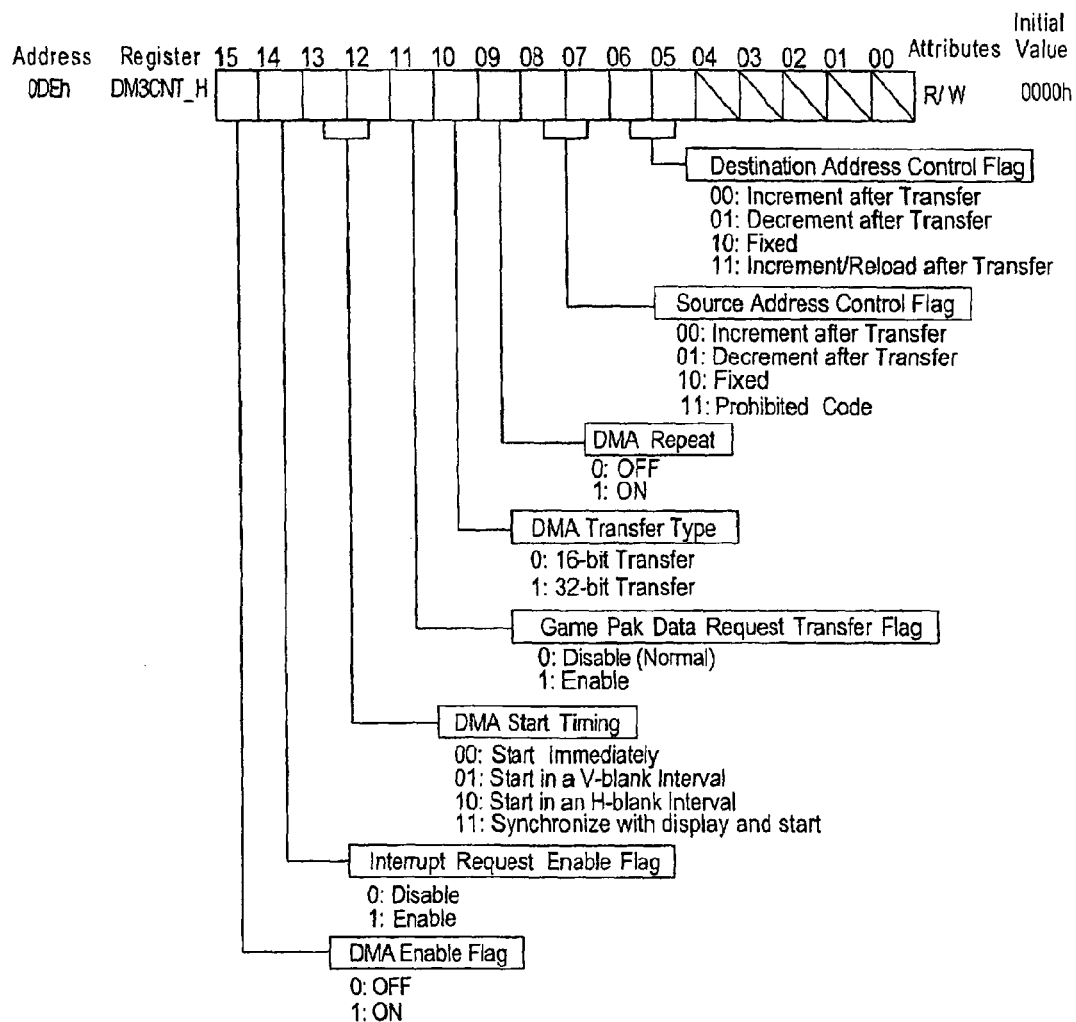
FIG. 93 depicts the register DM3CNT_H.

The DMA Control Register DM3CNT_H is shown in FIG. 93. DM3CNT_H [d15] (DMA Enable Flag) enables/disables DMA. A setting of 0 disables DMA. A setting of 1 enables DMA, and, after the transfer is completed, it is reset.

DM3CNT_H [d14] (Interrupt Request Enable Flag) enables an interrupt request to be generated when DMA transfer of the specified word count has been completed. No request is generated with a setting of 0; a request is generated with a setting of 1.

DM3CNT_H [d13-12] (DMA Transfer Timing) selects the timing of the DMA transfer. This timing can selected from the options in Table XVIII:

TABLE XVIII

| Setting | DMA Startup Timing |
|---|---|
| 00 | Start immediately |
| 01 | Start during a V-blanking interval - starts at the beginning of a V-blanking interval (approximately 4.993 milliseconds) |
| 10 | Start during an H-blanking interval - starts at the beginning of an H-blanking interval (approximately 16.212 microseconds). If this accompanies OAM access, the H-blanking interval should first be freed of OBJ display hardware processing periods. |
| 11 | Synchronize with display and start - synchronize with start of H-line rendering during a display interval and start. |

DM3CNT_H [d11] (Game Cartridge Data Request Transfer Flag) is normally set to 0. When set to 1, DMA transfer is performed in response to a data request from the game cartridge. A game cartridge that supports this transfer mode is required in order to use it. It cannot be used at the same time as a game cartridge interrupt.

DM3CNT_H [d10] (DMA Transfer Type) sets the bit length of the transfer data. With a setting of 0, the data are transferred by DMA in 16-bit (half-word) units. With a setting of 1, the data are transferred by DMA in 32-bit (word) units.

DM3CNT_H [d09] (DMA Repeat) turns the DMA repeat function ON and OFF. With the DMA repeat function set to ON, if V-blanking or H-blanking intervals are selected as the timing of DMA startup, DMA is restarted when the next startup condition occurs (a V-blank or H-blank). In this mode, restarting will continue as long as the DMA enable flag is not set to 0. When the DMA repeat function is set to OFF, DMA halts as soon as the amount of data specified by the value in the word-count register has been transferred.

DM3CNT_H [d08] (Source Address Control Flag) specifies the control of the source address after each DMA transfer. A setting of 00 causes an increment; a setting of 01 causes a decrement; and a setting of 10 causes it to be fixed. A setting of 11 is not used. When the game cartridge bus has been set to the source address, increment should be selected.

DM3CNT_H [d07] (Destination Address Control Flag) specifies the control of the destination address after each DMA transfer. A setting of 00 causes an increment; a setting of 01 causes a decrement; and a setting of 10 causes it to be fixed. A setting of 11 causes an increment to be carried out and then a reload (i.e., a return to setting at start of transfer) is done after every transfer is completed.

Communication Functions

The example AGB provides the following communication functions:
 8-bit/32-bit normal communication
 16-bit multiplayer communication
 UART communication
 General purpose communication
 JOY Bus communication These communication functions may be used for a wide variety of purposes. For example, multi-player communication can be used for communication between one or more additional AGBs to permit multi-player (e.g., four player) game play. This multi-player game play may be carried out even if only one AGB has a game cartridge for the game inserted into the game cartridge slot thereof. The game program itself should be written to utilize this feature.

JOY Bus communication may be used, for example, to connect the AGB to a game console such as the N64® and GameCube® products from Nintendo Co. Ltd. In this arrangement, the AGB can be used as a controller for the game console and the AGB display screen can display private data for each player that is not intended to be seen by other players. For example, in a card game, the AGB display screen can display an individual player's cards while the television connected to the game console can display cards common to all players. In a football game, the AGB screen can display a list from which plays are selected. A player on offense may select from a list of offensive plays (runs and passes) while a player on defense may select from a list of defensive plays (blitz, prevent, etc.).

Other communication functions may be used to connect the AGB to remote computers for game downloads and data exchanges. For example, an adapter may be used to connect the AGB to a mobile phone or the AGB may be connected to a modem. In this way, a user of the AGB can download games and game updates; play multi-player games; send/receive e-mail; get news, sports, stock and weather updates; etc.

8-Bit/32-Bit normal communication function is used, for example, to communicate with accessories that do not use cables. In the example AGB, normal communication cannot take place over a cable. When communicating with AGB using a cable, multi-player communication is used. Due to the voltage difference, it is not possible to communicate with CGB. 8-bit communication handles 8-bit data with a transfer-enable flag. 32-bit communication handles 32-bit data with a transfer-enable flag.

The 16-Bit multi-player communication function is a multiple/simultaneous communication function that uses a UART system to enable communication of up to 4 AGB units. A special cable to be described in greater detail below is used for multi-player communication.

The UART communication function enables high-speed communication by the UART system.

The general purpose communication function enables communication by any protocol through direct control of the communication terminal.

The JOY Bus communication function enables communication using a standardized Nintendo Joy Bus.

Selecting Communication Function

All communication functions use an external expansion 6-pin connector. Communication functions are switched as shown in Table XIX by the communication function set flag of the communication control register R (2-bit) (see FIG. 109) and the communication mode set flag of the serial communication control register SCCNT_L (2-bit), which are described in greater detail below.

TABLE XIX

| Communication functions | R | | SCCNT_L | |
|---|---|---|---|---|
| | d15 | d14 | d13 | d12 |
| General purpose | 1 | 0 | * | * |
| JOY Bus | 1 | 1 | * | * |
| 8-bit serial | 0 | * | 0 | 0 |
| 32-bit serial | 0 | * | 0 | 1 |
| 16-bit serial | 0 | * | 1 | 0 |
| UART | 0 | * | 1 | 1 |

When communication modes are changed, only the communication mode set flag is first changed. A communication is preferably not started at the same time as modes are changed as this may cause a malfunction.

8-Bit/32-Bit Normal Serial Communication

This communication is a serial transfer that sends/receives simultaneously. If data is set in the data register and the serial transfer is started, received data is set in the data register when the transfer is complete.

With reference to FIG. 94 and the timing charts of FIGS. 95A-95C, the master (internal clock mode) outputs the shift clock from the SC terminal. The SD terminal becomes an input terminal with pull-up. In the case of a slave (external clock mode), the SC terminal becomes an input terminal with pull-up. The SD terminal goes to LO output. The set data is left-shifted by the falling of the shift clock, and is output from the SO terminal in order starting from the most significant bit. The data input from SI terminal is input to the least significant bit with the rising of the shift clock.

8 bit Normal Serial Communication Data Register

Figure 96:
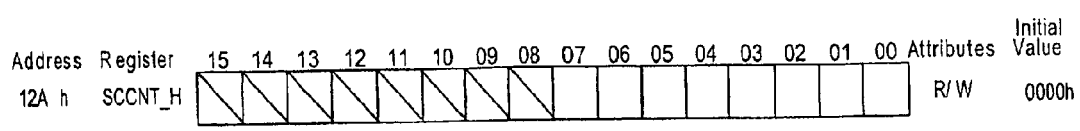
FIG. 96 depicts register SCCNT_H.

The 8-bit transfer mode uses SCCNT_H shown in FIG. 96 as a data register. The upper 8-bits are disabled.

32-Bit Normal Serial Communication Data Register

Figure 97A:
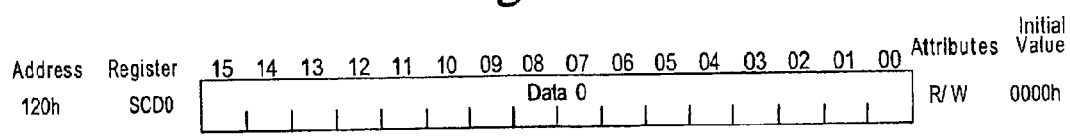
FIGS. 97A and 97B depict registers SCD0 and SCD1, respectively.
Figure 97B:
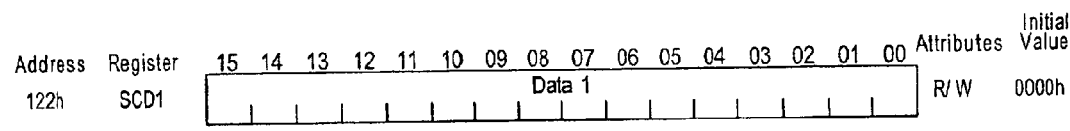

The 32-bit transfer mode uses register SCD0 and register SCD1 shown in FIGS. 97A and 97B as data registers. These data registers are also used for 16-bit multi-player communication. The most significant bit is d15 in the register SCD1, and the least significant bit is d0 in the register SCD0.

Control Register

Figure 98:
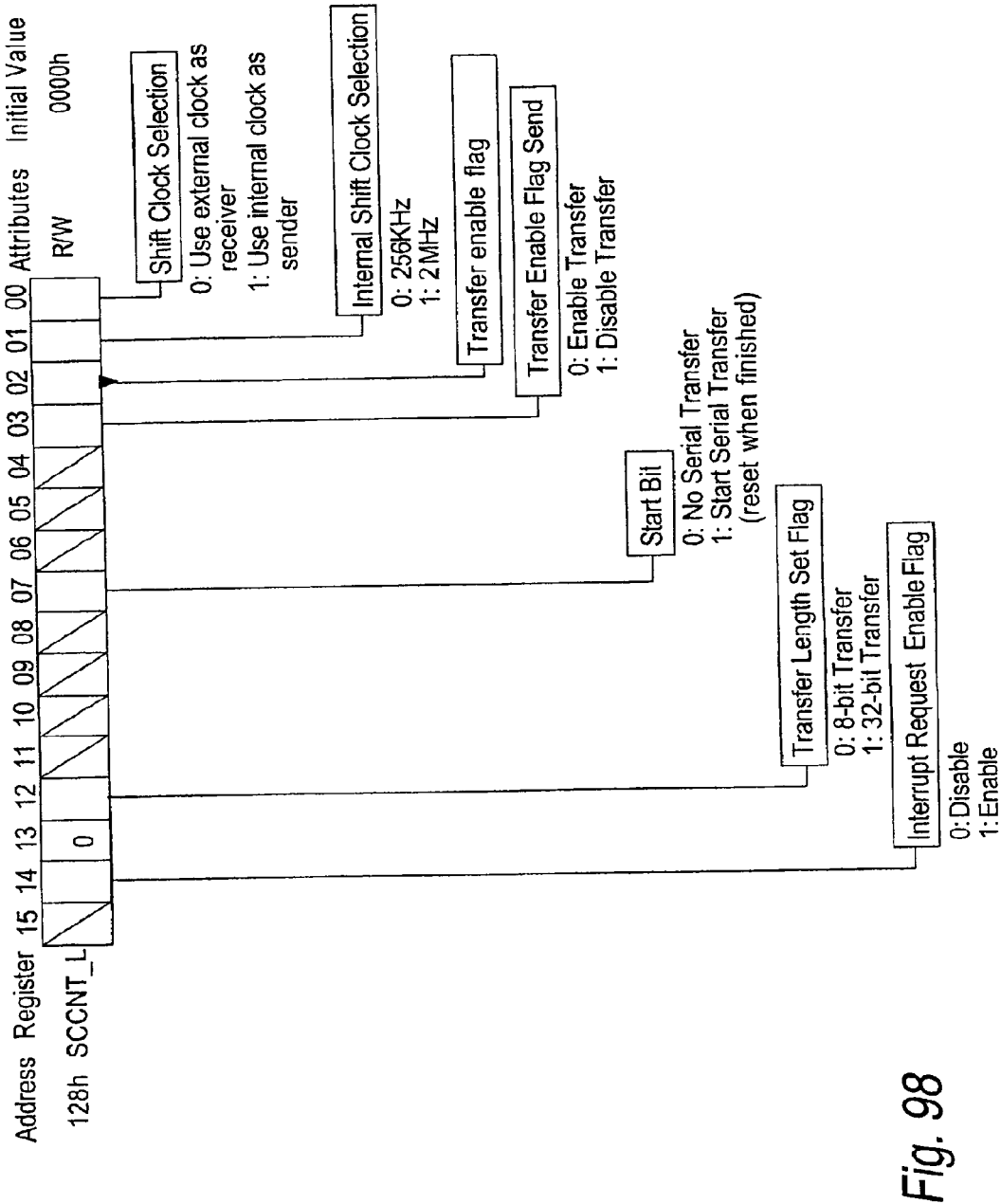
FIG. 98 depicts register SCCNT_L.

The control register SCCNT_L is shown in FIG. 98. When Register R (d15)=(0), the mode is the 8-bit normal serial communication mode if Register SCCNT_L (d13, d12)=(0, 0), and the mode is 32-bit normal serial communication mode if SCCNT_L (d13, d12)=(0, 1).

SCCNT_L [d14] (Interrupt Request Enable Flag) determines whether interrupt requests will be made. If 0 is set, an interrupt request will not be made. If 1 is set, an interrupt request will be made immediately after transfer is complete.

SCCNT_L [d12] (Transfer Length Setting Flag) sets the bit length of transfer data. If set to 0, 8-bit transfer is carried out. If set to 1, 32-bit transfer is carried out.

SCCNT_L [d07] (Start Bit) is set to 1 to start a serial transfer. This bit is automatically reset after transfer completion.

SCCNT_L [d03] (Transfer Enable Flag Send)—a setting of 0 enables transfer and a setting of 1 disables transfer. This flag is output from the SO terminal until the start of a transfer. When the transfer starts, serial data is output from the SO terminal.

SCCNT_L [d02] (Transfer Enable Flag Receive)—it is possible to read the status of the SI terminal (transfer-enable flag transmitting of the other party's hardware) before communication starts. It becomes invalid after communication has started (receive data bit during communication is reflected).

SCCNT_L [d01] (Internal Shift Clock Selection)—if set to 0, 256 KHz is selected for the shift clock. If set to 1, 2 MHz is selected for the shift clock.

SCCNT_L [d00] Shift Clock Selection—if set to 0, an external clock is used as a shift clock (slave). The external clock is input by the SC terminal from another hardware unit. The SD terminal will go to LO output. If set to 1, an internal clock is used as a shift clock (master). The internal clock is output from the SC terminal, and SD terminal will be in the pull-up input status.

The shift clock is preferably selected before the start bit of the SCCNT_L register is set. Extra shift operations may result if the serial transfer is started before or at the same time as the shift clock is selected.

The SCCNT_L register is preferably not accessed while its start bit is set.

The 8 bit transfer mode is compatible in terms of modes with DMG/CGB, but the voltage with the communication terminal varies. Therefore, communication between AGB and DMG/CGB is not possible.

For normal communication, use of cable is prohibited.

In order to communicate between AGBs, the multi player communication functions described below are used.

Example Normal Serial Communication Flow

Figure 99:
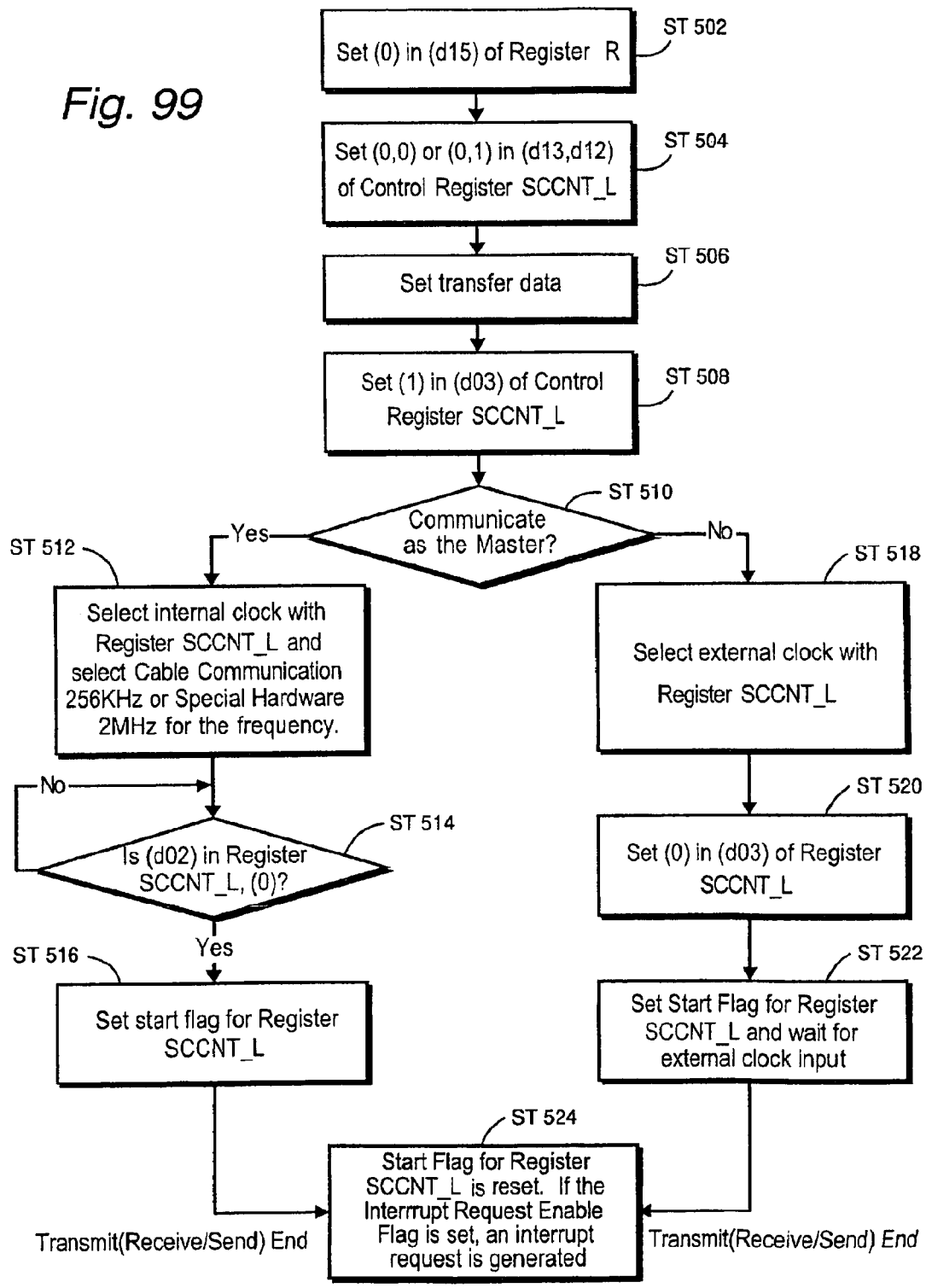
FIG. 99 is a flowchart illustrating an example normal serial communication.

FIG. 99 is a flowchart showing an example normal communication flow. At ST 502, (0) is set in (d15) of register R. Then, at ST 504, (0, 0) or (0, 1) are set in (d13, d12) of control register SCCNT_L. The transfer data is set at ST 506 and (1) is set in d(03) of control register SCCNT_L at ST 508. At ST 510, a determination is made as to whether the example AGB is communicating as the master device. If so, at ST 512, the internal clock is selected with register SCCNT_L and cable communication 256 KHz or special hardware 2 MHz is selected for the frequency. The operation then proceeds to ST 514 where a determination is made as to whether (d02) in register SCCNT_L is (0). This step is repeated until (d02) is (0). The operation then proceeds to ST 516 where a start flag is set for register SCCNT_L. At the end of transmit (receive/send), the operation proceeds to ST 524.

If, at ST 510, it is determined that the device is not communicating as the master device, the operation proceeds to ST 518 where the external clock is selected with the register SCCNT_L. Then, at ST 520, (0) is set in (d03) of register SCCNT_L and, at ST 522, the start flag is set for register SCCNT_L and the external clock input is waited for. At the end of transmit (receive/send), the operation then proceeds to ST 524.

At ST 524, the start flag for register SCCNT_L is reset. If the Interrupt Request Enable Flag is set, an interrupt request is generated.

16-Bit Multi-player Communication

The example AGB enables multi-player communication between up to 4 units using a special cable. Depending on the connection status, one unit is established as the master and transfers data to slaves in order, one after another.

Figure 100:
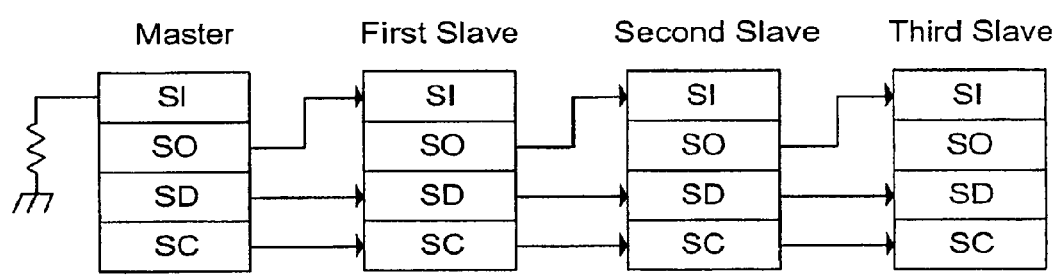
FIG. 100 depicts a connection status during multi-player communication.

The connection status during multi-player communication is shown in FIG. 100. In multi-player communication mode SC and SD become pull-up input terminals. Immediately following a reset or in another communication mode, LO is output from the SD terminal. Once the SD terminal becomes HI, it can be determined that all connected terminals have entered multi-player communication mode.

The SI terminal is in pull-up input, but due to the multi-player communication cable it becomes pull-down. Thus, once all of the terminals are in multi-player mode, the terminal that is LO input to the SI terminal becomes the master. The terminal that is HI input to the SI terminal becomes the slave. If the start bit of Register SCCNT_L of the master is set, the data registers SCD0, SCD1, SCD2, and SCD3 of the master are initialized to FFFFh. Additionally, the "SYNC signal" (LO level) is output from the SC terminal. At the same time, the "Start bit" (LO level) is output from the SD terminal. Next, the data from Register SCCNT_H is output and a "Stop bit" (HI level) is output. After this is done, the master makes the SD terminal become pull-up input, and LO is output from the SO terminal. Each slave detects the "SYNC Signal" output from the master and initializes all of the data registers (SCD0, SCD1, SCD2, and SCD3 shown in FIGS. 104A-104D, respectively) to FFFFh. The data output from the master is stored in the master and each slave's SCD0 register.

If LO is input to the SI terminal of the slave that was connected immediately following the master, a "Start bit" (LO level) is output from the SD terminal. Next, data from Register SCCNT_H is output, and lastly a "Stop bit" (HI level) is output. After this, the SD terminal goes to pull-up input and LO is output from the SO terminal. At this point, the data output from the first slave is stored in the master and each slave's SCD1 Register. In this way, each slave is sent and all transmissions are carried out.

In the following situations, the master produces a "SYNC Signal" (pull-up input after the output of a 5 cycle HI interval of source oscillation) and the transmission ends:

After the master outputs its own "Stop bit", the next "Start bit" is not input after a certain period of time.

After a "Stop bit" is received from the first or second slave, a "Start bit" is not input after a certain period of time.

A "Stop bit" is received from the third slave. Once the transmission ends, the received data is stored in each of the data registers (SCD0, SCD1, SCD2, and SCD3). If there is a terminal that is not connected, the initial data FFFFh is stored.

Figure 101:
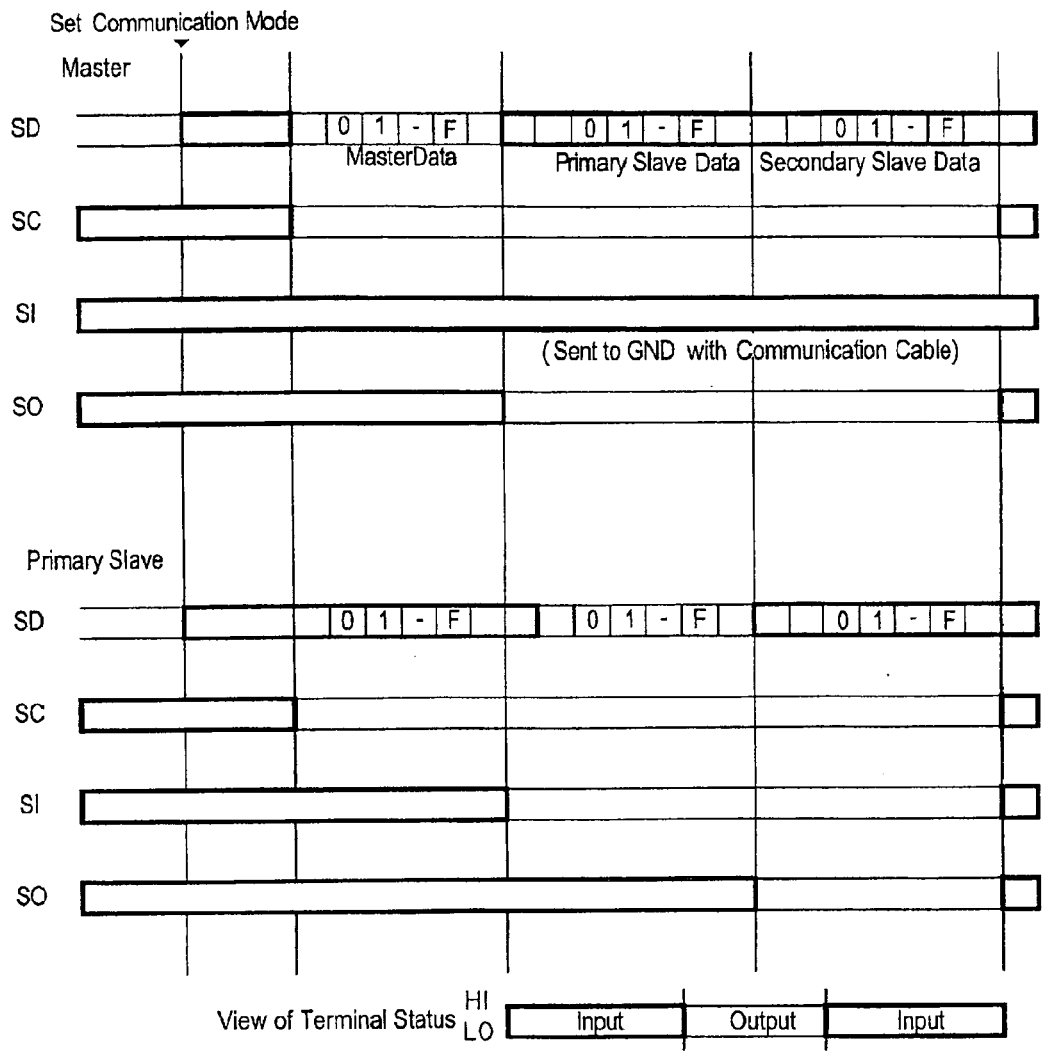
FIG. 101 is a multi-player communication timing chart.
Figure 102:
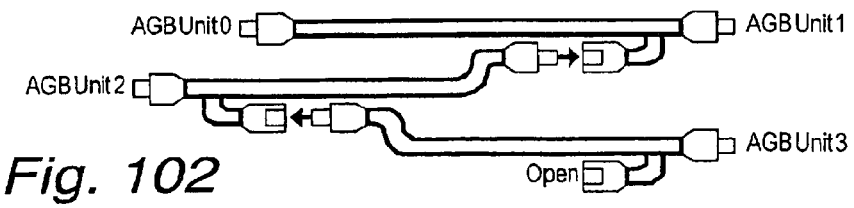
FIG. 102 is a multi-player communication cable connecting diagram.

FIG. 101 is a multi-player communication timing chart and FIG. 102 is a multi-player communication cable connecting diagram. As can be seen in FIG. 102, each cable includes a first connector for connecting to the communication interface of one AGB (e.g., the master AGB), a second connector for connecting to the interface of another AGB (e.g., a first slave AGB), and a third connector for connecting to a connector of another cable to which another AGB is connected (e.g., a second slave AGB).

Data Registers

The data send is stored in the Register SCCNT_H shown in FIG. 103. After completion of multi-player communication ends, the send data for the master is in register SCD0 shown in FIG. 104A.

Control Register

Figure 105:
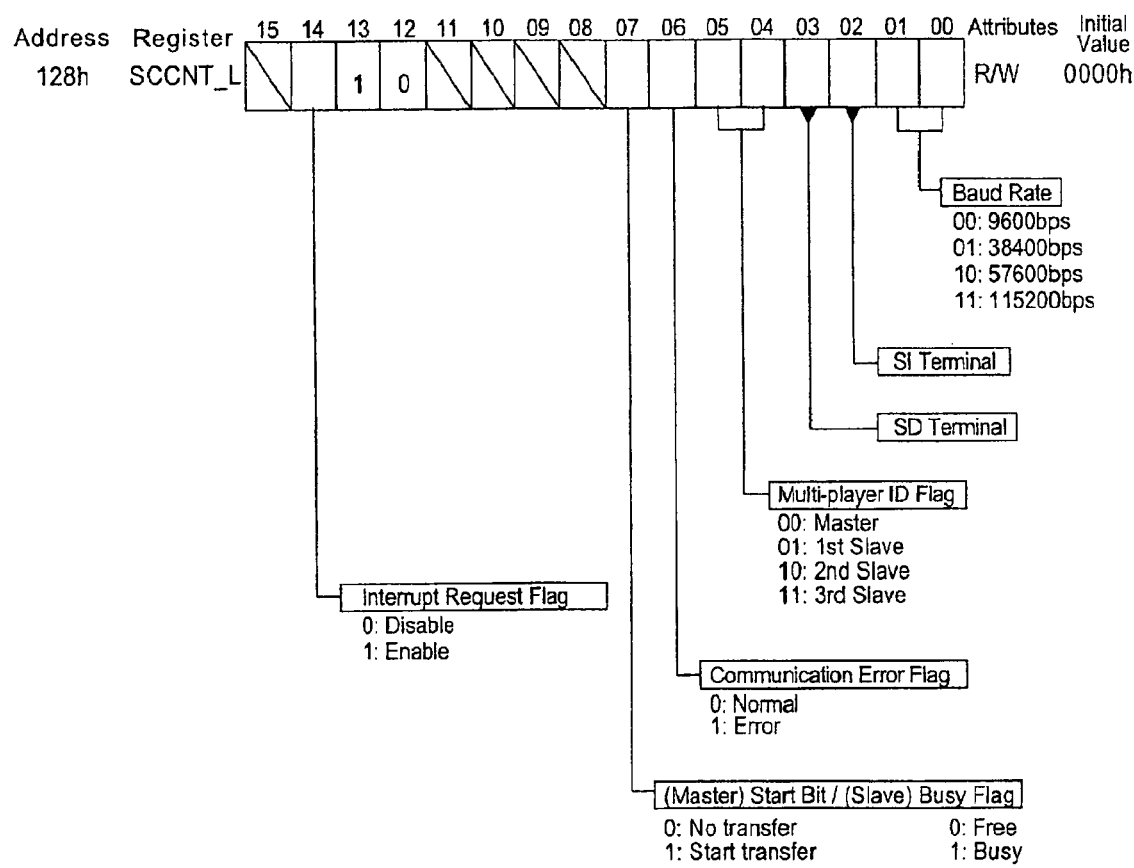
FIG. 105 depicts register SCCNT_L.

If Register SCCNT_L (d13,d12)=(1,0) when Register R (d15)=(0), 16-bit multi-player communication mode is enabled. Register SCCNT_L is shown in FIG. 105.

SCCNT_L [d14] (Interrupt Request Enable Flag)—when set to 0, no interrupt request is generated. When set to 1, an interrupt request is generated upon the completion of multi-player communication.

SCCNT_L [d07] (Start Bit/Busy Flag)

1. Master (d00 is 1)

When set to 0, no data is transferred. When set to 1, a data transfer is started. Upon completion of data transfer, it is automatically reset.

2. Slave (d00 is 0)

Set during input of transmit start bit (LO source oscillation cycle×3 (approx. 180 ns)), and reset when transfer is complete.

SCCNT_L [d06] (Communication Error Flag) allows confirmation of communication status. If the status for this bit is 0, there is no error. If it is 1, an error has occurred. This error flag is automatically set in the following situations:

The SI Terminal does not become LO during the interval when the "SYNC signal" is being input (the master is outputting).

The stop bit for the receive data is not HI (Framing Error) Even if an error occurs, the communication continues, and invalid data is stored in SCD0-SCD3.

SCCNT_[d05-d04] (Multi-player ID Flag)—when multi-player communication ends, an ID code will be stored which specifies the order that each particular system was connected.

SCCNT_L [d03] (SD Terminal)—the status of the SD Terminal can be read. If all of the connected terminals enter multi-player communication mode, it becomes HI status.

SCCNT_L [d02] (SI Terminal)—the status of the SI Terminal can be read. When all of the connected terminals are in multi-player communication mode, this shows that the terminal that is LO input to the SI terminal is the master. HI input means that it is a slave. Prior to communication starting, it is not possible to determine the number order of a particular slave.

SCCNT_L [d01-d00] (Baud Rate)—sets the communication baud rate as set forth in Table XX.

TABLE XX

| Setting | Baud rate |
|---------|-----------|
| 00 | 9600 bps |
| 01 | 38400 bps |
| 10 | 57600 bps |
| 11 | 115200 bps |

Example Multi-Player Communication Flow

Figure 106:
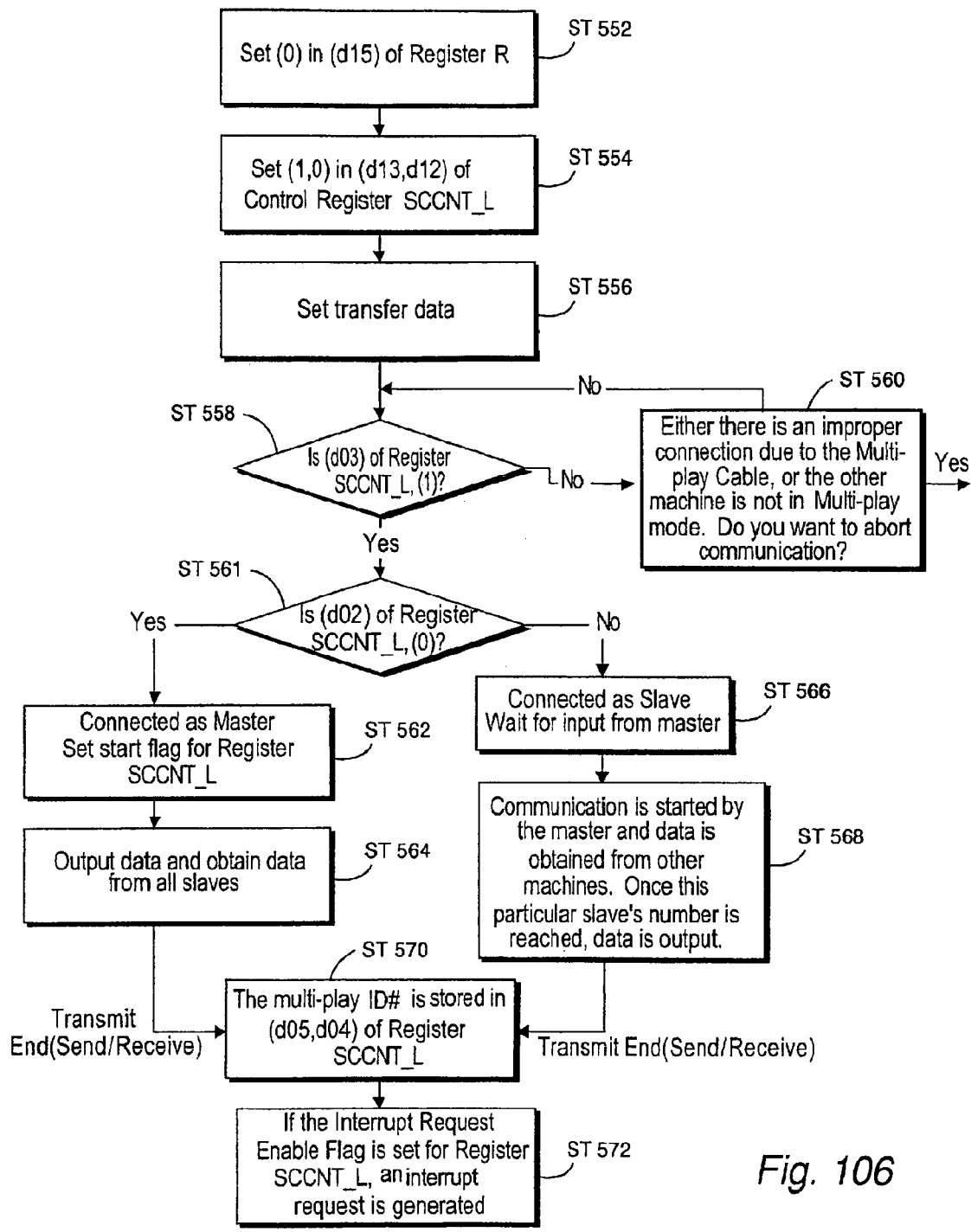
FIG. 106 is a flowchart illustrating an example multi-player communication.

FIG. 106 is a flowchart illustrating an example multi-player communication flow. At ST 552, (0) is set in (d15) of register R. At ST 554, (1, 0) is set in (d13, d12) of control register SCCNT_L and, at ST 556, the transfer data is set. At ST 558, a determination is made as to whether (d03) of register SCCNT_L is (1). If not, either there is an improper connection due to the multi-player cable, or the other system is not in multi-play mode and the player is able to abort communication (ST 560). If the player does not abort communication, the operation proceeds back to ST 558. If the player aborts communication, the operation ends.

If, at ST 558, it is determined that (d03) of register SCCNT_L is (1), a determination is then made as to whether (d02) of register SCCNT_L is 0 (ST 561). If so, the operation proceeds to ST 570 via ST 562 and ST 564. If not, the operation proceeds to ST 570 via ST 566 and ST 568.

At ST 562, the device is determined to be connected as the master and the start flag is set for register SCCNT_L. At ST 564, data is output and data is obtained from all slaves. At ST 566, the device is determined to be connected as a slave and waits for input from the master. At ST 568, communication is started by the master and data is obtained from other systems. Once this particular slave's number is reached, data is output.

At ST 570, the multi-play ID number is stored in (d05, d04) of register SCCNT_L. At ST 572, if the interrupt request enable flag is set for register SCCNT_L, an interrupt request is generated.

UART Communication Functions

Figures 107, 108A:
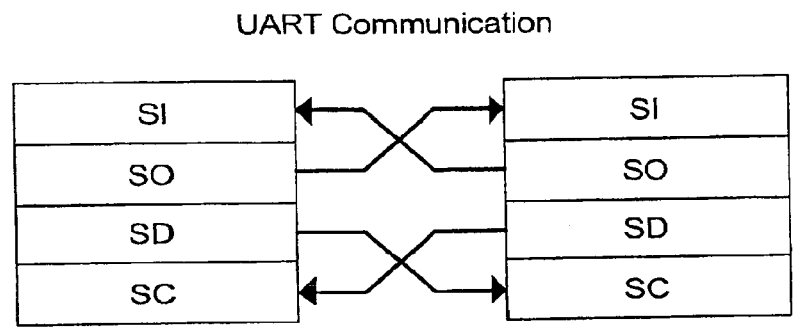
FIG. 107 depicts a connection during UART communication.
FIGS. 108A and 108B depict registers SCCNT_H and SCCNT_L, respectively.

UART communications are illustrated in FIG. 107. In the UART communication mode, a HI level is output from the SD terminal of a first system. When the receive data register (or the receive FIFO) is full, a HI is output from the SD terminal. When it is not full, a LO is output from the SD terminal if the receive enable flag is set. A HI is output if it is reset.

The output of the SD terminal of a second system is input to the SC terminal of the first system. Once data is written to the send data register, data is sent after a "Start bit" (1 bit) is sent from the SO terminal. However, when the CTS flag for the Control Register is set, data can be sent only when there is a LO input to the SC terminal. The Stop bit is a fixed 1 bit.

When sending or receiving, there are 4 bytes of FIFO. The use of FIFO can be selected using the FIFO enable flag for the control register SCCNT_L.

If FIFO is not used, when Register SCCNT_H is written to, data is written to the send data register. When a read is done, data is read from the receive data register (only the lower 8 bits are valid).

If FIFO is used, when Register SCCNT_H is written to, data is written to the send data FIFO. When a read is done, data is read from the receive FIFO (only the lower 8 bits are valid).

Figure 108B:
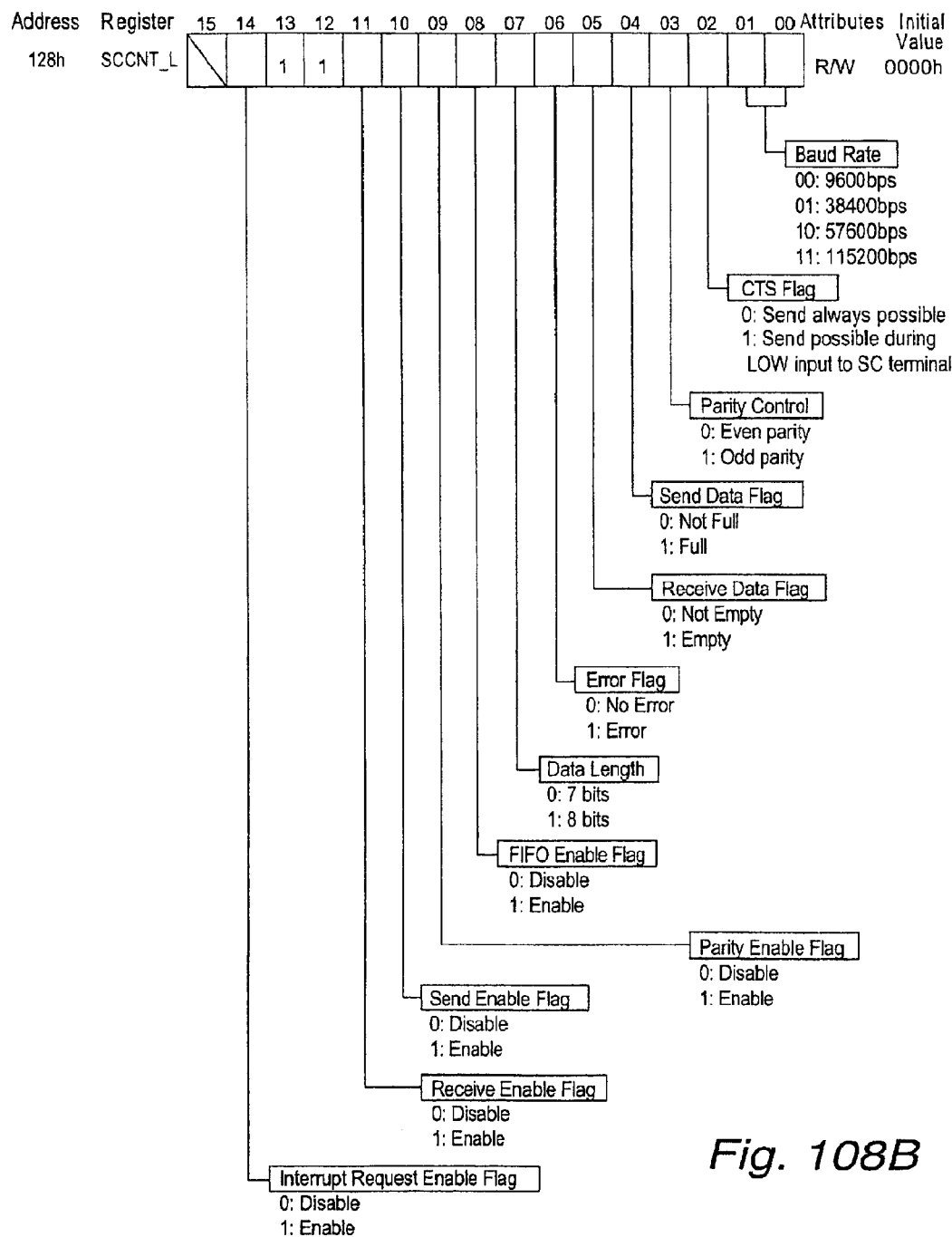

Data register SCCNT_H is shown in FIG. 108A and control register SCCNT_L is shown in FIG. 108B. If Register SCCNT_L (d13,d12)=(1,1) is set when Register R (d15)=(0), UART communication mode is set.

SCCNT_L [d14] (Interrupt Request Enable Flag)—when set to 0, an interrupt request is not generated. When set to 1, an interrupt request is generated when a communication error occurs and when the transmission(send/receive) ends.

SCCNT_L [d11] (Receive Enable Flag) controls the receive enable/disable. If the receive enable flag is set when the receive data register (or the receive FIFO) is not full, a LO is output from the SD terminal, and a HI is output if it is reset. The receive enable flag must be set and the send enable flag must be set to 0 [Disable] before going from UART communication mode to a different communication mode.

SCCNT_L [d10] (Send Enable Flag) controls the send enable/disable. The receive enable flag must be set and the send enable flag must be set to 0 [Disable] before going from UART communication mode to a different communication mode. SCCNT_L [d09] (Parity Enable Flag) controls the parity enable/disable.

SCCNT_L [d08] (FIFO Enable Flag) controls the send of the 8 bit wide×4 depth and the receive FIFO enable/disable. When using FIFO, it is needed to go into the UART mode in a status of 0 [FIFO Disable]. By disabling FIFO in UART mode the FIFO sequencer is initialized.

SCCNT_L [d07] (Data Length) selects the data length as 8 bits or 7 bits.

SCCNT_L [d06] (Error Flag)—by referring to this error flag, the status of communication errors can be determined. When this flag is 0, no errors have occurred. When this flag is set to 1, an error has occurred. By reading Register SCCNT_L, this error flag is reset. Additionally, when there has been an error, the data from the Receive Shift Register is not written to the Receive Data Register. The conditions associated with each error are described in Table XXI.

TABLE XXI

| Framing error | The receive data stop bit is not 0 |
|---------------|------------------------------------|
| Parity error | When parity is enabled, there is an error in parity for the receive data |
| Overrun error | The following receive ends (a stop bit is detected) when the receive data is a status of not empty. |

SCCNT_L [d05] (Receive Data Flag)—when set to 0, there is still data present. When set to 1, it is empty.

SCCNT_L [d04] (Send Data Flag)—When set to 0, it is not full. After one send operation ends this is reset. When set to 1, it is full. It is set during a write of data to the lower 8 bits of the Send Data Register SCCNT_H.

SCCNT_L [d03] (Parity Control) switches between even parity and odd parity.

SCCNT_L [d02] (CTS Flag)—the SD terminal of the other system (receive enable/disable) is input to the SC terminal. When set to 0, a send is always possible independent of the SC Terminal. When set to 1, a send is only possible when a LO is input to the SC Terminal.

SCCNT_L [d01-d00] (Baud Rate) sets communication baud rate as shown in Table XXII.

TABLE XXII

| Setting | Baud rate |
|---------|-----------|
| 00 | 9600 bps |
| 01 | 38400 bps |
| 10 | 57600 bps |
| 11 | 115200 bps |

General Purpose Communication

Setting (d13, d12)=(1, 0) initiates the general purpose communication mode. In this mode, all of the terminals SI, SO, SC, and SD become pull-up and operate as general purpose input/output terminals. Each of the communication terminals SI, SO, SC, and SD can be directly controlled.

Figure 109:
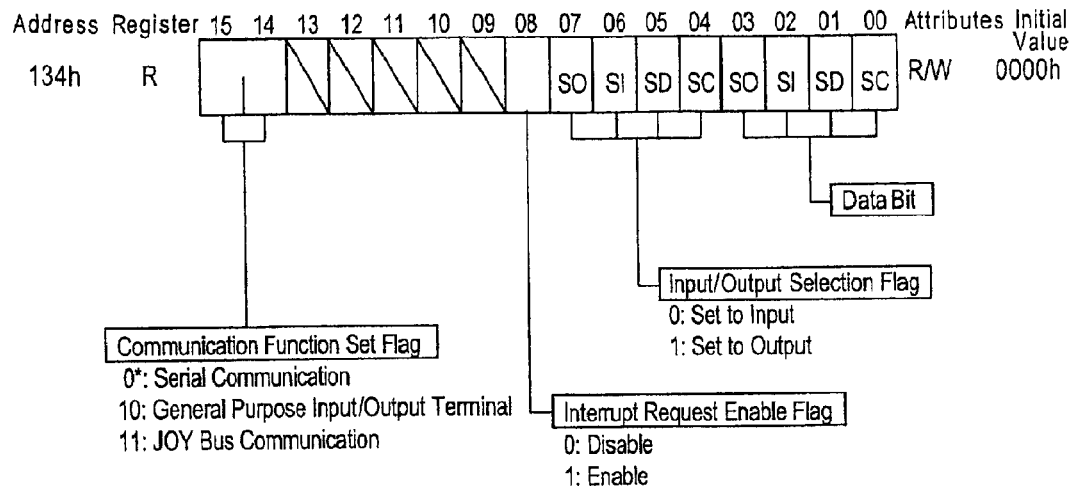
FIG. 109 depicts register R.

Register R is shown in FIG. 109. R [d15-d14] (Communication Function Set Flag)—when set to 00 or 01, the system operates as a serial communication (8-bit/16-bit serial communication, multi-player communication, UART communication function) terminal. When set to 10, the system can be used as a general purpose input/output terminal. When set to 11, the system can be used as a JOY Bus communication terminal.

R [d08] (Interrupt Request Enable Flag)—when general purpose input/output is set (R[d15,d14]=[1,0]) with the Communication Function Set Flag, a 1 causes an interrupt request to be generated with the falling of the SI Terminal (edge detect). When set to 0, no interrupt request is generated.

R [d07-d04] (Input/Output Selection Flag)—when general purpose input/output is set (R[d15,d14]=[1,0]) with the Communication Function Set Flag, a setting of 0 allows the corresponding terminal to be used as an input terminal. A setting of 1 allows the corresponding terminal to be used as an output terminal.

R [d03-d00] (Data Bit)—when the corresponding terminal is set for input, the status (HI/LO) of the terminal can be confirmed. If the corresponding terminal is set for output, the status of the set bit is output.

JOY Bus Communication

By setting the Communication Function Set Flag of Register R to 11, JOY Bus communication mode is selected. In JOY Bus communication mode, the SI Terminal is for input, and the SO Terminal is for output. The SD and SC terminals go to LO output.

Figure 110:
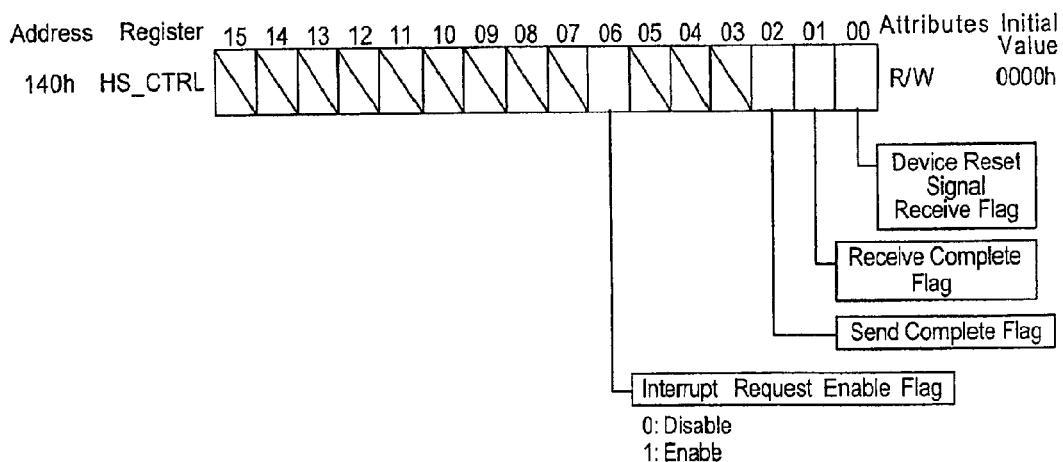
FIG. 110 depicts register HS_CTRL.

Register HS_CTRL for JOY Bus communication control is shown in FIG. 110. HS_CRTL [d05] (Interrupt Request Enable Flag)—when set to 0, an interrupt request is not generated. When set to 1, an interrupt request is generated once a device reset command is received.

HS_CRTL [d02] (Send Complete Flag) is set upon completion of send operation. When this is set, if a 1 is written, a reset can be done.

HS_CRTL [d01] (Receive Complete Flag) is set upon completion of a receive operation. When this is set, if a 1 is written, a reset can be done.

HS_CRTL [d00] (Device Reset Signal Receive Flag) is set when a device reset command is received. When this is set, if a 1 is written, a reset can be done.

The receive data registers JOYRE_L and JOYRE_H are shown in FIGS. 111A and 111B, respectively. The send data registers JOYTR_L and JOYTR_H are shown in FIGS. 112A and 112B, respectively.

The lower 8-bits of the receive status register JSTAT shown in FIG. 113 are returned as the communication status. JSTAT [d05,d04] (General Purpose Flag) is unassigned and may be used as desired.

JSTAT [d03] (Send Status Flag)—when an AGB write data signal is received, this is set. If a word read is done with the JOYRE Register it is reset.

JSTAT [d01] (Receive Status Flag)—when a word write is done with the JOYTR Register, this is set. If an AGB read data signal is received it is reset.

JOY Bus Communication Operations

AGB JOY Bus communication recognizes four commands sent from the host (e.g., the N64®, GameCube, etc.): [Device Reset], [Type/Status Data Request], [AGB Data Write], and [AGB Data Read]. The AGB operates based on the particular signal received. The transfer of the bit data for JOY Bus communication is done in units of bytes and in the order of MSB first.

[Device Reset] Command(FFh) Received

The device reset signal receive flag for Register HS_CTRL is set. If the interrupt request enable flag for the same register is also set, a JOY Bus interrupt request is generated. See FIG. 114.

[Type/Status Data Request] Command(00h) Received

Returns 2 byte type number (0004h) and 1 byte communication status. See FIG. 115.

[AGB Data Write] Command(15h) Received

Receives the 4 bytes of data sent following this command, and stores them in Register JOYRE. Once the receive is completed a 1 byte communication status is returned, and the receive complete flag for Register HS_CTRL is set. Also, if the interrupt request enable flag for the same register is set, a JOY Bus interrupt request is generated. See FIG. 116.

[AGB Data Read] Command(14h) Received 4 bytes of data stored in Register JOYTR and the 1 byte communication status are sent, and the send complete flag for Register HS_CTRL is set. Also, if the interrupt request enable flag for the same register is set, a JOY Bus interrupt request is generated. See FIG. 117.

Communication Cable

Figure 118A:
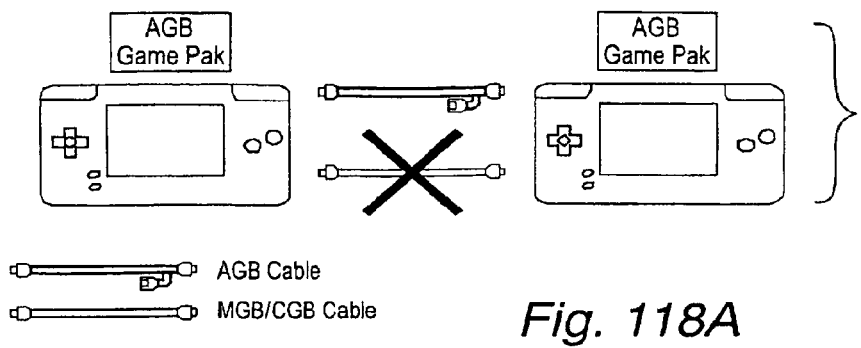
Figure 118B:
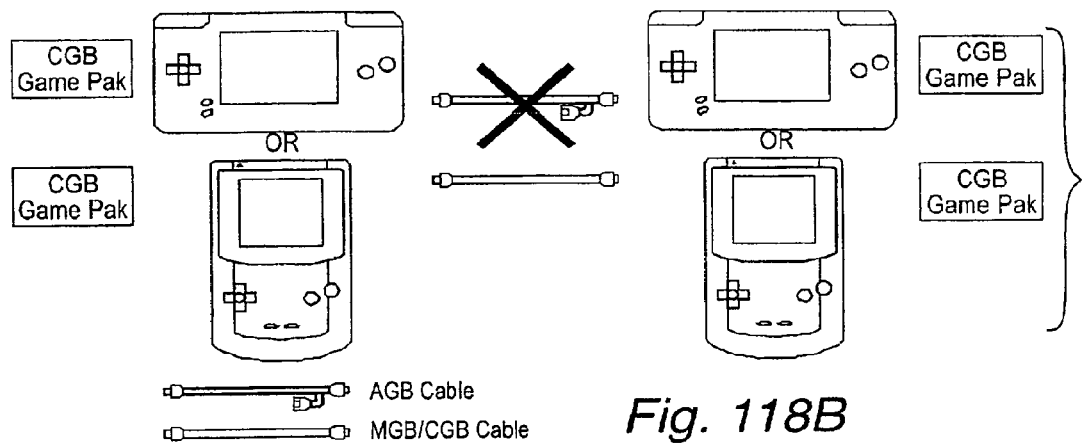
Figure 118C:
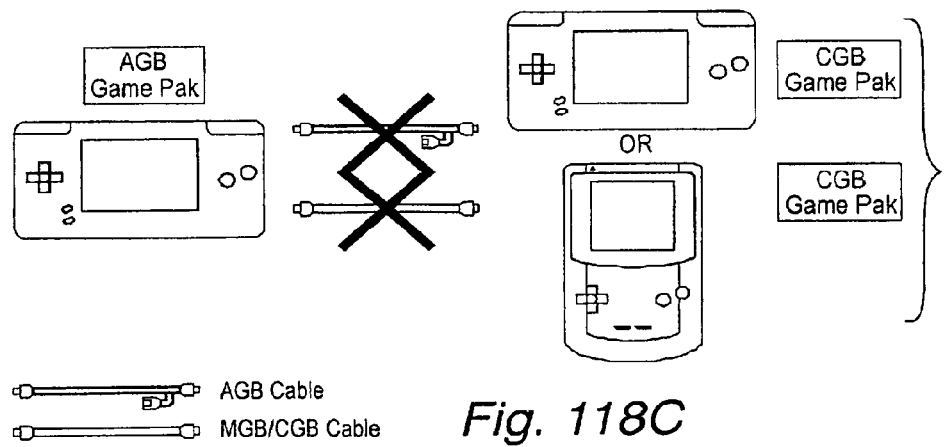

When communicating between AGB units, the communication cable to be used will vary depending upon the type of game cartridge used as shown in FIGS. 118A-118C.

Key Input

Key Status

Figure 119:
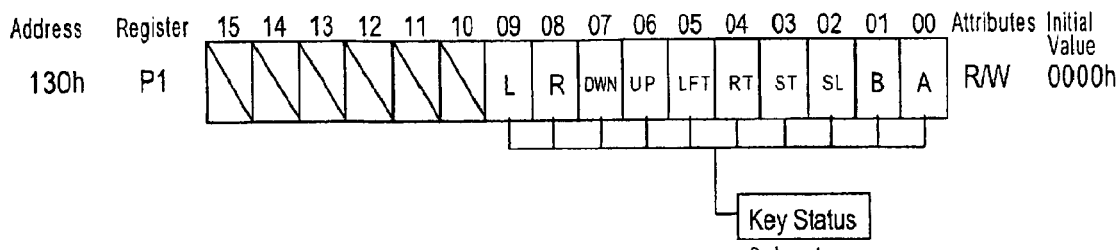

The AGB allows input with the operating keys 33a-33g. The status of each of these operating keys can be checked by reading the individual bits of Register P1 shown in FIG. 119.

Key Interrupt Control

Figure 120:
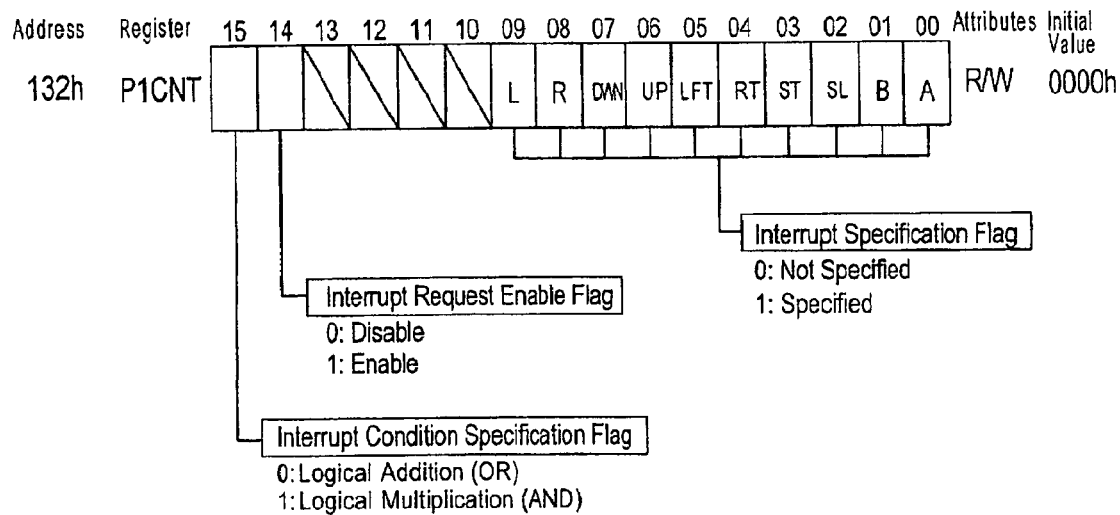

When an interrupt is performed for key input, the register P1CNT shown in FIG. 120 enables a target key combination or condition for the interrupt to be specified.

Interrupt Conditions

The interrupt conditions specify interrupt generation conditions when the interrupt enable request flag is true. The conditions for buttons selected with the key interrupt specification flag can be selected as follows:

1. Logical Addition (OR) Operation

The conditions for interrupt request generation occur when there is input for any of the buttons specified as interrupts.

2. Logical Multiplication (AND) Operation

The conditions for interrupt request generation occur when there is simultaneous input for all of the keys specified as interrupt keys.

Interrupt Control

AGB can use 14 types of maskable hardware interrupts. If an interrupt request signal is received from a hardware item, the corresponding interrupt request flag is set in the IF register. Masking can be performed individually for interrupt request signals received from each hardware item by means of the interrupt request flag register IE.

Figure 121:
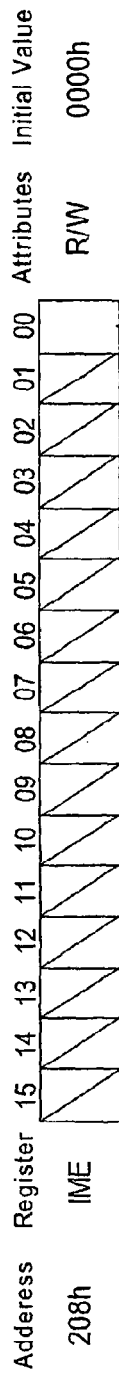

The Interrupt Mask Enable Register IME is shown in FIG. 121. The entire interrupt can be masked. When this flag is 0, all interrupts are disabled. When 1, the setting for interrupt enable register IE is enabled.

Figure 122:
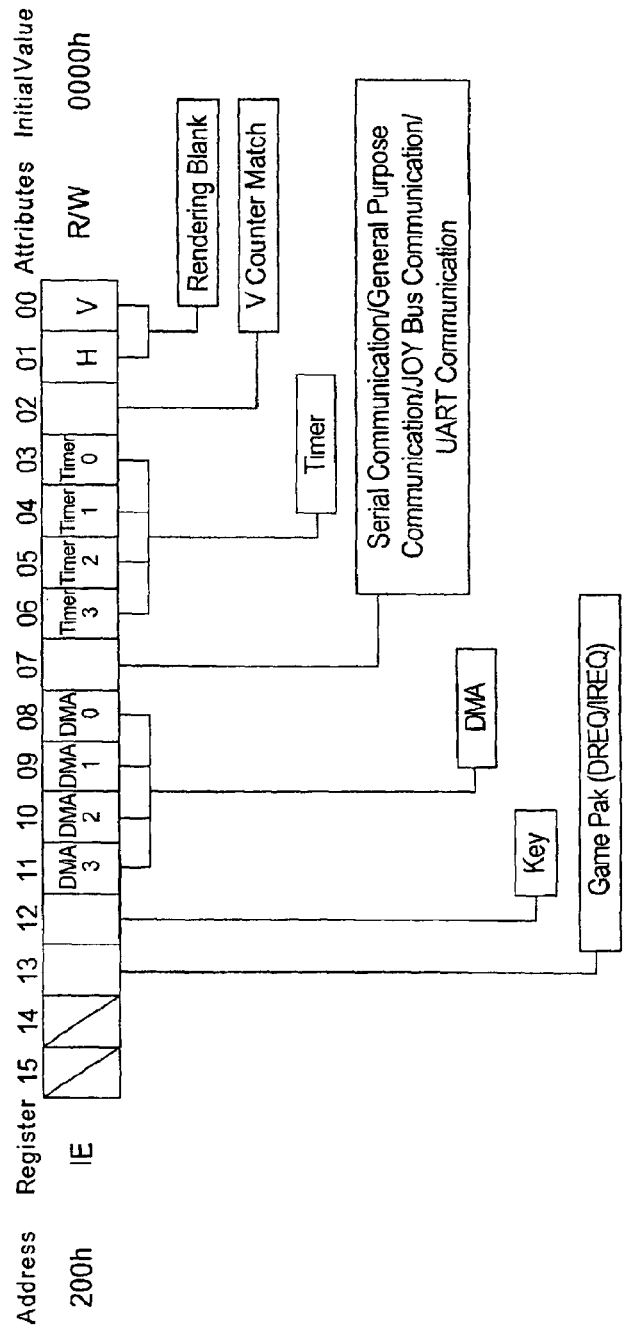

The Interrupt Enable Register IE is shown in FIG. 122. With the interrupt enable register, each hardware interrupt can be individually masked. By resetting the bit, the corresponding interrupt can be prohibited. Setting the bit to 1 enables the corresponding interrupt.

Figure 123:
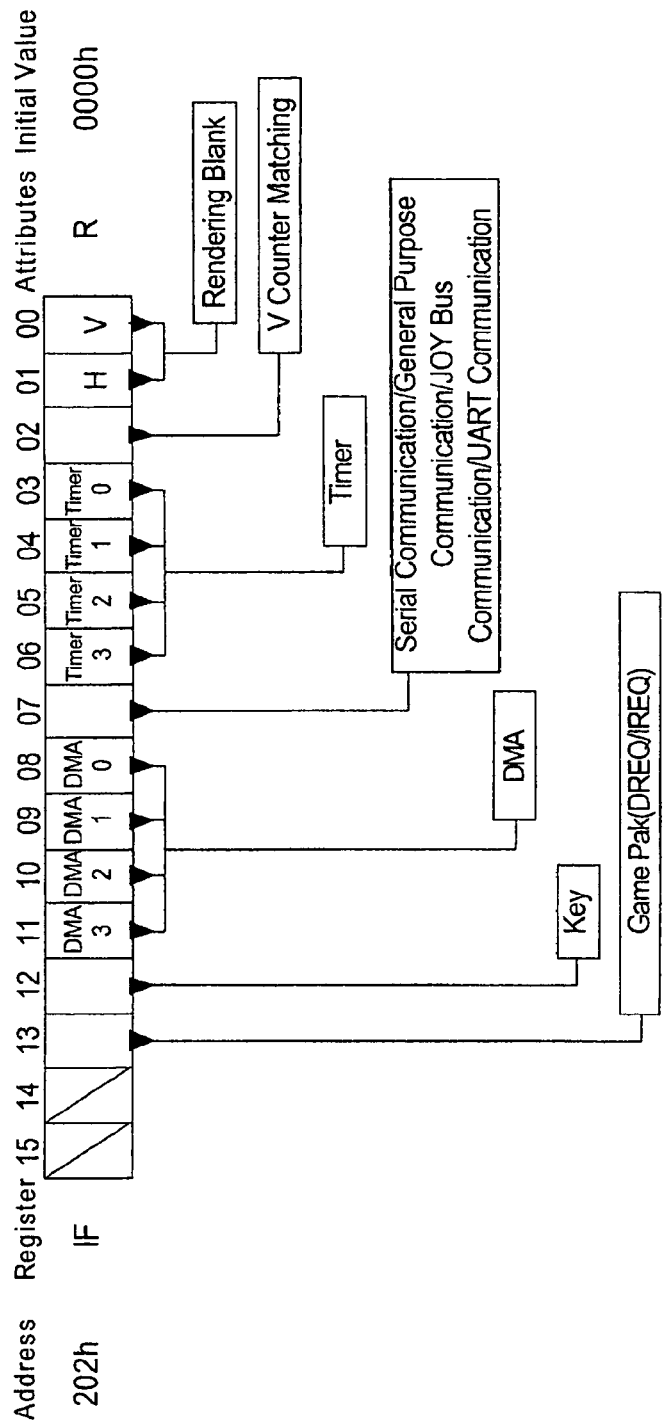

The Interrupt Request Register IF is shown in FIG. 123. When an interrupt request signal is generated from each hardware device, the corresponding interrupt request flag is set in the IF Register. If a 1 is written to the bit that the interrupt request flag is set in, that interrupt request flag can be reset.

System-Allocated Area in Work RAM

Figure 124:
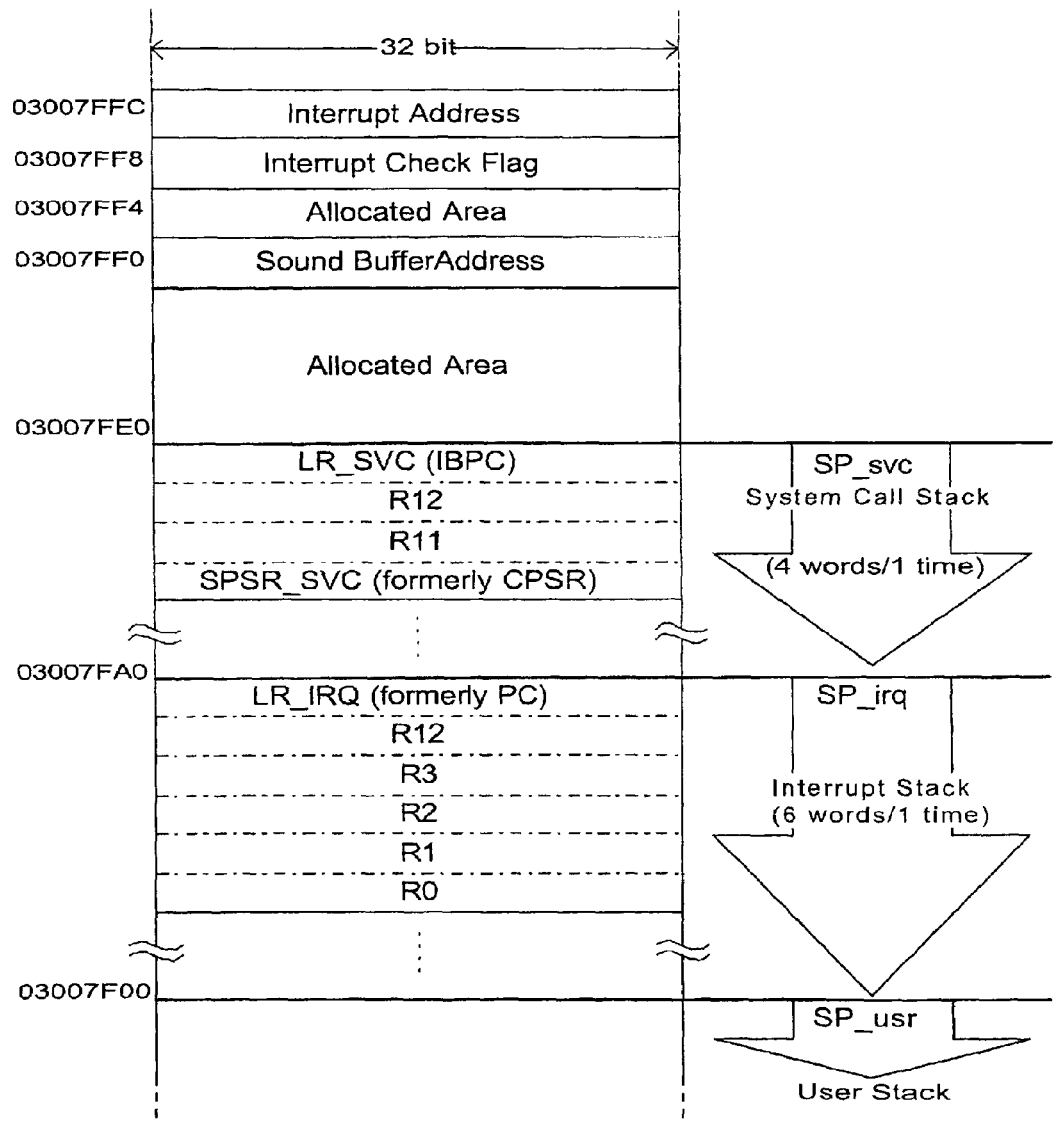

Controlling interrupts entails, along with clearing the IF register and setting the IE register, first writing an interrupt jump address at addresses $7FFC-$7FFF (total of 32 bits; see FIG. 124) in the system allocated area of Work RAM. Processing is executed in 32-bit mode for the user interrupt. To return control from the interrupt routine to the user program, the instruction "BX LR" is used. By changing each CPU Mode SP Initial-value, they can be set to an arbitrary memory map.

Interrupt Operation

The Interrupt Processing Routine can be arbitrarily defined, but as a general rule, a monitor ROM is provided to handle this processing.

Normal Interrupt

1. With reference to FIG. 125A, if an interrupt occurs, the CPU enters IRQ mode and control shifts to the monitor ROM. In the monitor ROM, each register (R0~R3, R12, LR_irq (former PC)) is saved to the Interrupt Stack. The total is 6 words. Next, the user interrupt processing set up in 03007FFCh is called. Commands called from the monitor directly must be in 32-bit code format.

2. User interrupt processing is done (the cause of the interrupt can be referenced with the IF Register). Problems with a stack are solved, if necessary.

3. Restore the registers (total of 6 words) saved to the Interrupt Stack and return to user main processing. See FIG. 125B.

Only the interrupt stack is used for normal interrupt processing. Therefore, there is a possibility of stack overflow in some cases. To solve this problem, a larger interrupt stack can be allocated by moving SP usr in advance or using the user stack for both, by switching the CPU mode to the user mode in user interrupt processing. In connection with the latter method, an explanation of multiple interrupts is described below.

Multiple Interrupts

1. If an interrupt occurs, the CPU enters IRQ mode and control shifts to the monitor ROM. In the monitor ROM, each register (R0~R3, R12, LR_irq (former PC)) is saved to the Interrupt Stack. The total is 6 words. Next, the user interrupt processing set up in 03007FFCh is called. Commands called from the monitor directly must be in 32-bit code format. See FIG. 126A.

2. User interrupt processing is done (the cause of the interrupt can be referenced with the IF Register). If multiple interrupts occur, SPSR irq will be overwritten, so a save must occur before enabling IRQ. See FIG. 126B. The Stack problem is solved (CPU mode is changed to user mode with system mode-privilege) and IRQ is enabled. With user interrupt processing, user stack is used because the CPU is in system mode. When calling the subroutine, LSR_usr is saved as well. See FIG. 126C. When an interrupt occurs, the monitor ROM does the processing (1) again, and loads each register to the interrupt stack. See FIG. 126D. Continue processing (2).

Power Down Functions

Stop Function

Stop Function Summary

During periods when the LCD display is not done and CPU processing is not considered essential, power consumption can be reduced greatly if used efficiently. The content of each type of RAM are maintained.

Implementing Stop

1. Implemention of Stop Mode

The AGB is placed in stop mode by executing the system call [SWI<3>] instruction (Stop( ).

2. Canceling Stop Mode

If the corresponding flag with the interrupt enable register IE is set when there is an interrupt request from a key, game cartridge, or SIO, the stop is cancelled.

Canceling stop status requires a brief wait until the system clock stabilizes.

System Working Status in Stop Mode

The working status of each block of the AGB system during a stop is shown in Table XXIII:

TABLE XXIII

| Block | Working | Status |
| --- | --- | --- |
| AGB-CPU | X | Wait status resulting from wait signal |
| LPU | X | Stopped because no clock provided |
| Sound | X | Stopped |
| Timer | X | Stopped |
| Serial Communication | X | Stopped |
| Key | X | Stopped |
| System Clock | X | Stopped |
| Infrared Communication | X | Stopped |

In the case of the LPU block, Stop mode is entered after turning the LCD OFF because the LPU stops. If Sound stops in Stop mode, noise may be heard.

Halt Function

Halt Function Summary

During periods when CPU processing is not considered essential, power consumption can be reduced.

Implementing Halt

1. Invoking Halt

The AGB is placed in halt mode by executing the system call [SWI<2>] instruction (Halt( ).

2. Canceling Halt

Halt is canceled when the interrupt enable register IE's corresponding flag is set with any type of interrupt request.

System Working Status in Halt Mode

The working status of each block of the AGB system during a semi-stop is shown in Table XXIV.

TABLE XXIV

| Block | Working | Status |
| --- | --- | --- |
| AGB-CPU | X | Wait status resulting from wait signal |
| LPU | ○ | Normal operation |
| Sound | ○ | Normal operation |
| Timer | ○ | Normal operation |
| Serial Communication | ○ | Normal operation |
| Key | ○ | Normal operation |
| System Clock | ○ | Normal operation |

AGB System Calls
  System Call Operation
    Normal Calls
    1. When an argument is required for the system call used, after writing to registers R0-R3 call the monitor ROM system call with the "SWI<Number>". The CPU mode changes to Supervisor Mode.
    2. The registers, SPSR_svc (formerly CPSR), R 11, R12, LR_svc (formerly PC) are saved to the system call stack with the monitor ROM. See FIG. 127A.
    3. Switch from CPU mode to system mode. The IRQ disable flag is called with the monitor ROM. The previous status will continue.
    4. The R2 and LR_usr registers are saved to the user stack. Other registers will be saved with each system call. See FIG. 127B.
    5. Complete processing using each system call. See FIG. 127C.
    6. Return value to registers R0, R1, and R3, in cases where a system call provides a return value, and then return to the user program. See FIG. 127D.
    Multiple Calls
    1. When an argument is required for the system call used, after reading to the registers, R0-R3, call the monitor ROM system call with the "SWI<Number>".
    2. Save the registers, SPSR_svc (formerly CPSR), R12, LR_svc (formerly PC) to the system call stack with the monitor ROM. See FIG. 128A.
    3. Switch from CPU mode to system mode. The status of the IRQ Disable Flag prior to the call is kept in system ROM. The previous conditions will be continued.
    4. The R2 and LR_usr registers are saved to the user stack. Other registers will be saved with each system call. See FIG. 128B.
    5. Interrupt occurs while executing system call. See FIG. 128C.
    6. User interrupt processing is done. The cause of the interrupt can be referenced with the IF Register. The CPU mode is changed to System Mode (User Mode with privilege) in order to solve the problem with stacks (to reference interrupt processing). See FIG. 128D. If System Call occurs during User interrupt processing, the System Call is called using Multiple Calls.
    7. The monitor ROM does the system call operation (1), and loads to the system call stack. See FIG. 128E.
    8. The CPU Mode is switched to System Mode (privileged user mode).
    9. The monitor ROM does the same operation as (3), and loads to the user stack. See FIG. 128F.
    10. Complete processing with each system call. See FIG. 128G.
    11. Return value to registers R0, R1, and R3, in cases where a system call provides a return value, and then return to the user interrupt processing. See FIG. 128H.
    12. Complete the user interrupt processing and return to the previous system call. See FIG. 128I.
    13. Complete processing with each system call. See FIG. 128J.
    14. Return value to registers R0, R1, and R3, in cases where a system call provides a return value, and then return to the user program. See FIG. 128K.
  ROM Registration Data
    Information about the game is registered in the program area for AGB software as shown in FIG. 129.
    Start Address
    Store the 32-bit ARM command "B<User program start address>".
    Logo Character Data
    The logo/character data, which is displayed when the game is started, is stored here. The monitor ROM checks this data at start-up.
    Game Title
    The game title is stored in this area.
    Game Code
    A game code for the game is stored in this area.
    Maker Code
    A code indicative of the game maker is stored in this area.
    Fixed Value
    A fixed code "96h" is stored.
    Main Unit Code
    A code for the hardware on which the software is intended to run is stored in this area.
    Device Type
    The type of device in the game cartridge is stored. If there is a 1 Mbit flash DACS (Debugging And Communication System) (=custom 1 Mbit flash Memory with security and patch functions) in a game cartridge, the most significant bit is set to 1. Otherwise it is reset.
    Software Version No.
    The ROM version number is stored.
    Complement Check
    The 2's complement of the total of the data stored in address 80000A0h~80000BCh plus 19h is stored.
    Check Sum
    "0" is stored in address 80000BEh and 80000BFh respectively. The ROM data is added byte-by-byte to determine the binary total. The data at address 80000BEh and 80000BFh is replaced with the lower 2 bytes of the calculated result.
    FIGS. 131A-131H identify the various AGB registers.

Other Example Compatible Implementations

Certain of the above-described system components could be implemented as other than the home video game console system or hand-held system configurations described above. An emulator system, for example, might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in function and appearance.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game system platform for which the game programmer wrote the game software. Similarly, PDAs running emulator software may have sufficient performance to approximate the graphics and sound performance of the system.

Application Ser. No. 09/723,322, filed Nov. 28, 2000, now U.S. Pat. No. 6,672,963 (the contents of which are incorporated herein) discloses a software emulator that maintains high-quality graphics and sound in real time across a wide variety of video games and other applications. The emulator disclosed in application Ser. No. 09/723,322 achieves this through a unique combination of features and optimizations including, for example:

- use of a virtual liquid crystal display controller (state machine) to maintain real time synchronization with events as they would occur on the native platform,
- use of a hardware-assisted bit BLIT memory transfer operation to efficiently transfer graphics information into video memory,
- pre-computed translation table for translating native platform graphics character formats into formats more compatible with standard graphics adapters,
- emulation of native platform color palette information to provide compatibility with games and other applications that change color palettes within a frame,
- emulation of major registers and other hardware-based memory structures within the native platform in RAM under software control,
- use of a jump table able to efficiently parse incoming binary instruction formats,
- use of a unique page table to control memory access by remapping memory access instructions into different memory locations and/or function calls,
- availability of a ROM protection function to eliminate ROM overwriting during emulated operations,
- responsive to video game compatibility modes and registration data,
- models native platform using state machine defining search, transfer, horizontal blank and vertical blank states,
- cycle counter to determine when a modeled state has expired and transition to a new state is desired,
- selective frame display update skipping while maintaining execution of all instructions to maintain state information while minimizing game play slowdowns,
- optional NOP loop look ahead feature to avoid wasting processing time in NOP loops,
- redundant emulated RAM and ROM storage to optimize execution efficiency,
- separate page tables for read and write operations,
- modeling of native microprocessor registers as a union of byte, word and long register formats,
- modeling native instruction CPU flags to allow efficient updating after operations are performed by target platform microprocessor,
- mapping emulated program counter into target platform microprocessor general purpose register,
- reads and writes via index register go through pointer tables to increase execution efficiency,
- adaptable input controller emulator to provide user inputs from a variety of different user input devices,
- emulated object attribute memory, and
- use of screen memory buffers larger than screen size to increase paging efficiency by eliminating clipping calculations and using the hardware BitBlt to transfer a subset of the memory buffer to displayed video memory.

It will be recognized that various features and optimizations described in application Ser. No. 09/723,322 are applicable to emulate the example AGBs described herein.

FIG. 132A illustrates an example overall emulation process using a host platform 1201, an emulator component 1303, and a game software executable binary image provided on a storage medium 62. Host 1201 may be a general or special purpose digital computing device such as, for example, a personal computer, a laptop computer, a palm-top computer, a video game console, a portable game system, a personal digital assistant, an internet appliance, a set-top box, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by portable game system 10 from storage medium 62 and converts these program instructions to a target format that can be executed or otherwise processed by host 1201.

As one example, in the case where the software is written for execution on a platform using a specific processor and the host 1201 is a personal computer using a different (e.g., Intel) processor, emulator 1203 fetches one or a sequence of binary-image program instructions from storage medium 62 and converts these program instructions to one or more equivalent Intel binary-image program instructions. The emulator 1203 also fetches and/or generates graphics commands and audio commands and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 132B illustrates one example emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209, magnetic disk drive 1213, and optical disk drive 1217 are connected to system bus 1207 by a hard disk drive interface 1221, a magnetic disk drive interface 1223, and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port, Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

FIG. 132C illustrates another example emulation host system 1201' suitable for use with emulator 1303. The emulation host system in FIG. 132C is generally configured along the lines of a personal digital assistant such as those available from Palm Inc., Handpsring, Inc. and Sony and running an operating system such as Windows CE, EPOC or PalmOS. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) and random access memory (RAM). Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as pushbuttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 1303. Games may be written to memory 1505 using communication circuit 1521 which may take the form of a modem for downloading the game from the Internet, for example, or of a cradle (e.g., a USB cradle) for connecting system 1201' to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1201'.

As described in the foregoing, in the present invention, even if the level of the voltage supplied to a cartridge and an access manner thereto vary depending on the memory type therein, the memory in the cartridge is accessible by identifying the cartridge type and, according to a result obtained thereby, by switching the voltage level and an operation mode of central processing means.

When an information processing device or a game device, for example, is provided with a professor in which the number of bits for data processing is rather large, the data width of a connector may not wide enough. In the example systems, however, memory that has a number of data bits corresponding to the number of bits in the processor for data processing can be connected to a common bus. Further, when the information processing device or game device, for example, is provided with processors each having a different number of bits for data processing to retain compatibility of software, for example, memories each corresponding to those processors are connected to the common bus to be accessed.

The contents of any technical documents or patent documents referenced above are incorporated herein in their entirety.

While the invention has been described in detail, the foregoing description is in all aspects illustrative and not restrictive. It is understood that numerous other modifications and variations can be devised without departing from the scope of the invention.

We claim:
1. A display system for playing a video game, comprising:
a hand-holdable housing;
a liquid crystal display;
one or more input devices;
a first internal boot ROM disposed within the hand-holdable housing and storing code that is executed if a video game program for the video game has a first specification;

a second internal boot ROM disposed within the hand-holdable housing and storing code that is executed if a video game program for the video game has a second specification; and processing circuitry configured to generate image data for display on the liquid crystal display, the image data being selectively generated for viewing on the liquid crystal display in either a widescreen or non-widescreen format.

2. The display system according to claim 1, wherein the one or more input devices comprise a touch screen.

3. The display system according to claim 1, wherein the first specification is an m-bit specification and the second specification is an n-bit specification.

4. The display system according to claim 1, wherein the one or more input devices comprise one or more first input devices arranged on a first side of the liquid crystal display and one or more second input devices arranged on a second side of the liquid crystal display opposite to the first side.

5. The display system according to claim 4, wherein the input devices further comprise shoulder buttons at upper corners of the hand-holdable housing.

6. The display system according to claim 1, further comprising:
processing circuitry comprising plural processor cores.

7. The display system according to claim 1, further comprising:
communication circuitry for wireless connection to the internet.

8. A display system comprising:
a hand-holdable housing;
a touchscreen display arranged on a front surface of the housing;
a speaker arranged on the front surface of the housing;
a first input device arranged on the front surface of the housing, the first input device and the speaker being arranged on opposite sides of the touchscreen display;
a multi-pin connector arranged on side surface of the housing;
an audio jack arranged on a side surface of the housing;
a memory card slot;
communication circuitry configured for wireless connection to the internet;
memory storing multiple application programs; and
processing circuitry comprising plural processor cores, the processing circuitry configured to execute selected application programs and generate image data for display on the touchscreen display, the image data being selectively generated for viewing on the touchscreen display in either a widescreen or non-widescreen format.

9. The display system according to claim 8, further comprising:
first and second internal boot ROMs disposed within the hand-holdable housing.

10. A display system comprising:
a hand-holdable housing;
a touchscreen display arranged on a front surface of the housing;
a speaker arranged on the front surface of the housing;
a first input device arranged on the front surface of the housing, the first input device and the speaker being arranged on opposite sides of the touchscreen display;
a multi-pin connector arranged on side surface of the housing;
an audio jack arranged on a side surface of the housing;
a memory card slot;
communication circuitry configured for wireless connection to the internet;
memory storing multiple application programs; and
processing circuitry comprising plural processor cores, the processing circuitry configured to execute selected application programs and generate image data for display on the touchscreen display, the image data being selectively generated for viewing on the touchscreen display in either a first format in which an image corresponding to the image data is displayed on the entirety of the touchscreen display or a second format in which an image corresponding to the image data is displayed with borders.

11. The display system according to claim 10, further comprising:
first and second internal boot ROMs disposed within the hand-holdable housing.

12. A display system comprising:
a hand-holdable housing;
a touchscreen display arranged on a front surface of the housing;
a speaker arranged on the front surface of the housing;
a first input device arranged on the front surface of the housing, the first input device and the speaker being arranged on opposite sides of the touchscreen display;
a multi-pin connector arranged on side surface of the housing;
an audio jack arranged on a side surface of the housing;
a memory card slot;
communication circuitry configured for wireless connection to the internet;
memory storing multiple application programs; and
processing circuitry comprising plural processor cores, the processing circuitry configured to execute selected application programs and generate image data for display on the touchscreen display, the image data being selectively generated for viewing on the touchscreen display in either a first format in which an image corresponding to the image data is displayed using M1×N1 pixels or a second format in which an image corresponding to the image data is displayed using M2×N2 pixels, where M1, M2, N1 and N2 are numbers, M1 is not equal to M2, and N1 is not equal to N2.

13. The display system according to claim 12, further comprising:
first and second internal boot ROMs disposed within the hand-holdable housing.

* * * * *